United States Patent
Bernstein et al.

(10) Patent No.: US 9,971,499 B2
(45) Date of Patent: May 15, 2018

(54) DEVICE, METHOD, AND GRAPHICAL USER INTERFACE FOR DISPLAYING CONTENT ASSOCIATED WITH A CORRESPONDING AFFORDANCE

(71) Applicant: Apple Inc., Cupertino, CA (US)

(72) Inventors: Jeffrey Traer Bernstein, San Francisco, CA (US); May-Li Khoe, San Francisco, CA (US); Nicholas Zambetti, Largo, FL (US)

(73) Assignee: APPLE INC., Cupertino, CA (US)

( * ) Notice: Subject to any disclaimer, the term of this patent is extended or adjusted under 35 U.S.C. 154(b) by 140 days.

(21) Appl. No.: 14/536,247

(22) Filed: Nov. 7, 2014

(65) Prior Publication Data

US 2015/0067601 A1 Mar. 5, 2015

Related U.S. Application Data

(63) Continuation of application No. PCT/US2013/040998, filed on May 8, 2013.
(Continued)

(51) Int. Cl.
*G06F 3/041* (2006.01)
*G06F 3/0481* (2013.01)
(Continued)

(52) U.S. Cl.
CPC ........ *G06F 3/04883* (2013.01); *G06F 3/0412* (2013.01); *G06F 3/0414* (2013.01);
(Continued)

(58) Field of Classification Search
CPC ..... G06F 3/048–3/04897; G06F 3/041–3/047; G01L 5/226–5/228
See application file for complete search history.

(56) References Cited

U.S. PATENT DOCUMENTS

| | | |
|---|---|---|
| 4,864,520 A | 9/1989 | Setoguchi et al. |
| 5,184,120 A | 2/1993 | Schultz |

(Continued)

FOREIGN PATENT DOCUMENTS

| | | |
|---|---|---|
| AU | 2016100649 A4 | 6/2016 |
| CN | 1808362 A | 7/2006 |

(Continued)

OTHER PUBLICATIONS

Dan Elliott. "Mac System 7." YouTube. YouTube, Aug. 3, 2011. Web. Mar. 8, 2017. <https://www.youtube.com/watch?v=XLv22hfuuik>.*

(Continued)

*Primary Examiner* — Jennifer To
*Assistant Examiner* — Liang Li
(74) *Attorney, Agent, or Firm* — Morgan, Lewis & Bockius LLP

(57) ABSTRACT

An electronic device with a display, a touch-sensitive surface, and sensors to detect intensity of contacts with the touch-sensitive surface displays, on the display, an affordance corresponding to respective content at a respective size and detects a gesture that includes an increase in intensity of a contact followed by a subsequent decrease in intensity of the contact. In response to the increase in intensity, the device decreases a size of the affordance below the respective size. In response to the subsequent decrease in intensity: when a maximum intensity of the contact is above a content-display intensity threshold, the device ceases to display the affordance and displays at least a portion of the respective content; and when a maximum intensity of the contact is below the content-display intensity threshold, the device increases the size of the affordance to the respective size and forgoes displaying the respective content.

36 Claims, 72 Drawing Sheets

Related U.S. Application Data

(60) Provisional application No. 61/778,412, filed on Mar. 13, 2013, provisional application No. 61/747,278, filed on Dec. 29, 2012, provisional application No. 61/688,227, filed on May 9, 2012.

(51) Int. Cl.
| | | |
|---|---|---|
| *G06F 3/0482* | (2013.01) | |
| *G06F 3/0484* | (2013.01) | |
| *G06F 3/0486* | (2013.01) | |
| *G06F 3/0488* | (2013.01) | |
| *G11B 27/00* | (2006.01) | |
| *G11B 27/10* | (2006.01) | |
| *G11B 27/34* | (2006.01) | |

(52) U.S. Cl.
CPC .......... *G06F 3/0482* (2013.01); *G06F 3/0484* (2013.01); *G06F 3/0486* (2013.01); *G06F 3/0488* (2013.01); *G06F 3/04815* (2013.01); *G06F 3/04842* (2013.01); *G06F 3/04845* (2013.01); *G06F 3/04847* (2013.01); *G11B 27/00* (2013.01); *G11B 27/105* (2013.01); *G11B 27/34* (2013.01); *G06F 2203/04802* (2013.01); *G06F 2203/04806* (2013.01)

(56) References Cited

U.S. PATENT DOCUMENTS

| | | |
|---|---|---|
| 5,428,730 A | 6/1995 | Baker et al. |
| 5,463,722 A | 10/1995 | Venolia |
| 5,510,813 A | 4/1996 | Makinwa et al. |
| 5,627,914 A | 5/1997 | Pagallo |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,844,560 A | 12/1998 | Crutcher et al. |
| 5,872,922 A | 2/1999 | Hogan et al. |
| 5,946,647 A | 8/1999 | Miller et al. |
| 6,031,989 A | 2/2000 | Cordell |
| 6,088,027 A | 7/2000 | Konar et al. |
| 6,111,575 A | 8/2000 | Martinez et al. |
| 6,180,894 B1 | 1/2001 | Chao et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,243,080 B1 | 6/2001 | Molne |
| 6,252,594 B1 | 6/2001 | Xia et al. |
| 6,266,684 B1 | 7/2001 | Kraus et al. |
| 6,323,846 B1 | 11/2001 | Westerman et al. |
| 6,347,997 B1 | 2/2002 | Armstrong |
| 6,400,303 B2 | 6/2002 | Armstrong |
| 6,456,778 B2 | 9/2002 | Armstrong |
| 6,459,442 B1 | 10/2002 | Edwards et al. |
| 6,469,691 B1 | 10/2002 | Armstrong |
| 6,470,078 B1 | 10/2002 | Armstrong |
| 6,489,978 B1 | 12/2002 | Gong et al. |
| 6,504,527 B1 | 1/2003 | Armstrong |
| 6,512,530 B1 | 1/2003 | Rzepkowski et al. |
| 6,532,000 B2 | 3/2003 | Armstrong |
| 6,551,357 B1 | 4/2003 | Madduri |
| 6,559,831 B1 | 5/2003 | Armstrong |
| 6,567,102 B2 | 5/2003 | Kung |
| 6,583,798 B1 | 6/2003 | Hoek et al. |
| 6,590,568 B1 | 7/2003 | Astala et al. |
| 6,670,952 B2 | 12/2003 | Jaeger et al. |
| 6,750,890 B1 | 6/2004 | Sugimoto |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 7,259,752 B1 | 8/2007 | Simmons |
| 7,312,791 B2 | 12/2007 | Hoshino et al. |
| 7,532,206 B2 | 5/2009 | Morrison et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,619,616 B2 | 11/2009 | Rimas Ribikauskas et al. |
| 7,629,966 B2 | 12/2009 | Anson |
| 7,683,889 B2 | 3/2010 | Rimas Ribikauskas et al. |
| 7,787,026 B1 | 8/2010 | Flory et al. |
| 7,801,950 B2 | 9/2010 | Eisenstadt et al. |
| 7,890,862 B2 | 2/2011 | Kompe et al. |
| 7,903,090 B2 | 3/2011 | Soss et al. |
| 7,952,566 B2 | 5/2011 | Poupyrev et al. |
| 7,966,352 B2 | 6/2011 | Madan et al. |
| 7,973,778 B2 | 7/2011 | Chen |
| 8,040,142 B1 | 10/2011 | Bokma et al. |
| 8,059,104 B2 | 11/2011 | Shahoian et al. |
| 8,125,440 B2 | 2/2012 | Guyot-Sionnest et al. |
| 8,125,492 B1 | 2/2012 | Wainwright et al. |
| RE43,448 E | 6/2012 | Kimoto et al. |
| 8,209,628 B1 | 6/2012 | Davidson |
| 8,271,900 B2* | 9/2012 | Wakizaka ........... G06F 3/04817 345/156 |
| 8,363,020 B2 | 1/2013 | Li et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,456,431 B2 | 6/2013 | Victor |
| 8,466,889 B2 | 6/2013 | Tong et al. |
| 8,482,535 B2 | 7/2013 | Pryor |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,793,577 B2 | 7/2014 | Schellingerhout et al. |
| 8,799,816 B2 | 8/2014 | Wells et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,881,062 B2 | 11/2014 | Kim et al. |
| 8,914,732 B2 | 12/2014 | Jun et al. |
| 8,976,128 B2 | 3/2015 | Moore |
| 9,030,436 B2 | 5/2015 | Ikeda |
| 9,046,999 B1 | 6/2015 | Teller et al. |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |

(56) References Cited

U.S. PATENT DOCUMENTS

| | | |
|---|---|---|
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 * | 2/2017 | Lipman .................. G06F 1/1626 |
| 9,600,114 B2 | 3/2017 | Milam et al. |
| 9,600,116 B2 | 3/2017 | Tao et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2002/0008691 A1 | 1/2002 | Hanajima et al. |
| 2002/0015064 A1 | 2/2002 | Robotham et al. |
| 2002/0140740 A1 | 10/2002 | Chen |
| 2002/0149630 A1 | 10/2002 | Kitainik et al. |
| 2002/0186257 A1 | 12/2002 | Cadiz et al. |
| 2003/0001869 A1 | 1/2003 | Nissen |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0219969 A1 | 1/2004 | Casey et al. |
| 2004/0021643 A1 * | 2/2004 | Hoshino .................. G06F 3/016 345/173 |
| 2004/0108995 A1 | 6/2004 | Hoshino et al. |
| 2004/0138849 A1 | 7/2004 | Schmidt et al. |
| 2004/0267877 A1 | 12/2004 | Shiparo et al. |
| 2005/0012723 A1 | 1/2005 | Pallakoff |
| 2005/0039141 A1 | 2/2005 | Burke et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0184973 A1 | 8/2005 | Lum et al. |
| 2005/0223338 A1 | 10/2005 | Partanen |
| 2005/0229112 A1 | 10/2005 | Clay et al. |
| 2006/0026535 A1 | 2/2006 | Hotelling et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0274042 A1 | 12/2006 | Krah et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0152959 A1 | 7/2007 | Peters |
| 2007/0157173 A1 | 7/2007 | Klein et al. |
| 2007/0168369 A1 | 7/2007 | Bruns |
| 2007/0176904 A1 | 8/2007 | Russo |
| 2007/0186178 A1 | 8/2007 | Schiller |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0294295 A1 | 12/2007 | Finkelstein et al. |
| 2007/0299923 A1 | 12/2007 | Skelly et al. |
| 2008/0001924 A1 | 1/2008 | dos los Reyes et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094398 A1 | 4/2008 | Ng et al. |
| 2008/0106523 A1 | 5/2008 | Conrad |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0168395 A1 | 7/2008 | Ording et al. |
| 2008/0168404 A1 | 7/2008 | Ording |
| 2008/0202824 A1 | 8/2008 | Philipp et al. |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0297475 A1 | 12/2008 | Woolf et al. |
| 2008/0303799 A1 * | 12/2008 | Schwesig .............. G06F 3/0414 345/173 |
| 2008/0307335 A1 | 12/2008 | Chaudhri et al. |
| 2008/0307359 A1 | 12/2008 | Louch et al. |
| 2008/0317378 A1 | 12/2008 | Steinberg et al. |
| 2009/0002392 A1 | 1/2009 | Hou et al. |
| 2009/0007017 A1 | 1/2009 | Anzures et al. |
| 2009/0037846 A1 | 2/2009 | Spalink et al. |
| 2009/0046110 A1 | 2/2009 | Sadler et al. |
| 2009/0066668 A1 | 3/2009 | Kim et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167728 A1 | 7/2009 | Geaghan et al. |
| 2009/0169061 A1 | 7/2009 | Anderson et al. |
| 2009/0198767 A1 | 8/2009 | Jakobson et al. |
| 2009/0225037 A1 | 9/2009 | Williamson et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293009 A1 | 11/2009 | Meserth et al. |
| 2009/0303187 A1 | 12/2009 | Pallakoff |

(56) References Cited

U.S. PATENT DOCUMENTS

| | | |
|---|---|---|
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085317 A1 | 4/2010 | Park et al. |
| 2010/0088596 A1 | 4/2010 | Griffin et al. |
| 2010/0088639 A1 | 4/2010 | Yach et al. |
| 2010/0090988 A1 | 4/2010 | Park |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0148999 A1 | 6/2010 | Casparian et al. |
| 2010/0153879 A1 | 6/2010 | Rimas-Ribikauskas et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0175023 A1 | 7/2010 | Gatlin et al. |
| 2010/0180225 A1* | 7/2010 | Chiba .................. G06F 3/0481 715/777 |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0214257 A1 | 8/2010 | Wussler et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0315345 A1 | 12/2010 | Laitinen |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0018695 A1 | 1/2011 | Bells et al. |
| 2011/0035145 A1 | 2/2011 | Yamasaki |
| 2011/0050576 A1 | 3/2011 | Forutanpour et al. |
| 2011/0050588 A1 | 3/2011 | Li et al. |
| 2011/0050594 A1 | 3/2011 | Kim et al. |
| 2011/0050629 A1 | 3/2011 | Homma et al. |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0074697 A1 | 3/2011 | Rapp et al. |
| 2011/0080350 A1 | 4/2011 | Almalki et al. |
| 2011/0087982 A1 | 4/2011 | McCann et al. |
| 2011/0093815 A1 | 4/2011 | Gobeil |
| 2011/0093817 A1 | 4/2011 | Song et al. |
| 2011/0107272 A1 | 5/2011 | Aguilar |
| 2011/0116716 A1 | 5/2011 | Kwon et al. |
| 2011/0122087 A1 | 5/2011 | Jang et al. |
| 2011/0126139 A1 | 5/2011 | Jeong et al. |
| 2011/0138295 A1 | 6/2011 | Momchilov et al. |
| 2011/0141052 A1 | 6/2011 | Bernstein et al. |
| 2011/0145752 A1 | 6/2011 | Fagans |
| 2011/0145753 A1* | 6/2011 | Prakash ................ G06F 3/0481 715/783 |
| 2011/0163971 A1 | 7/2011 | Wagner et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175830 A1 | 7/2011 | Miyazawa et al. |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202879 A1 | 8/2011 | Stovicek et al. |
| 2011/0209097 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0242029 A1 | 10/2011 | Kasahara et al. |
| 2011/0248916 A1 | 10/2011 | Griffin et al. |
| 2011/0248948 A1 | 10/2011 | Griffin et al. |
| 2011/0252357 A1 | 10/2011 | Chaudhri |
| 2011/0258537 A1 | 10/2011 | Rives et al. |
| 2011/0263298 A1 | 10/2011 | Park |
| 2011/0267530 A1 | 11/2011 | Chun |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvuori et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0092355 A1 | 4/2012 | Yamamoto et al. |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0113007 A1 | 5/2012 | Koch et al. |
| 2012/0126962 A1 | 5/2012 | Ujii et al. |

(56) References Cited

U.S. PATENT DOCUMENTS

| | | |
|---|---|---|
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0260220 A1 | 10/2012 | Griffin |
| 2012/0274662 A1 | 11/2012 | Kim et al. |
| 2012/0284673 A1 | 11/2012 | Lamb et al. |
| 2012/0293551 A1 | 11/2012 | Momeyer et al. |
| 2012/0299859 A1 | 11/2012 | Kinoshita |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Karnibeppu |
| 2012/0306765 A1 | 12/2012 | Moore |
| 2012/0311429 A1 | 12/2012 | Decker et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0031514 A1 | 1/2013 | Gabbert |
| 2013/0036386 A1 | 2/2013 | Park et al. |
| 2013/0050143 A1 | 2/2013 | Kim et al. |
| 2013/0061172 A1 | 3/2013 | Huang et al. |
| 2013/0067383 A1 | 3/2013 | Kataoka et al. |
| 2013/0067513 A1 | 3/2013 | Takami |
| 2013/0067527 A1 | 3/2013 | Ashbook et al. |
| 2013/0077804 A1* | 3/2013 | Glebe .................. H03G 3/02 381/109 |
| 2013/0086056 A1 | 4/2013 | Dyor et al. |
| 2013/0093691 A1 | 4/2013 | Moosavi |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0106766 A1 | 5/2013 | Yilmaz et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120295 A1 | 5/2013 | Kim et al. |
| 2013/0120306 A1 | 5/2013 | Furukawa |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0154948 A1 | 6/2013 | Schediwy et al. |
| 2013/0154959 A1 | 6/2013 | Lindsay et al. |
| 2013/0155018 A1* | 6/2013 | Dagdeviren ........ G06F 3/03543 345/174 |
| 2013/0159893 A1 | 6/2013 | Lewis et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0227419 A1 | 8/2013 | Lee et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0268875 A1 | 10/2013 | Han et al. |
| 2013/0305184 A1 | 11/2013 | Kim et al. |
| 2013/0307792 A1 | 11/2013 | Andres et al. |
| 2013/0321457 A1 | 12/2013 | Bauermeister et al. |
| 2013/0325342 A1 | 12/2013 | Pylappan et al. |
| 2013/0326421 A1 | 12/2013 | Jo |
| 2013/0328770 A1 | 12/2013 | Parham |
| 2013/0339909 A1 | 12/2013 | Ha |
| 2014/0002386 A1 | 1/2014 | Rosenberg et al. |
| 2014/0026098 A1 | 1/2014 | Gilman |
| 2014/0055367 A1 | 2/2014 | Dearman et al. |
| 2014/0059460 A1 | 2/2014 | Ho |
| 2014/0059485 A1 | 2/2014 | Lehrian et al. |
| 2014/0063316 A1 | 3/2014 | Lee et al. |
| 2014/0078318 A1 | 3/2014 | Alameh |
| 2014/0082536 A1 | 3/2014 | Costa et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0118268 A1 | 5/2014 | Kuscher |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0201660 A1 | 7/2014 | Clausen et al. |
| 2014/0210753 A1 | 7/2014 | Lee et al. |
| 2014/0210798 A1 | 7/2014 | Wilson |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0304651 A1 | 10/2014 | Johansson et al. |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0365945 A1 | 12/2014 | Karunamuni et al. |
| 2015/0020036 A1 | 1/2015 | Kim et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1 | 2/2015 | Cieplinski et al. |
| 2015/0062046 A1 | 3/2015 | Cho et al. |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067602 A1 | 3/2015 | Bernstein et al. |
| 2015/0067605 A1 | 3/2015 | Zambetti et al. |

(56) References Cited

U.S. PATENT DOCUMENTS

| | | |
|---|---|---|
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0381931 A1 | 12/2015 | Uhma et al. |
| 2016/0004393 A1 | 1/2016 | Faaborg et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0188181 A1 | 6/2016 | Smith |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |

FOREIGN PATENT DOCUMENTS

| | | |
|---|---|---|
| CN | 101118469 A | 2/2008 |
| CN | 101222704 A | 7/2008 |
| CN | 101320303 A | 12/2008 |
| CN | 100524183 | 8/2009 |
| CN | 101593077 A | 12/2009 |
| CN | 101809526 A | 8/2010 |
| CN | 102004593 A | 4/2011 |
| CN | 102112946 A | 6/2011 |
| CN | 102160021 A | 8/2011 |
| CN | 102385478 A | 3/2012 |
| CN | 102438092 A | 5/2012 |
| CN | 102483677 A | 5/2012 |
| CN | 102662573 A | 9/2012 |
| CN | 102841677 A | 12/2012 |
| CN | 103097992 A | 5/2013 |
| EP | 1406150 A1 | 4/2004 |
| EP | 1 674 977 A2 | 6/2006 |
| EP | 1882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 196 893 A2 | 6/2010 |
| EP | 2 226 715 A2 | 9/2010 |
| EP | 2 299 351 A2 | 3/2011 |
| EP | 2 302 496 A1 | 3/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 809 058 A1 | 12/2014 |
| GB | 2 402 105 A | 12/2004 |
| JP | H07-151512 A | 6/1995 |
| JP | H08-227341 A | 9/1996 |
| JP | H11-203044 A | 7/1999 |
| JP | 2004-054861 A | 2/2004 |
| JP | 2004-062648 A | 2/2004 |
| JP | 2004-086733 A | 3/2004 |
| JP | 2005-031786 A | 2/2005 |
| JP | 2005-092386 A | 4/2005 |
| JP | 2005-135106 A | 5/2005 |
| JP | 2005-196810 A | 7/2005 |
| JP | 2007-116384 A | 5/2007 |
| JP | 2008-537615 | 9/2008 |
| JP | 2009-500761 | 1/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-152716 A | 7/2010 |
| JP | 2010-176174 A | 8/2010 |
| JP | 2011-501307 A | 1/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-107823 A | 6/2011 |
| JP | 2011 192179 A | 9/2011 |
| JP | 2011-192215 A | 9/2011 |
| JP | 2011-257941 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |

(56) References Cited

FOREIGN PATENT DOCUMENTS

| | | | |
|---|---|---|---|
| JP | 2012-093820 A | 5/2012 | |
| JP | 2012-123564 A | 6/2012 | |
| JP | 2012-128825 A | 7/2012 | |
| JP | 2013-030050 A | 2/2013 | |
| JP | 2013-058149 A | 3/2013 | |
| JP | 2013-080521 A | 5/2013 | |
| JP | 2013-529339 A | 7/2013 | |
| JP | 2013-542488 A | 11/2013 | |
| JP | 2014-130567 A | 7/2014 | |
| JP | 2014-519109 A | 8/2014 | |
| JP | 2015-153420 A | 8/2015 | |
| KR | 2008-0045143 A | 4/2008 | |
| KR | 2010 0046087 | 6/2010 | |
| KR | 2011 0086501 A | 7/2011 | |
| KR | 2014 0016495 A | 2/2014 | |
| KR | 2014 0043760 A | 4/2014 | |
| KR | 2014 0079110 A | 6/2014 | |
| WO | WO 2005/106637 A2 | 11/2005 | |
| WO | WO 2006/013485 A2 | 2/2006 | |
| WO | WO 2007/121557 A1 | 11/2007 | |
| WO | WO 2008/064142 A2 | 5/2008 | |
| WO | WO 2009/155981 A1 | 12/2009 | |
| WO | WO 2010/013876 A1 | 2/2010 | |
| WO | WO 2010/090010 A1 | 8/2010 | |
| WO | WO 2010/122813 A1 | 10/2010 | |
| WO | WO 2011/024389 A1 | 3/2011 | |
| WO | WO 2011/024465 A1 | 3/2011 | |
| WO | WO 2011/093045 A1 | 8/2011 | |
| WO | WO 2011/105009 A1 | 9/2011 | |
| WO | WO 2011/115187 A1 | 9/2011 | |
| WO | WO 2011/121375 A1 | 10/2011 | |
| WO | WO 2012/021417 A1 | 2/2012 | |
| WO | WO 2012/037664 | 3/2012 | |
| WO | WO 2012/096804 A2 | 7/2012 | |
| WO | WO 2012/108213 A1 | 8/2012 | |
| WO | WO 2012/114760 A1 | 8/2012 | |
| WO | WO 2012/150540 A2 | 11/2012 | |
| WO | WO 2013/169853 A1 | 11/2013 | |
| WO | WO 2013/169877 A2 | 11/2013 | |
| WO | WO 2014/129655 A1 | 8/2014 | |
| WO | WO 2014/149473 A1 | 9/2014 | |
| WO | WO 2014/200733 A1 | 12/2014 | |
| WO | WO 2016/200584 A2 | 12/2016 | |

OTHER PUBLICATIONS

Angelov, Martin. "Sponsor Flip Wall With JQuery & CSS." Tutorialzine. N.p., Mar. 24, 2010. Web. Mar. 8, 2017. <http://tutorialzine.com/2010/03/sponsor-wall-flip-jquery-css/>.*
Office Action, dated Aug. 27, 2015, received in Australian Patent Application No. 2013259614, which corresponds with U.S. Appl. No. 14/536,141, 4 pages.
Office Action, dated Aug. 10, 2015, received in Australian Patent Application No. 2013259637, which corresponds with U.S. Appl. No. 14/536,203, 3 pages.
Office Action, dated Aug. 18, 2015, received in Australian Patent Application No. 2013259642, which corresponds with U.S. Appl. No. 14/536,291, 3 pages.
Office Action, dated Jul. 15, 2015, received in Australian Patent Application No. 2013259606, which corresponds with U.S. Appl. No. 14/536,426, 3 pages.
Office Action, dated Jul. 17, 2015, received in Australian Patent Application No. 2013259613, which corresponds with U.S. Appl. No. 14/536,646, 5 pages.
Office Action, dated Jul. 9, 2015, received in Australian Patent Application No. 2013259630, which corresponds with U.S. Appl. No. 14/536,203, 3 pages.
International Preliminary Report on Patentability, dated Jun. 30, 2015, received in International Patent Application No. PCT/US2013/069472, which corresponds with U.S. Appl. No. 14/608,895, 18 pages.
International Preliminary Report on Patentability, dated Jun. 30, 2015, received in International Application No. PCT/2013/069483, which corresponds to U.S. Appl. No. 14/608,942, 13 pages.
International Preliminary Report on Patentability, dated Jun. 30, 2015, received in International Patent Application No. PCT/US2013/069484, which corresponds with U.S. Appl. No. 14/608,965, 12 pages.
International Preliminary Report on Patentability, dated Jun. 30, 2015, received in International Patent Application No. PCT/US2013/069486, which corresponds with U.S. Appl. No. 14/608,985, 19 pages.
International Preliminary Report on Patentability, dated Jun. 30, 2015, received in International Patent Application No. PCT/US2013/069489, which corresponds with U.S. Appl. No. 14/609,006, 10 pages.
Bautista, "Microsoft Mathematics Tutorial 7—The Ink Input", <URL:http://mathandmultimedia.com/2012/05/23/microsoft-math-tutorial-7-ink>, May 23, 2012, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Forlines, et al., "Glimpse: a Novel Input Model for Multi-level Devices", Chi '05 Extended Abstracts on Human Factors in Computing Systems, Apr. 2, 2005, 4 pages.
Harrison, "Stylus-Based Interface with Full Mouse Emulation", IBM Technical Disclosure Bulletin, vol. 34, No. 10B, Mar. 1, 1992, 3 pages.
International Preliminary Report on Patentability dated Nov. 20, 2014, received in International Application No. PCT/US2013/040053, which corresponds to U.S. Appl. No. 14/535,671, 26 pages.
International Preliminary Report on Patentability dated Nov. 20, 2014, received in International Application No. PCT/US2013/040054, which corresponds to U.S. Appl. No. 14/536,235, 11 pages.
International Preliminary Report on Patentability dated Nov. 20, 2014, received in International Application No. PCT/US2013/040056, which corresponds to U.S. Appl. No. 14/536,367, 11 pages.
International Preliminary Report on Patentability dated Nov. 20, 2014, received in International Application No. PCT/US2013/040058, which corresponds to U.S. Appl. No. 14/536,426, 11 pages.
International Preliminary Report on Patentability dated Nov. 20, 2014, received in International Application No. PCT/US2013/040061, which corresponds to U.S. Appl. No. 14/536,464, 26 pages.
International Preliminary Report on Patentability dated Nov. 20, 2014, received in International Application No. PCT/US2013/040067, which corresponds to U.S. Appl. No. 14/536,644, 36 pages.
International Preliminary Report on Patentability dated Nov. 20, 2014, received in International Application No. PCT/US2013/040070, which corresponds to U.S. Appl. No. 14/535,646, 10 pages.
International Preliminary Report on Patentability dated Nov. 20, 2014, received in International Application No. PCT/US2013/040072, which corresponds to U.S. Appl. No. 14/536,141, 32 pages.
International Preliminary Report on Patentability dated Nov. 20, 2014, received in International Application No. PCT/2013/040087, which corresponds to U.S. Appl. No. 14/536,166, 29 pages.
International Preliminary Report on Patentability dated Nov. 20, 2014, received in International Application No. PCT/2013040093, which corresponds to U.S. Appl. No. 14/536,203, 9 pages.
International Preliminary Report on Patentability dated Nov. 20, 2014, received in International Application No. PCT/2013/040098, which corresponds to U.S. Appl. No. 14/536,247, 27 pages.
International Preliminary Report on Patentability dated Nov. 20, 2014, received in International Application No. PCT/2013/040101, which corresponds to U.S. Appl. No. 14/536,267, 24 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Aug. 6, 2013, received in International Application No. PCT/US2013/040058, which corresponds to U.S. Appl. No. 14/536,426, 12 pages.

(56) References Cited

OTHER PUBLICATIONS

International Search Report and Written Opinion dated Aug. 7, 2013, received in International Application No. PCT/US2013/040054, which corresponds to U.S. Appl. No. 14/536,235, 12 pages.
International Search Report and Written Opinion dated Aug. 7, 2013, received in International Application No. PCT/US2013/040056, which corresponds to U.S. Appl. No. 14/536,367, 12 pages.
International Search Report and Written Opinion dated Aug. 7, 2013, received in International Application No. PCT/US2013/040070, which corresponds to U.S. Appl. No. 14/535,646, 12 pages.
International Search Report and Written Opinion dated Aug. 7, 2013, received in International Application No. PCT/US2013/040093, which corresponds to U.S. Appl. No. 14/536,203, 11 pages.
International Search Report and Written Opinion dated Jan. 8, 2014, received in International Application No. PCT/US2013/040108, 30 pages.
International Search Report and Written Opinion dated Jan. 27, 2014, received in International Application No. PCT/US2013/040101, 30 pages.
International Search Report and Written Opinion dated Feb. 5, 2014, received in International Application No. PCT/US2013/040061, which corresponds to U.S. Appl. No. 14/536,464, 30 pages.
International Search Report and Written Opinion dated Feb. 5, 2014, received in International Application No. PCT/US2013/040098, which corresponds to U.S. Appl. No. 14/536,247, 35 pages.
International Search Report and Written Opinion dated Mar. 3, 2014, received in International Application No. PCT/US2013/040087, which corresponds to U.S. Appl. No. 14/536,166, 35 pages.
International Search Report and Written Opinion dated Mar. 6, 2014, received in International Application No. PCT/US2013/069489, 12 pages.
International Search Report and Written Opinion dated Mar. 12, 2014, received in International Application No. PCT/US2013/069479, 14 pages.
International Search Report and Written Opinion dated Apr. 7, 2014, received in International Application No. PCT/US2013/040072, which corresponds to U.S. Appl. No. 14/536,141, 38 pages.
International Search Report and Written Opinion dated Apr. 7, 2014, received in International Application No. PCT/US2013/069483, 18 pages.
International Search Report and Written Opinion dated May 8, 2014, received in International Application No. PCT/US2013/040067, which corresponds to U.S. Appl. No. 14/536,644, 45 pages.
International Search Report and Written Opinion dated Apr. 7, 2014, received in International Application No. PCT/US2013/069472, 24 pages.
International Search Report and Written Opinion dated May 26, 2014, received in International Application No. PCT/US2013/040053, which corresponds to U.S. Appl. No. 14/535,671, 32 pages.
International Search Report and Written Opinion dated Jun. 2, 2014, received in International Application No. PCT/US2013/069486, 7 pages.
International Search Report and Written Opinion dated Jul. 9, 2014, received in International Application No. PCT/US2013/069484, 17 pages.
International Search Report and Written Opinion dated Sep. 30, 2014, received in International Application No. PCT/US2014/047303, 10 pages.
Invitation to Pay Additional Fees dated Aug. 7, 2013, received in International Application No. PCT/US2013/040101, which corresponds to U.S. Appl. No. 14/536,267, 7 pages.
Invitation to Pay Additional Fees dated Aug. 7, 2013, received in International Application No. PCT/US2013/040108, which corresponds to U.S. Appl. No. 14/536,291, 6 pages.
Invitation to Pay Additional Fees dated Sep. 25, 2013, received in International Application No. PCT/US2013/040061, which corresponds to U.S. Appl. No. 14/536,464, 6 pages.
Invitation to Pay Additional Fees dated Sep. 25, 2013, received in International Application No. PCT/US2013/040098, which corresponds to U.S. Appl. No. 14/536,247, 8 pages.
Invitation to Pay Additional Fees dated Oct. 8, 2013, received in International Application No. PCT/US2013/040067, which corresponds to U.S. Appl. No. 14/536,644, 8 pages.
Invitation to Pay Additional Fees dated Oct. 28, 2013, received in International Application No. PCT/US2013/040072, which corresponds to U.S. Appl. No. 14/536,141, 7 pages.
Invitation to Pay Additional Fees dated Oct. 28, 2013, received in International Application No. PCT/US2013/040087, which corresponds to U.S. Appl. No. 14/536,166, 8 pages.
Invitation to Pay Additional Fees dated Feb. 10, 2014, received in International Application No. PCT/US2013/069472, 6 pages.
Invitation to Pay Additional Fees dated Feb. 14, 2014, received in International Application No. PCT/US2013/069483, 7 pages.
Invitation to Pay Additional Fees dated Apr. 1, 2014, received in International Application No. PCT/US2013/069486, 7 pages.
Invitation to Pay Additional Fees dated Apr. 17, 2014, received in International Application No. PCT/US2013/069484, 7 pages.
Kaaresoja, et al., "Snap-Crackle-Pop: Tactile Feedback for Mobile Touch Screens", Proceedings of Eurohaptics vol. 2006, Jul. 3, 2006, 2 pages.
O'Hara, et al., "Pressure-Sensitive Icons", ip.com Journal, Jun. 1, 1990, 2 Pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSenseII: Bi-directional Touch and Pressure Sensing Interactions with Tactile Feedback", Conference on Human Factors in Computing Systems Archive, ACM, Apr. 22, 2006, 6 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG-en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.
B-log—Betriebsraum weblog, "Extremely Efficient Menu Selection: Marking Menus for the Flash Platform," http://www.betriebsraum.de/blog/2009/12/11/extremely-efficient-menu-selection-marking -for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Dzyre, "10 Android Notification Features You Can Fiddle With", http://www.hongkiat.com/blog/android-notification-features, Mar. 10, 2014, 10 pages.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.

(56) References Cited

OTHER PUBLICATIONS

Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Flixel, "Cinemagraph Pro for Mac", https://flixel.com/products/mac/cinemagraph-pro, 2014, 7 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kiener, "Force Touch on iPhone", https://www.youtube.com/watch?v=CEMmnsU5fC8, Aug. 4, 2015, 4 pages.
Kronfli, "HTC Zoe Comes to Google Play, Here's Everything You Need to Know," Know Your Mobile, http://www.knowyourmobile.com/htc/htc-one/19550/what-htc-zoe, Aug. 14, 2014, 5 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Kurdi, "XnView Shell Extension: A Powerful Image Utility Inside the Context Menu", http://www.freewaregenius.com/xnview-shell-extension-a-powerful-image-utility-inside-the-context-menu, Jul. 30, 2008, 4 pages.
Laurie, "The Power of the Right Click," http://vlaurie.com/right-click/customize-context-menu.html, 2002-2016, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Phonebuff, "How to Pair Bluetooth on the iPhone", https://www.youtube.com/watch?v=LudNwEar9A8, Feb. 8, 2012, 3 pages.
PoliceOne.com "COBAN Technologies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7> 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
VGJFeliz, "How to Master Android Lollipop Notifications in Four Minutes!", https://www.youtube.com/watch?v=S-zBRG7GJgs, Feb. 8, 2015, 5 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modifired Jan. 15, 2016, 3 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Final Office Action, dated May 6, 2016, received in U.S. Appl. No. 14/536,426, 23 pages.
Notice of Allowance, dated May 23, 2016, received in Australian Patent Application No. 2013259606, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Office Action, dated May 6, 2016, received in European Patent Application No. 13795392.3, which corresponds with U.S. Appl. No. 14/608,926, 6 pages.
Office Action, dated Nov. 11, 2016, received in European Patent Application No. 13795392.3, which corresponds with U.S. Appl. No. 14/608,926, 6 pages.

(56) References Cited

OTHER PUBLICATIONS

Notice of Allowance, dated Jan. 17, 2017, received in Japanese Patent Application No. 2015-549392, which corresponds with U.S. Appl. No. 14/608,926, 2 pages.

Office Action, dated May 12, 2016, received in Korean Patent Application No. 10-2015-7018853, which corresponds with U.S. Appl. No. 14/608,926, 4 pages.

Office Action, dated May 31, 2016, received in Australian Patent Application No. 2013259613, which corresponds with U.S. Appl. No. 14/536,646, 4 pages.

Notice of Allowance, dated Jul. 5, 2016, received in Australian Patent Application No. 2013259613, which corresponds with U.S. Appl. No. 14/536,646, 3 pages.

Office Action, dated Dec. 1, 2016, received in Chinese Patent Application No. 2013800362059, which corresponds with U.S. Appl. No. 14/536,646, 3 pages.

Office Action, dated May 31, 2016, received in European Patent Application No. 13724102.2, which corresponds with U.S. Appl. No. 14/536,646, 5 pages.

Notice of Allowance, dated Jan. 4, 2017, received in European Patent Application No. 13724102.2, which corresponds with U.S. Appl. No. 14/536,646, 5 pages.

Notice of Allowance, dated Dec. 22, 2016, received in Japanese Patent Application No. 2015-511645, which corresponds with U.S. Appl. No. 14/536,646, 2 pages.

Notice of Allowance, dated Aug. 15, 2016, received in Australian Patent Application No. 2013259614, which corresponds with U.S. Appl. No. 14/536,141, 1 page.

Office Action, dated Aug. 31, 2016, received in European Patent Application No. 13726053.5, which corresponds with U.S. Appl. No. 14/536,141, 10 pages.

Office Action, dated Oct. 25, 2016, received in Japanese Patent Application No. 2015-511646, which corresponds with U.S. Appl. No. 14/536,141, 6 pages.

Office Action, dated Dec. 8, 2016, received in U.S. Appl. No. 14/608,942, 9 pages.

Certificate of Grant, dated Jul. 7, 2016, received in Australian Patent Application No. 2013368443, which corresponds with U.S. Appl. No. 14/536,141, 3 pages.

Office Action, dated Oct. 7, 2016, received in European Patent Application No. 13798464.7, which corresponds with U.S. Appl. No. 14/608,942, 7 pages.

Office Action, dated Jul. 4, 2016, received in Japanese Patent Application No. 2015-549393, which corresponds with U.S. Appl. No. 14/536,141, 4 pages.

Office Action, dated Aug. 1, 2016, received in U.S. Appl. No. 14/536,203, 14 pages.

Notice of Allowance, dated Feb. 1, 2017, received in U.S. Appl. No. 14/536,203, 9 pages.

Notice of Allowance, dated Jun. 15, 2016, received in Australian Patent Application No. 2013259630, which corresponds with U.S. Appl. No. 14/536,203, 3 pages.

Certificate of Grant, dated Oct. 21, 2016, received in Australian Patent Application No. 2013259630, which corresponds with U.S. Appl. No. 14/536,203, 3 pages.

Office Action, dated May 31, 2016, received in European Patent Application No. 13724104.8, which corresponds with U.S. Appl. No. 14/536,203, 5 pages.

Notice of Allowance, dated Aug. 5, 2016, received in Japanese Patent Application No. 2015-511650, which corresponds with U.S. Appl. No. 14/536,203, 4 pages.

Certificate of Patent, dated Sep. 9, 2016, received in Japanese Patent Application No. 2015-511650, which corresponds with U.S. Appl. No. 14/536,203, 3 pages.

Notice of Allowance, dated Sep. 1, 2016, received in Korean Patent Application No. 2014-7034520, which corresponds with U.S. Appl. No. 14/536,203, 5 pages.

Office Action, dated Feb. 6, 2017, received in Korean Patent Application No. 2016-7033834, which corresponds with U.S. Appl. No. 14/536,203, 4 pages.

Office Action, dated Jul. 22, 2016, received in European Office Action No. 13798465.4, which corresponds with U.S. Appl. No. 14/608,965, 8 pages.

Notice Notice of Allowance, dated Jun. 28, 2016, received in Australian Patent Application No. 2013259637, which corresponds with U.S. Appl. No. 14/536,267, 3 pages.

Certificate of Grant, dated Oct. 21, 2016, received in Australian Patent Application No. 2013259637, which corresponds with U.S. Appl. No. 14/536,267, 3 pages.

Office Action, dated Dec. 9, 2016, received in Chinese Patent Application No. 2016120601564130, which corresponds with U.S. Appl. No. 14/536,267, 4 pages.

Notice of Allowance, dated Sep. 26, 2016, received in Japanese Patent Application No. 2015-511652, which corresponds with U.S. Appl. No. 14/536,267, 5 pages.

Notice of Allowance, dated Sep. 1, 2016, received in Korean Patent Application No. 2014-7034530, which corresponds with U.S. Appl. No. 14/536,267, 3 pages.

Office Action, dated Jan. 5, 2017, received in Korean Patent Application No. 2016-7029533, which corresponds to U.S. Appl. No. 14/536,267, 2 pages.

Office Action, dated Jul. 25, 2016, received in Australian Patent Application No. 2013259642, which corresponds with U.S. Appl. No. 14/536,291, 3 pages.

Office Action, dated Aug. 10, 2016, received in Australian Patent Application No. 2013259642, which corresponds with U.S. Appl. No. 14/536,291, 4 pages.

Innovation Patent, dated Sep. 1, 2016, received in Australian Patent Application No. 2016101481, which corresponds with U.S. Appl. No. 14/536,291, 1 page.

Office Action dated Sep. 29, 2016, received in Australian Patent Application No. 2016101481, which corresponds with U.S. Appl. No. 14/536,291, 3 pages.

Office Action, dated Aug. 22, 2016, received in European Patent Application No. 13724107.1, which corresponds with U.S. Appl. No. 14/536,291, 7 pages.

Office Action, dated Mar. 8, 2016, received in Japanese Patent Application No. 2015-511655, which corresponds with U.S. Appl. No. 14/536,291, 4 pages.

Final Office Action, dated Dec. 22, 2016, received in Japanese Patent Application No. 2015-511655, which corresponds with U.S. Appl. No. 14/536,291, 3 pages.

Office Action, dated Jan. 15, 2016, received in Australian Patent Application No. 2013368445, which corresponds with U.S. Appl. No. 14/608,985, 3 pages.

Notice of Allowance, dated Jan. 18, 2017, received in Australian Patent Application No. 2013368445, which corresponds with U.S. Appl. No. 14/608,985, 3 pages.

Office Action, dated Jul. 25, 2016, received in Japanese Patent Application No. 13811032.5, which corresponds with U.S. Appl. No. 14/608,985, 8 pages.

Office Action, dated Apr. 25, 2016, received in Japanese Patent Application No. 2015-550384, which corresponds with U.S. Appl. No. 14/608,985, 4 pages.

Notice of Allowance, dated Jan. 24, 2017, received in Japanese Patent Application No. 2015-550384, which corresponds with U.S. Appl. No. 14/608,985, 5 pages.

Office Action, dated Nov. 4, 2016, received in Korean Patent Application No. 10-2015-7019984, which corresponds with U.S. Appl. No. 14/608,985, 8 pages.

Office Action, dated Jan. 19, 2017, received in U.S. Appl. No. 14/609,042, 12 pages.

Office Action, dated Mar. 31, 2016, received in U.S. Appl. No. 14/864,737, 17 pages.

Notice of Allowance, dated Feb. 27, 2017, received in U.S. Appl. No. 14/864,737, 9 pages.

Notice of Allowance, dated Jul. 1, 2016, received in Chinese Patent Application No. 201620214376.7, which corresponds with U.S. Appl. No. 14/864,737, 3 pages.

Patent, dated Aug. 3, 2016, received in Chinese Patent Application No. 201620214376.7, which corresponds with U.S. Appl. No. 14/864,737, 5 pages.

(56) References Cited

OTHER PUBLICATIONS

Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Office Action, dated May 10, 2016, received in Australian Patent Application No. 2016100254, which corresponds with U.S. Appl. No. 14/866,981, 6 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/686,078, 3 pages.
Office Action (Search Report), dated Mar. 30, 2016, received in Danish Patent Application No. 201500588, which corresponds with U.S. Appl. No. 14/686,078, 9 pages.
Office Action, dated Sep. 2, 2016, received in Danish Patent Application No. 201500588, which corresponds with U.S. Appl. No. 14/686,078, 4 pages.

Notice of Allowance, dated Jan. 30, 2017, received in Danish Patent Application No. 201500588, which corresponds with U.S. Appl. No. 14/686,078, 2 pages.
Office Action, dated May 9, 2016, received in U.S. Appl. No. 14/863,432, 26 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated May 10, 2016, received in U.S. Appl. No. 14/866,489, 15 pages.
Final Office Action, date Sep. 16, 2016, received in U.S. Appl. No. 14/866,489, 24 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101483, which corresponds with U.S. Appl. No. 14/869,899, 1 page.
Certificate of Examination, dated Oct. 11, 2016, received in Australian Patent Application No. 2016101483, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.

(56) References Cited

OTHER PUBLICATIONS

Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 202016000003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated Sep. 19, 2016, received in German Patent Application No. 202016002908.9, which corresponds with U.S. Appl. No. 14/866,987, 3 pages.
Intention to Grant, dated Jun. 10, 2016, received in Danish Patent Application No. 201500587, which corresponds with U.S. Appl. No. 14/866,987, 2 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Notice of Allowance, dated Nov. 1, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Search Report, dated May 26, 2016, received in Danish Patent Application No. 201500595, which corresponds with U.S. Appl. No. 14/871,236, 14 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action and Search Report, dated Jun. 9, 2016, received in Danish Patent Application No. 201500595, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.

(56) References Cited

OTHER PUBLICATIONS

Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Office Action, dated May 10, 2016, received in U.S. Appl. No. 14/867,892, 28 pages.
Final Office Action, dated Nov. 2, 2016, received in U.S. Appl. No. 14/867,892, 48 pages.
Office Action, dated Sep. 14, 2016, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated May 23, 2016, received in Australian Patent Application No. 2016100253, which corresponds with U.S. Appl. No. 14/867,990, 5 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent Application No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Office Action, dated Jul. 17, 2017, received in U.S. Appl. No. 14/536,166, 19 pages.
Office Action, dated Jul. 21, 2017, received in Australian Patent Application No. 2016216658, which corresponds with U.S. Appl. No. 14/536,291, 3 pages.
Office Action, dated Jul. 21, 2017, received in Australian Patent Application No. 2016247194, which corresponds with U.S. Appl. No. 14/536,648, 3 pages.

(56) References Cited

OTHER PUBLICATIONS

Grant, dated Jul. 21, 2016, received in Dutch Patent Application No. 2016801, which corresponds with U.S. Appl. No. 14/871,227, 8 pages.
Notice of Allowance, dated Jul. 14, 2017, received in Japanese Patent Application No. 2016558214, which corresponds with U.S. Appl. No. 14/866,511, 5 pages.
Office Action, dated Jul. 31, 2017, received in Japanese Patent Application No. 2017126445, which corresponds with U.S. Appl. No. 14/866,987, 6 pages.
Office Action, dated Aug. 4, 2017, received in Japanese Patent Application No. 2016-533201, which corresponds with U.S. Appl. No. 14/871,227, 6 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Jun. 22, 2017, received in Dutch Patent Application No. 2016375, which corresponds with U.S. Appl. No. 14/866,981, 17 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Kost, "LR3—Deselect All Images But One", Julieanne Kost's Blog, blogs.adobe.com/jkost/2011/12/lr3-deselect-all-images-but-one.html, Dec. 22, 2011, 1 page.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Office Action, dated Mar. 15, 2017, received in U.S. Appl. No. 14/535,671, 13 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Apr. 5, 2017, received in U.S. Appl. No. 14/536,367, 16 pages.
Office Action, dated May 15, 2017, received in Australian Patent Application No. 2016216580, which corresponds with U.S. Appl. No. 14/536,426, 3 pages.
Office Action, dated May 4, 2017, received in Chinese Patent Application No. 201380068414.1, which corresponds with U.S. Appl. No. 14/608,926, 5 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Patent, dated May 26, 2017, received in European Patent Application No. 13724102.2, which corresponds with U.S. Appl. No. 14/536,646, 1 page.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated Jun. 30, 2017, received in Japanese Patent Application No. 2015-511646, which corresponds with U.S. Appl. No. 14/536,141, 5 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Feb. 24, 2017, received in Korean Patent Application No. 2015-7018448, which corresponds with U.S. Appl. No. 14/608,942, 4 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Mar. 3, 2017, received in Japanese Patent Application No. 2016-125839, which corresponds with U.S. Appl. No. 14/536,267, 6 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Feb. 27, 2017, received in European Patent Application No. 13811032.5, which corresponds with U.S. Appl. No. 14/608,985, 6 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.

(56) References Cited

OTHER PUBLICATIONS

Office Action, dated May 18, 2017, received in Dutch Patent Application No. 2016452, which corresponds with U.S. Appl. No. 14/864,737, 22 pages.
Office Action, dated Jul. 7, 2017, received in Danish Patent Application No. 201500575, 4 pages.
Office Action, dated Mar. 14, 2017, received in Danish Patent Application No. 201500574, which corresponds with U.S. Appl. No. 14/866,159, 5 pages.
Office Action, dated Jul. 6, 2017, received in Danish Patent Application No. 201500574, which corresponds with U.S. Appl. No. 14/866,159, 3 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Apr. 27, 2017, received in U.S. Appl. No. 14/863,432, 7 pages.
Office Action, dated Jun. 12, 2017, received in Danish Patent Application No. 201500582, which corresponds with U.S. Appl. No. 14/863,432, 5 pages.
Office Action, dated May 18, 2017, received in Dutch Patent Application No. 2016801, which corresponds with U.S. Appl. No. 14/863,432, 34 pages.
Office Action, dated Jun. 9, 2017, received in Japanese Patent Application No. 2016558214, which corresponds with U.S. Appl. No. 14/866,511, 6 pages.
Notice of Allowance, dated Apr. 27, 2017, received in U.S. Appl. No. 14/866,489, 27 pages.
Notice of Allownce, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Apr. 13, 2017, received in U.S. Appl. No. 14/866,992, 34 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Mar. 31, 2017, received in U.S. Appl. No. 14/857,700, 14 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Office Action, dated May 4, 2017, received in Danish Patent Application No. 201500585, which corresponds with U.S. Appl. No. 14/864,627, 4 pages.
Office Action, dated Jun. 15, 2017, received in Danish Patent Application No. 201500579, which corresponds with U.S. Appl. No. 14/866,361, 2 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Apr. 20, 2017, received in Chinese Patent Application No. 201621044346.2, which corresponds with U.S. Appl. No. 14/871,462, 3 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated May 4, 2017, received in Danish Patent Application No. 201500598, which corresponds with U.S. Appl. No. 14/867,892, 4 pages.
Office Action, dated May 3, 2017, received in Danish Patent Application No. 201500581 which corresponds with U.S. Appl. No. 14/867,990, 5 pages.
Final Office Action, dated Jun. 2, 2017, received in U.S. Appl. No. 15/081,771, 17 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in A Tap", https://www.youtube.com/watch?v=qailSHRgsTo, May 15, 2015, 1 page.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.

(56) References Cited

OTHER PUBLICATIONS

Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated Sep. 25, 2017, received in U.S. Appl. No. 14/536,644, 29 pages.
Office Action, dated Aug. 22, 2017, received in Korean Patent Application No. 2017-7018250, which corresponds with U.S. Appl. No. 14/608,926, 2 pages.
Notice of Allowance, dated Sep. 20, 2017, received in U.S. Appl. No. 14/536,141, 10 pages.
Patent, dated Jul. 28, 2017, received in Japanese Patent Application No. 2015-511646, which corresponds with U.S. Appl. No. 14/536,141, 3 pages.
Office Action, dated Sep. 13, 2017, received in European Patent Application No. 16177863.4, which corresponds with U.S. Appl. No. 14/536,267, 6 pages.
Notice of Allowance, dated Sep. 1, 2017, received in Korean Patent Application No. 2016-7029533, which corresponds with U.S. Appl. No. 14/536,267, 4 pages.
Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 28, 2017, received in Japanese Patent Application No. 2016-558331, which corresponds with U.S. Appl. No. 14/864,737, 3 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Patent, dated Aug. 18, 2017, received in Japanese Patent Application No. 2016558214, which corresponds with U.S. Appl. No. 14/866,511, 3 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Office Action, dated Sep. 22, 2017, received in Japanese Patent Application No. 2017-029201, which corresponds with U.S. Appl. No. 14/857,636 8 pages.
Notice of Allowance, dated Sep. 29, 2017, received in Danish Patent Application No. 201670463, which corresponds with U.S. Appl. No. 14/866,987, 2 pages.
Notice of Allowance, dated Sep. 22, 2017, received in Japanese Patent Application No. 2016-233449, which corresponds with U.S. Appl. No. 14/866,987, 5 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Sep. 29, 2017, received in Australian Patent Application No. 2016231505, which corresponds with U.S. Appl. No. 14/871,462, 5 pages.
Final Office Action, dated Aug. 18, 2017, received in U.S. Appl. No. 14/869,873, 20 pages.
Office Action, dated Aug. 29, 2017, received in Korean Patent Application No. 2017-7014536, which corresponds with U.S. Appl. No. 15/081,771, 5 pages.
Notice of Allowance, dated Jul. 6, 2017, received in U.S. Appl. No. 15/231,745, 18 pages.
Office Action, dated Aug. 30, 2017, received in U.S. Appl. No. 15/655,749, 22 pages.
Extended European Search Report, dated Sep. 11, 2017, received in European Patent Application No. 17163309.2, which corresponds with U.S. Appl. No. 14/866,987, 8 pages.
Office Action, dated Oct. 19, 2017, received in U.S. Appl. No. 14/608,926, 14 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which correponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Summons, dated Oct. 6, 2017, received in European Patent Application No. 13811032.5 , which corresponds with U.S. Appl. No. 14/608,985, 6 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Oct. 6, 2017, received in U.S. Appl. No. 14/868,078, 40 pages.
Office Action, dated Oct. 11, 2017, received in U.S. Appl. No. 14/857,700, 13 pages.
Office Action, dated Oct. 16, 2017, received in Australian Patent Application No. 2016203040, which corresponds with U.S. Appl. No. 14/871,227, 5 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Innovation Patent, dated Oct. 11, 2017, received in Australian Patent Application No. 2016231505, which corresponds with U.S. Appl. No. 14/871,462, 1 page.
Final Office Action, dated Oct. 10, 2017, received in U.S. Appl. No. 14/869,855, 16 pages.
Notice of Allowance, dated Oct. 20, 2017, received in U.S. Appl. No. 15/136,782, 9 pages.

(56) References Cited

OTHER PUBLICATIONS

Office Action, dated Oct. 16, 2017, received in Danish Patent Application No. 201770710, 10 pages.
Office Action, dated Oct. 31, 2017, received in U.S. Appl. No. 15/723,069, 7 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
Office Action, dated Nov. 6, 2017, received in Chinese Patent Application No. 201380068493.6, which corresponds with U.S. Appl. No. 14/608,895, 5 pages.
Notice of Allowance, dated Nov. 9, 2017, received in U.S. Appl. No. 14/536,267, 8 pages.
Patent, dated Nov. 6, 2017, received in Danish Patent Application No. 201670463, which corresponds with U.S. Appl. No. 14/866,987, 6 pages.
Patent, dated Oct. 27, 2017, received in Japanese Patent Application No. 2016-233449, which corresponds with U.S. Appl. No. 14/866,987, 3 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Nov. 13, 2017, received in Japanese Patent Application No. 2016-183289, which corresponds with U.S. Appl. No. 14/871,462, 5 pages.
Office Action, dated Oct. 31, 2017, received in Danish Patent Application No. 201500598, which corresponds with U.S. Appl. No. 14/867,892, 2 pages.
Patent, dated Oct. 30, 2017, received in Danish Patent Application No. 201670593, which corresponds with U.S. Appl. No. 15/231,745, 3 pages.
Certificate of Grant, dated Nov. 10, 2017, received in Hong Kong Patent Application No. 15107535.0, which corresponds with U.S. Appl. No. 14/536,426, 2 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
Office Action, dated Nov. 30, 2017, received in U.S. Appl. No. 14/535,671, 21 pages.
Notice of Allowance, dated Nov. 30, 2017, received in U.S. Appl. No. 14/536,367, 9 pages.
Office Action, dated Feb. 12, 2018, received in U.S. Appl. No. 14/536,464, 33 pages.
Notice of Allowance, dated Dec. 1, 2017, received in U.S. Appl. No. 14/536,291, 19 pages.
Office Action, dated Dec. 15, 2017, received in U.S. Appl. No. 14/866,159, 35 pages.
Office Action, dated Jan. 29, 2018, received in U.S. Appl. No. 14/866,992, 44 pages.
Office Action, dated Feb. 12, 2018, received in U.S. Appl. No. 15/009,661, 36 pages.
Office Action, dated Jan. 18, 2018, received in U.S. Appl. No. 15/009,676, 21 Pages.
Notice of Allowance, dated Jan. 31, 2018, received in U.S. Appl. No. 14/856,519, 9 pages.
Notice of Allowance, dated Feb. 9, 2018, received in U.S. Appl. No. 14/856,522, 9 pages.
Office Action, dated Nov. 30, 2017, received in U.S. Appl. No. 14/857,636, 19 pages.
Office Action, dated Dec. 1, 2017, received in U.S. Appl. No. 14/857,663, 15 pages.
Notice of Allowance, dated Feb. 12, 2018, received in U.S. Appl. No. 14/857,700, 13 pages.
Office Action, dated Jan. 22, 2018, received in U.S. Appl. No. 14/866,987, 22 pages.
Office Action, dated Nov. 29, 2017, received in U.S. Appl. No. 14/866,989, 31 pages.
Office Action, dated Nov. 22, 2017, received in U.S. Appl. No. 14/871,227, 24 pages.
Final Office Action, dated Nov. 29, 2017, received in U.S. Appl. No. 14/867,823, 47 pages.
Final Office Action, dated Dec. 14, 2017, received in U.S. Appl. No. 14/867,892, 53 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Jan. 11, 2018, received in U.S. Appl. No. 14/869,997, 17 pages.
Notice of Allowance, dated Jan. 17, 2018, received in U.S. Appl. No. 14/867,990, 12 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Notice of Allowance, dated Dec. 21, 2017, received in U.S. Appl. No. 15/723,069, 7 pages.
MacKenzie et al., "The Tactile Touchpad", Chi '97 Extended Abstracts on Human Factors in Computing Systems Looking to the Future, Chi '97, Mar. 22, 1997, 5 pages.
YouTube, "HTC One Favorite Camera Features", http://www.youtube.com/watch?v=sUYHfcjl4RU, Apr. 28, 2013, 3 pages.
Notice of Allowance, dated Dec. 8, 2017, received in Japanese Patent Application No. 2015-511644, which corresponds with U.S. Appl. No. 14/536,426, 6 pages.
Patent, dated Jan. 12, 2018, received in Japanese Patent Application No. 2015-511644, which corresponds with U.S. Appl. No. 14/536,426, 3 pages.
Notice of Acceptance, dated Dec. 20, 2017, received in Australian Patent Application No. 2016201451, which corresponds with U.S. Appl. No. 14/608,926, 3 pages.
Notice of Allowance, dated Dec. 29, 2017, received in Korean Patent Application No. 2017-7018250, which corresponds with U.S. Appl. No. 14/608,926, 3 pages.
Office Action, dated Feb. 2, 2018, received in Chinese Patent Application No. 201380035893.7, which corresponds with U.S. Appl. No. 14/536,141, 5 pages.
Office Action, dated Dec. 6, 2017, received in European Patent Application No. 13724104.8, which corresponds with U.S. Appl. No. 14/536,203, 9 pages.
Notice of Allowance, dated Jan. 12, 2018, received in Japanese Patent Application No. 2016173113, which corresponds with U.S. Appl. No. 14/536,203, 5 pages.
Patent, dated Jan. 23, 2018, received in Korean Patent Application No. 2016-7033834, which corresponds with U.S. Appl. No. 14/536,203, 4 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Patent, dated Dec. 1, 2017, received in Korean Patent Application No. 2016-7029533, which corresponds with U.S. Appl. No. 14/536,267, 2 pages.
Patent, dated Dec. 8, 2017, received in Chinese Patent Application No. 201380068399.0, which corresponds with U.S. Appl. No. 14/608,985, 4 pages.
Patent, dated Dec. 19, 2017, received in Korean Patent Application No. 2015-7019984, which corresponds with U.S. Appl. No. 14/608,985, 3 pages.
Office Action, dated Feb. 14, 2018, received in Korean Patent Application No. 2017-7030129, which corresponds with U.S. Appl. No. 14/864,737, 17 pages.
Office Action, dated Jan. 10, 2018, received in Danish Patent Application No. 201500574, which corresponds with U.S. Appl. No. 14/866,159, 2 pages.

(56) References Cited

OTHER PUBLICATIONS

Certificate of Grant, dated Jan. 3, 2018, received in Australian Patent Application No. 2016229421, which corresponds with U.S. Appl. No. 14/868,078, 1 page.
Office Action, dated Nov. 24, 2017, received in European Patent Application No. 16727900.9, which corresponds with U.S. Appl. No. 14/866,511, 5 pages.
Office Action, dated Jan. 29, 2018, received in Danish Patent Application No. 201500592, which corresponds with U.S. Appl. No. 14/869,899, 2 pages.
Office Action, dated Dec. 14, 2017, received in Danish Patent Application No. 201670594, which corresponds with U.S. Appl. No. 14/869,899, 3 pages.
Office Action, dated Jan. 19, 2018, received in Australian Patent Application No. 201761478, which corresponds with U.S. Appl. No. 14/866,992, 6 pages.
Office Action, dated Jan. 17, 2018, received in Australian Patent Application No. 2017202816, which corresponds with U.S. Appl. No. 14/857,636, 3 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Patent, dated Jan. 29, 2018, received in Danish Patent Application No. 201500596, which corresponds with U.S. Appl. No. 14/870,882, 4 pages.
Notice of Allowance, dated Jan. 4, 2018, received in Japanese Patent Application No. 2016-533201, which corresponds with U.S. Appl. No. 14/871,227, 4 pages.
Patent, dated Oct. 30, 2017, Danish Patent Application No. 201500601, which corresponds with U.S. Appl. No. 14/871,336, 5 pages.
Office Action, dated Jan. 23, 2018, received in Danish Patent Application No. 201500594, which corresponds with U.S. Appl. No. 14/867,823, 8 pages.
Notice of Allowance, dated Jan. 26, 2018, received in Danish Patent Application No. 201500598, which corresponds with U.S. Appl. No. 14/867,892, 2 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Jan. 8, 2018, received in Danish Patent Application No. 201770190, which corresponds with U.S. Appl. No. 15/136,782, 2 pages.
Office Action, dated Jan. 10, 2018, received in Danish Patent Application No. 201670590, which corresponds with U.S. Appl. No. 15/231,745, 2 pages.
Office Action, dated Jan. 30, 2018, received in Danish Patent Application No. 201670592, which corresponds with U.S. Appl. No. 15/231,745, 2 pages.
Office Action, dated Feb. 7, 2018, received in Danish Patent Application No. 201770709, 2 pages.
Extended European Search Report, dated Nov. 24, 2017, received in European Patent Application No. 17186744.3, which corresponds with U.S. Appl. No. 14/536,291, 10 pages.
Notice of Allowance, dated Nov. 17, 2017, received in Japanese Patent Application No. 2016-125839, which corresponds with U.S. Appl. No. 14/536,267, 5 pages.

\* cited by examiner

DEVICE, METHOD, AND GRAPHICAL USER INTERFACE FOR DISPLAYING CONTENT ASSOCIATED WITH A CORRESPONDING AFFORDANCE

RELATED APPLICATIONS

This application is a continuation of PCT Patent Application Serial No. PCT/US2013/040098, filed on May 8, 2013, entitled "Device, Method, and Graphical User Interface for Displaying Content Associated with a Corresponding Affordance," which claims the benefit of and priority to U.S. Provisional Patent Application Ser. No. 61/778,412, filed on Mar. 13, 2013, entitled "Device, Method, and Graphical User Interface for Displaying Content Associated with a Corresponding Affordance;" U.S. Provisional Patent Application No. 61/747,278, filed Dec. 29, 2012, entitled "Device, Method, and Graphical User Interface for Manipulating User Interface Objects with Visual and/or Haptic Feedback;" and U.S. Provisional Patent Application No. 61/688,227, filed May 9, 2012, entitled "Device, Method, and Graphical User Interface for Manipulating User Interface Objects with Visual and/or Haptic Feedback," which applications are incorporated by reference herein in their entireties.

This application is also related to the following: U.S. Provisional Patent Application Ser. No. 61/778,092, filed on Mar. 12, 2013, entitled "Device, Method, and Graphical User Interface for Selecting Object within a Group of Objects;" U.S. Provisional Patent Application Ser. No. 61/778,125, filed on Mar. 12, 2013, entitled "Device, Method, and Graphical User Interface for Navigating User Interface Hierarchies;" U.S. Provisional Patent Application Ser. No. 61/778,156, filed on Mar. 12, 2013, entitled "Device, Method, and Graphical User Interface for Manipulating Framed Graphical Objects;" U.S. Provisional Patent Application Ser. No. 61/778,179, filed on Mar. 12, 2013, entitled "Device, Method, and Graphical User Interface for Scrolling Nested Regions;" U.S. Provisional Patent Application Ser. No. 61/778,171, filed on Mar. 12, 2013, entitled "Device, Method, and Graphical User Interface for Displaying Additional Information in Response to a User Contact;" U.S. Provisional Patent Application Ser. No. 61/778,191, filed on Mar. 12, 2013, entitled "Device, Method, and Graphical User Interface for Displaying User Interface Objects Corresponding to an Application;" U.S. Provisional Patent Application Ser. No. 61/778,211, filed on Mar. 12, 2013, entitled "Device, Method, and Graphical User Interface for Facilitating User Interaction with Controls in a User Interface;" U.S. Provisional Patent Application Ser. No. 61/778,239, filed on Mar. 12, 2013, entitled "Device, Method, and Graphical User Interface for Forgoing Generation of Tactile Output for a Multi-Contact Gesture;" U.S. Provisional Patent Application Ser. No. 61/778,284, filed on Mar. 12, 2013, entitled "Device, Method, and Graphical User Interface for Providing Tactile Feedback for Operations Performed in a User Interface;" U.S. Provisional Patent Application Ser. No. 61/778,287, filed on Mar. 12, 2013, entitled "Device, Method, and Graphical User Interface for Providing Feedback for Changing Activation States of a User Interface Object;" U.S. Provisional Patent Application Ser. No. 61/778,363, filed on Mar. 12, 2013, entitled "Device, Method, and Graphical User Interface for Transitioning between Touch Input to Display Output Relationships;" U.S. Provisional Patent Application Ser. No. 61/778,367, filed on Mar. 12, 2013, entitled "Device, Method, and Graphical User Interface for Moving a User Interface Object Based on an Intensity of a Press Input;" U.S. Provisional Patent Application Ser. No. 61/778,265, filed on Mar. 12, 2013, entitled "Device, Method, and Graphical User Interface for Transitioning between Display States in Response to a Gesture;" U.S. Provisional Patent Application Ser. No. 61/778,373, filed on Mar. 12, 2013, entitled "Device, Method, and Graphical User Interface for Managing Activation of a Control Based on Contact Intensity;" U.S. Provisional Patent Application Ser. No. 61/778,413, filed on Mar. 13, 2013, entitled "Device, Method, and Graphical User Interface for Selecting User Interface Objects;" U.S. Provisional Patent Application Ser. No. 61/778,414, filed on Mar. 13, 2013, entitled "Device, Method, and Graphical User Interface for Moving and Dropping a User Interface Object;" U.S. Provisional Patent Application Ser. No. 61/778,416, filed on Mar. 13, 2013, entitled "Device, Method, and Graphical User Interface for Determining Whether to Scroll or Select Content;" and U.S. Provisional Patent Application Ser. No. 61/778,418, filed on Mar. 13, 2013, entitled "Device, Method, and Graphical User Interface for Switching between User Interfaces," which are incorporated herein by reference in their entireties.

This application is also related to the following: U.S. Provisional Patent Application Ser. No. 61/645,033, filed on May 9, 2012, entitled "Adaptive Haptic Feedback for Electronic Devices;" U.S. Provisional Patent Application Ser. No. 61/665,603, filed on Jun. 28, 2012, entitled "Adaptive Haptic Feedback for Electronic Devices;" and U.S. Provisional Patent Application Ser. No. 61/681,098, filed on Aug. 8, 2012, entitled "Adaptive Haptic Feedback for Electronic Devices," which are incorporated herein by reference in their entireties.

TECHNICAL FIELD

This relates generally to electronic devices with touch-sensitive surfaces, including but not limited to electronic devices with touch-sensitive surfaces that detect inputs for manipulating user interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. In addition, existing methods take longer than necessary, thereby wasting energy. This latter consideration is particularly important in battery-operated devices.

SUMMARY

Accordingly, there is a need for electronic devices with faster, more efficient methods and interfaces for manipulating user interfaces. Such methods and interfaces optionally complement or replace conventional methods for manipulating user interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

There is a need for electronic devices with faster, more efficient methods and interfaces for arranging user interface objects relative to one another, both in the x and y directions on a display, as well as in a layer order (i.e., the z-order or front-to-back order of the user interface objects). Such methods and interfaces may complement or replace conventional methods for arranging user interface objects. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying a plurality of user interface objects on the display, including a first user interface object and a second user interface object, where the first user interface object is above the second user interface object in a z-order. The method also includes, detecting a contact on the touch-sensitive surface; detecting a gesture on the touch-sensitive surface, where the gesture includes movement of the contact on the touch-sensitive surface corresponding to movement of the first user interface object into a respective area of the display that was occupied by the second user interface object prior to detecting the gesture; and in response to detecting the gesture: moving the first user interface object on the display in accordance with the movement of the contact on the touch-sensitive surface. The method further includes, when the first user interface object moves into the respective area of the display: in accordance with a determination that the gesture meets object-collision criteria, the object-collision criteria including that the contact had a maximum intensity during the gesture above a first intensity threshold prior to moving the first user interface object into the respective area of the display, displaying the first user interface object colliding with the second user interface object and adjusting display properties of the second user interface object in accordance with the movement of the first user interface object on the display; and in accordance with a determination that the contact had a maximum intensity during the gesture below the first intensity threshold prior to moving the first user interface object into the respective area of the display, displaying the first user interface object moving over the second user interface object.

In accordance with some embodiments, an electronic device includes a display unit configured to display a plurality of user interface objects; a touch-sensitive surface unit configured to receive user contacts; one or more sensor units configured to detect intensity of user contacts with the touch-sensitive surface unit; and a processing unit coupled to the display unit, the touch-sensitive surface unit, and the sensor units. The processing unit is configured to: enable display of a plurality of user interface objects on the display unit, including a first user interface object and a second user interface object, wherein the first user interface object is above the second user interface object in a z-order; detect a contact on the touch-sensitive surface unit; detect a gesture on the touch-sensitive surface unit, wherein the gesture includes movement of the contact on the touch-sensitive surface corresponding to movement of the first user interface object into a respective area of the display unit that was occupied by the second user interface object prior to detecting the gesture. The processing unit is further configured to, in response to detecting the gesture: move the first user interface object on the display unit in accordance with the movement of the contact on the touch-sensitive surface; and when the first user interface object moves into the respective area of the display unit: in accordance with a determination that the gesture meets object-collision criteria, the object-collision criteria including that the contact had a maximum intensity during the gesture above a first intensity threshold prior to moving the first user interface object into the respective area of the display unit, enable display of the first user interface object colliding with the second user interface object and adjust display properties of the second user interface object in accordance with the movement of the first user interface object on the display; and in accordance with a determination that the contact had a maximum intensity during the gesture below the first intensity threshold prior to moving the first user interface object into the respective area of the display unit, enable display of the first user interface object moving over the second user interface object.

Thus, electronic devices with displays, touch-sensitive surfaces and one or more sensors to detect intensity of contacts with the touch-sensitive surface are provided with faster, more efficient methods and interfaces for arranging user interface objects, thereby increasing the effectiveness, efficiency, and user satisfaction with such devices. Such methods and interfaces may complement or replace conventional methods for arranging user interface objects.

There is a need for electronic devices with faster, more efficient methods and interfaces for displaying content associated with a corresponding affordance. Such methods and interfaces may complement or replace conventional methods for displaying content associated with a corresponding affordance. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface and one or more sensors to detect intensity of contacts with the touch-sensitive surface. The method includes: displaying, on the display, an affordance corresponding to respective content, where the affordance is displayed at a respective size; while a focus selector is over the affordance, detecting a gesture that includes an increase in intensity of the contact on the touch-sensitive surface followed by a subsequent decrease in intensity of the contact on the touch-sensitive surface; and in response to detecting the increase in intensity of the contact, decreasing a size of the affordance below the respective size. The method further includes, in response to detecting the subsequent decrease in intensity of the contact: in accordance with a determination that a maximum intensity of the contact is above a content-display intensity threshold, ceasing to display the affordance and displaying at least a portion of the respective content; and in accordance with a determination that a maximum intensity of the contact is below the content-display intensity threshold, increasing the size of the affordance to the respective size and forgoing displaying the respective content.

In accordance with some embodiments, an electronic device includes a display unit configured to display, on the display unit, an affordance corresponding to respective content, where the affordance is displayed at a respective size, a touch-sensitive surface unit configured to receive inputs and contacts, one or more sensor units to detect intensity of contacts with the touch-sensitive surface unit, and a processing unit coupled to the display unit, the touch-sensitive surface unit, and the sensor units. The processing unit is configured to: while a focus selector is over the affordance, detect a gesture that includes an increase in intensity of the contact on the touch-sensitive surface unit followed by a subsequent decrease in intensity of the contact on the touch-sensitive surface unit; in response to detecting the increase in intensity of the contact, decrease a size of the affordance below the respective size; and in response to detecting the subsequent decrease in intensity of the contact: in accordance with a determination that a maximum intensity of the contact is above a content-display intensity threshold, cease to display the affordance and enable display of at least a portion of the respective content; and in accordance with a determination that a maximum intensity of the contact is below the content-display intensity threshold, increase the size of the affordance to the respective size and forgo displaying the respective content.

Thus, electronic devices with displays, touch-sensitive surfaces and one or more sensors to detect intensity of contacts with the touch-sensitive surface are provided with faster, more efficient methods and interfaces for displaying content associated with a corresponding affordance, thereby increasing the effectiveness, efficiency, and user satisfaction with such devices. Such methods and interfaces may complement or replace conventional methods for displaying content associated with a corresponding affordance.

There is a need for electronic devices with faster, more efficient methods and interfaces for previewing media content. Such methods and interfaces may complement or replace conventional methods for previewing media content. Such methods and interfaces reduce the cognitive burden on a user and produce a more efficient human-machine interface. For battery-operated devices, such methods and interfaces conserve power and increase the time between battery charges.

In accordance with some embodiments, a method is performed at an electronic device with a display, a touch-sensitive surface, and one or more sensors to detect intensity of contacts with the touch-sensitive surface. The method includes: displaying, on the display, a media player application, where the media player application includes a first media player control for controlling playback of a plurality of different media items by the media player application; and while the first media player control is associated with a first media item: displaying a representation of a second media item that is associated with a second media player control for controlling playback of the second media item; while a focus selector is over the second media player control, detecting an input that includes an increase in intensity of a contact; and in response to detecting the input, determining whether to advance through the second media item in accordance with the intensity of the contact.

In accordance with some embodiments, an electronic device includes a display unit configured to display a media player application, where the media player application includes a first media player control for controlling playback of a plurality of different media items by the media player application; a touch-sensitive surface unit configured to receive inputs that include contacts; one or more sensors configured to detect intensity of contacts with the touch-sensitive surface unit; and a processing unit coupled to the display unit, the touch-sensitive surface unit, and the sensors. The processing unit is configured to: while the first media player control is associated with a first media item: enable display of a representation of a second media item that is associated with a second media player control for controlling playback of the second media item; while a focus selector is over the second media player control, detect an input that includes an increase in intensity of a contact; and in response to detecting the input, determine whether to advance through the second media item in accordance with the intensity of the contact.

Thus, electronic devices with displays, touch-sensitive surfaces, and one or more sensors to detect intensity of contacts with the touch-sensitive surface are provided with faster, more efficient methods and interfaces for previewing media content, thereby increasing the effectiveness, efficiency, and user satisfaction with such devices. Such methods and interfaces may complement or replace conventional methods for previewing media content.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods referred to in the fifth paragraph of the Description of Embodiments. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods referred to in the fifth paragraph of the Description of Embodiments, which are updated in response to inputs, as described in any of the methods referred to in the fifth paragraph of the Description of Embodiments. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred to in the fifth paragraph of the Description of Embodiments. In accordance with some embodiments, an electronic device includes: a display, a touch-sensitive surface, and optionally one or more sensors to detect intensity of contacts with the touch-sensitive surface; and means for performing the operations of any of the methods referred to in the fifth paragraph of the Description of Embodiments. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods referred to in the fifth paragraph of the Description of Embodiments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
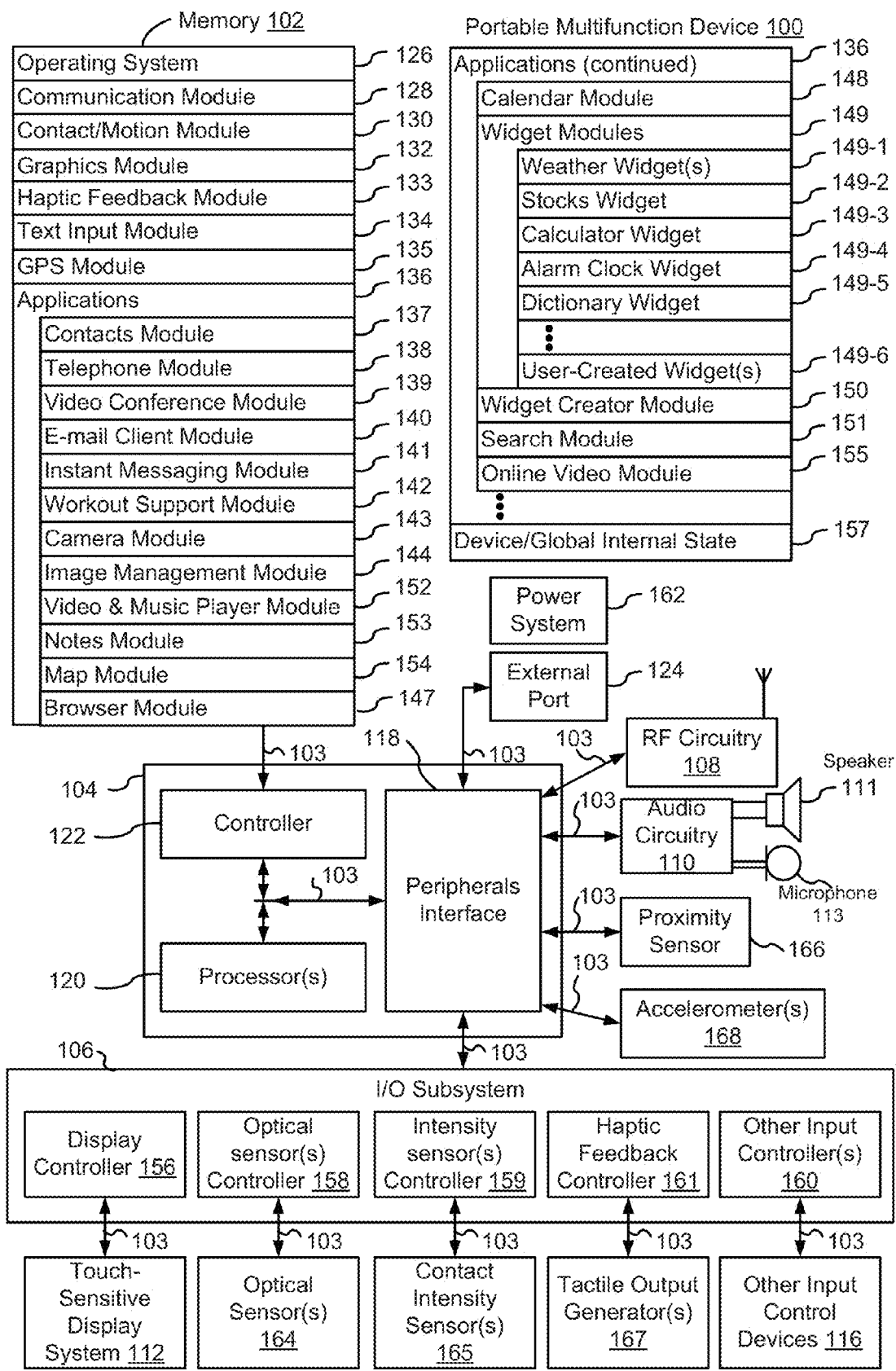
FIG. 1A is a block diagram illustrating a portable multifunction device with a touch-sensitive display in accordance with some embodiments.

The methods, devices and GUIs described herein provide visual and/or haptic feedback that makes manipulation of user interface objects more efficient and intuitive for a user. For example, in a system where the clicking action of a trackpad is decoupled from the contact intensity (e.g., contact force, contact pressure, or a substitute therefore) that is needed to reach an activation threshold, the device can generate different tactile outputs (e.g., "different clicks") for different activation events (e.g., so that clicks that accomplish a particular result are differentiated from clicks that do not produce any result or that accomplish a different result from the particular result). Additionally, tactile outputs can be generated in response to other events that are not related to increasing intensity of a contact, such as generating a tactile output (e.g., a "detent") when a user interface object is moved to a particular position, boundary or orientation, or when an event occurs at the device.

Additionally, in a system where a trackpad or touch-screen display is sensitive to a range of contact intensity that includes more than one or two specific intensity values (e.g., more than a simple on/off, binary intensity determination), the user interface can provide responses (e.g., visual or tactile cues) that are indicative of the intensity of the contact within the range. In some implementations, a pre-activation-threshold response and/or a post-activation-threshold response to an input are displayed as continuous animations. As one example of such a response, a preview of an operation is displayed in response to detecting an increase in contact intensity that is still below an activation threshold for performing the operation. As another example of such a response, an animation associated with an operation continues even after the activation threshold for the operation has been reached. Both of these examples provide a user with a continuous response to the force or pressure of a user's contact, which provides a user with visual and/or haptic feedback that is richer and more intuitive. More specifically, such continuous force responses give the user the experience of being able to press lightly to preview an operation and/or press deeply to push "past" or "through" a predefined user interface state corresponding to the operation.

Additionally, for a device with a touch-sensitive surface that is sensitive to a range of contact intensity, multiple contact intensity thresholds can be monitored by the device and different functions can be mapped to different contact intensity thresholds. This serves to increase the available "gesture space" providing easy access to advanced features for users who know that increasing the intensity of a contact at or beyond a second "deep press" intensity threshold will cause the device to perform a different operation from an operation that would be performed if the intensity of the contact is between a first "activation" intensity threshold and the second "deep press" intensity threshold. An advantage of assigning additional functionality to a second "deep press" intensity threshold while maintaining familiar functionality at a first "activation" intensity threshold is that inexperienced users who are, in some circumstances, confused by the additional functionality can use the familiar functionality by just applying an intensity up to the first "activation" intensity threshold, whereas more experienced users can take advantage of the additional functionality by applying an intensity at the second "deep press" intensity threshold.

Additionally, for a device with a touch-sensitive surface that is sensitive to a range of contact intensity, the device can provide additional functionality by allowing users to perform complex operations with a single continuous contact. For example, when selecting a group of objects, a user can move a continuous contact around the touch-sensitive surface and can press while dragging (e.g., applying an intensity greater than a "deep press" intensity threshold) to add additional elements to a selection. In this way, a user can intuitively interact with a user interface where pressing harder with a contact causes objects in the user interface to be "stickier."

Figure 5A:
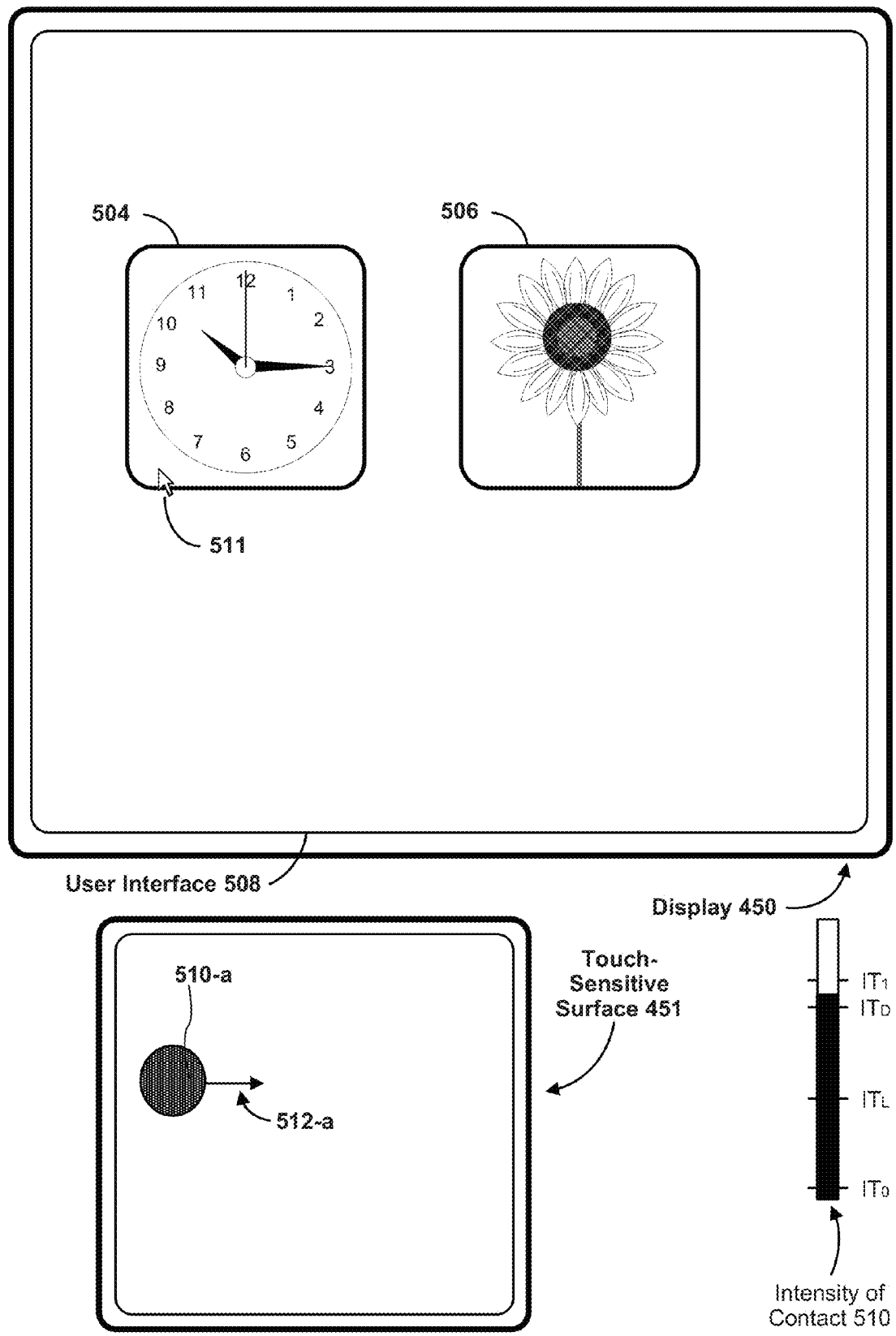
FIGS. 5A-5O illustrate exemplary user interfaces for arranging user interface objects in accordance with some embodiments.

A number of different approaches to providing an intuitive user interface on a device where a clicking action is decoupled from the force that is needed to reach an activation threshold and/or the device is sensitive to a wide range of contact intensities are described below. Using one or more of these approaches (optionally in conjunction with each other) helps to provide a user interface that intuitively provides users with additional information and functionality, thereby reducing the user's cognitive burden and improving the human-machine interface. Such improvements in the human-machine interface enable users to use the device faster and more efficiently. For battery-operated devices, these improvements conserve power and increase the time between battery charges. For ease of explanation, systems, methods and user interfaces for including illustrative examples of some of these approaches are described below, as follows:

Manipulating the arrangement of user interface objects on a display is intimately linked to the overall user experience with an electronic device. One example of manipulating the arrangement of user interface objects is changing the respective z-order of two user interface objects. Sometimes, manipulating the z-order of two or more user interface objects requires a complicated sequence of user inputs, which can be cumbersome, difficult to remember, and time consuming. The embodiments described below provide a convenient, intuitive method of arranging user interface objects (e.g., changing their respective z-order) based on an intensity of an input on a touch-sensitive surface. In particular, FIGS. 5A-5O illustrate exemplary user interfaces for arranging user interface objects. FIGS. 6A-6E are flow diagrams illustrating a method of arranging user interface objects. The user interfaces in FIGS. 5A-5O are used to illustrate the processes in FIGS. 6A-6E.

Figure 8A:
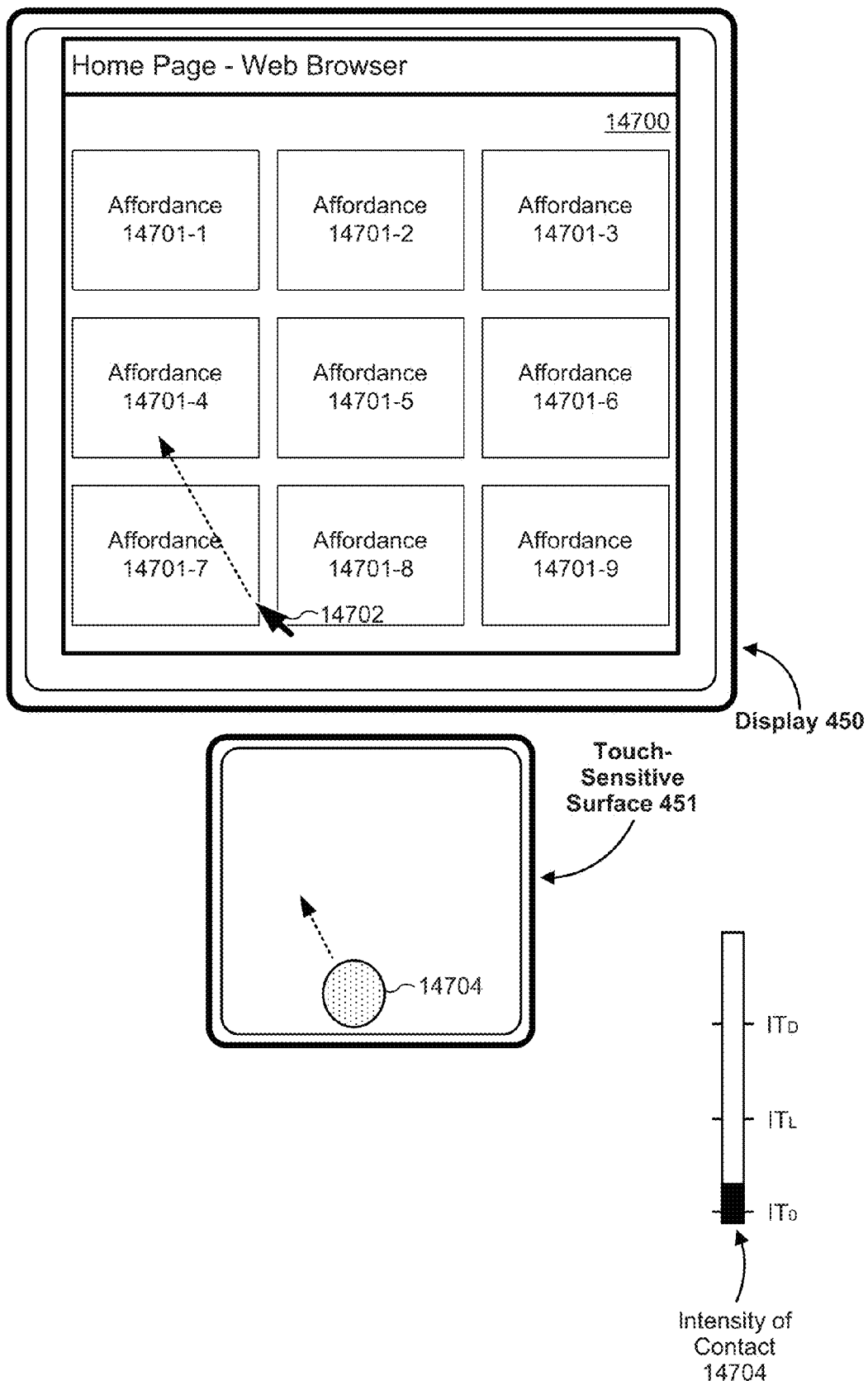
FIGS. 8A-8P illustrate exemplary user interfaces for displaying content associated with a corresponding affordance in accordance with some embodiments.
Figure 8P:
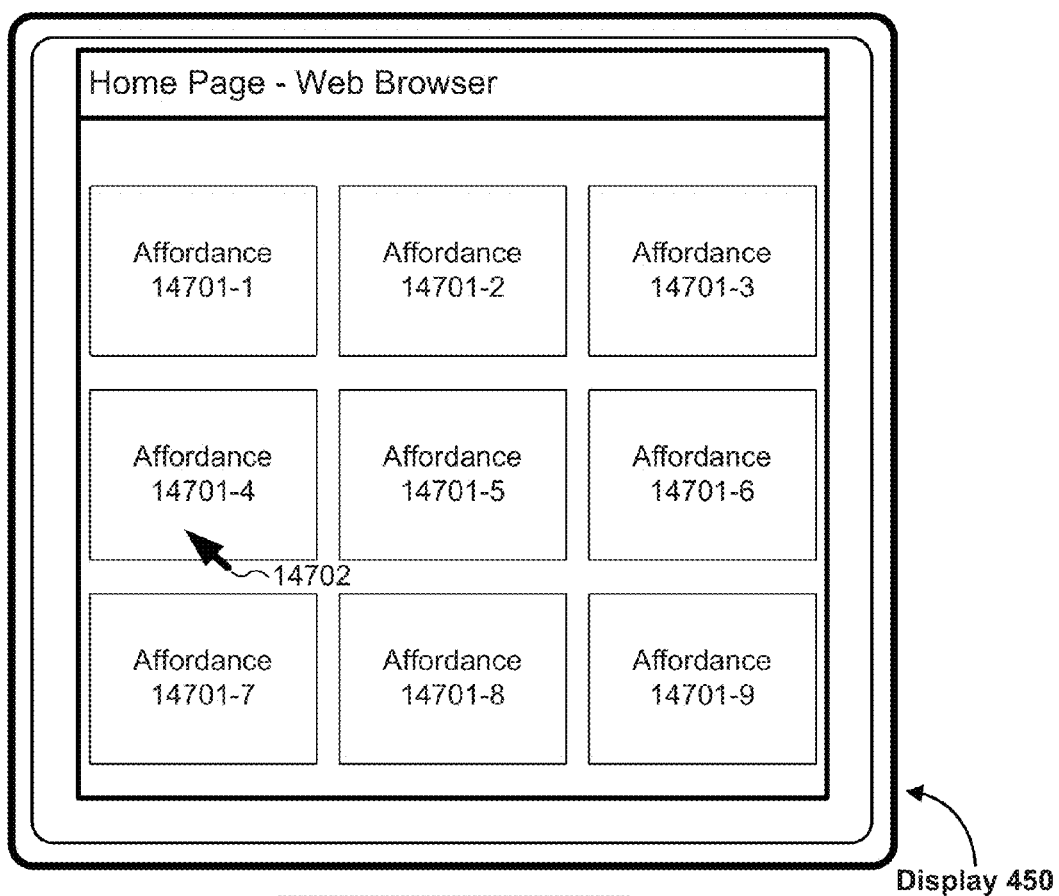
Figure 8P:
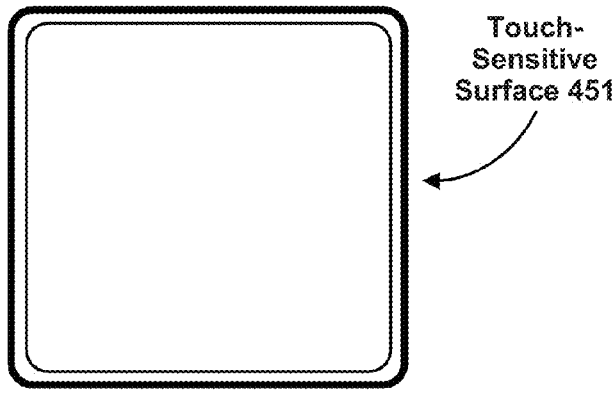
Figure 8P:
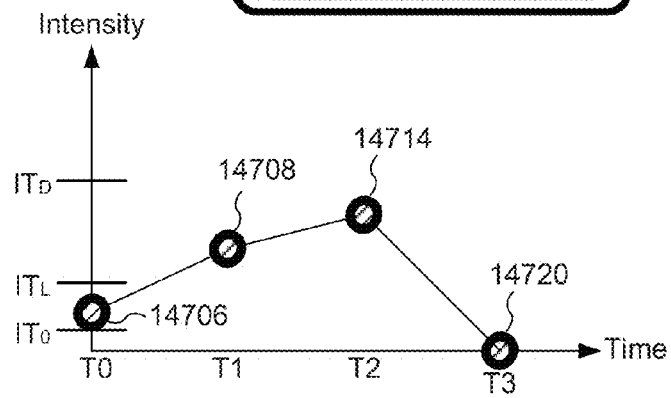
Figure 9A:
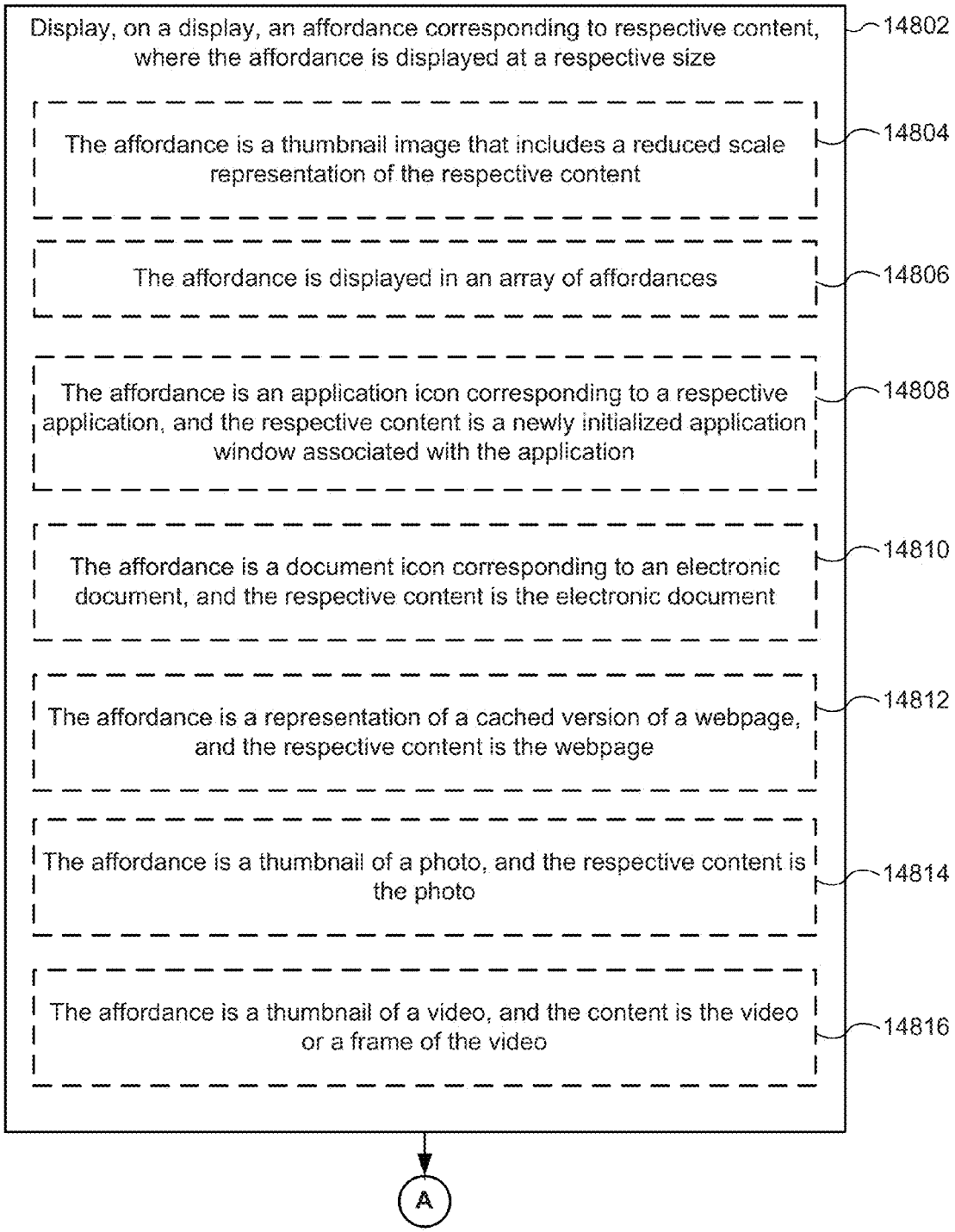
FIGS. 9A-9B are flow diagrams illustrating a method of for displaying content associated with a corresponding affordance in accordance with some embodiments.
Figure 9B:
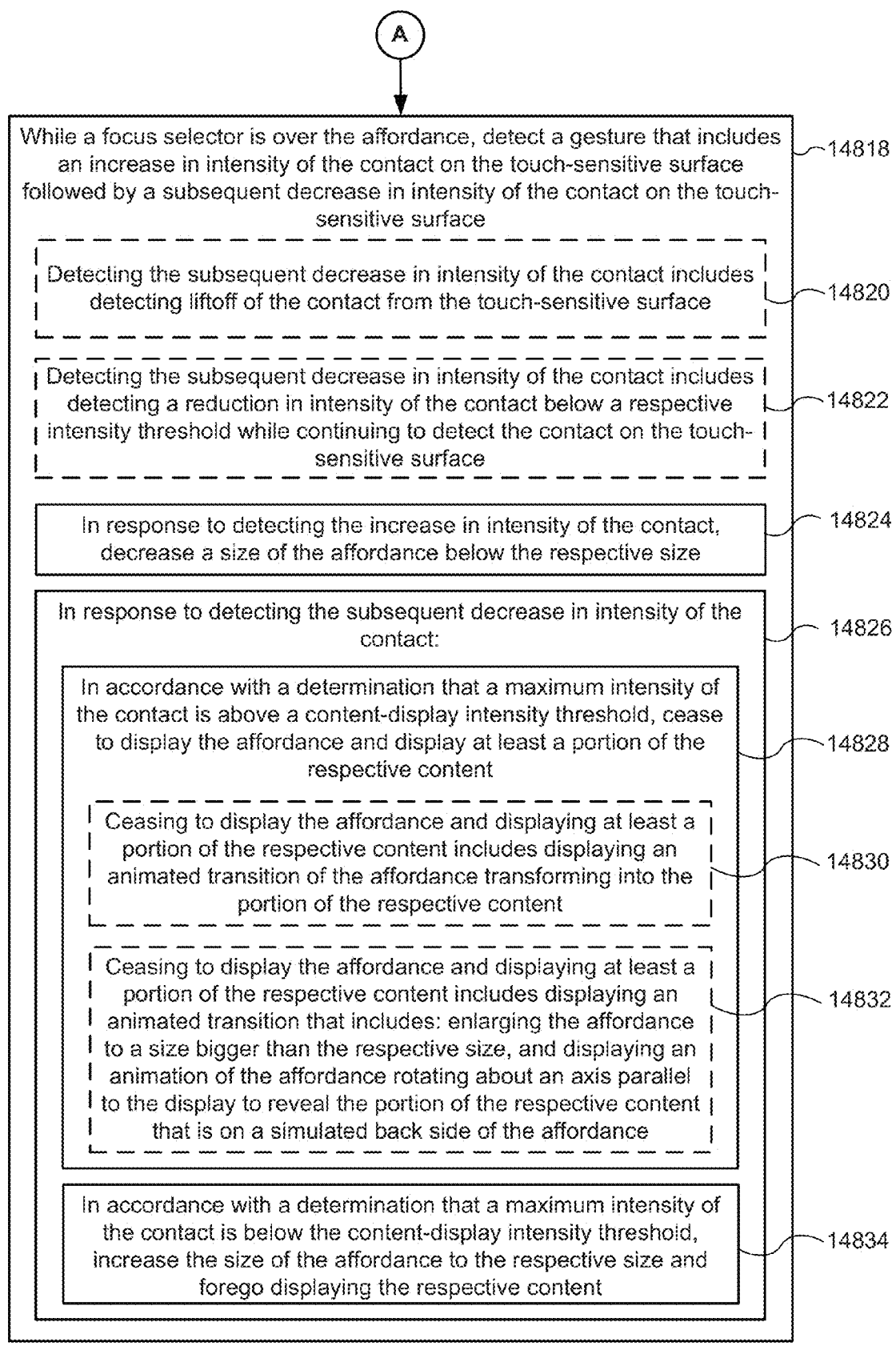

Many electronic devices have graphical user interfaces in which an affordance corresponds to respective content, though which the content can be accessed. However, in many situations when a user starts to activate an affordance, the user is not provided with any indication which affordance is about to be selected or how close the affordance is to being selected. To avoid accidental selections of such affordances, or to allow a user to change his or her mind, it would be advantageous to provide visual feedback indicating that an affordance is about to be selected. The embodiments described below provide a convenient and intuitive method of indicating that an affordance is about to be selected based on an intensity of a contact on a touch-sensitive surface. In particular, FIGS. 8A-8P illustrate exemplary user interfaces for displaying content associated with a corresponding affordance. FIGS. 9A-9B are flow diagrams illustrating a method of displaying content associated with a corresponding affordance. The user interfaces in FIGS. 8A-8P are used to illustrate the processes in FIGS. 9A-9B.

Figure 11A:
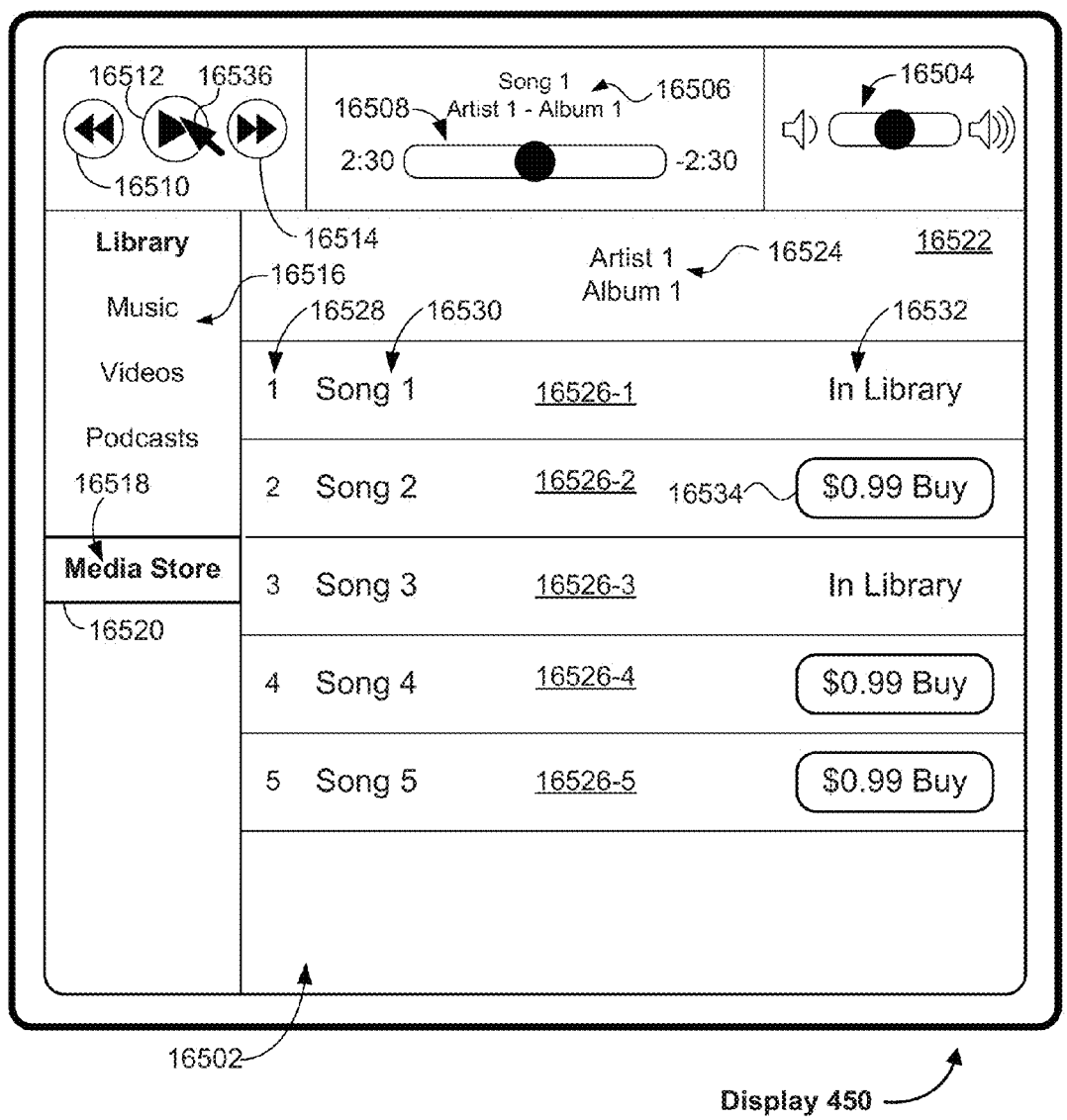
FIGS. 11A-11T illustrate exemplary user interfaces for previewing media content in accordance with some embodiments.
Figure 11A:
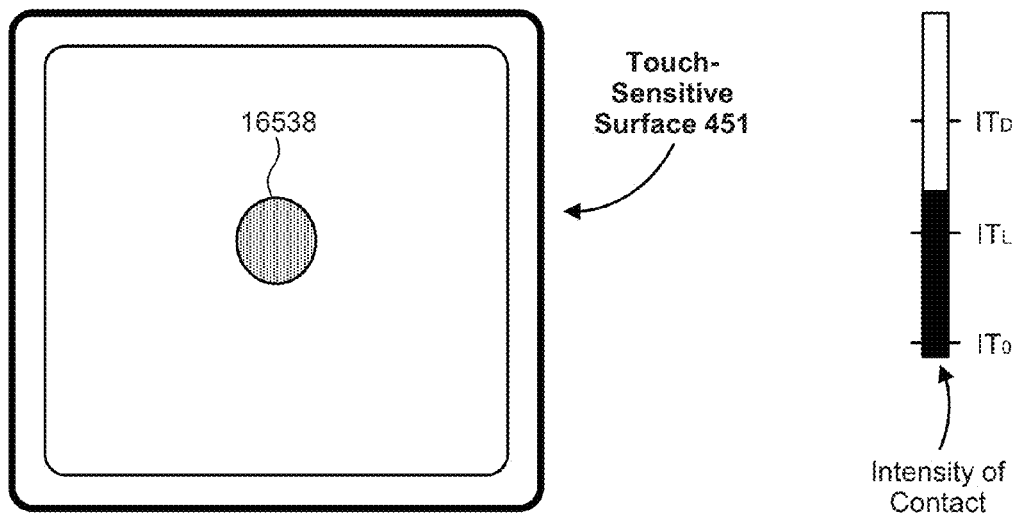
Figure 11B:
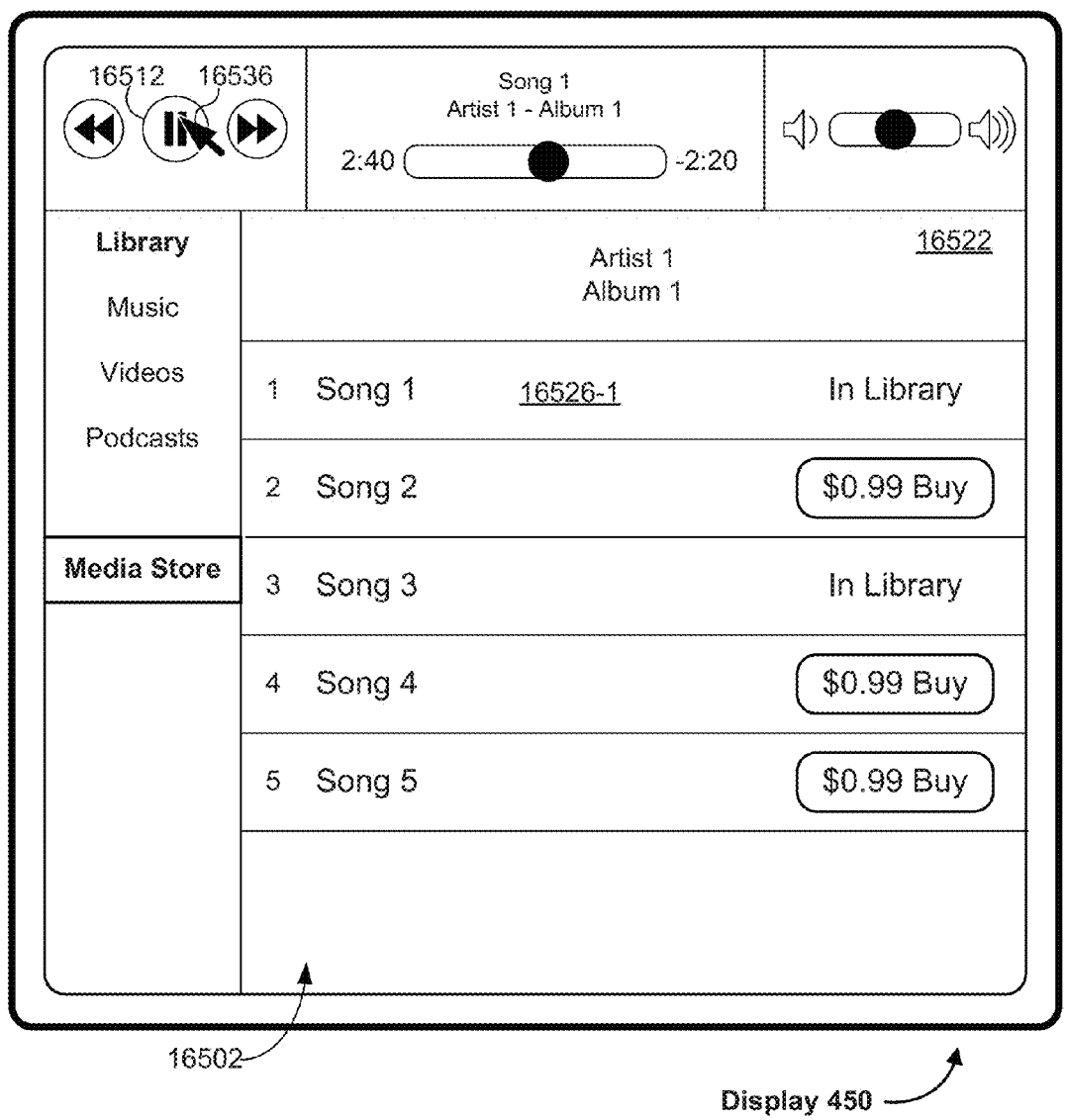
Figure 11B:
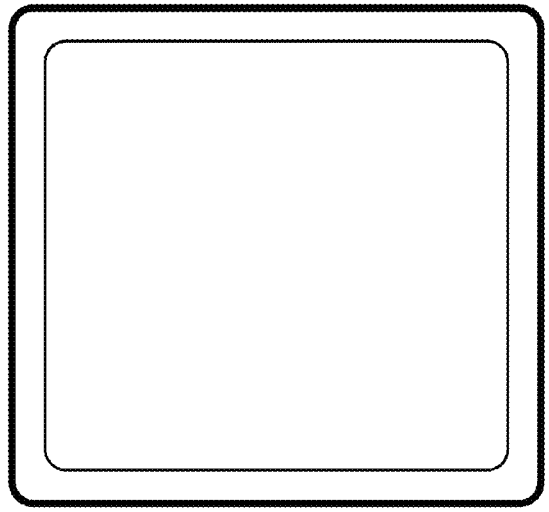

Many electronic devices include a media player application for playing media items in a media library and accessing media stores for acquiring media items. In some circumstances, a user can preview such media items in the media player. However, sometimes the user's ability to preview media is limited (e.g., the user is only able to play or stop the preview). The embodiments described below provide a convenient and intuitive method for previewing a media item by allowing a user to advance through the media item in accordance with an intensity of a contact on a touch-sensitive surface. In particular, FIGS. 11A-11T illustrate exemplary user interfaces for previewing media content. FIGS. 12A-12E are flow diagrams illustrating a method of previewing media content. The user interfaces in FIGS. 11A-11T are used to illustrate the processes in FIGS. 12A-12E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
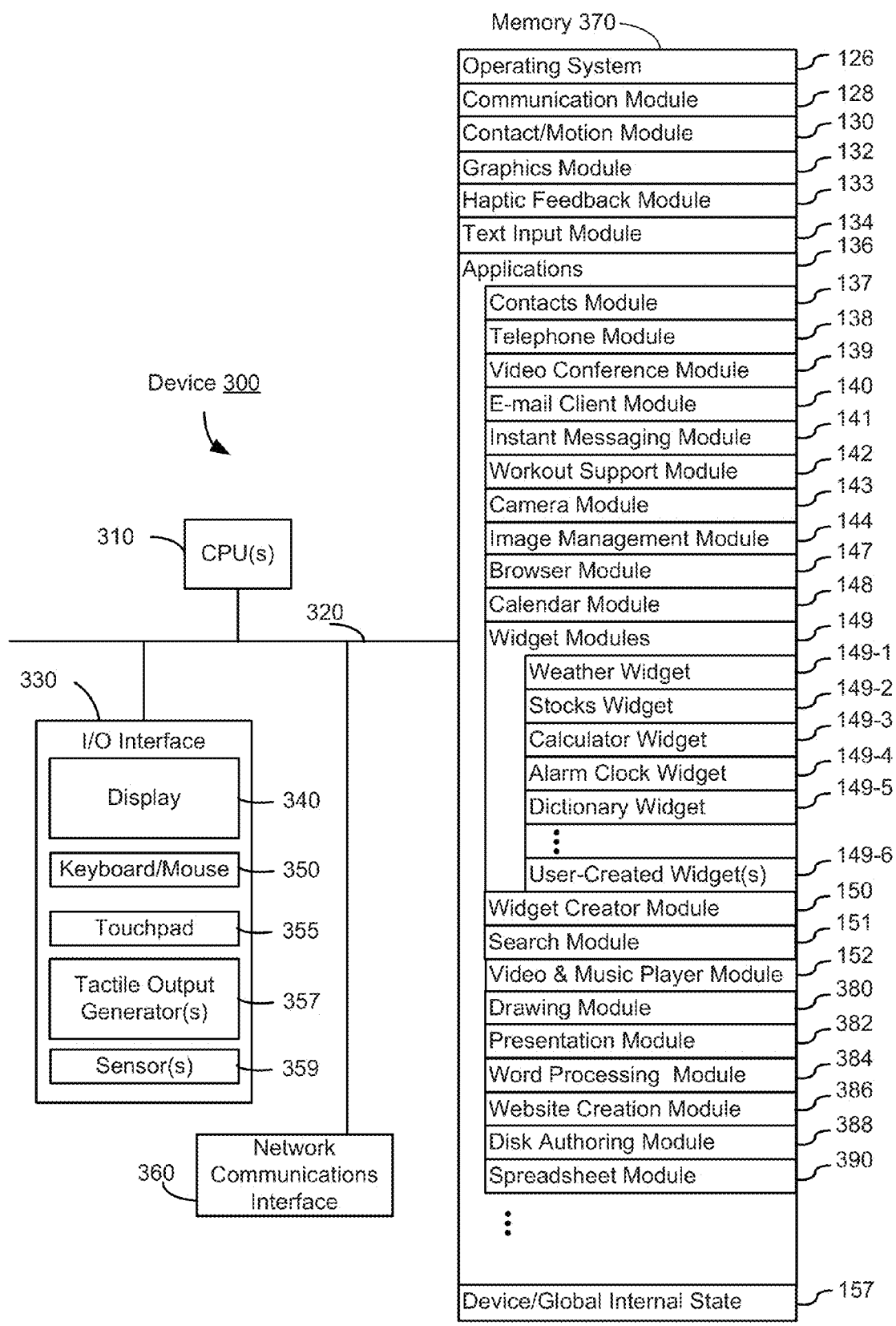
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;

video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
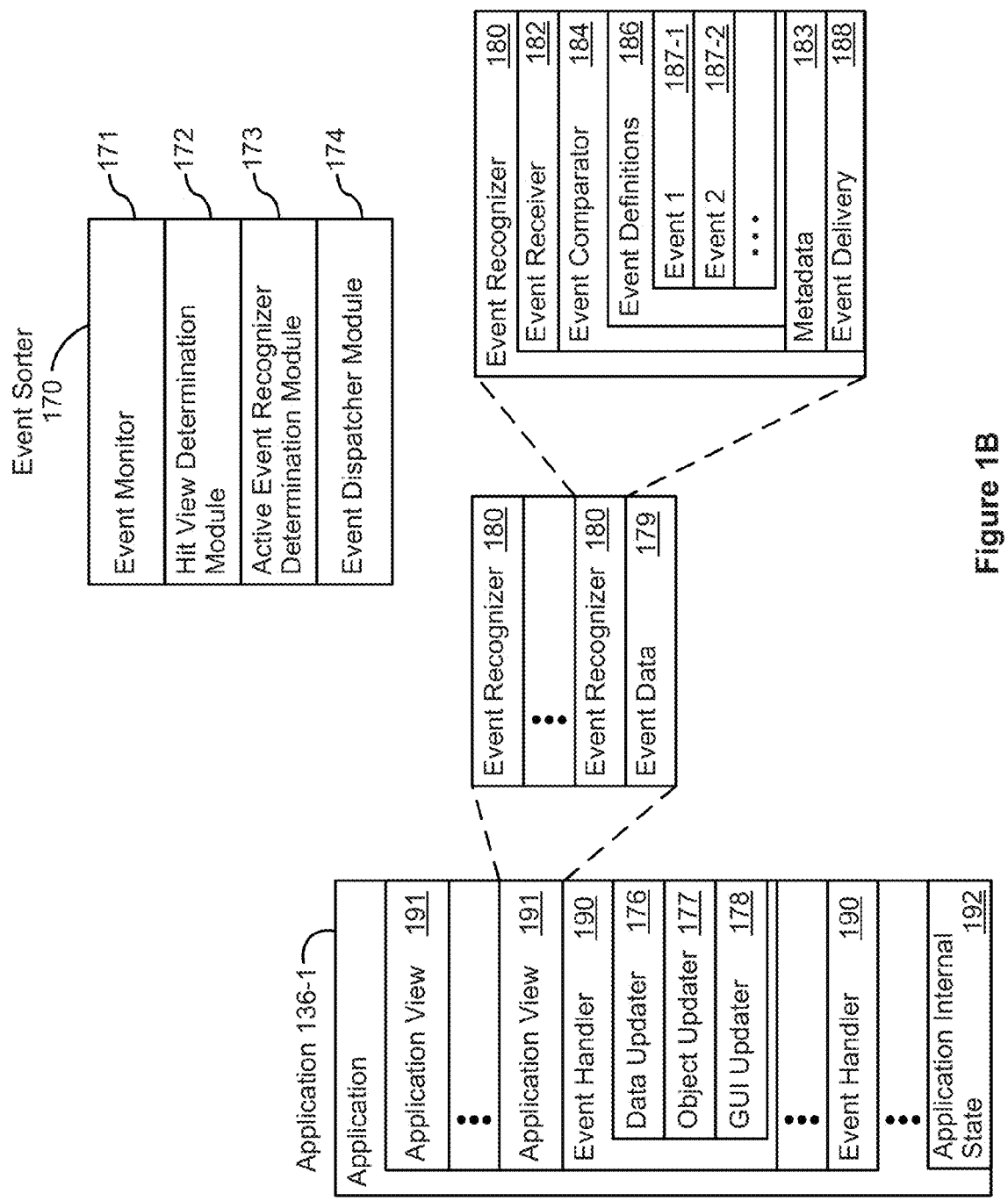
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
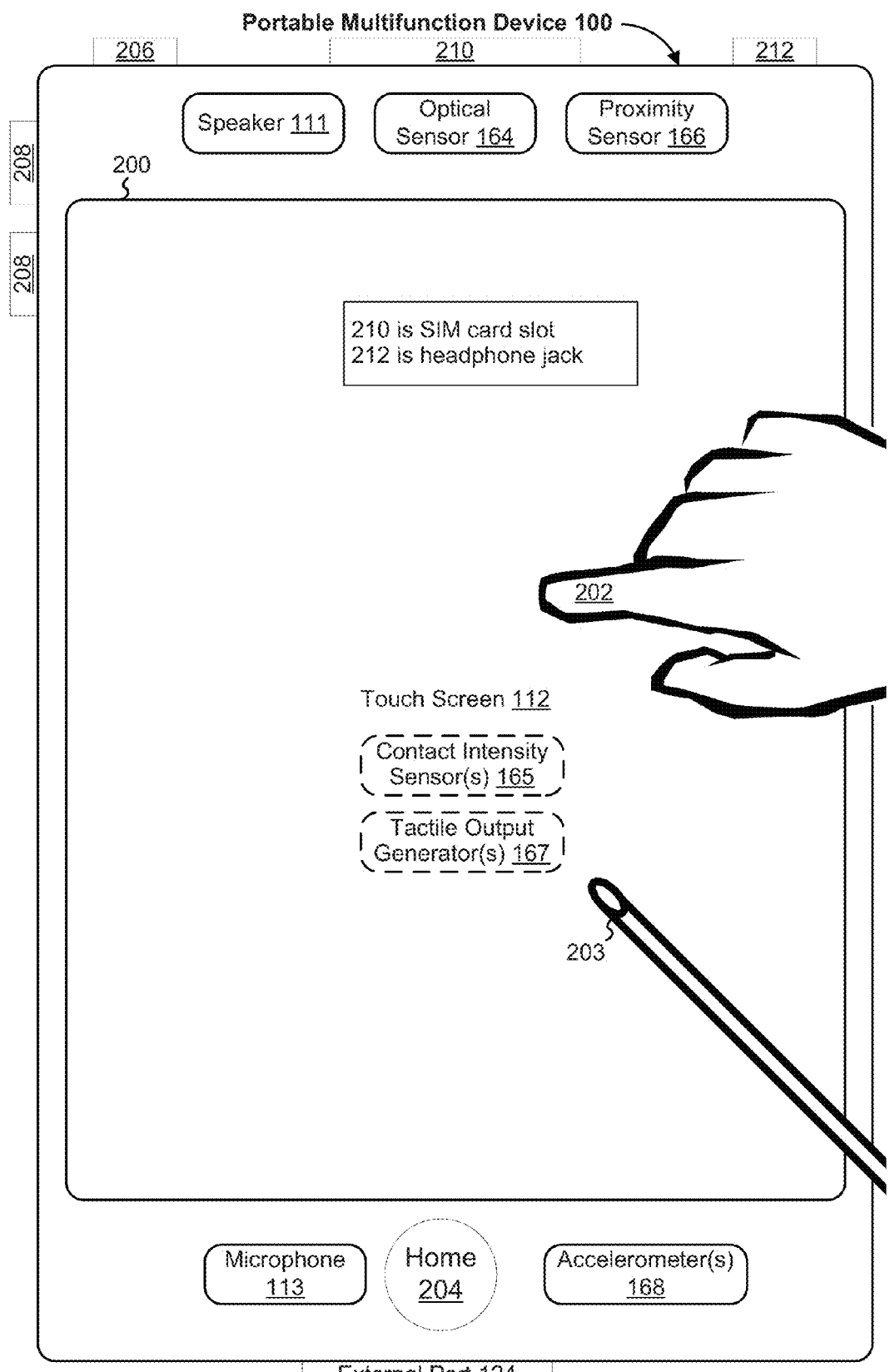
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
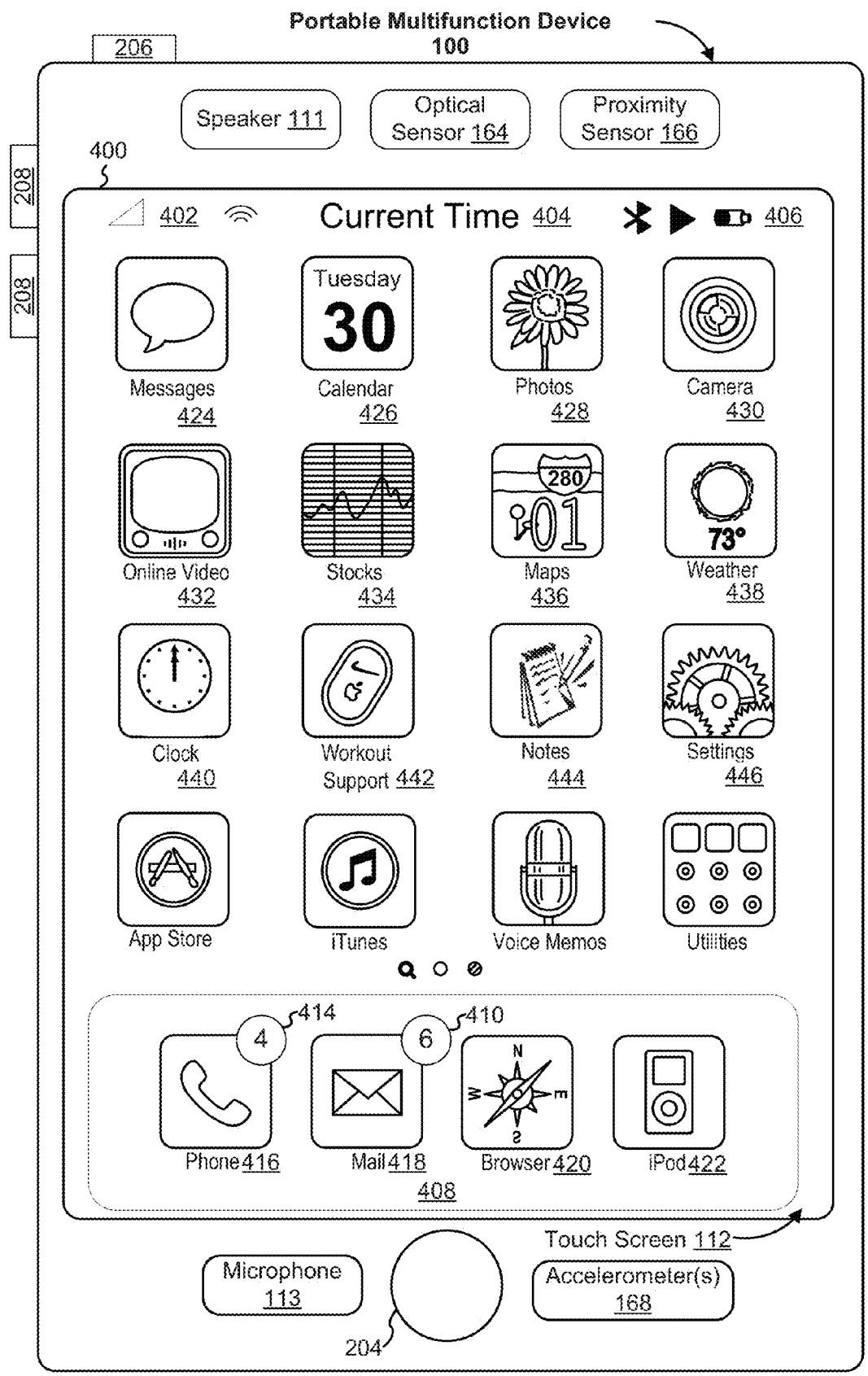
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
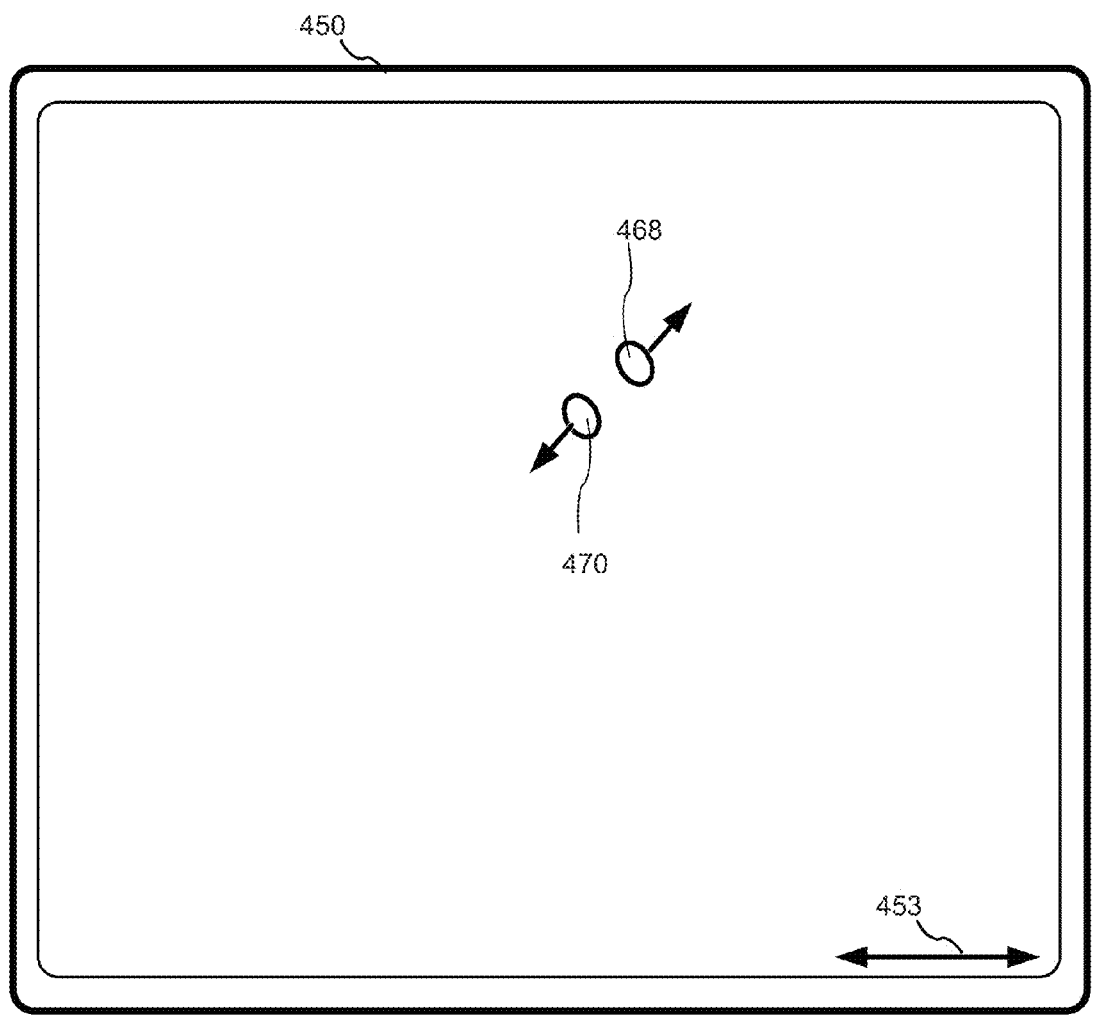
FIG. 4B illustrates an exemplary user interface for a multifunction device with a touch-sensitive surface that is separate from the display in accordance with some embodiments.
Figure 4B:
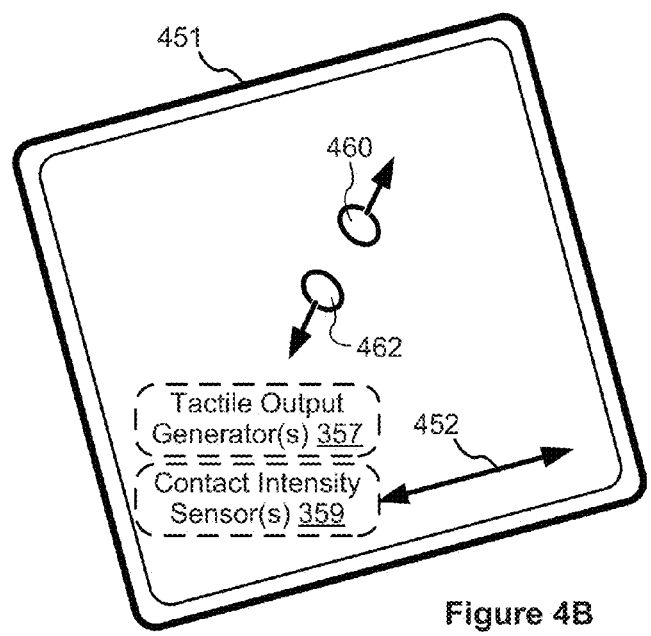

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$, and/or one or more other intensity thresholds). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with an intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of intensity of the contact from an intensity below the light press intensity threshold $IT_L$ to an intensity between the light press intensity threshold $IT_L$ and the deep press intensity threshold $IT_D$ is sometimes referred to as a "light press" input. An increase of intensity of the contact from an intensity below the deep press intensity threshold $IT_D$ to an intensity above the deep press intensity threshold $IT_D$ is sometimes referred to as a "deep press" input. An increase of intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of intensity of the contact from an intensity above the contact-detection intensity threshold $IT_0$ to an intensity below the contact intensity threshold $IT_0$ is sometimes referred to as detecting liftoff of the contact from the touch-surface. In some embodiments $IT_0$ is zero. In some embodiments $IT_0$ is greater than zero. In some illustrations a shaded circle or oval is used to represent intensity of a contact on the touch-sensitive surface. In some illustrations a circle or oval without shading is used represent a respective contact on the touch-sensitive surface without specifying the intensity of the respective contact.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

User Interfaces and Associated Processes

Arranging User Interface Objects

Manipulating the arrangement of user interface objects on a display is intimately linked to the overall user experience with an electronic device such as a desktop computer or mobile device (e.g., a notebook computer, tablet computer, or handheld device). For example, the arrangement of user interface objects on a display, each associated with a unique operation (e.g., an application or electronic document), can contribute to or hinder a user's ability to locate a desired user interface object on the display. The capacity to easily manipulate an arrangement of user interface objects on a display is desirable because it allows the user, for example, to prioritize the location of often used user interface objects, group related user interface objects together, or otherwise display a plurality of user interface objects in a functionally optimized manner. Easy manipulation of the arrangement of user interface objects can result in increased productivity, decreased frustration associated with the inability to quickly locate a desired user interface object, and an overall more efficient user experience.

User interface objects may be spatially arranged on a display along three axes, two of which lie in the plane of the display (e.g., x- and y-axes), and the third of which is non-planar, non-parallel (e.g., perpendicular) to the plane of the display (e.g., a z-axis). Positioning user interface objects relative to each other in a z-direction (e.g., in a z-order) provides the appearance/illusion that the user interface objects are tiled/stacked upon one another. Manipulating the z-order of two or more user interface objects typically requires a sequence of user inputs including selecting one of the user interface objects and performing an operation to change the z-order of the user interface object (e.g., entering a keyboard shortcut, or navigating through a menu or tool bar to a z-order control). In some situations, the user will have to perform a long sequence of operations to change the z-order (e.g., when the displayed menu does not include the menu option for changing the z-order, the user needs to search through multiple menus and/or sub-menus to find a menu that has the menu option for changing the z-order and select the proper menu option). In addition, with existing methods, the process for changing the z-order of a user interface object requires inputs that are separate from the inputs used to move objects in the plane of the display.

In the embodiments described below, an improved method for changing the z-order, and for otherwise manipulating the arrangement, of a first user interface object relative to a second user interface object is achieved through the detection of contacts and gestures, and the determination of their associated intensities, on a touch-sensitive display. Detecting input (e.g., a finger contact) that exceeds a first and/or second intensity on a user interface object positions the user interface object in the z-order. Detection of a gesture (e.g., movement of a finger contact) on a user interface object further positions the user interface object in the plane of the display, and optionally manipulates the display properties (e.g., translational position or size) of other user interface objects in the same or different z-order position as the first user interface object. Moreover, the intensity of the contact used to perform the gesture optionally changes an interaction between two or more user interface objects (e.g., causing a first user interface object to collide with a second user interface object and adjusting display properties of the second user interface object, rather than passing "over" the second user interface object without adjusting the display properties of the second user interface object). This method streamlines the process of moving and arranging user interface objects on a display, thereby eliminating the need for extra steps, for example, to change the relative z-order of two user interface objects or independently move the other user interface objects.

FIGS. 5A-5O illustrate exemplary user interfaces for arranging user interface objects in accordance with some embodiments. The user interfaces in these figures are used to illustrate the processes described below, including the processes in FIGS. 6A-6E. FIGS. 5A-5O include intensity diagrams that show the current intensity of the contact on the touch-sensitive surface relative to a first intensity threshold ("$IT_D$") and a second threshold ("$IT_L$"). In some embodiments, the second intensity threshold is higher than the first intensity threshold. This intensity meter is typically not part of the displayed user interface, but is provided to aid in the interpretation of the figures. In some embodiments, operations similar to those described below with reference to $IT_D$ and $IT_1$ are performed with reference to a different intensity threshold (e.g., "$IT_L$" and an intensity threshold above $IT_L$).

FIG. 5A illustrates exemplary user interface 508 displaying application windows for different applications in accordance with some embodiments. In FIG. 5A, user interface 508 is displayed on display 450 of an electronic device that also includes touch-sensitive surface 451 and one or more sensors for detecting intensity of contacts with touch-sensitive surface 451. In some embodiments, touch-sensitive surface 451 is a touch screen display that is optionally display 450 or a separate display. User interface 508 displays a plurality of user interface objects, including first user interface object 504 and second user interface object 506, where the first user interface object 504 is above the second user interface object 506 in a z-order. For example, the objects in FIG. 5A have a layer order (e.g., a z-order or front-to-back order of the user interface objects), where overlapping objects are displayed on the display in accordance with their front-to-back order (e.g., an object that is "in front of" or, equivalently, "above" another object is displayed where the two objects overlap). In addition to repositioning the objects on the display, a user often wants to change the front-to-back order of the objects on the display.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 5A-5O and 6A-6E will be discussed with reference to display 450 and a separate touch-sensitive surface 451, however analogous operations are, optionally, performed on a device with a touch-sensitive display system 112 in response to detecting the contacts described in FIGS. 5A-5O on the touch-sensitive display system 112 while displaying the user interfaces shown in FIGS. 5A-5O on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 511.

In some embodiments, the first user interface object 504 and the second user interface object 506 are application windows for different applications. In other embodiments, the first user interface object 504 and the second user interface object 506 are different user interface objects within a single application.

Figure 5B:
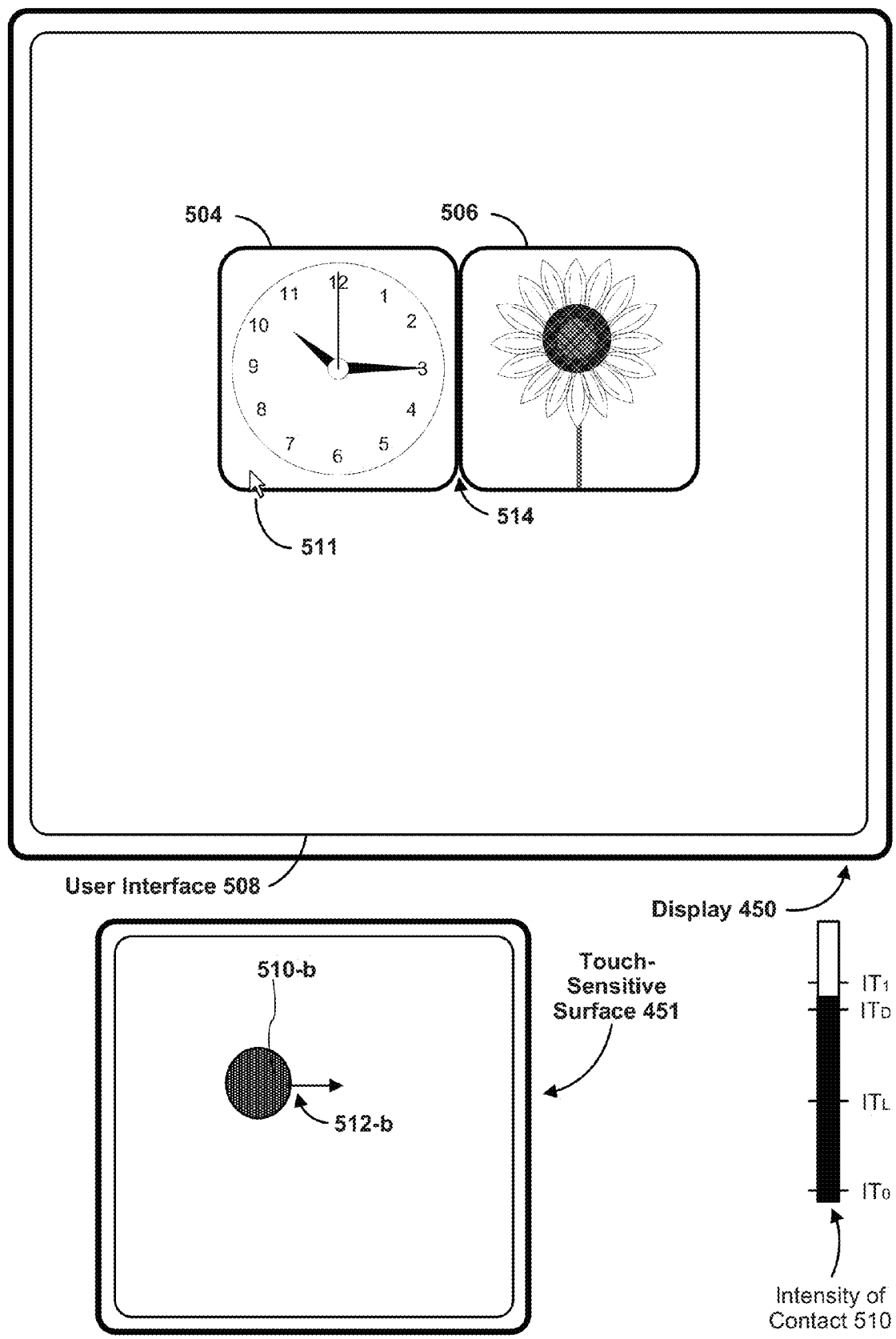
Figure 5C:
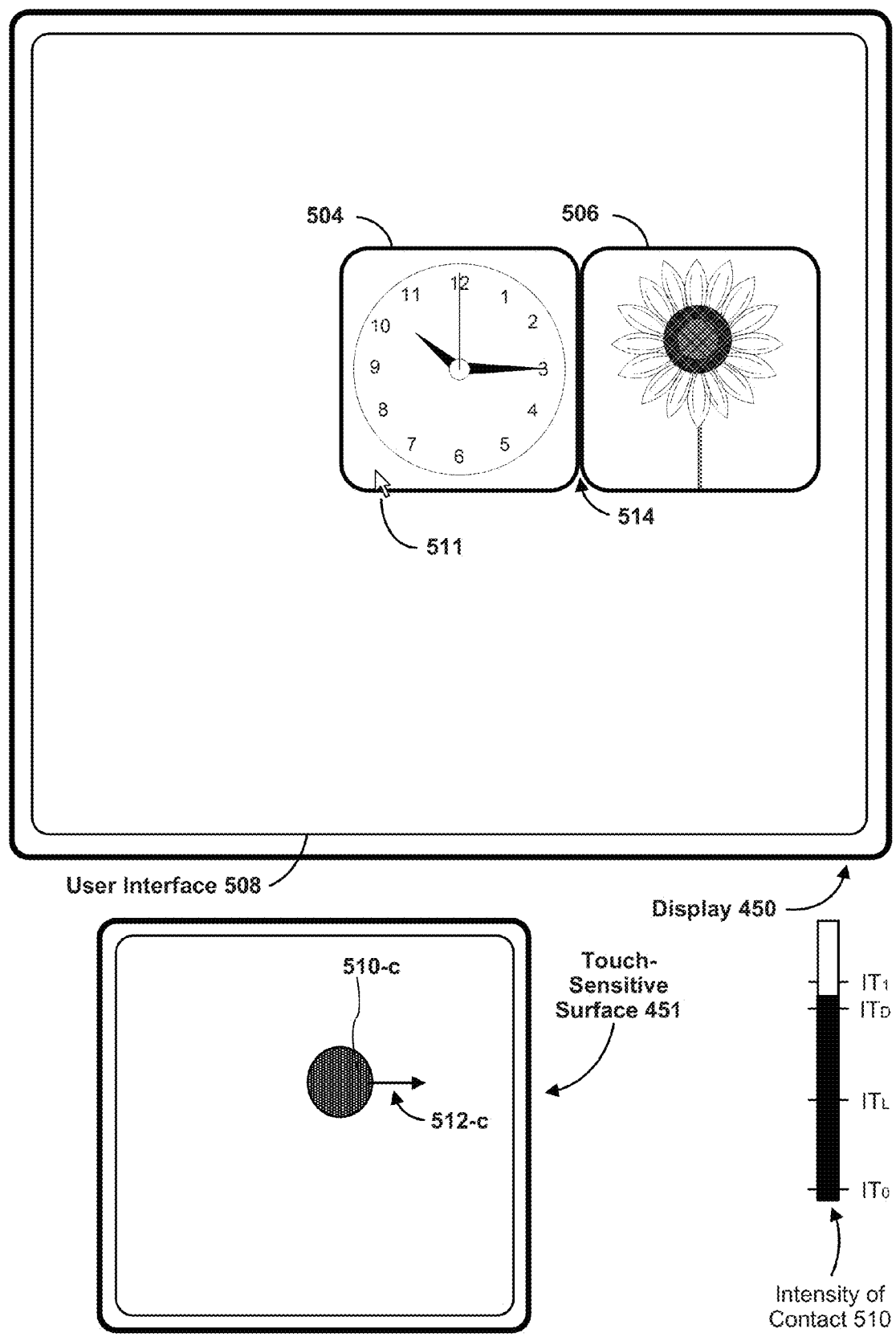
Figure 5D:
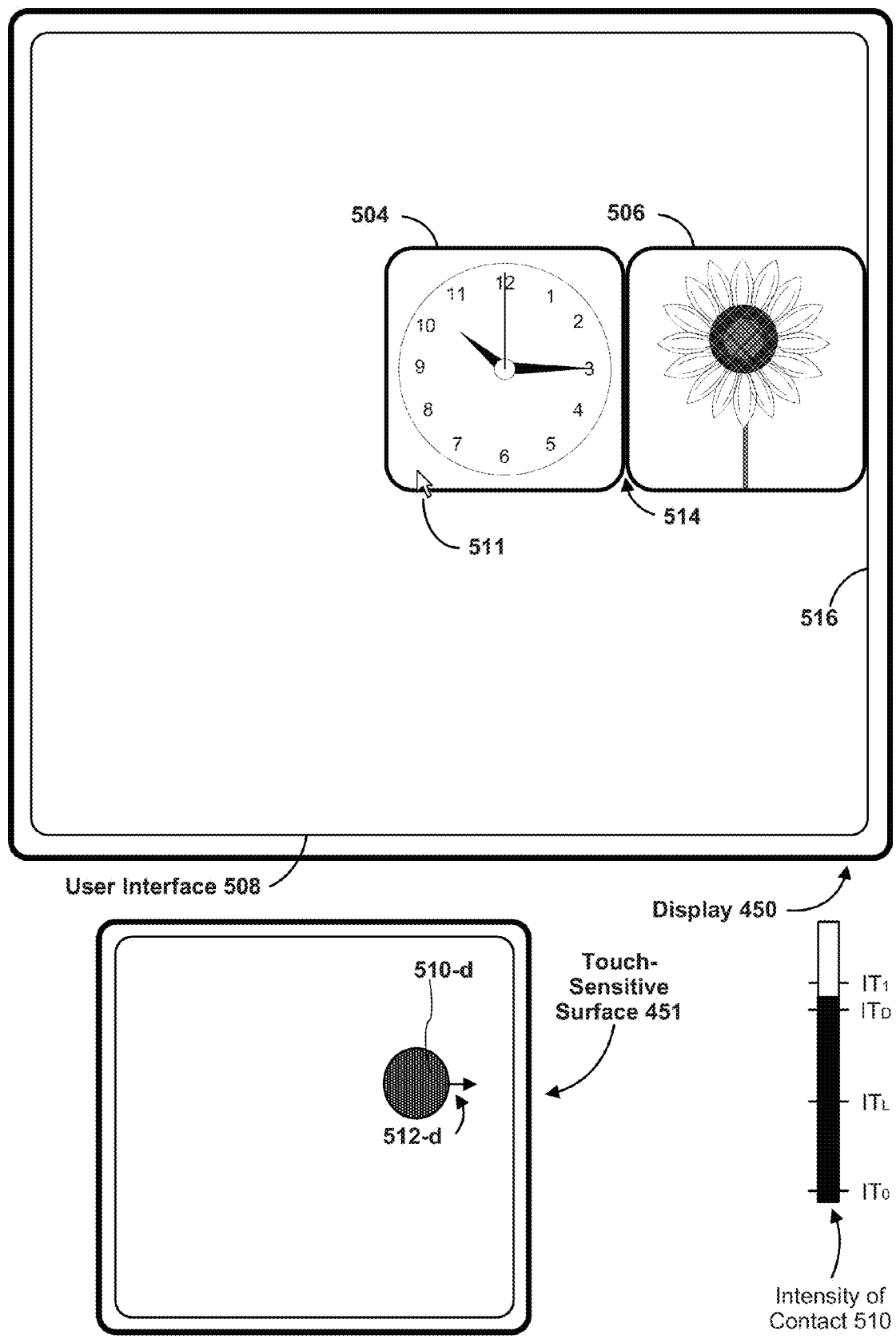
Figure 5E:
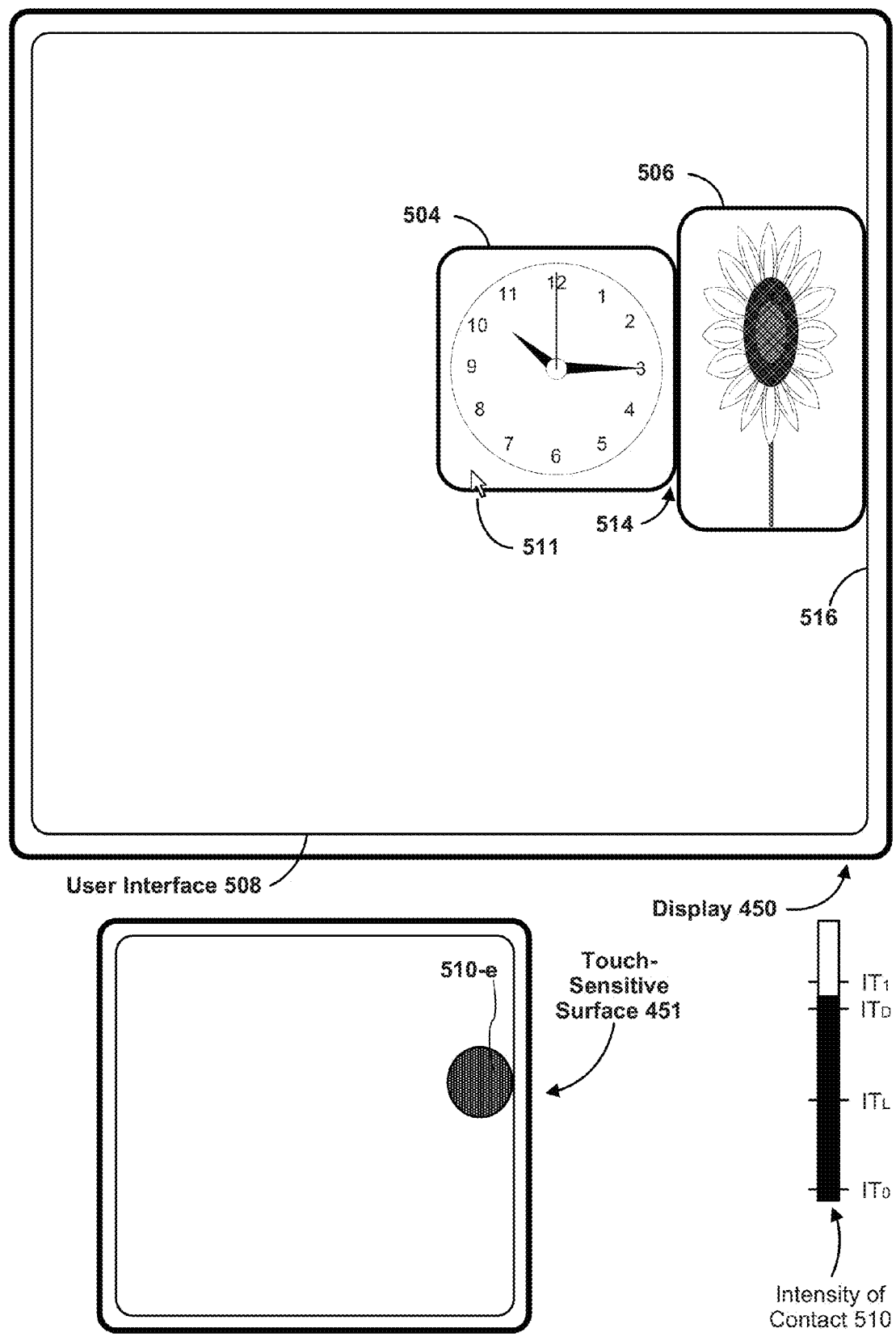
Figure 5F:
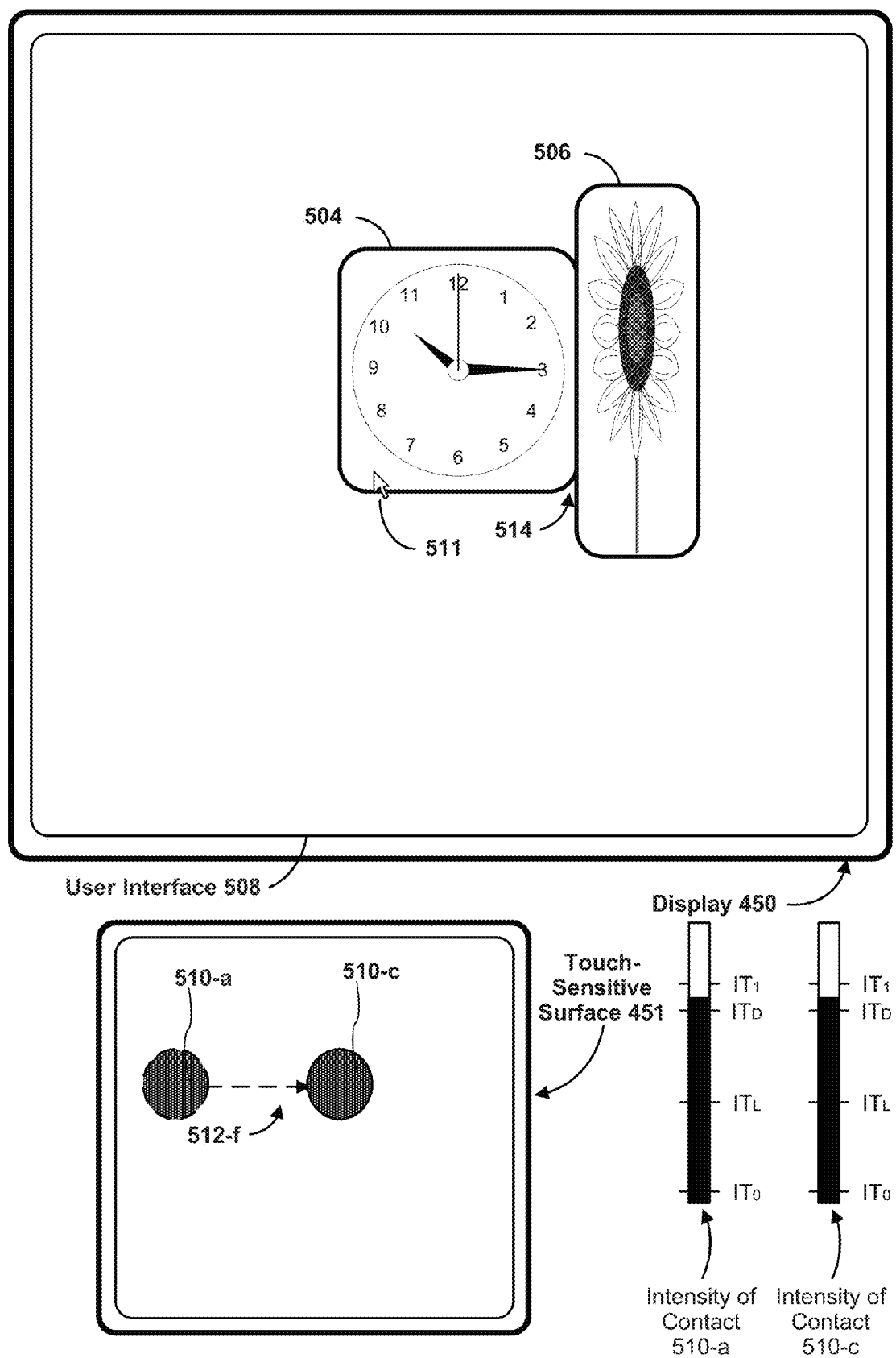
Figure 5G:
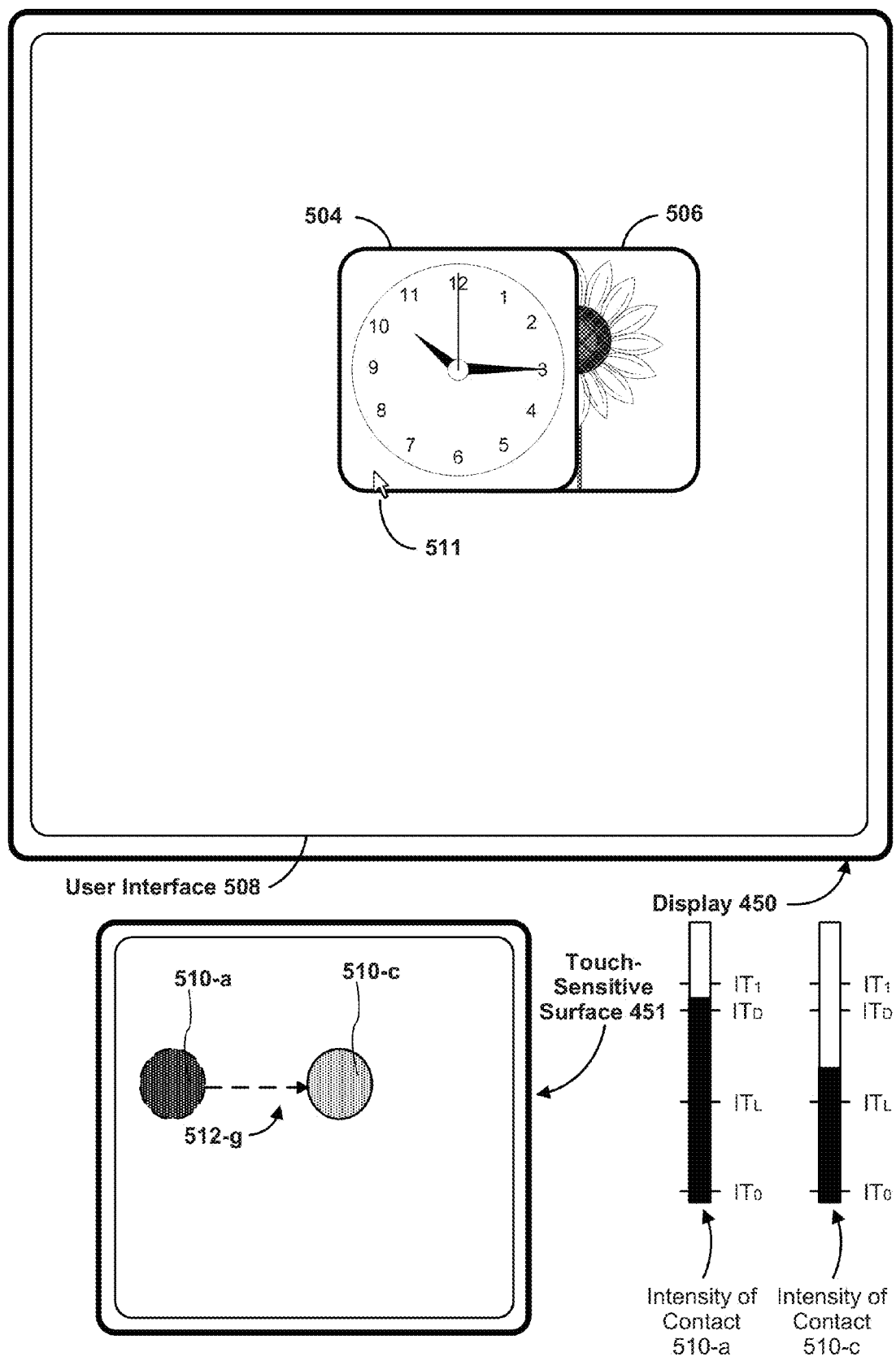
Figure 5H:
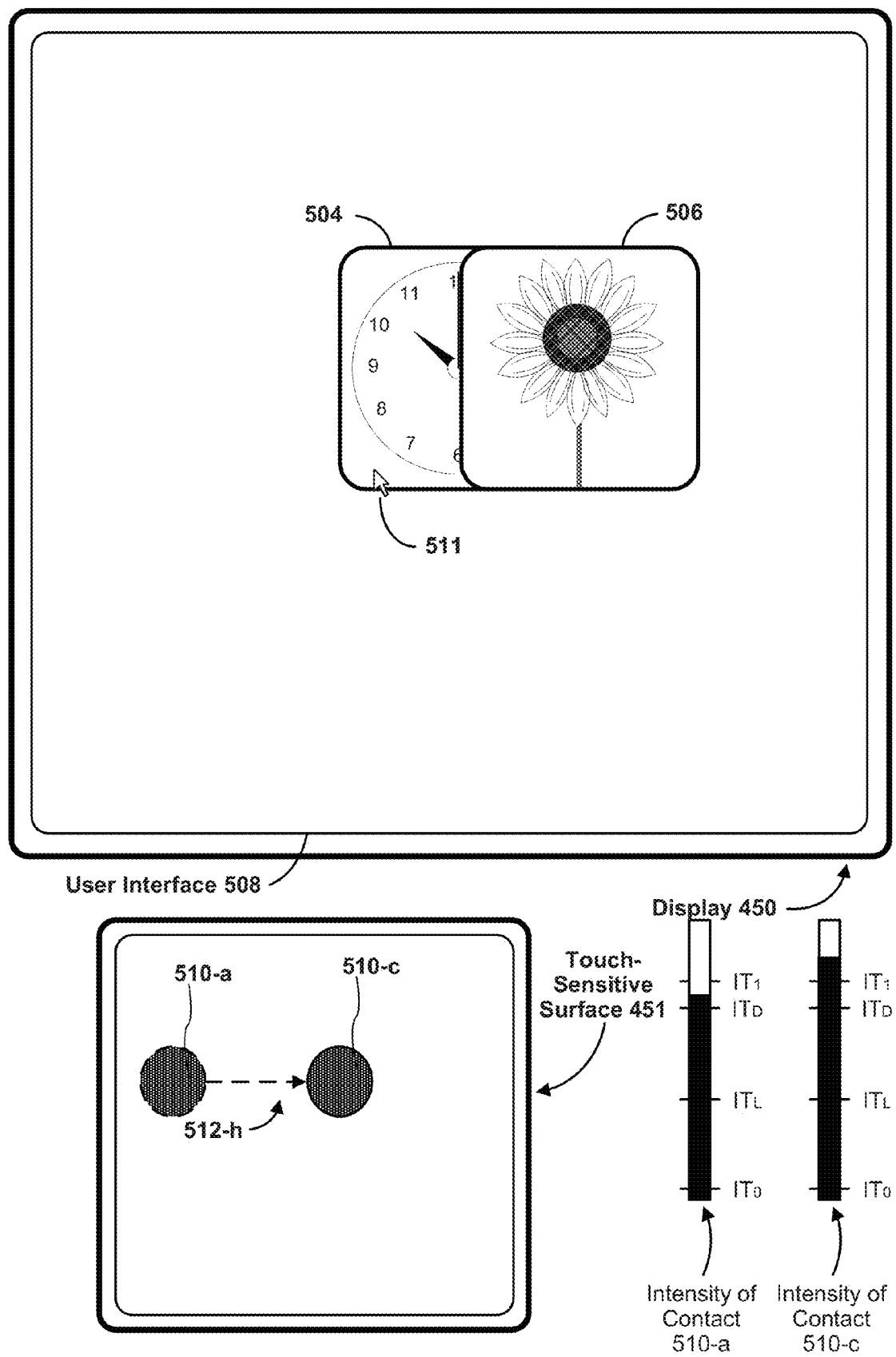

FIGS. 5A-5E illustrate that contact 510 and gesture 512 are detected on touch-sensitive surface 451 (e.g., movement 512-a of contact 510 from location 510-a in FIG. 5A to location 510-b in FIG. 5B; movement 512-b of contact 510 from location 510-b in FIG. 5B to location 510-c in FIG. 5C; movement 512-c of contact 510 from location 510-c in FIG. 5C to location 510-d in FIG. 5D; movement 512-d of contact 510 from location 510-d in FIG. 5D to location 510-e in FIG. 5E; movement 512-f of contact 510 from location 510-a in FIG. 5F in to location 510-c in FIG. 5F; movement 512-g of contact 510 from location 510-a in FIG. 5G in to location 510-c in FIG. 5G; and/or movement 512-h of contact 510 from location 510-a in FIG. 5H in to location 510-c in FIG. 5H). Contact 510 occurs at a position on touch-sensitive surface 451 corresponding to an area on display 450 occupied by first user interface object 504 (e.g., contact 510 corresponds to a focus selector on the display, such as cursor 511). Gesture 512 includes movement of contact 510 on touch-sensitive surface 451 that corresponds to movement of first user interface object 504 on display 450 (e.g., as illustrated in FIGS. 5A-5E). In some embodiments, contact 510 and gesture 512 are different from a gesture that activates first user interface object 504 (e.g., a tap gesture while a focus selector such as cursor 511 is over first user interface object 504). When activated, first user interface object 504 initiates a respective operation (e.g., opening an application or program). In some embodiments, contact 510 and gesture 512 are detected after the electronic device enters an arrangement mode that is activated, for example, by detection of a particular user input (e.g., a triple click, triple tap gesture, or a stationary contact that is sustained for more than a predetermined time period). In some embodiments, the electronic device is responsive to contact 510 and gesture 512 only in an arrangement mode.

FIG. 5B illustrates that continuation of gesture 512 corresponds to movement of first user interface object 504 into an area of display 450 immediately adjacent to a respective area of display 450 occupied by second user interface object 506, forming boundary 514.

As illustrated in FIGS. 5C-5F, gesture 512 includes movement of contact 510 on the touch-sensitive surface that corresponds to movement of first user interface object 504 into a respective area of the display that was occupied by second user interface object 506 immediately prior to detecting gesture 512. In response to detection of gesture 512, first user interface object 504 moves on display 450 in accordance with the movement of contact 510 on touch-sensitive surface 451. When first user interface object 504 moves into the respective area of display 450 that was occupied by second user interface object 506 just prior to detecting gesture 512, in accordance with a determination that gesture 512 meets object-collision criteria (including that contact 510 had a maximum intensity during gesture 512 above the first intensity threshold (e.g., "$IT_D$") prior to moving first user interface object 504 into the respective area of display 450), first user interface object 504 is displayed as colliding with second user interface object 506 at boundary 514 and the display properties of second user interface object 506 are adjusted in accordance with the movement of first user interface object 504 on display 450.

In some embodiments, the display properties of the second user interface object 506 are indirectly adjusted in accordance with the movement of the contact 510 on the touch-sensitive surface 451 after the collision. In particular, a focus selector (e.g., cursor 511) moves in accordance with the movement of the contact 510, the first user interface object 504 moves in accordance with the movement of the focus selector (e.g., cursor 511), and the display properties of the second user interface object 506 are adjusted in accordance with movement of the first user interface object 504. Thus, movement of the focus selector (governed by the movement of the contact 510) causes movement of the first user interface object 504, which, in turn, causes the display properties of the second user interface object 506 to be adjusted. The resulting effect presents the user of the device with the appearance that the first user interface object 504 and the second user interface object 506 are physically interacting in the user interface 508 in accordance with movements of the user's contact 510 on the touch-sensitive surface 451, thereby providing an intuitive and efficient user interface for manipulating the arrangement of user interface objects on the display.

FIG. 5C illustrates one embodiment, where adjusting the display properties of second user interface object 506 includes translating second user interface object 506 across the display in accordance with movement of first user interface object 504 (e.g., translating the object on the display 450). The resulting effect presents the user of the device with the appearance that the first user interface object 504 is pushing the second user interface object 506 across the display 450.

FIG. 5D illustrates that continuation of gesture 512 corresponds to movement of first user interface object 504 and second user interface object 506 across display 450, until second user interface object 506 is adjacent to a boundary 516 on display 450 (e.g., a boundary of the window, an edge of another window, or an edge of the display). In some embodiments, continuation of gesture 512 in the direction of boundary 516 does not correspond to additional movement of first user interface object 504 or second user interface object 506 (e.g., presenting the user of the device with the appearance that the first user interface object 504 and second user interface object 506 are jammed against the boundary 516).

In some embodiments, as illustrated in FIG. 5E, continuation of gesture 512 in the direction of boundary 516, when second user interface object 506 is adjacent to boundary 516, corresponds to: movement of first user interface object 504; movement of the edge of second user interface object 506 at boundary 514, in accordance with movement of first user interface object 504; and resizing of second user interface object 506 in accordance with movement of the edge of second user interface object 506 (e.g., presenting the user of the device with the appearance that the second user interface object 506 is being squished against the boundary 516).

In some embodiments, continuation of gesture 512 in the direction of boundary 516, when second user interface object 506 is adjacent to boundary 516, corresponds to resizing of first user interface object 504, in accordance with movement of the edge of first user interface object 504 opposite boundary 514 (e.g., presenting the user of the device with the appearance that the first user interface object 504 is being squished against the second user interface object 506) in addition to, or instead of resizing the second user interface object 506, as illustrated in FIG. 5E.

In some embodiments, continuation of gesture 512 in the direction of boundary 516, when second user interface object 506 is adjacent to boundary 516, corresponds to resizing both the first user interface object 504 and the second user interface object 506, in accordance with movement of the edge of first user interface object 504 opposite boundary 514 (e.g., presenting the user of the device with the appearance that the first user interface object 504 and second user interface object 506 are being squished against the boundary 516).

Accordingly, in some embodiments, when gesture 512 meets the object-collision criteria: movement of first user interface object 504 on display 450 includes, while an edge of first user interface object 504 is adjacent to a first edge of second user interface object 506 (at boundary 514), movement of first user interface object 504 in concert with second user interface object 506; and adjustment of the display properties of the second user interface object 506 includes: translation of second user interface object 506 across the display in accordance with movement of first user interface object 504 until a second edge of second user interface object 506 is adjacent to boundary 516 (e.g., a boundary of the window, an edge of another window, or an edge of display 516); and after a determination that the second edge of second user interface object 506 is adjacent to boundary 516, an edge of second user interface object 506 moves in accordance with movement of first user interface object 504, second user interface object 506 resizes in accordance with movement of the edge of second user interface object 506 (e.g., "squishing" the window against a boundary of the desktop), as illustrated in FIGS. 5A-5E.

FIG. 5F illustrates one embodiment, when in response to first user interface object 504 moving into the respective area of display 450, that was occupied by second user interface object 506 just prior to detecting gesture 512, adjusting the display properties of second user interface object 506 includes: movement of an edge of second user interface object 506 (e.g., at boundary 514) in accordance with movement of first user interface object 504; and resizing of second user interface object 506 in accordance with movement of the edge of second user interface object 506 (e.g., "squishing" the window so that the edge of the window that is remote from the first user interface object 504 remains stationary). In some embodiments, the resizing is performed so as to maintain a constant area of the second user interface object 506. In some embodiments, for a horizontal compression in response to horizontal movement of the contact during the gesture, as the width of the second user interface object 506 is decreased, the height of the second user interface object 506 is increased so as to maintain a constant area of the second user interface object 506. In the embodiment shown in FIG. 5F, in contrast to the embodiment shown in FIG. 5C, when the gesture meets the object collision criteria, the second user interface object 506 is resized rather than being translated (e.g., "pushed") in accordance with the movement of the first user interface object 504 that corresponds to movement of the contact from location 510-a to location 510-c in FIG. 5F.

In some embodiments, as illustrated in FIG. 5G, when first user interface object 504 moves into the respective area of display 450, that was occupied by second user interface object 506 just prior to detecting gesture 512, in accordance with a determination that contact 510 had a maximum intensity during gesture 512 below the first intensity threshold prior to moving first user interface object 504 into the respective area of the display 450, first user interface object 504 is displayed as moving over second user interface object 506 (e.g., because the gesture did not meet the object collision criteria). In some embodiments, the first user interface object 504 continues to be displayed over the second user interface object 506 even after the gesture 512 has ended (e.g., after detecting liftoff of the contact 510). In the embodiment shown in FIG. 5G, when the gesture does not meet the object collision criteria (e.g., unlike in FIG. 5C), the first user interface object 504 moves over the second user interface object 506 rather than translating (e.g., "pushing") the second user interface object 506 in accordance with the movement of the first user interface object 504 that corresponds to movement of the contact from location 510-a to location 510-c in FIG. 5G.

In some embodiments, as illustrated in FIG. 5H, when first user interface object 504 moves into the respective area of display 450, that was occupied by second user interface object 506 just prior to detecting gesture 512, in accordance with a determination that contact 510 had a maximum intensity during gesture 512 above the second intensity threshold (e.g., "IT$_1$") prior to moving first user interface object 504 into the respective area of the display 450 (e.g., prior to detecting movement of the contact 510 during the gesture 512 that moves the first user interface object 504 into the respective area of the display 450), second user interface object 506 is displayed over first user interface object 504 (e.g., moving the first user interface object 504 underneath the second user interface object 506). In some embodiments, the first user interface object 504 continues to be displayed underneath the second user interface object 506 even after the gesture 512 has ended (e.g., after detecting liftoff of the contact 510). In the embodiment shown in FIG. 5H, when the gesture does not meet the object collision criteria (e.g., unlike in FIG. 5C), the first user interface object 504 moves under the second user interface object 506 rather than translating (e.g., "pushing") the second user interface object 506 in accordance with the movement of the first user interface object 504 that corresponds to movement of the contact from location 510-*a* to location 510-*c* in FIG. 5H. In the embodiment shown in FIG. 5H, the first user interface object 504 moves under the second user interface object 506 because the intensity of contact 510 is above the second intensity threshold, whereas in the embodiment shown in FIG. 5G the first user interface object 504 moves over the second user interface object 506 because the intensity of contact 510 is below the first intensity threshold.

In some embodiments, object-collision criteria are met when a contact 510 has a maximum intensity between the first intensity threshold and the second intensity threshold prior to moving a first user interface object 504 into the respective area of the display (e.g., prior to detecting movement of the contact 510 during the gesture 512 that moves the first user interface object 504 into the respective area of the display that was occupied by second user interface object 506 just prior to detecting gesture 512). Thus, in some embodiments, the first user interface object 504 is either "on top of," "colliding with," or "below" the second user interface object 506, depending on the intensity of the contact 510.

In some embodiments, object-collision criteria are met when the contact 510 during the gesture 512 has a maximum intensity above the first intensity threshold prior to moving the first user interface object 504 into the respective area of the display (e.g., prior to detecting movement of the contact 510 during the gesture 512 that moves the first user interface object 504 into the respective area of the display that was occupied by second user interface object 506 just prior to detecting gesture 512). Thus, in some embodiments, the first user interface object 504 is either "on top of," or "colliding with" the second user interface object 506, but not "below" the second user interface object 506.

Figure 5I:
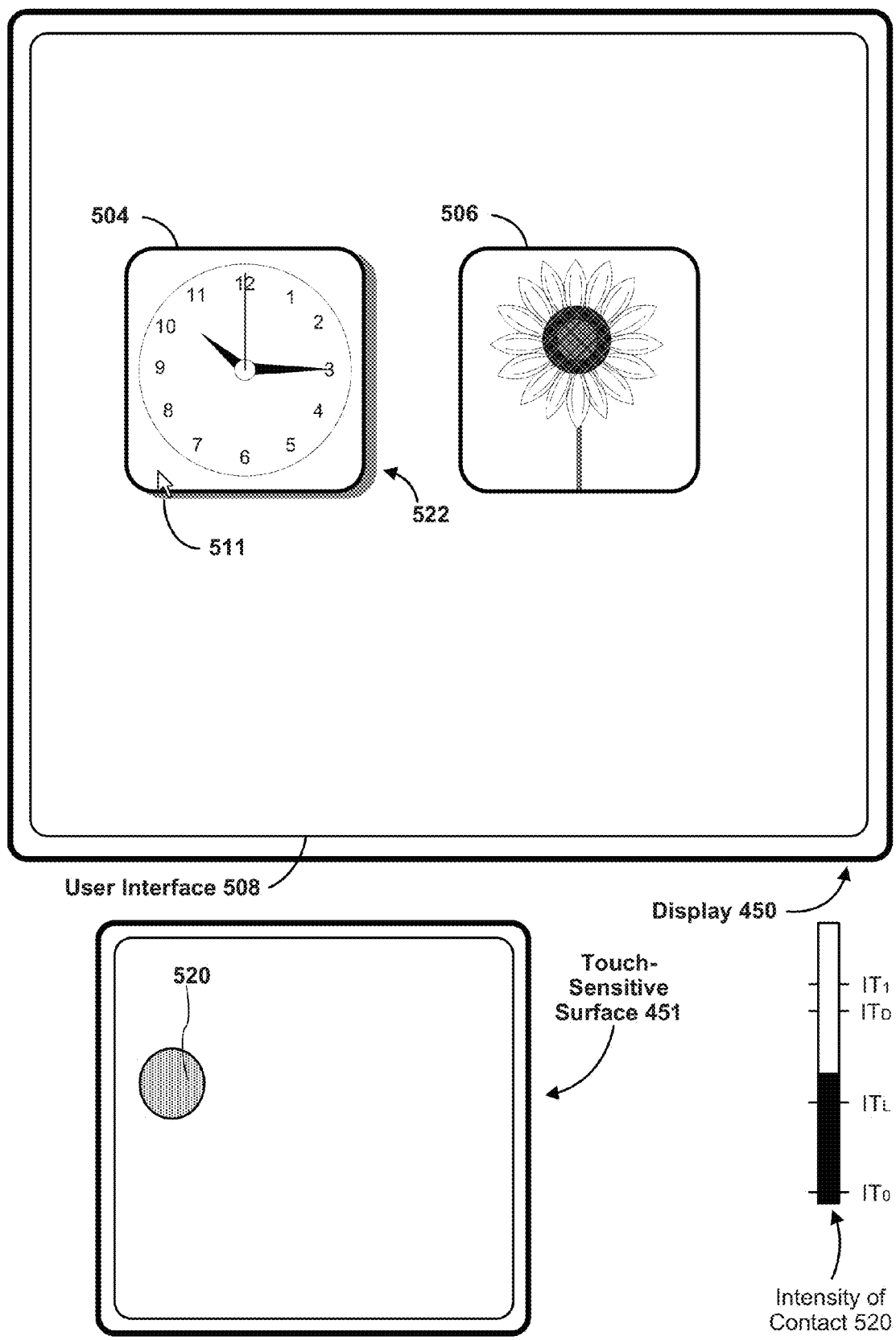

FIG. 5I illustrates an embodiment, where prior to detection of a gesture, a visual indication of relative z-order of first user interface object 504 and second user interface object 506 is displayed, e.g., drop shadow 522 indicates that the first user interface object 504 is "over"/"above" the second user interface object 506. In some embodiments, drop shadow 522 is displayed while a contact 520 is detected that has an intensity below the first intensity threshold and while a focus selector (e.g., cursor 511) is over the first user interface object 504. In some embodiments, operations analogous to the operations described below with respect to contact 520 are performed with respect to contact 510 in FIGS. 5A-5H or contact 530 in FIGS. 5L-5O.

Figure 5J:
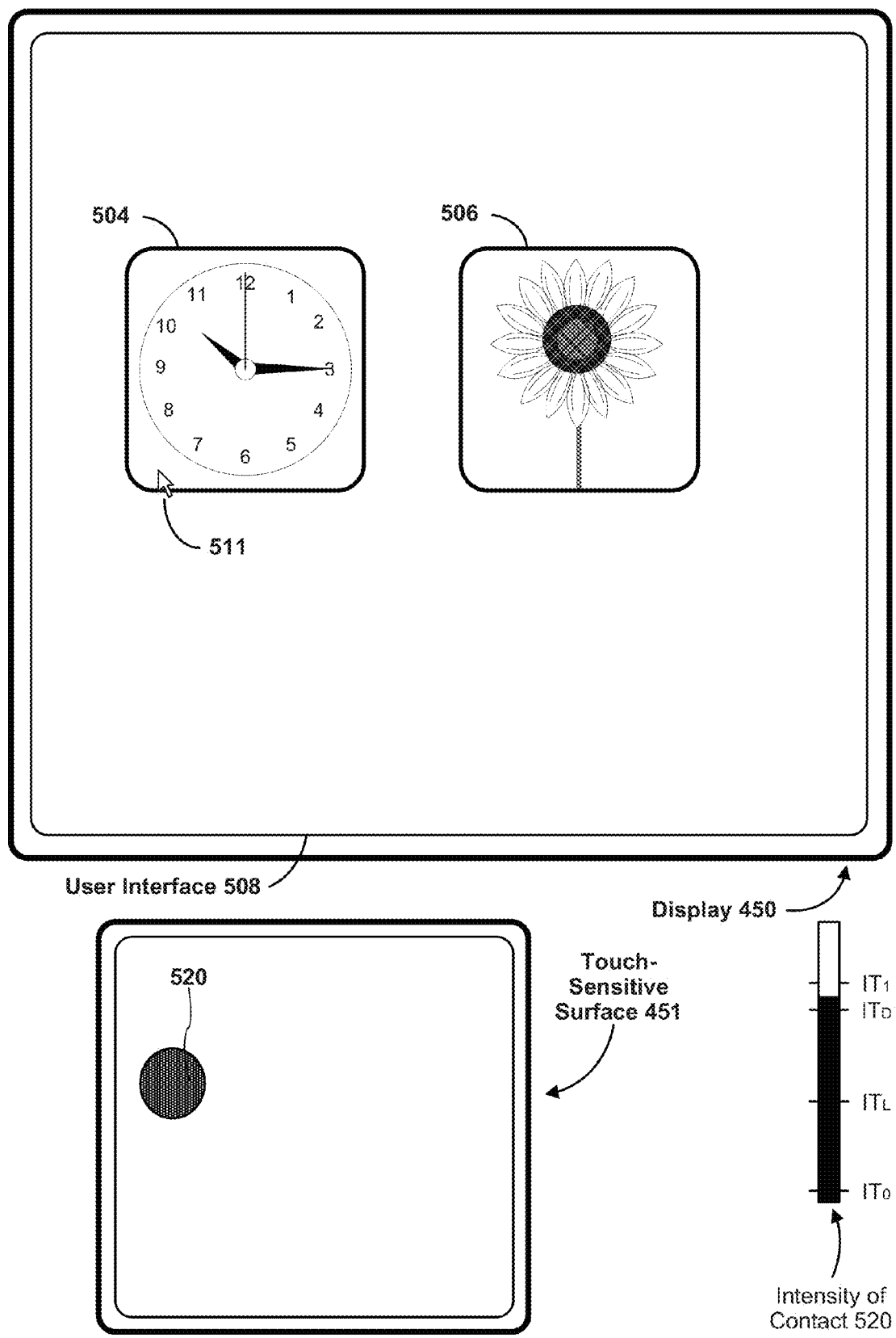

As illustrated in FIG. 5J, when a gesture is detected, in accordance with a determination that contact 520 has exceeded the first intensity threshold, visual indication 522 is no longer displayed, because the first user interface object 504 has been "pushed down" so that it is on the same z-level as the second user interface object 506.

Figure 5K:
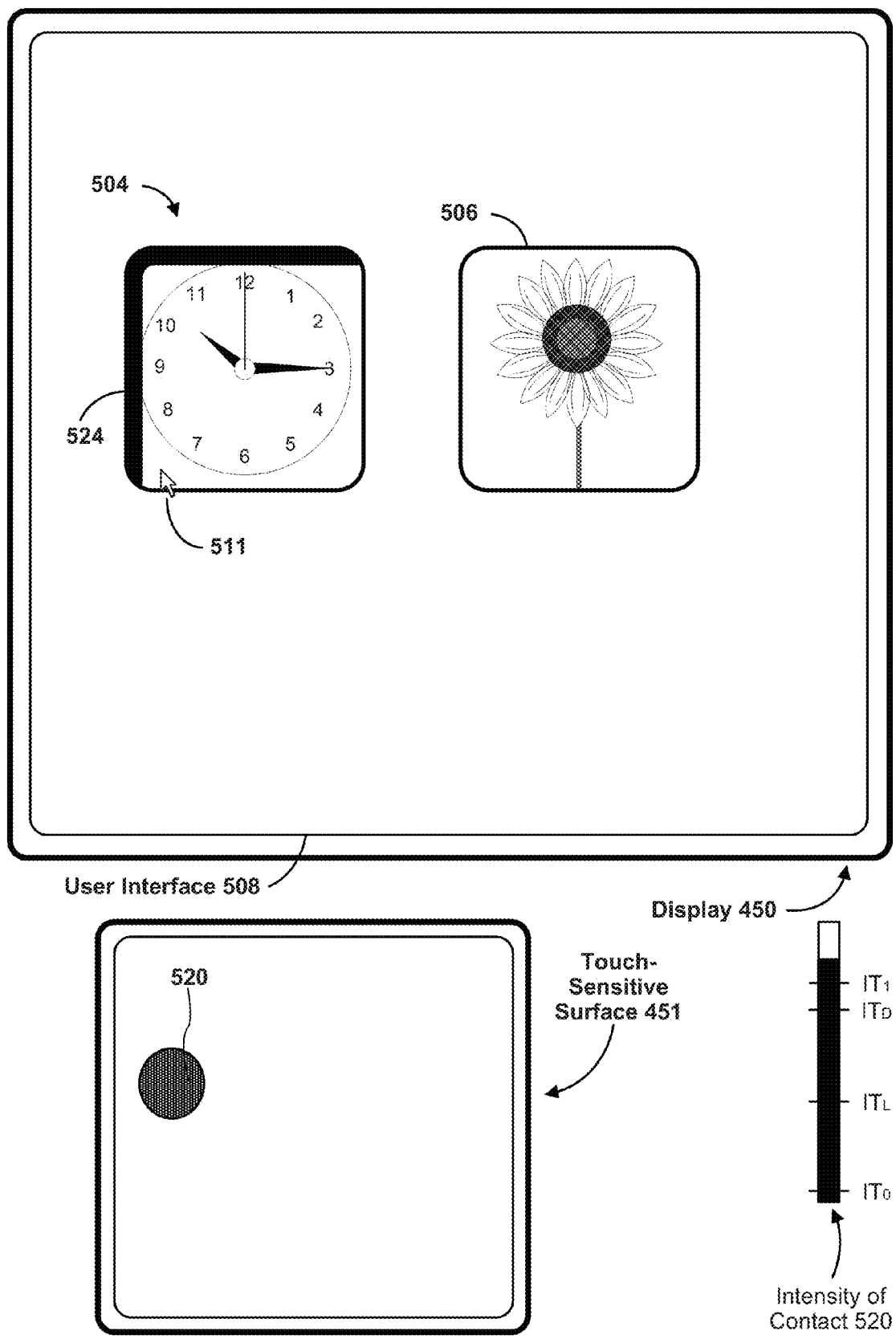

FIG. 5K illustrates an embodiment, when a gesture is detected, in accordance with a determination that contact 520 has exceeded the second intensity threshold, a visual indication of relative z-order of first user interface object 504 and second user interface object 506 is displayed, e.g., drop shadow 524 indicates that the first user interface object 504 is "under"/"below" the second user interface object 506. Alternatively, the second user interface object 506 is displayed with a drop shadow similar to drop shadow 522 shown in FIG. 5I to indicate that the second user interface object 506 is above the first user interface object 504 in the z-order.

In some embodiments, the first user interface object 504 continues to be displayed in a relative z-order below the second user interface object 506 even after detecting liftoff of contact 520 in FIG. 5K. In some embodiments, the first user interface object 504 is displayed at the same z-order level as the second user interface object 506 after detecting liftoff of contact 520 in FIG. 5K (e.g., drop shadow 524 is no longer displayed, returning the display of first user interface object 504 to the state illustrated in FIG. 5J). In some embodiments, the first user interface object 504 is displayed in a relative z-order above the second user interface object 506 after detecting liftoff of contact 520 in FIG. 5K (e.g., presenting the user of the device with the appearance/illusion that the first user interface object 504 has popped back out of the plane of the display 450, returning to a relative z-order state as illustrated in FIG. 5I after liftoff of the contact 520). In some embodiments, operations analogous to the operations illustrated in FIGS. 5I-5K are performed for the first user interface object 504 and the second user interface object 506 in the embodiments described with reference to FIGS. 5A-5H if contact 510 increases in intensity over the first intensity threshold while the first user interface object 504 is over the second user interface object 506 (e.g., an increase in intensity of contact 510 above the first intensity threshold in FIG. 5G).

Figure 5L:
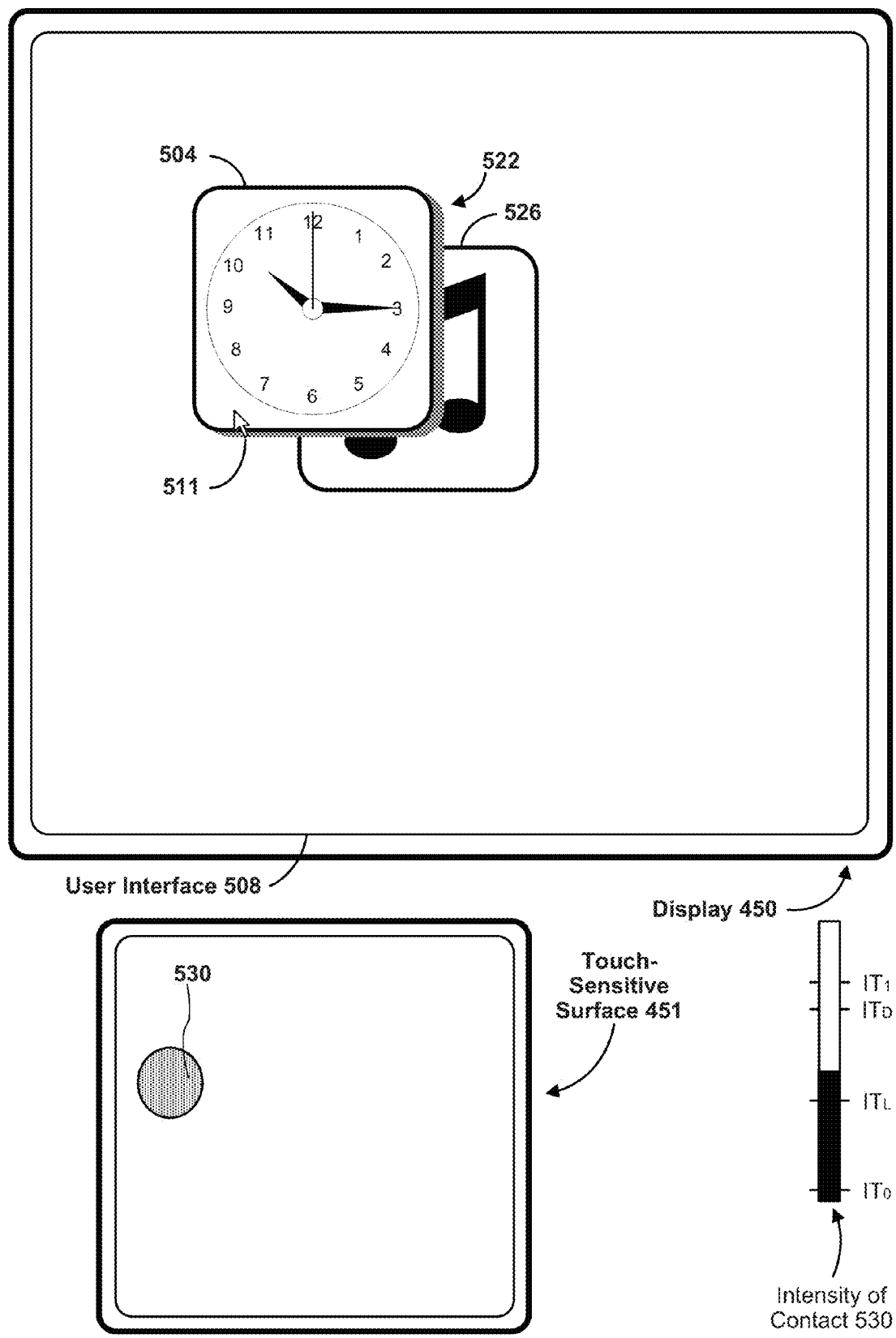

FIG. 5L illustrates an embodiment, where first user interface object 504 is displayed in a relative z-order above (e.g., displayed over) third user interface object 526 (e.g., with or without displaying drop shadow 522). In some embodiments, the third user interface object 526 is second user interface object 506.

Figure 5M:
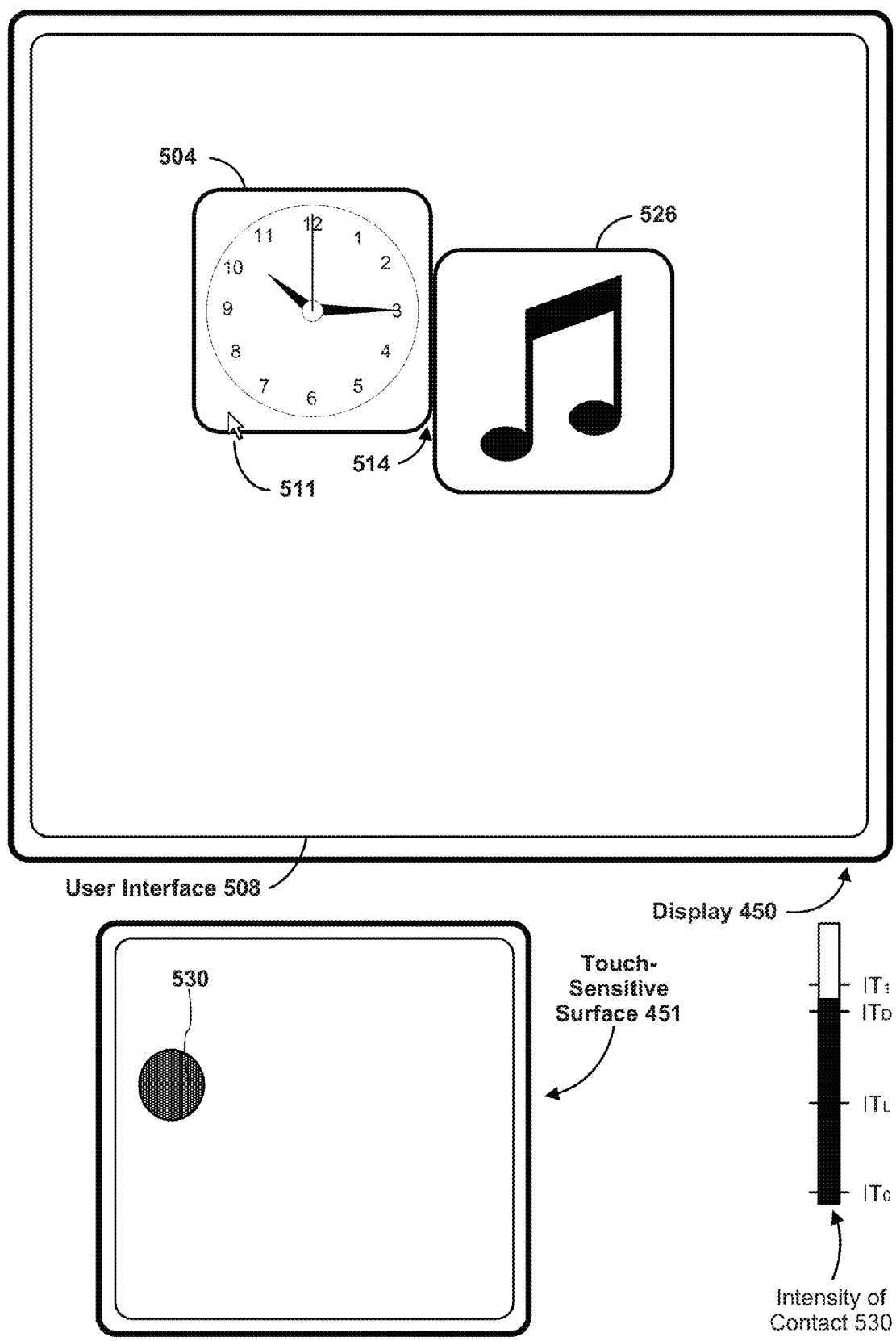
Figure 5N:
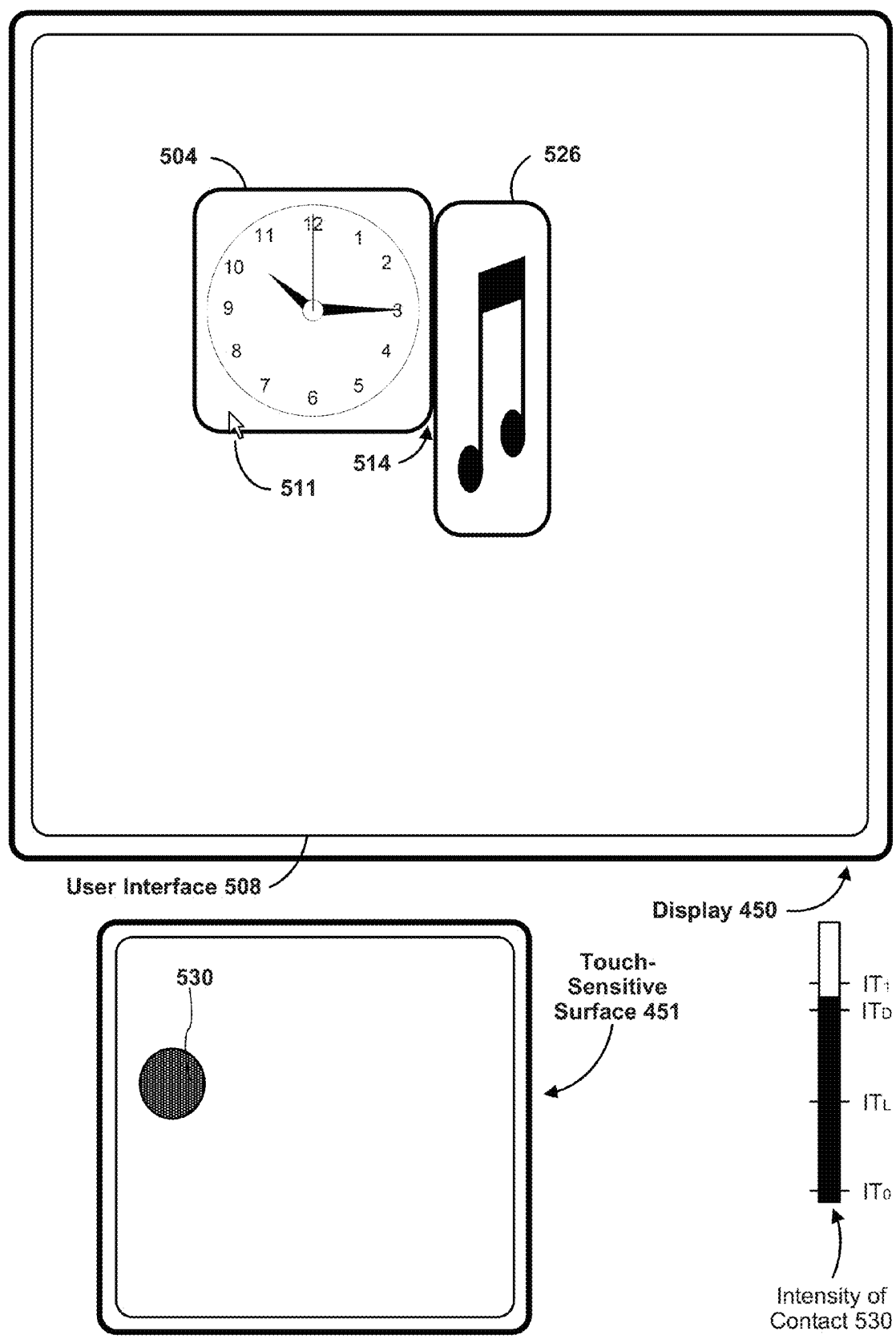
Figure 5O:
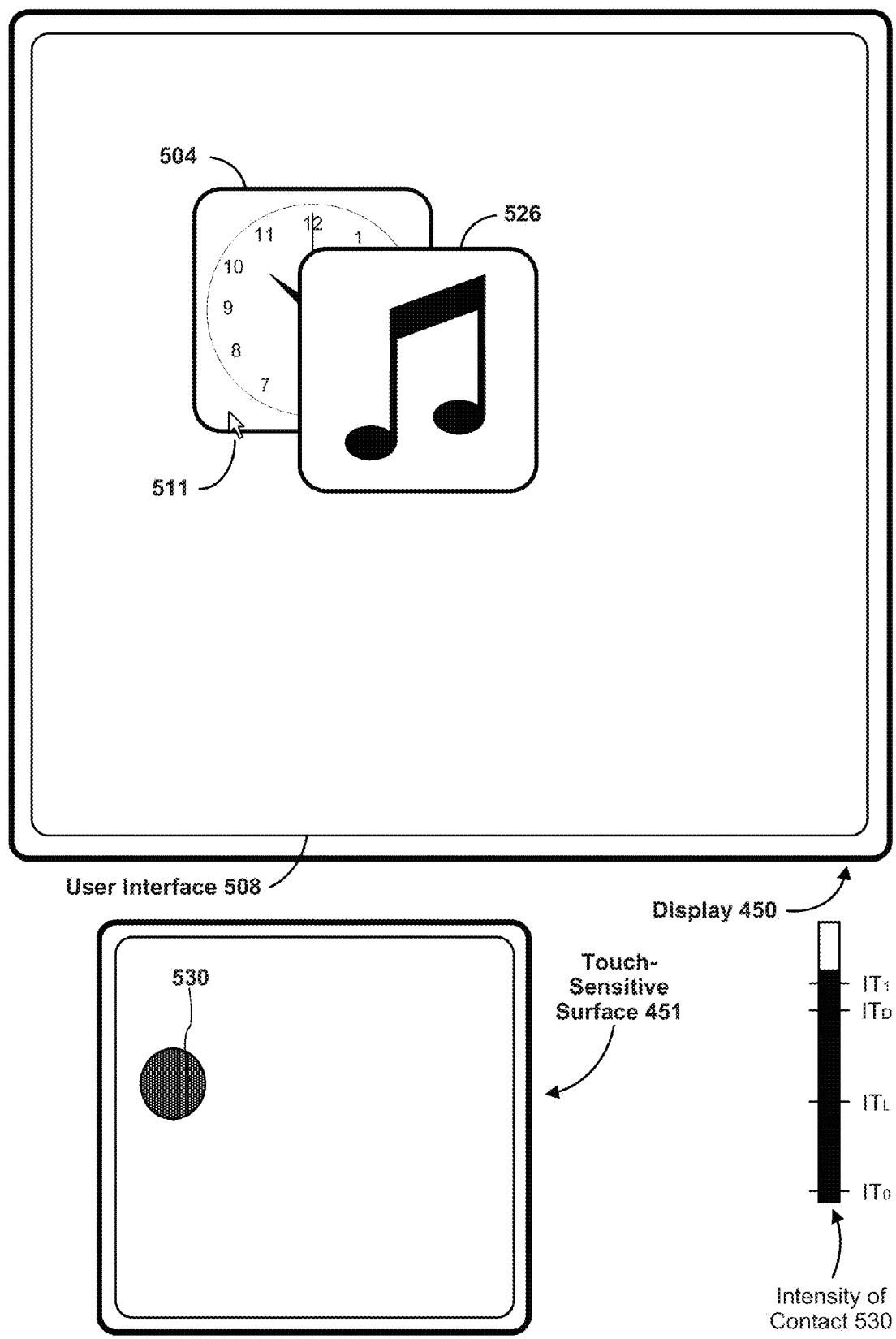
Figure 6A:
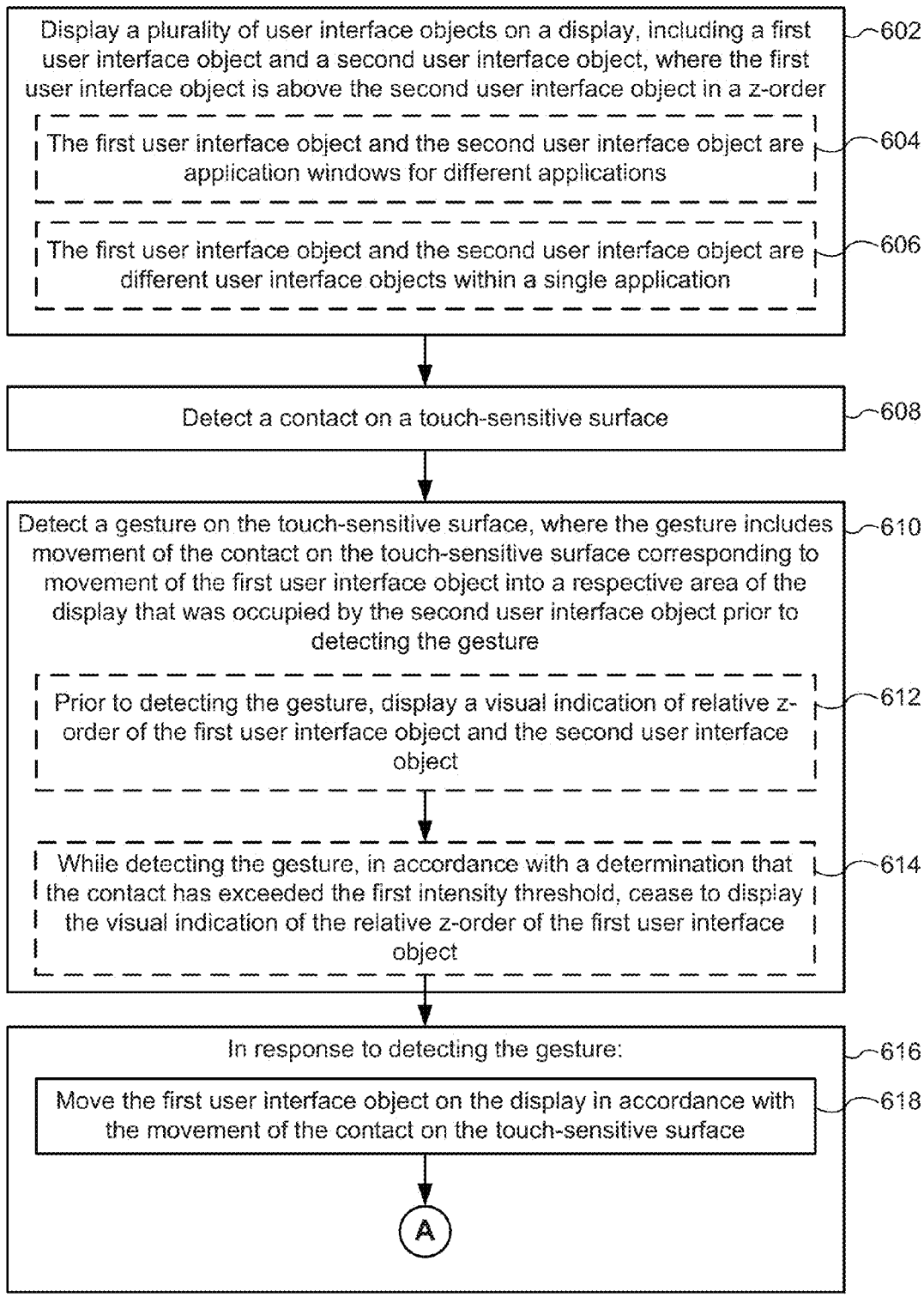
FIGS. 6A-6E are flow diagrams illustrating a method of arranging user interface objects in accordance with some embodiments.
Figure 6B:
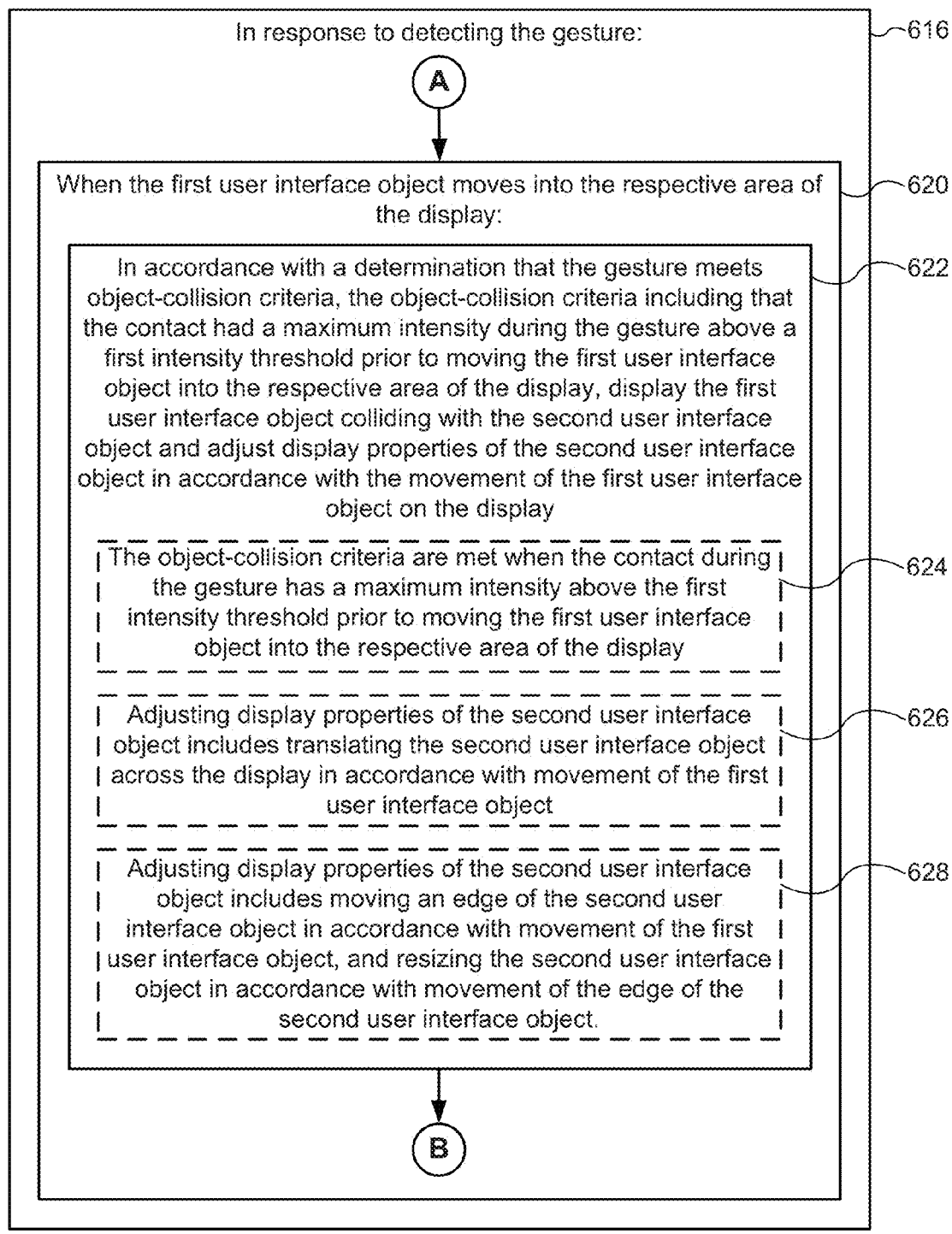
Figure 6C:
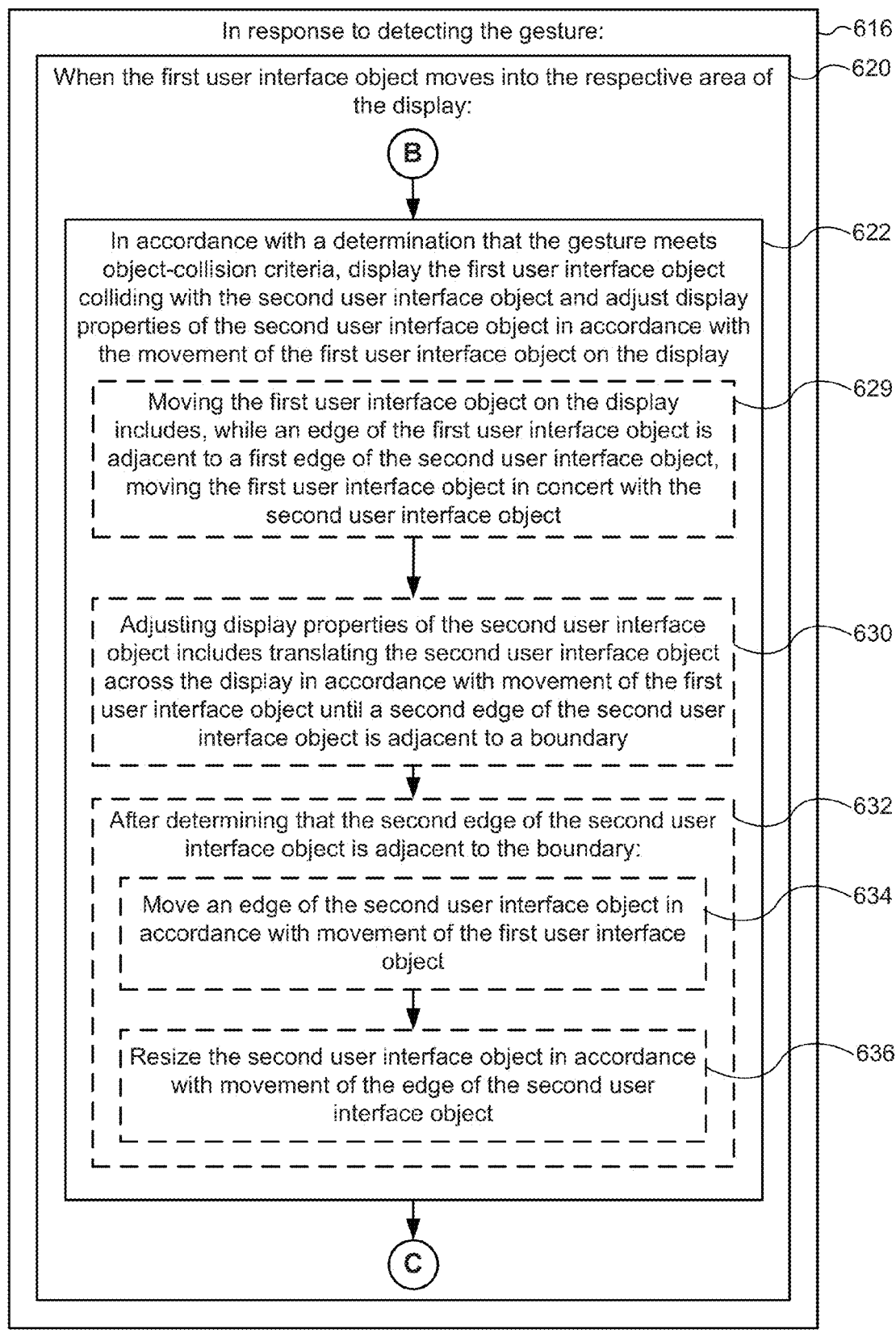
Figure 6D:
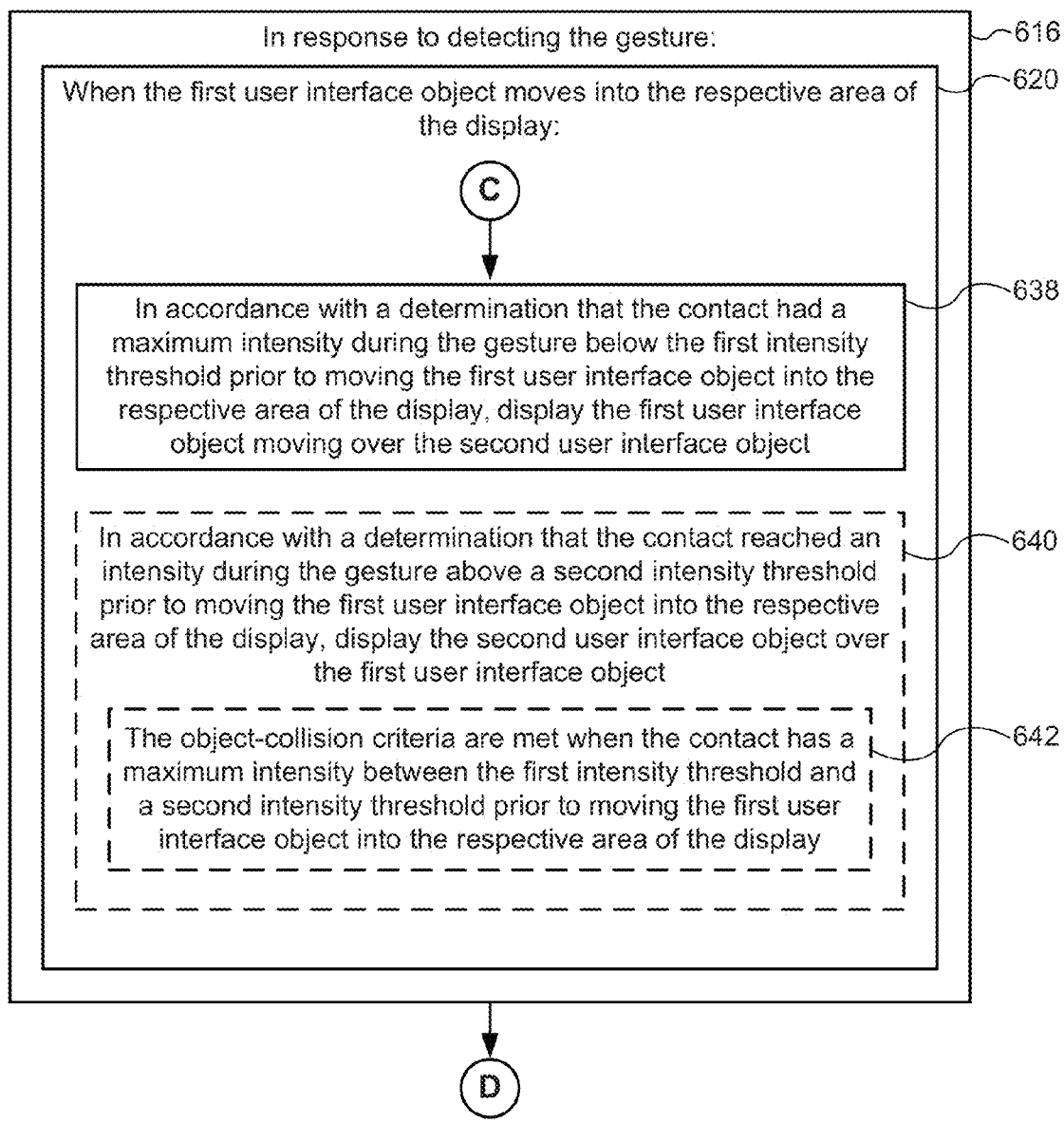
Figure 6E:
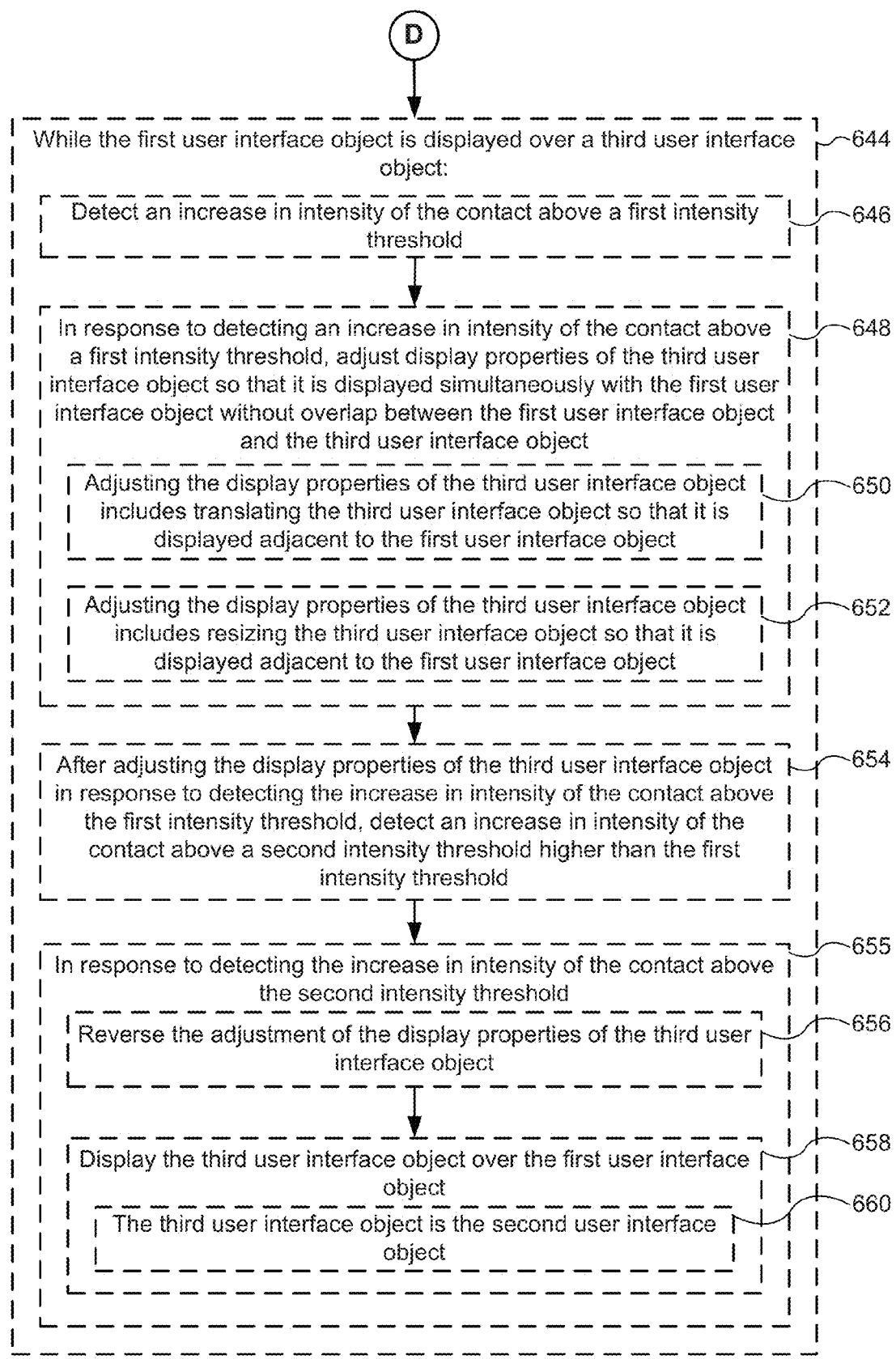

As illustrated in FIGS. 5M and 5N, while first user interface object 504 is displayed over third user interface object 526, a contact 530 is detected while a focus selector (e.g., cursor 511) is over the first user interface object 504. In accordance with a determination that contact 530 has a maximum intensity above the first intensity threshold, the display properties of third user interface object 526 are adjusted so that it is displayed simultaneously with first user interface object 504 without overlap between first user interface object 504 and third user interface object 526 (e.g., first user interface object 504 and third user interface object 526 are displayed at the same z-order level). FIG. 5M illustrates an embodiment, where in response to detecting a contact 530 with an intensity above a first threshold, adjusting the display properties of the third user interface object 526 includes translating the third user interface object 526 so that it is displayed adjacent to the first user interface object 504 (e.g., forming boundary 514). FIG. 5N illustrates an embodiment, where in response to detecting a contact 530 with an intensity above a first threshold, adjusting the display properties of the third user interface object 526 includes resizing the third user interface object 526 so that it is displayed adjacent to the first user interface object 504 (e.g., forming boundary 514).

FIG. 5O illustrates an embodiment, where after the display properties of the third user interface object 526 are adjusted in response to detecting an increase in intensity of contact 530 above the first intensity threshold, an increase in intensity of the contact 530 above the second intensity threshold that is higher than the first intensity threshold is detected. In response to detecting the increase in intensity of contact 530 above the second intensity threshold: the adjustment of the display properties of the third user interface object 526 are reversed (e.g., reversal of the translation and/or resizing operations that were performed on the third user interface object 526 in response to detecting the increase in intensity of the contact 530 over the first intensity threshold); and the third user interface object 526 is displayed over the first user interface object 504. For example, the first user interface object 504 is moved underneath the third user interface object in a relative z-order. In some embodiments, when the first user interface object 504 is over the third user interface object 526, a press input (e.g., by a finger contact 530) with an intensity above the collision threshold causes the third user interface object 526 to move out from under the first user interface object 504 (e.g., by translating horizontally and/or vertically or by resizing horizontally and/or vertically). Additionally, a subsequent increase in intensity of the press input above a higher intensity threshold (e.g., a second threshold) causes the first user interface object 504 to be moved underneath the third user interface object 526. The effect of these operations gives the appearance that the first user interface object 504 pushed the third user interface object 526 out of the way when the first user interface object 504 was pushed down to the same level as the third user interface object 526 and then that the third user interface object 526 subsequently sprang back into place, above the first user interface object 504, when the first user interface object 504 is pushed below the third user interface object 526.

FIGS. 6A-6E are flow diagrams illustrating a method 600 for arranging user interface objects relative to one another in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations are, optionally, changed.

As described below, the method 600 provides an intuitive way to arrange user interface objects in their (x, y) positions on a display, as well as in their z-order. The method reduces the cognitive burden on a user when arranging user interface objects relative to one another, thereby creating a more efficient human-machine interface. For battery-operated electronic devices, enabling a user to arrange user interface objects faster and more efficiently conserves power and increases the time between battery charges.

The device displays (602) a plurality of user interface objects on a display 450, including a first user interface object and a second user interface object, where the first user interface object is above the second user interface object in a z-order (e.g., first user interface object 504 and second user interface object 506 on display 450, FIG. 5A).

In some embodiments, the first user interface object and the second user interface object are application windows for different applications (604). In other embodiments, the first user interface object and the second user interface object are different user interface objects within a single application (606).

While displaying the user interface objects, the device detects (608) a contact (e.g., contact 510 in FIG. 5A) on a touch-sensitive surface (e.g., touch-sensitive surface 451, FIG. 5A). The device then detects (610) a gesture (e.g., gesture 512 illustrated in FIGS. 5A-5E) on the touch-sensitive surface, where the gesture includes movement of the contact on the touch-sensitive surface that corresponds to movement of the first user interface object into a respective area of the display 450 that was occupied by the second user interface object prior to detecting the gesture (e.g., the area occupied by user interface object 506 in FIGS. 5A-5B).

In some embodiments, prior to detecting the gesture, the device displays (612) a visual indication of relative z-order of the first user interface object and the second user interface object (e.g., drop shadow 522, FIGS. 5I and 5L, which indicates the first user interface object 504 is "above" the second user interface object 506 in the z-order; or drop shadow 524, FIG. 5K, which indicates the first user interface object 504 is "below" the second user interface object 506 in the z-order). In some embodiments, while displaying the visual indication of relative z-order of the first user interface object and second user interface object, in accordance with a determination that the contact has exceeded the first intensity threshold (e.g., "$IT_D$"), the device ceases to display (614) the visual indication of the relative z-order of the first user interface object and the second user interface object (e.g., ceasing to display the drop shadow 522 shown in FIG. 5I in FIG. 5J, when the contact 520 has exceeded the first intensity threshold).

In response to detecting the gesture (616): the device moves (618) the first user interface object on the display in accordance with the movement of the contact on the touch-sensitive surface. When the first user interface object moves into the respective area of the display (620): in accordance with a determination that the gesture meets object-collision criteria, the object-collision criteria including that the contact had a maximum intensity during the gesture above the first intensity threshold (e.g., "$IT_D$") prior to moving the first user interface object into the respective area of the display, the device displays (622) the first user interface object colliding with the second user interface object and adjusts the display properties of the second user interface object in accordance with the movement of the first user interface object on the display 450 (e.g., as illustrated in FIGS. 5A-5D with first object 504, second object 506, contact 510, and gesture 512).

In some embodiments, the object-collision criteria are met (624) when the contact during the gesture has a maximum intensity above the first intensity threshold prior to moving the first user interface object into the respective area of the display.

In some embodiments, where the first user interface object collides with the second user interface object, the device adjusts (626) display properties of the second user interface object by at least translating the second user interface object across the display in accordance with movement of the first user interface object. For example, FIG. 5B illustrates first user interface object 504 colliding with second user interface object 506 at boundary 514. Continuation of gesture 512 (e.g., as shown in FIGS. 5C and 5D) translates the second user interface object 506 across the display 450 in accordance with the movement of first user interface object 504.

In some embodiments, where the first user interface object collides with the second user interface object, the device adjusts (628) display properties of the second user interface object by at least moving an edge of the second user interface object in accordance with movement of the first user interface object, and resizing the second user interface object in accordance with movement of the edge of the second user interface object 506. For example, FIG. 5B illustrates first user interface object 504 colliding with second user interface object 506 at boundary 514. Continuation of gesture 512 as shown in FIG. 5F corresponds to movement of the lagging edge (e.g., the edge present at boundary 514 in FIG. 5F) of the second user interface object 506, and further corresponds to resizing of the second user interface object 506 (e.g., by "stretching" the second user interface object 506 in the y-direction and "shrinking" the second user interface object 506 in the x-direction, as shown in FIG. 5F). Similarly, FIG. 5B illustrates first user interface object 504 colliding with second user interface object 506 at boundary 514. Continuation of gesture 512 as shown in FIGS. 5C-5E corresponds to movement of first user interface object 504 and second user interface object 506 across the display 450 and subsequent resizing of the second user interface object 506 in accordance with movement of the edge of the second user interface object 506 when the second user interface object 506 is pushed against an edge of the display 450.

In some embodiments, moving the first user interface object on the display includes, while an edge of the first user interface object is adjacent to a first edge of the second user interface object, moving (629) the first user interface object in concert with the second user interface object, as illustrated in FIGS. 5B-5D. In some embodiments, where the first user interface object collides with the second user interface object, the device adjusts display properties of the second user interface object by translating (630) the second user interface object across the display 450 in accordance with movement of the first user interface object until a second edge of the second user interface is adjacent to a boundary; and, after determining (632) that the second edge of the second user interface object is adjacent to the boundary, moves (634) an edge of the second user interface object in accordance with movement of the first user interface object and resizes (636) the second user interface object in accordance with movement of the edge of the second user interface object. For example, FIG. 5B illustrates first user interface object 504 colliding with second user interface object 506 at boundary 514. Continuation of gesture 512 (e.g., as shown in FIGS. 5C and 5D) causes movement of first user interface object 504 and second user interface object 506 across the display 450 until the second user interface object 506 is adjacent to a boundary (e.g., boundary 516, as shown in FIG. 5D). Further continuation of gesture 512 (e.g., as shown in FIG. 5E) causes movement of the lagging edge (e.g., the left edge of the second user interface object 506 that is present at boundary 514 in FIGS. 5D-5E) of the second user interface object 506, and further causes resizing of the second user interface object 506 (e.g., by "stretching" the second user interface object 506 in the y-direction and "shrinking" the second user interface object 506 in the x-direction, as shown by the change in the second user interface object 506 between FIG. 5D and FIG. 5E).

In some embodiments, when the first user interface object moves into the respective area of the display, in accordance with a determination that the contact had a maximum intensity during the gesture below the first intensity threshold prior to moving the first user interface object into the respective area of the display, the device displays (638) the first user interface object as moving over the second user interface object. For example, in response to a determination that contact 510 (FIG. 5G) had a maximum intensity during the gesture below the first intensity threshold, the device displays first user interface object 504 as moving over second user interface object 506 (e.g., as illustrated in FIG. 5G).

In some embodiments, when the first user interface object moves into the respective area of the display, in accordance with a determination that the contact had a maximum intensity during the gesture above the second intensity threshold (e.g., "IT$_1$") prior to moving the first user interface object into the respective area of the display, the device displays (640) the second user interface object over the first user interface object. For example, in response to a determination that contact 510 (FIG. 5H) had a maximum intensity during the gesture above the second intensity threshold, the device displays first user interface object 504 as sliding under second user interface object 506 (e.g., as illustrated in FIG. 5H). In some embodiments, The object-collision criteria are met (642) when the contact has a maximum intensity between the first intensity threshold and the second intensity threshold prior to moving the first user interface object 504 into the respective area of the display 450.

In some embodiments, while the device displays (644) the first user interface object over a third user interface object (e.g., as illustrated in FIG. 5L), the device detects (646) an increase in intensity of the contact above the first intensity threshold. In response to detecting the increase in intensity of the contact above the first intensity threshold, the device adjusts (648) the display properties of the third user interface object so that it is displayed simultaneously with the first user interface object without overlap between the first user interface object and the third user interface object (e.g., as illustrated by first user interface object 504, third user interface object 526, and contact 530 in FIGS. 5L, 5M and 5N). In some embodiments, the third user interface object 526 is the second user interface object 506, as described above.

In some embodiments, while the device displays the first user interface object over the third user interface object, in response to detecting an increase in intensity of the contact above the first intensity threshold, the device adjusts (650) the display properties of the third user interface object by at least translating the third user interface object so that it is displayed adjacent to the first user interface object. For example, in response to detecting contact 530 (FIG. 5M) having an intensity above a first threshold, the device adjusts the display properties of third user interface object 526 (displayed under first user interface object 504 in FIG. 5L) by translating the third user interface object 526 out from under user interface object 504, and displays the first user interface object 504 and third user interface object 526 at the same z-order level, as illustrated in FIG. 5M. In some embodiments, operations analogous to the operations illustrated in FIGS. 5L-5M are performed for the first user interface object 504 and the second user interface object 506 if contact 510 increases in intensity over the first intensity threshold while the first user interface object 504 is over the second user interface object 506 (e.g., an increase in intensity of contact 510 above the first intensity threshold in FIG. 5G).

In some embodiments, while the device displays the first user interface object over the third user interface object, in response to detecting an increase in intensity of the contact, above the first intensity threshold, the device adjusts (652) the display properties of the third user interface object by at least resizing the third user interface object so that it is displayed adjacent to the first user interface object. For example, in response to detecting contact 530 (FIG. 5N) having an intensity above the first threshold, the device adjusts the display properties of third user interface object 526 (displayed under first user interface object 504 in FIG. 5L) by resizing the third user interface object 526 (e.g., by stretching the third user interface object 526 in the y-direction and shrinking the third user interface object 526 in the x-direction, as illustrated in FIG. 5N), and displays the first user interface object 504 and third user interface object 526 at the same z-order level, as illustrated in FIG. 5N. In some embodiments, an operations analogous to the operations illustrated in FIGS. 5L and 5N are performed for the first user interface object 504 and the second user interface object 506 if contact 510 increases in intensity over the first intensity threshold while the first user interface object 504 is over the second user interface object 506 (e.g., an increase in intensity of contact 510 above the first intensity threshold in FIG. 5G).

In some embodiments, after adjusting the display properties of the third user interface object in response to detecting the increase in intensity of the contact above the first intensity threshold, the device detects (654) a contact or increase in intensity of a contact, above the second intensity threshold, and adjusts the display properties of the third user interface object. In some embodiments, where the device displays the first user interface object adjacent to the third user interface object (e.g., as in FIG. 5M or 5N), in response (655) to detecting an increase in intensity of the contact above the second intensity threshold, the device reverses (656) the adjustment of the display properties of the third user interface object and displays (658) the third user interface object over the first user interface object 504. For example, when a first user interface object 504 is displayed above a third user interface object 526 (e.g., as illustrated in FIG. 5L), the device detects an increase in intensity of the contact 530 (FIG. 5M or 5N), above the first intensity threshold and adjusts the display properties of the third user interface object 526 so that it is displayed simultaneously with the first user interface object 504, without overlap between the first user interface object 504 and the third user interface object 526, for example by "sliding" the third user interface object 526 out of the way of the first user interface object 504 (e.g., as illustrated in FIG. 5M), or by "squishing" the third user interface object 526 to make room for the first user interface object 504 (e.g., as illustrated in FIG. 5N). When the device detects a further increase of the intensity of contact above a second threshold (e.g., contact 530 in FIG. 5O), the x- and y-axis display properties of third user interface object 526 (e.g., the (x, y) position of object 526 on the display) revert back to those prior to the initial detection of contact 530 (e.g., as illustrated in FIG. 5L), and the device displays the third user interface object 526 above the first user interface object 504 in the z-order (e.g., as illustrated in FIG. 5O). In some embodiments, the third user interface object 526 is the second user interface object 506 (660), as described above. In some embodiments, operations analogous to the operations illustrated in FIGS. 5L-5O are performed for the first user interface object 504 and the second user interface object 506 if contact 510 increases in intensity over the first intensity threshold while the first user interface object 504 is over the second user interface object 506 (e.g., an increase in intensity of contact 510 above the second intensity threshold in FIG. 5G).

It should be understood that the particular order in which the operations in FIGS. 6A-6E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 600 described above with respect to FIGS. 6A-6E. For example, the contacts, gestures, user interface objects, intensity thresholds, and boundaries described above with reference to method 600 optionally have one or more of the characteristics of the contacts, gestures, user interface objects, intensity thresholds, and boundaries described herein with reference to other methods described herein (e.g., those listed in the fifth paragraph of the Description of Embodiments). For brevity, these details are not repeated here.

Figure 7:
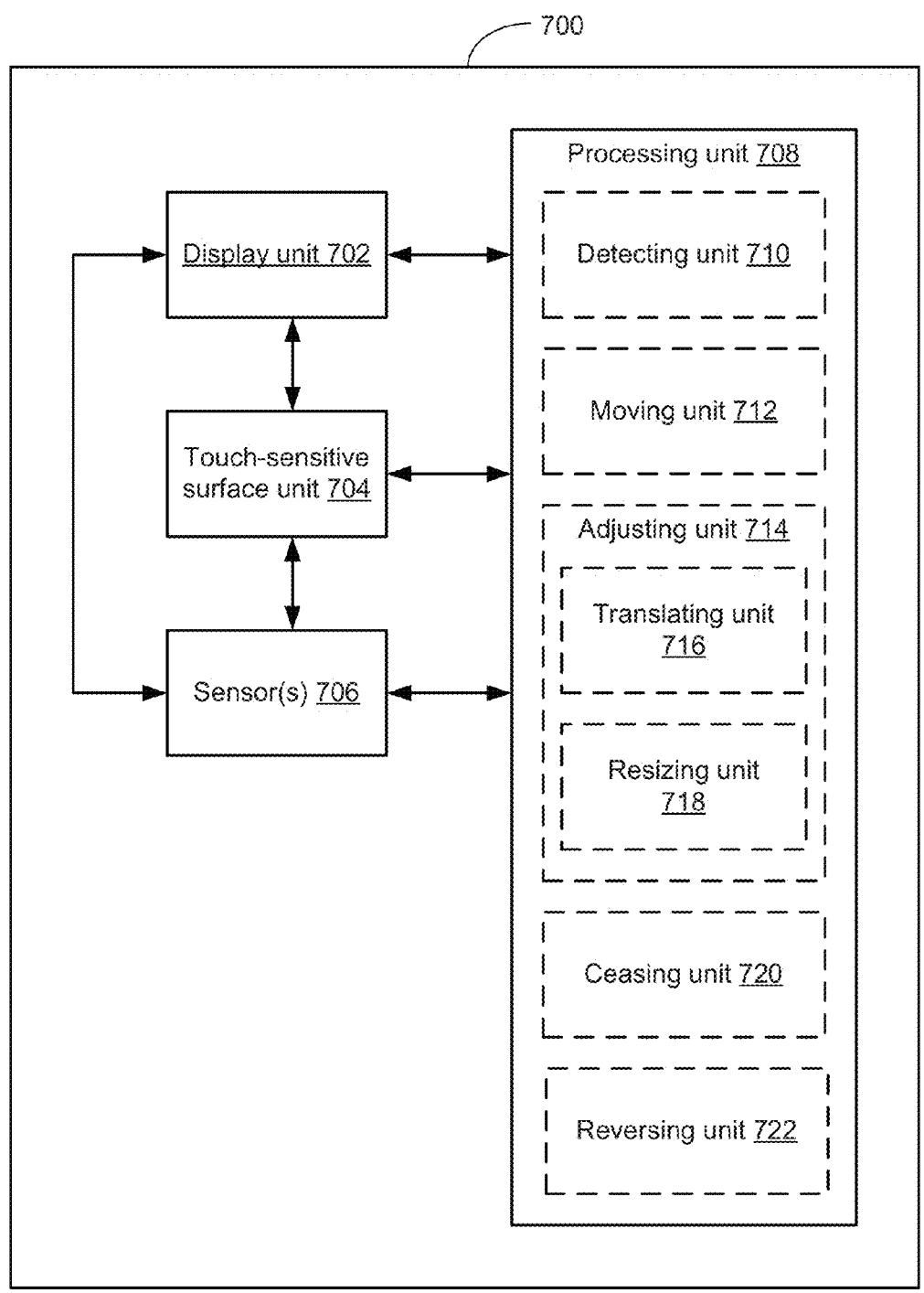
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a plurality of user interface objects; a touch-sensitive surface unit 704 configured to receive user contacts; one or more sensor units 706 configured to detect intensity of user contacts with the touch-sensitive surface unit 704; and a processing unit 708 coupled to the display unit 702, the touch-sensitive surface unit 704 and the sensor units 706. In some embodiments, the processing unit 708 includes a detecting unit 710, a moving unit 712, an adjusting unit 714, a ceasing unit 720, and a reversing unit 722. In some embodiments, the adjusting unit 714 includes a translating unit 716 and a resizing unit 718.

The processing unit 708 is configured to: enable display of a plurality of user interface objects on the display unit 702, including a first user interface object and a second user interface object, wherein the first user interface object is above the second user interface object in a z-order; detect a contact on the touch-sensitive surface (e.g., with the detecting unit 710), detect a gesture on the touch-sensitive surface (e.g., with the detecting unit 710), wherein the gesture includes movement of the contact on the touch-sensitive surface corresponding to movement of the first user interface object into a respective area of the display that was occupied by the second user interface object prior to detecting the gesture; and in response to detecting the gesture: move the first user interface object on the display in accordance with the movement of the contact on the touch-sensitive surface (e.g., with the moving unit 712); and when the first user interface object moves into the respective area of the display: in accordance with a determination that the gesture meets object-collision criteria, the object-collision criteria including that the contact had a maximum intensity during the gesture above the first intensity threshold prior to moving the first user interface object into the respective area of the display, enable display of the first user interface object colliding with the second user interface object (e.g., with the display unit 702) and adjust display properties of the second user interface object in accordance with the movement of the first user interface object on the display (e.g., with the adjusting unit 714); and in accordance with a determination that the contact had a maximum intensity during the gesture below the first intensity threshold prior to moving the first user interface object into the respective area of the display, enable display of the first user interface object moving over the second user interface object (e.g., with the display unit 702).

In some embodiments, the first user interface object and the second user interface object are application windows for different applications.

In some embodiments, the first user interface object and the second user interface object are different user interface objects within a single application.

In some embodiments, the processing unit 708 is configured to translate the second user interface object across the display unit 702 in accordance with movement of the first user interface object (e.g., with the translating unit 716).

In some embodiments, the processing unit 708 is configured to: move an edge of the second user interface object in accordance with movement of the first user interface object (e.g., with the moving unit 712); and resize the second user interface object in accordance with movement of the edge of the second user interface object (e.g., with the resizing unit 718).

In some embodiments, the processing unit 708 is configured to: when the gesture meets object-collision criteria: while an edge of the first user interface object is adjacent to a first edge of the second user interface object, move the first user interface object in concert with the second user interface object (e.g., with the moving unit 712); translate the second user interface object across the display unit 702 in accordance with movement of the first user interface object until a second edge of the second user interface object is adjacent to a boundary (e.g., with the translating unit 716); and after determining that the second edge of the second user interface object is adjacent to the boundary: move an edge of the second user interface object in accordance with movement of the first user interface object (e.g., with the moving unit 712); and resize the second user interface object in accordance with movement of the edge of the second user interface object (e.g., with the resizing unit 718).

In some embodiments, the display unit 702 is configured to, prior to detecting the gesture, display a visual indication of relative z-order of the first user interface object and the second user interface object; and the processing unit 708 is configured to, in accordance with a determination that the contact has exceeded the first intensity threshold, cease to enable display of the visual indication of the relative z-order of the first user interface object (e.g., with the ceasing unit 720) on the display unit 702.

In some embodiments, the processing unit 708 is configured to, when the first user interface object moves into the respective area of the display and in accordance with a determination that the contact reached an intensity during the gesture above the second intensity threshold prior to moving the first user interface object into the respective area of the display, enable display of the second user interface object over the first user interface object on the display unit 702.

In some embodiments, the object-collision criteria are met when the contact has a maximum intensity between the first intensity threshold and the second intensity threshold prior to moving the first user interface object into the respective area of the display unit 702.

In some embodiments, the object-collision criteria are met when the contact during the gesture has a maximum intensity above the first intensity threshold prior to moving the first user interface object into the respective area of the display unit 702.

In some embodiments, the processing unit 708 is configured to: while the first user interface object is displayed over a third user interface object: detect an increase in intensity of the contact above the first intensity threshold (e.g., with the detecting unit 710); and in response to detecting the increase in intensity of the contact above the first intensity threshold, adjust display properties of the third user interface object so that it is displayed simultaneously with the first user interface object without overlap between the first user interface object and the third user interface object (e.g., with the adjusting unit 714).

In some embodiments, the processing unit 708 is configured to translate the third user interface object so that it is displayed adjacent to the first user interface object (e.g., with the translating unit 716).

In some embodiments, the processing unit 708 is configured to resize the third user interface object so that it is displayed adjacent to the first user interface object (e.g., with the resizing unit 718).

In some embodiments, the processing unit 708 is configured to: after adjusting the display properties of the third user interface object in response to detecting the increase in intensity of the contact above the first intensity threshold: detect an increase in intensity of the contact above the second intensity threshold that is higher than the first intensity threshold (e.g., with the detecting unit 710); and in response to detecting the increase in intensity of the contact above the second intensity threshold: reverse the adjustment of the display properties of the third user interface object (e.g., with the reversing unit 722); and enable display of the third user interface object over the first user interface object on the display unit 702.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B or FIG. 7. For example, detection operations 608, 610, 646, and 654 and determination operations 614, 622, 632, 638, and 640 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface, or a change in the display properties of an object (e.g., changing the z-order of the object relative to a second object). When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Displaying Content Associated with a Corresponding Affordance

Many electronic devices have graphical user interfaces in which an affordance corresponds to respective content. Typically a user accesses respective content by selecting an affordance associated with the respective content (e.g., making an input with a focus selector over the affordance). However, when a user accesses the content by selecting an affordance from a plurality of affordances, the wrong affordance is sometimes accidentally selected and/or the user changes their mind. These accidental selections can cause a user to lose their place and take additional steps to undo the accidental selections. Such additional operations reduce the efficiency of interaction with the user interface. Thus, in many circumstances, it would be advantageous to provide visual feedback indicating that an affordance is about to be selected in accordance with increasing intensity of a contact on a touch-sensitive surface, to enable a user to readily identify which affordance is being selected and determine whether or not to continue with the selection or cancel the selection. The embodiments below provide a convenient and intuitive method of indicating that an affordance is about to be selected by first decreasing the size of the affordance below an initial size of the affordance prior to determining whether or not to display content associated with the affordance based on an intensity of a contact detected on the display, thereby providing the user with visual feedback that enables the user to quickly and efficiently identify that the affordance is about to be selected. In some circumstances, after determining whether or not to display content associated with the affordance, the device provides additional visual feedback to indicate whether or not the content will be displayed (e.g., either enlarging the affordance to the prior size or replacing display of the affordance with the associated content). This additional (or alternative) feedback for accessing respective content enables the user to operate the device more quickly and efficiently, thereby creating a more efficient human-machine interface.

In some implementations, the affordance changes size in tandem with increasing and decreasing intensity of the contact, thereby simulating a springing or slingshot action. In response to increasing intensity of the contact, the size of the displayed affordance decreases, as though a spring were being compressed, and in response to decreasing intensity of the contact, the size of the displayed affordance increases, as though the spring were being decompressed. In some implementations, when the maximum intensity of the contact exceeds a content-display threshold, a slingshot action is simulated, with the size of the displayed affordance increased beyond the (original) respective size of the affordance. Furthermore, in some implementations, when the maximum intensity of the contact is less than the content-display threshold, the size of the displayed affordance springs back to the (original) respective size of the affordance.

FIGS. 8A-8P illustrate exemplary user interfaces for displaying content associated with a corresponding affordance in accordance with some embodiments. The user interfaces in these figures are used to illustrate the processes described below, including the processes in FIGS. 9A-9B. FIGS. 8A-8O include intensity diagrams that show the current intensity of the contact on the touch-sensitive surface relative to a plurality of intensity thresholds including a content-display threshold (e.g., "$IT_D$"). In some embodiments, operations similar to those described below with reference to $IT_D$ are performed with reference to a different intensity threshold (e.g., "$IT_L$").

FIG. 8A illustrates an example of user interface 14700 displayed on display 450 of a device (e.g., device 300) that is responsive to contacts (e.g., a finger contact) on touch-sensitive surface 451. User interface 14700 is associated with an application (e.g., a web browser). In this example, user interface 14700 is arranged in an array of affordances 14701 displayed at a respective size. FIG. 8A further illustrates a contact 14704 detected on touch-sensitive surface 451 and a displayed representation of a focus selector (e.g., cursor 14702) corresponding to contact 14704.

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 8A-8P and FIGS. 9A-9B will be discussed with reference to display 450 and a separate touch-sensitive surface 451, however analogous operations are, optionally, performed on a device with a touch-sensitive display system 112 in response to detecting the contacts described in FIGS. 8A-8P on the touch-sensitive display system 112 while displaying the user interfaces shown in FIGS. 8A-8P on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 14702.

Figure 8B:
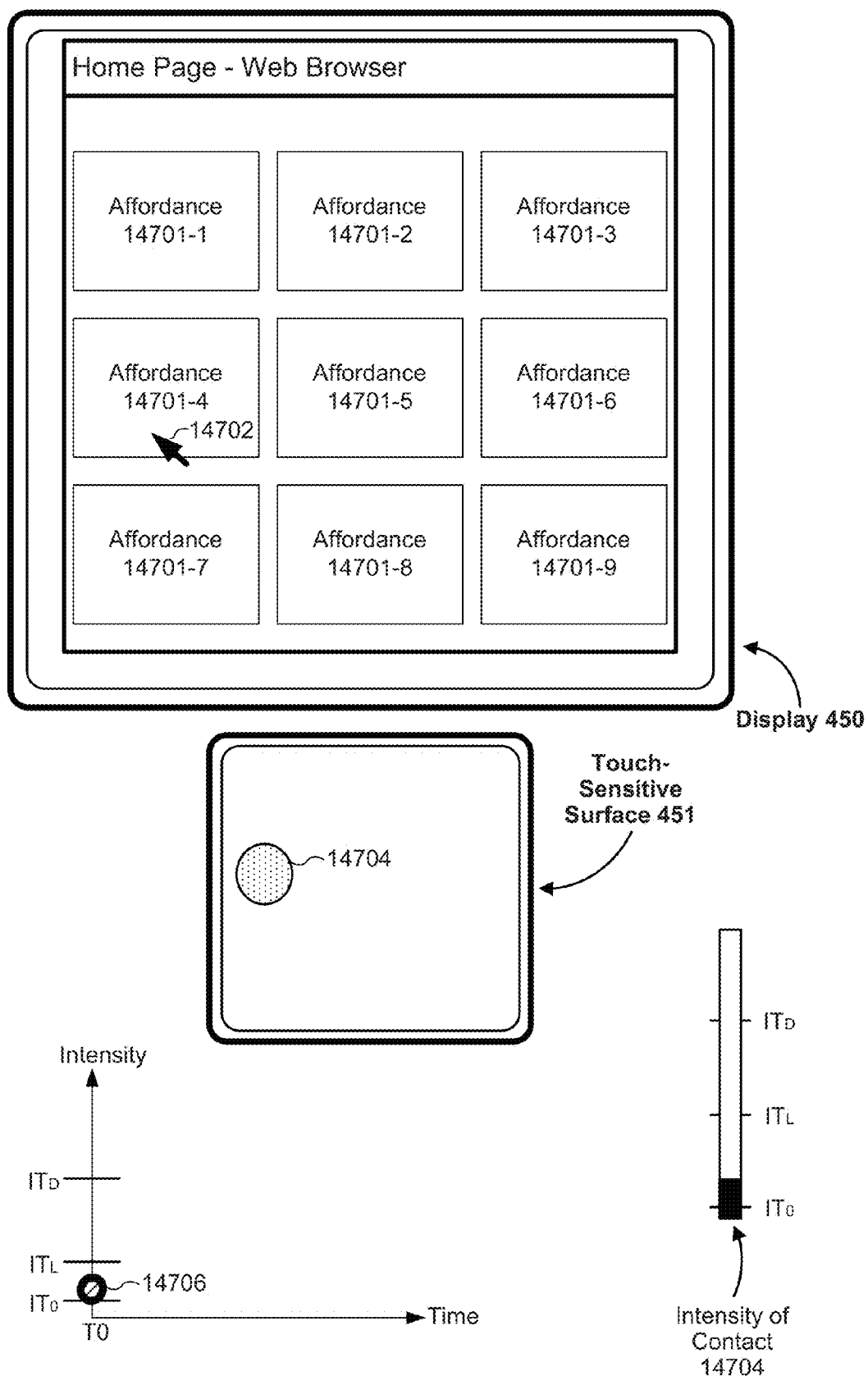

FIGS. 8A and 8B illustrate an example of moving a focus selector (e.g., cursor 14702) over an affordance 14701-4 (e.g., from the location of cursor 14702 in FIG. 8A to the location of cursor 14702 in FIG. 8B) in response to detecting movement of contact 14704 across the touch-sensitive surface 451. In this example, the intensity of the contact 14704 is a between $IT_0$ and $IT_L$.

Figure 8C:
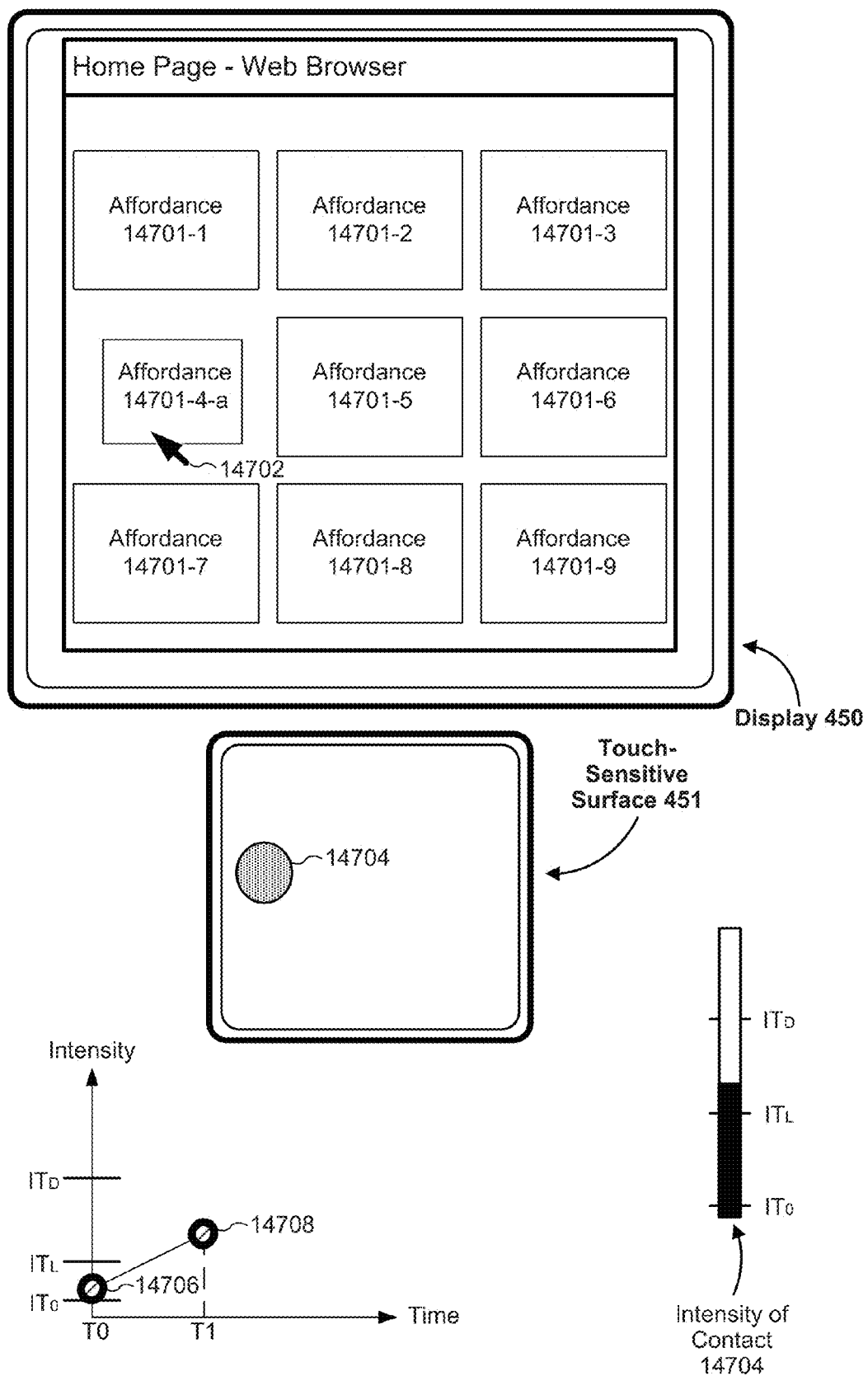

FIGS. 8B-8C illustrate an example of decreasing a size of the affordance below a respective size (e.g., the size of affordance 14701-4 in FIG. 8B) in response to detecting the increase in intensity of the contact 14704. In this example, affordance 14701-4-a in FIG. 8C is displayed at a size smaller than affordance 14701-4 in FIG. 8B. This operation occurs in response to detecting the intensity of the contact 14704 increasing (e.g., from between below $IT_L$ in FIG. 8B to above $IT_L$ in FIG. 8C).

Figure 8D:
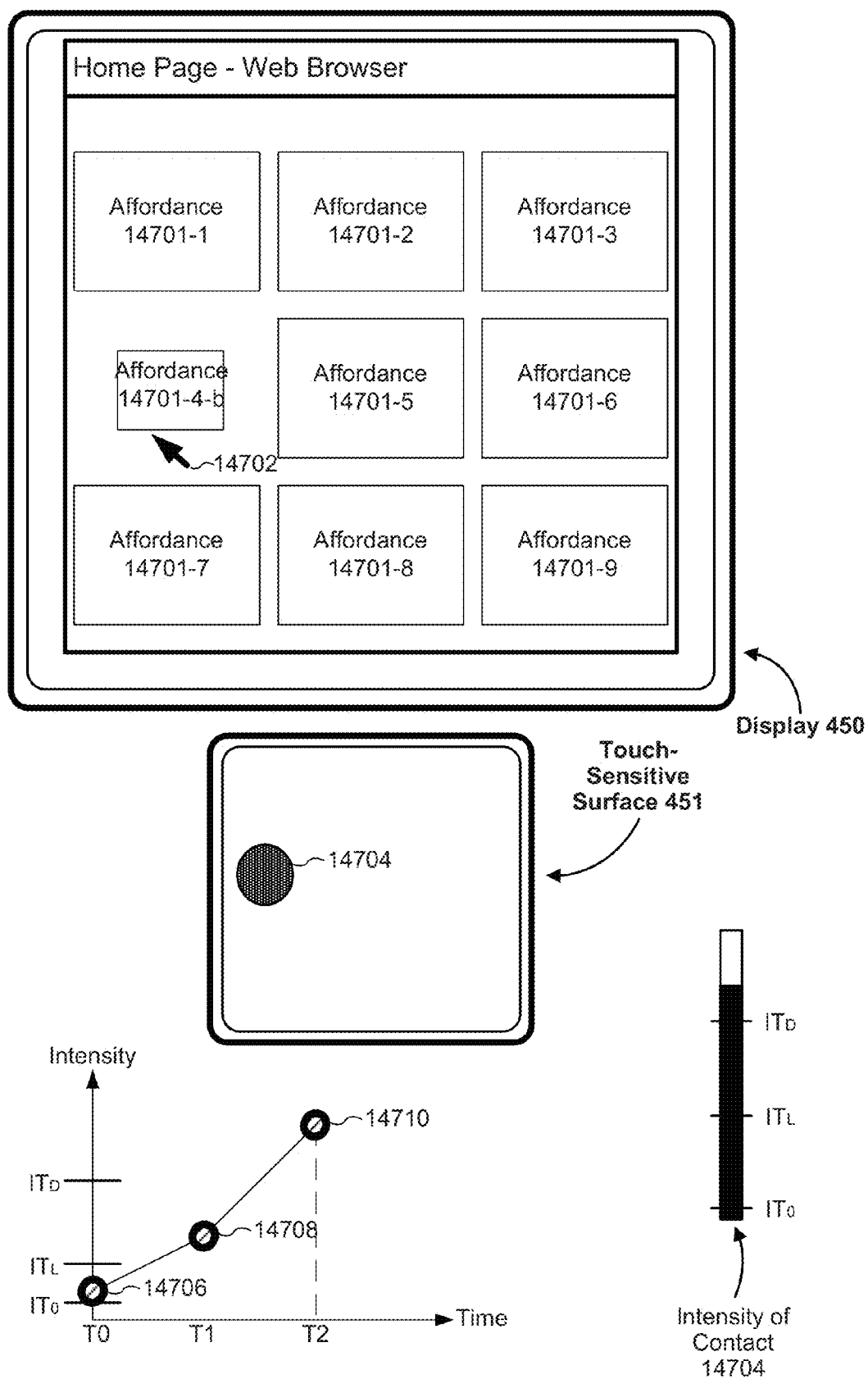

FIGS. 8C-8D illustrate an example of a maximum intensity of the contact 14704 increasing above a content-display intensity threshold (e.g., the change in intensity of contact between FIGS. 8C-8D). In this example, the intensity of the contact 14704 increases above the content-display intensity threshold (e.g., "$IT_D$"). In some implementations, the affordance 14701-4-*b* is displayed at a size smaller than affordance 14701-4-*a* in FIG. 8C in response to detecting the intensity of contact 14704 increasing from below $IT_D$ in FIG. 8C to above $IT_D$ in FIG. 8D.

Figure 8E:
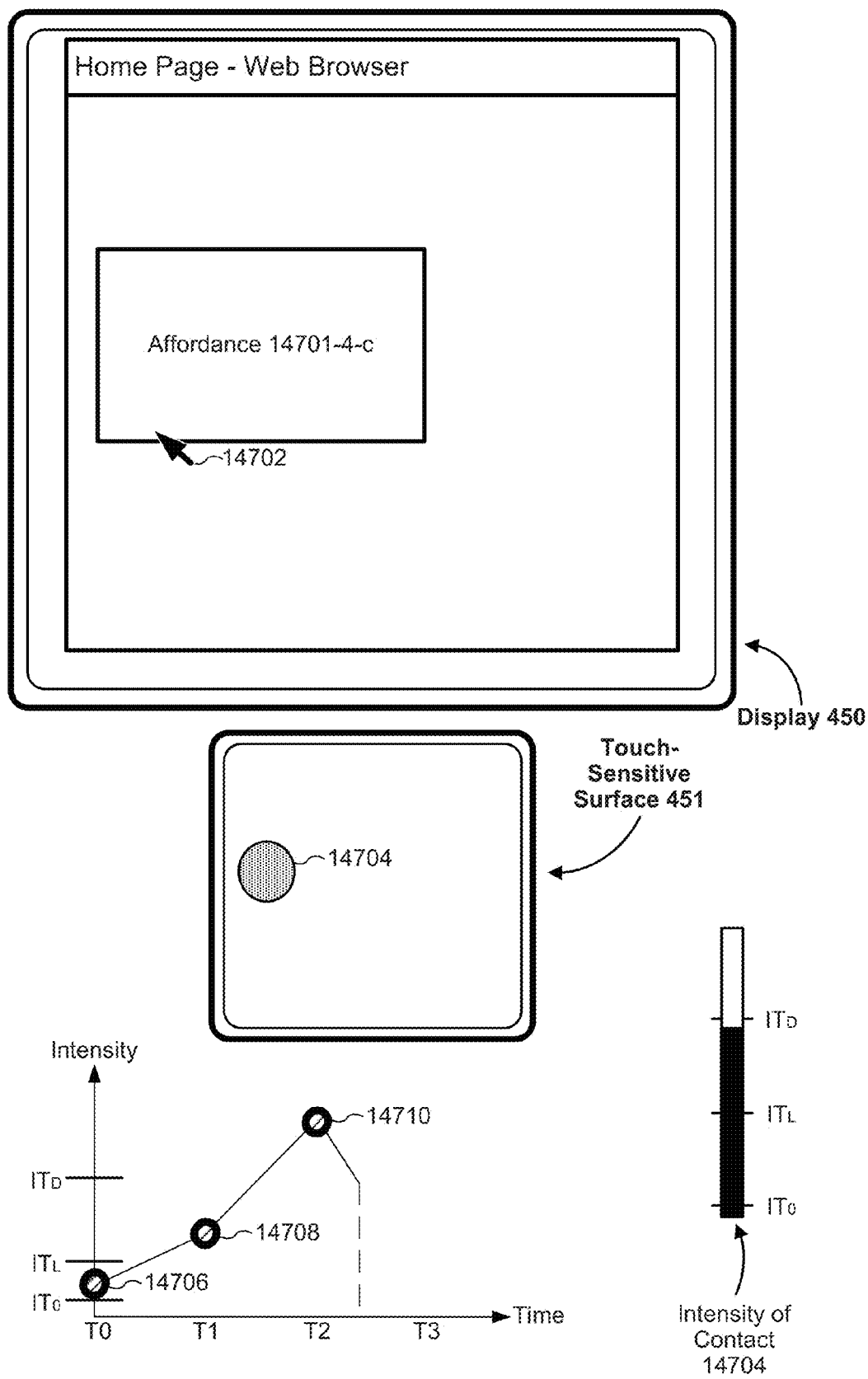
Figure 8F:
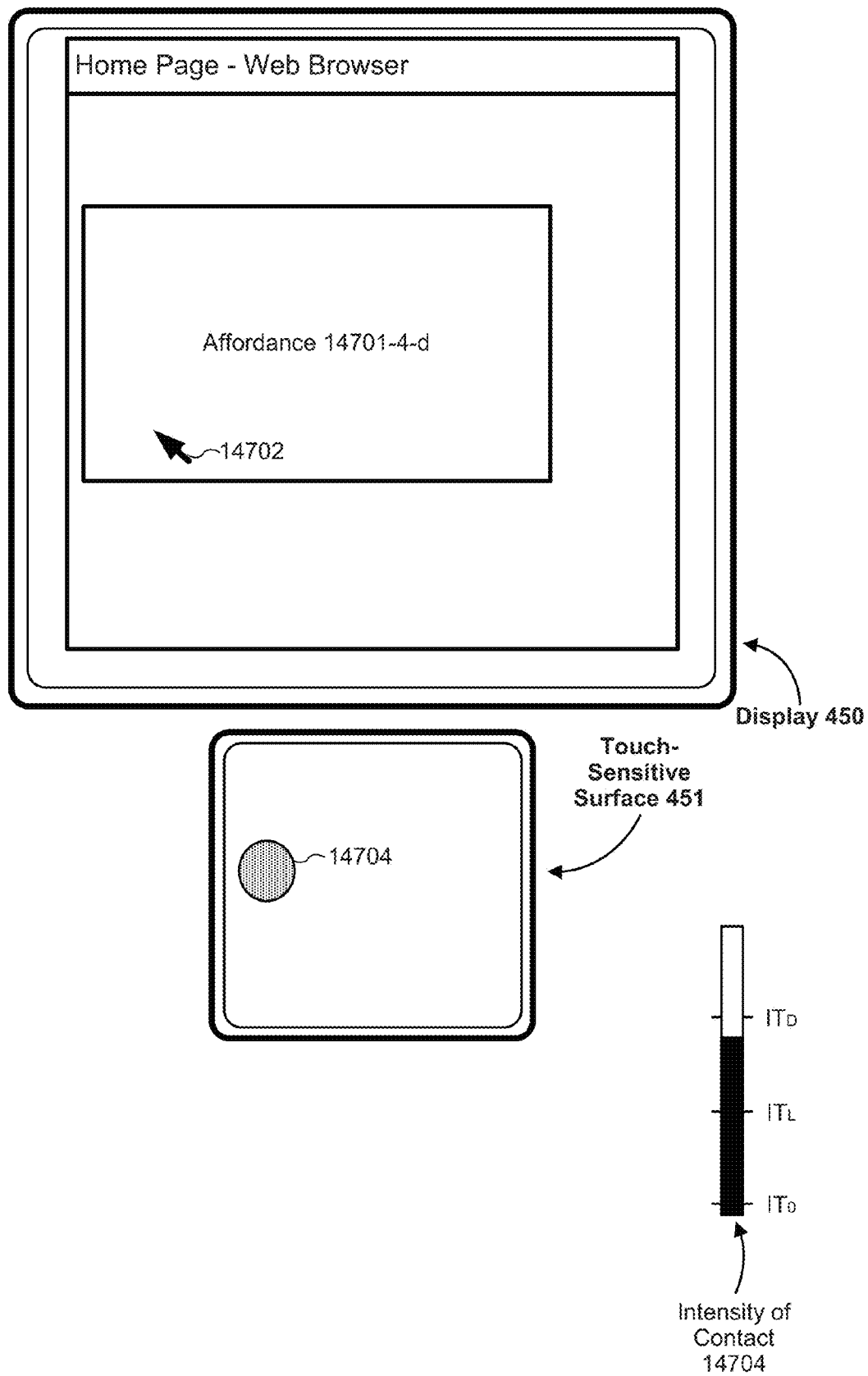
Figure 8G:
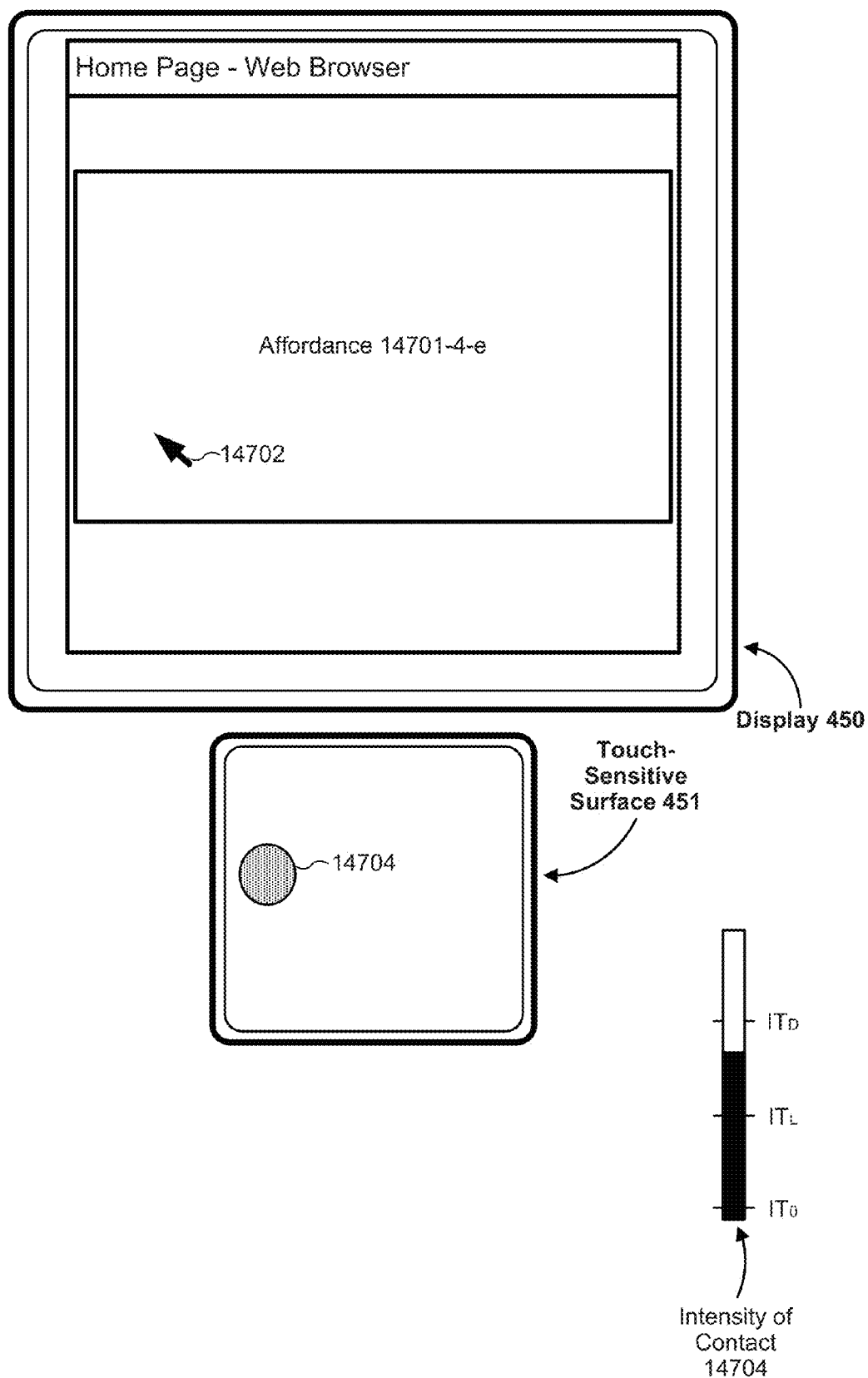
Figure 8H:
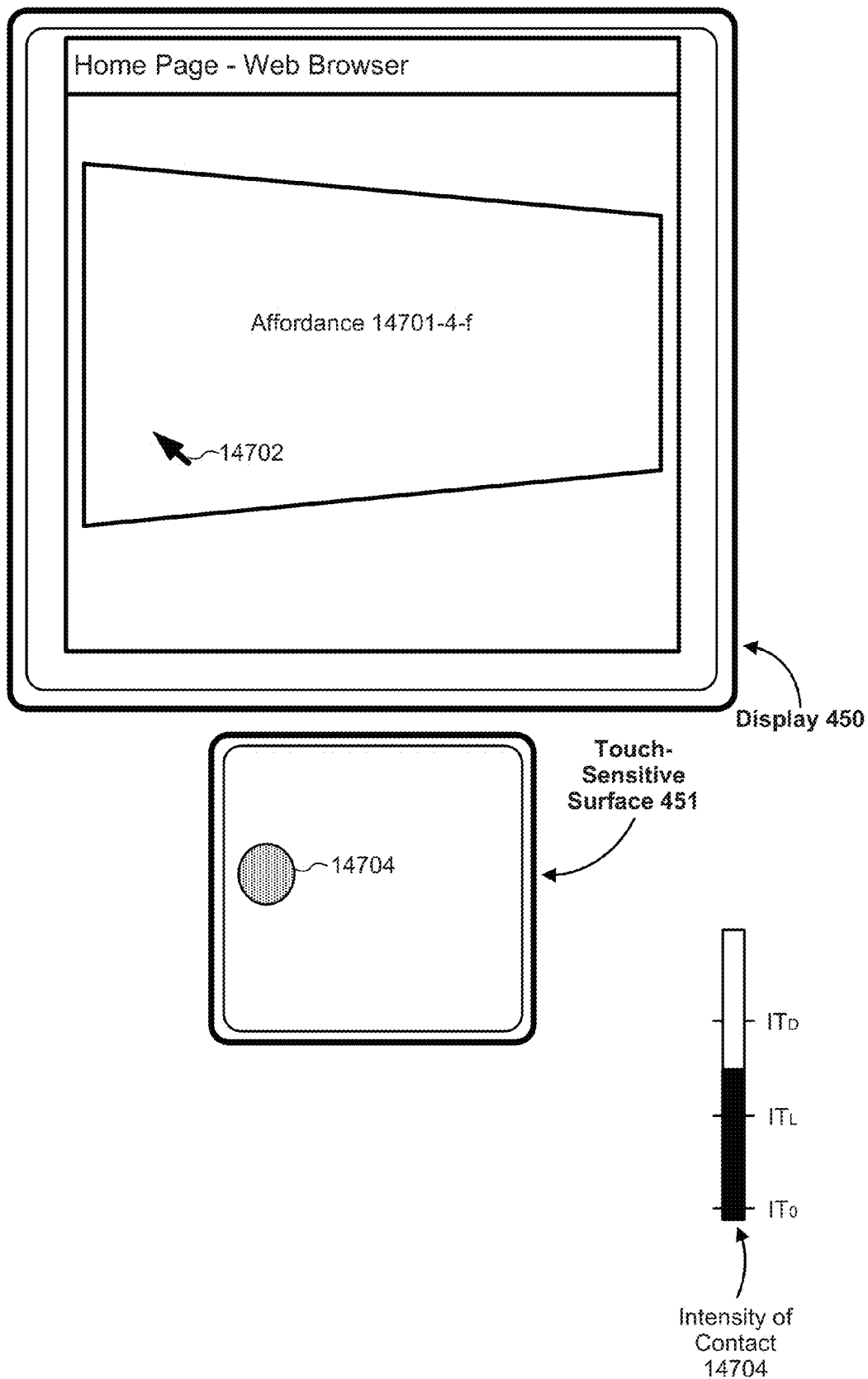
Figure 8I:
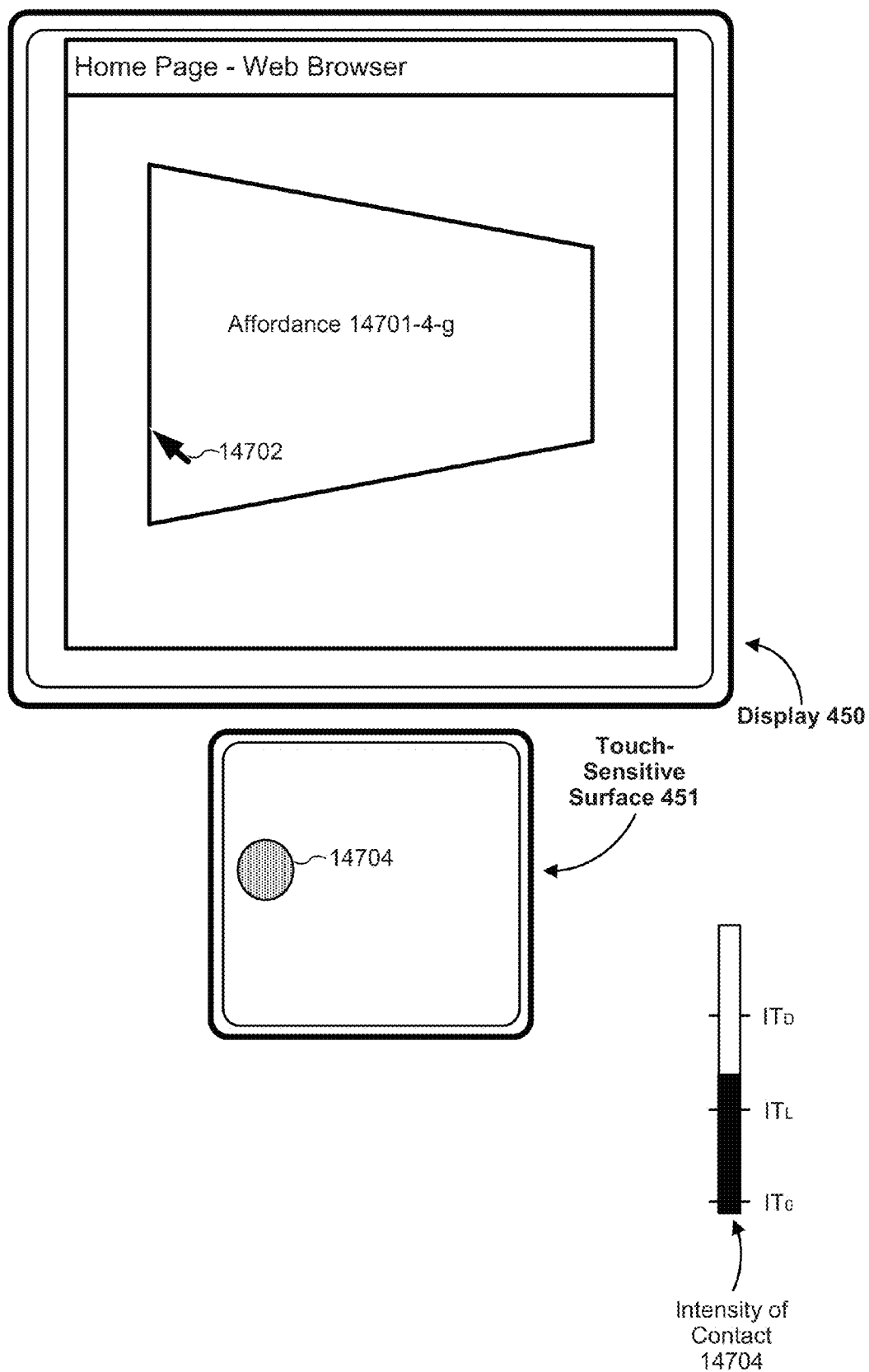
Figure 8J:
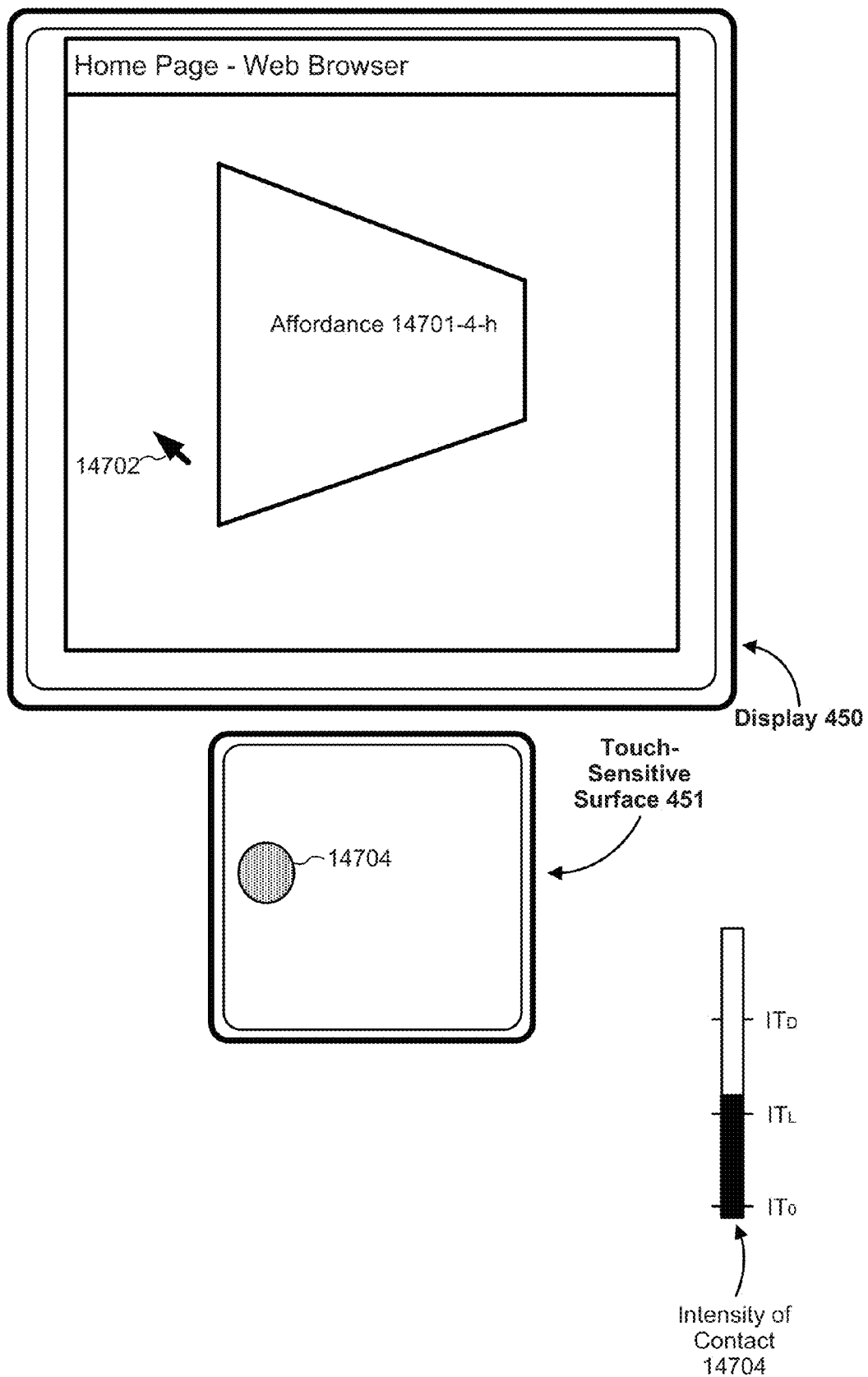
Figure 8K:
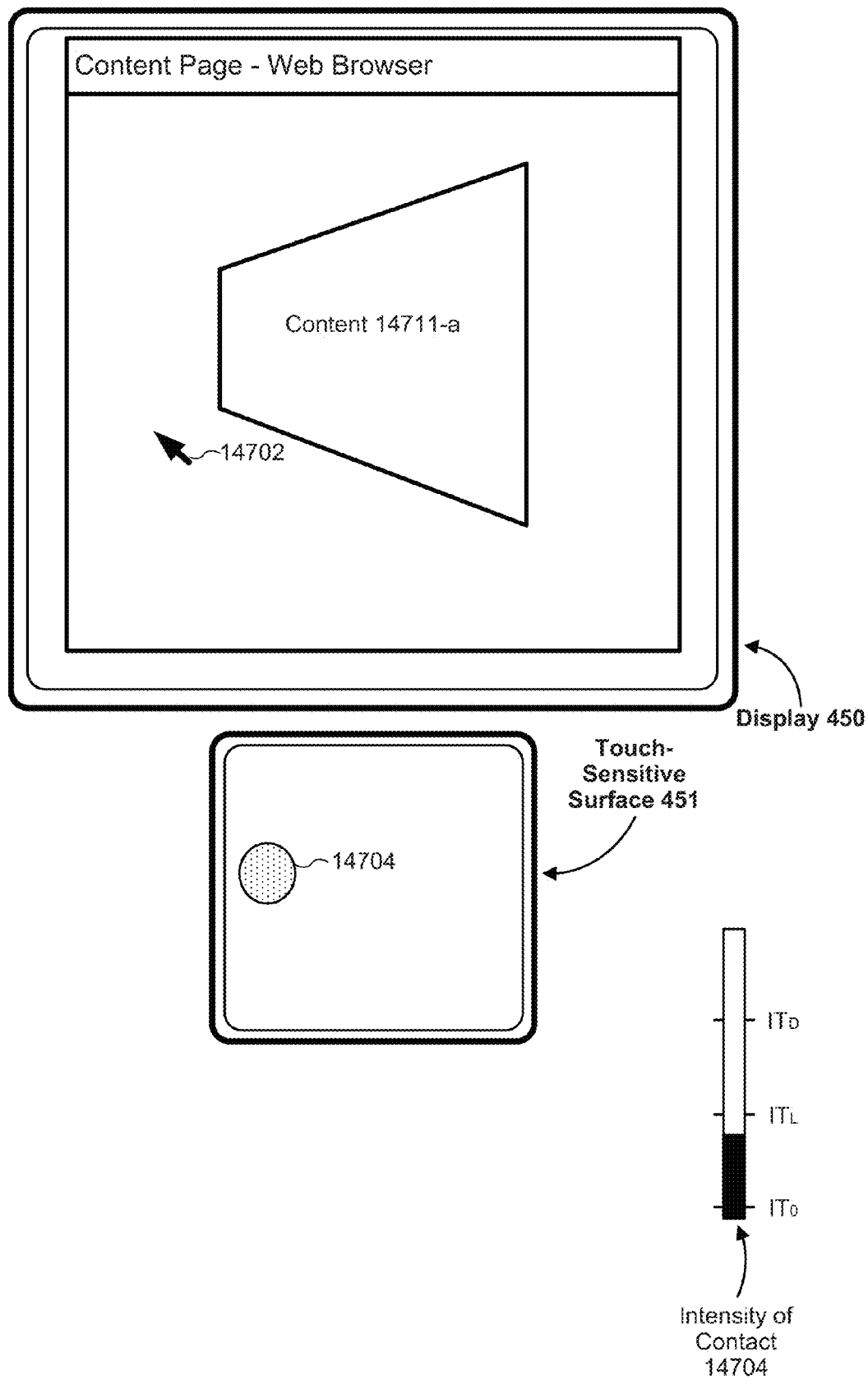
Figure 8L:
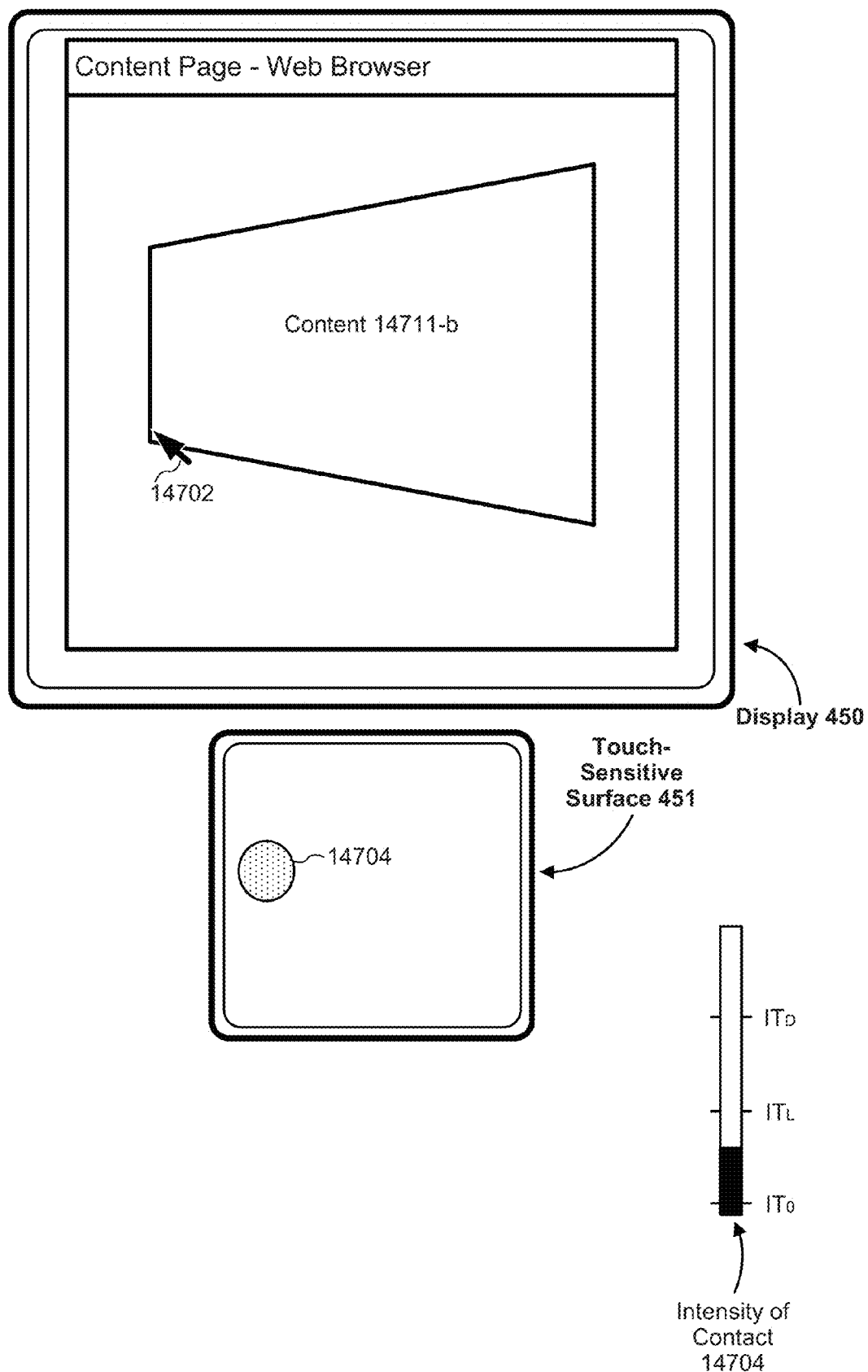
Figure 8M:
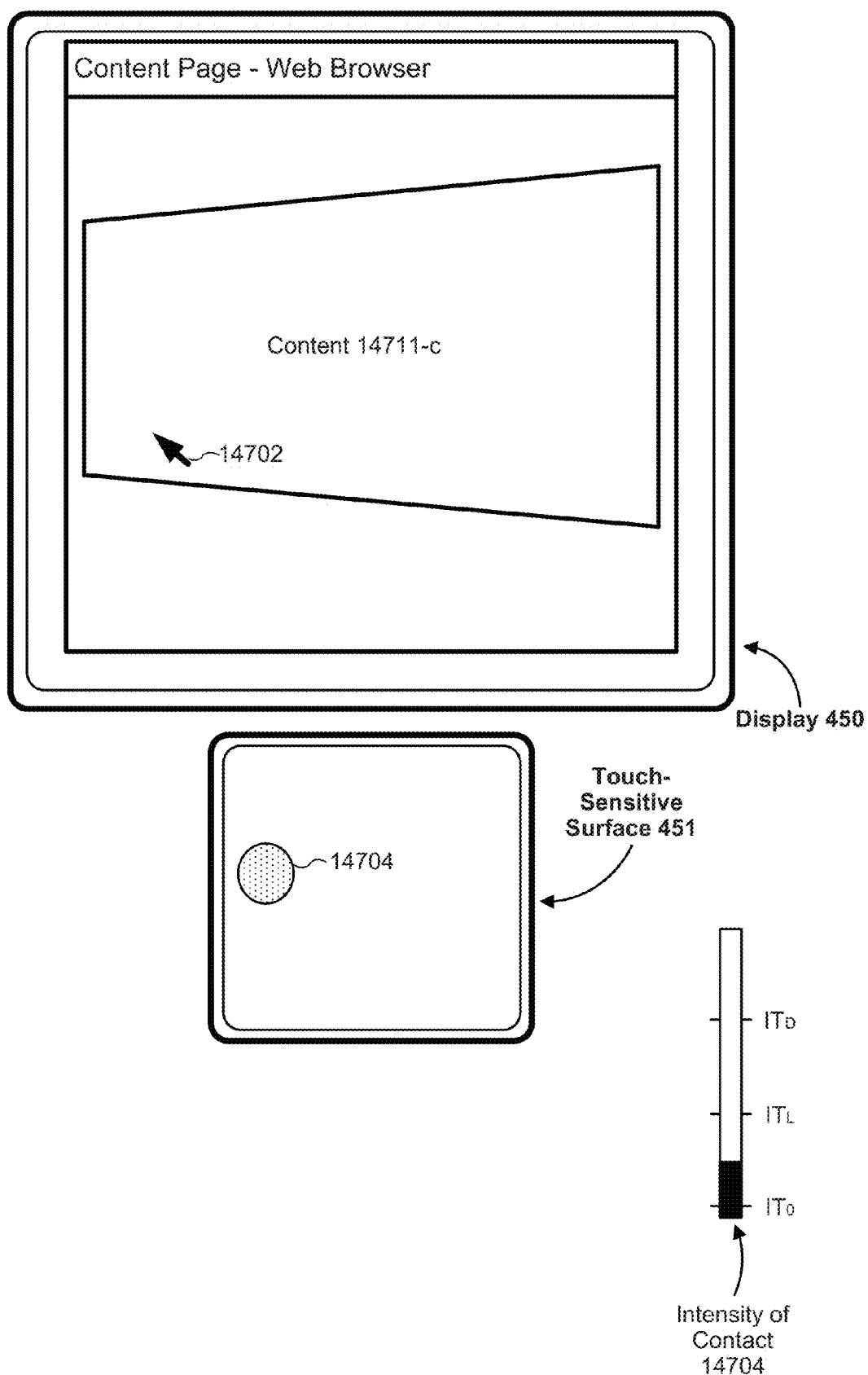

FIGS. 8E-8M illustrate an example of displaying an animated transition that includes: enlarging the affordance to a size bigger than the respective size and displaying an animation of the affordance rotating about an axis parallel to the display to reveal a portion of the respective content that is on a simulated back side of the affordance. FIGS. 8E-8G illustrate enlarging the affordance to a size bigger than the respective size of the affordances 14701 (e.g., including affordance 14701-4) shown in FIG. 8B. FIGS. 8H-8M illustrate displaying an animation of the affordance 14701-4 rotating about an axis parallel to the display to reveal the portion of the respective content 14711 that is on a simulated back side of the affordance 14701-4. FIGS. 8H-8J illustrate rotating the affordance 14701-4 about a vertical axis parallel to the display so that the right side of the affordance 14701-4 is rotated into the display while the left side of the affordance is rotated out of the display at angles increasingly approaching 90 degrees. FIGS. 8K-8M illustrate revealing the portion of the respective content 14711 that is on a simulated back side of the affordance 14701-4 at angles increasingly approaching 180 degrees. In some implementations, the animated transition is displayed at a fixed rate. In some implementations, the animated transition is displayed in accordance with an intensity of the contact 14704 (e.g., in FIGS. 8E-8M the animation gradually progresses as the intensity of the contact 14704 is gradually reduced).

Figure 8N:
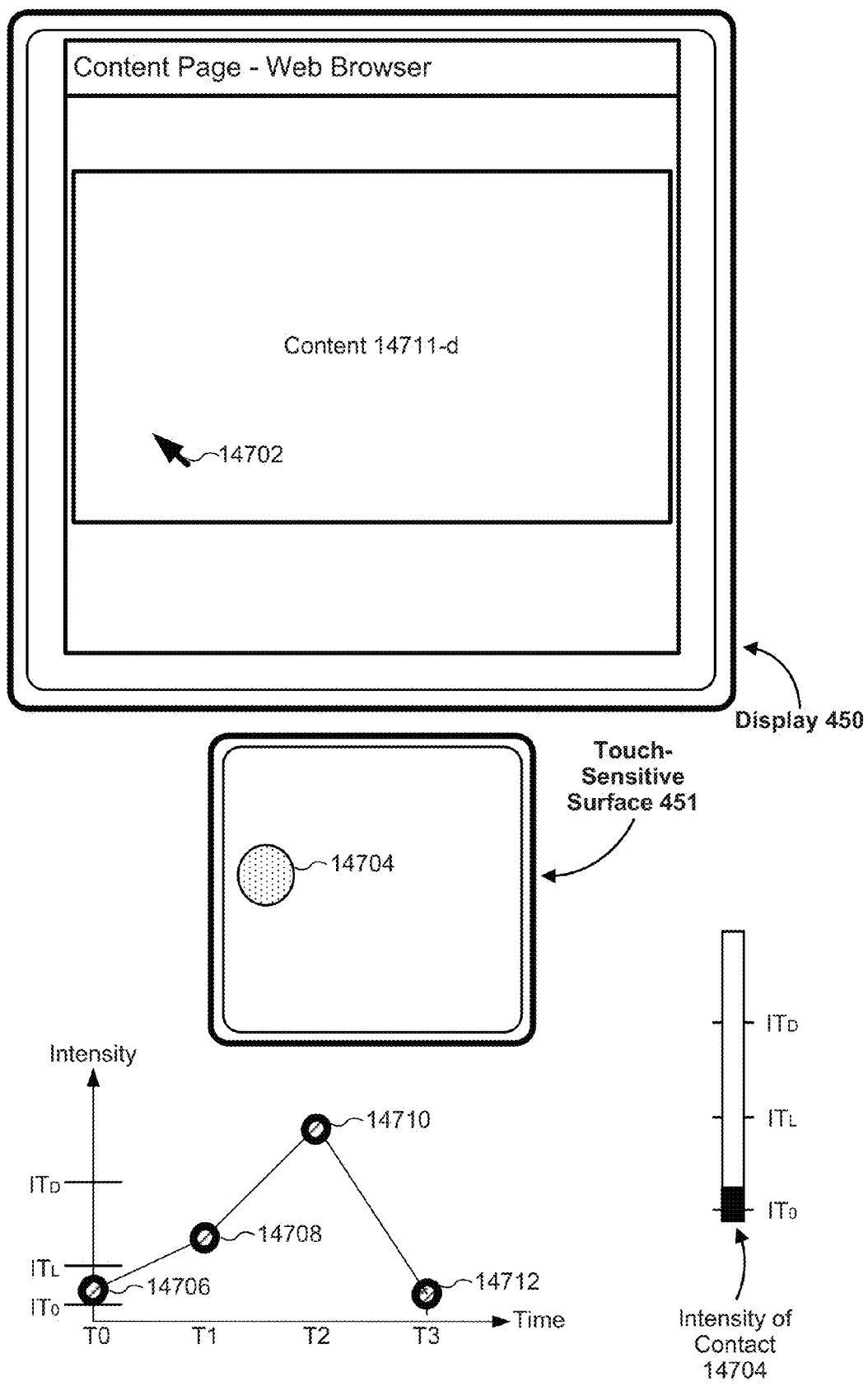
Figure 8O:
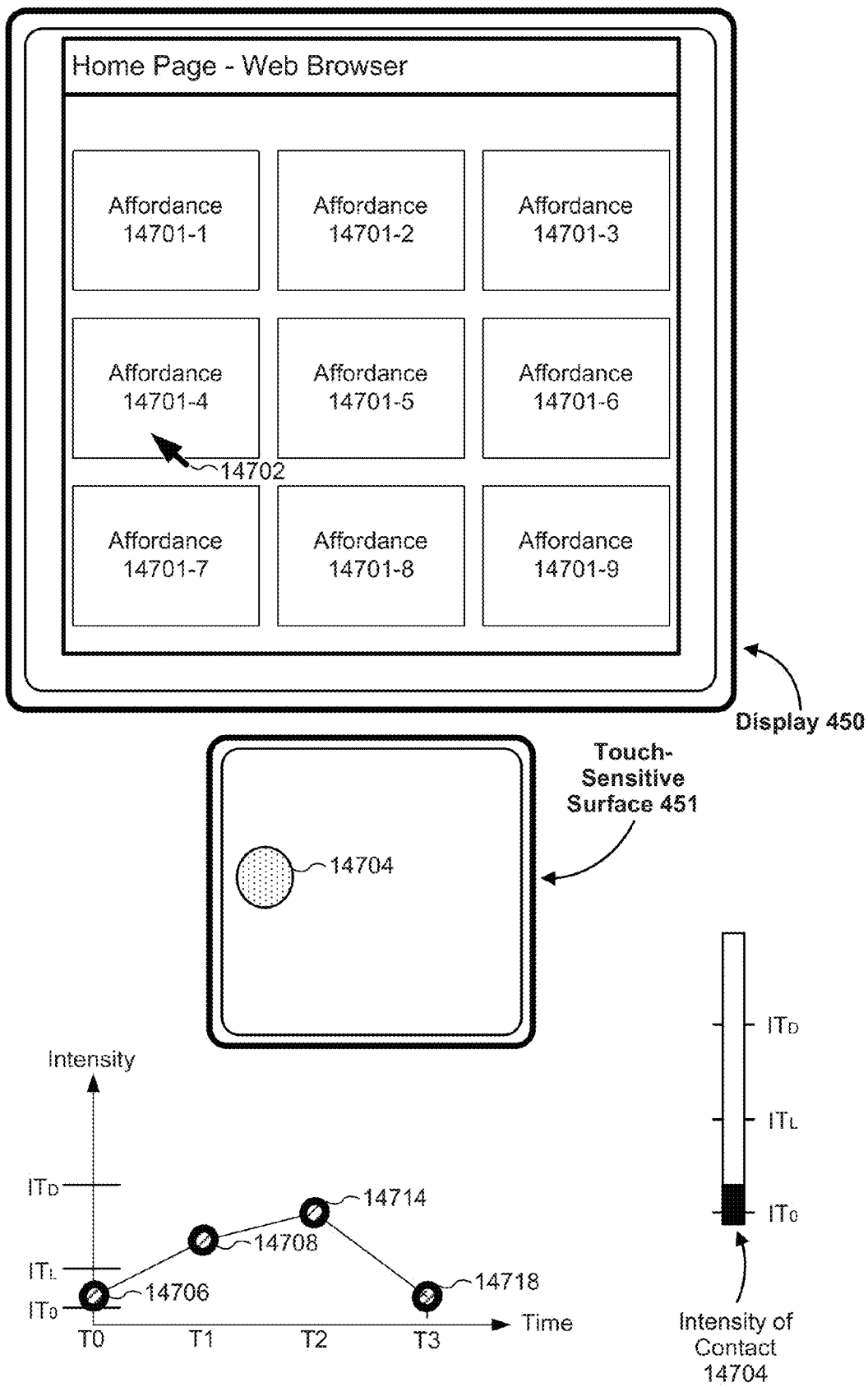

FIG. 8N illustrates an example in which the affordance has ceased to be displayed (and, optionally, the other affordances 14701 in FIG. 8B have also ceased to be displayed) and instead the device displays at least a portion of the respective content in response to detecting the subsequent decrease in intensity of the contact and in accordance with a determination that a maximum intensity of the contact was (during the gesture) above a content-display intensity threshold (e.g., "$IT_D$"). In this example, the device ceases to display affordance 14701-4-*b*, which was displayed in FIG. 8D, and displays content 14711-*d*, as shown in FIG. 8N. These operations occur in response to the device detecting the subsequent decrease in intensity of contact 14704 and in accordance with the determination that the maximum intensity of the contact 14704 (e.g., as shown in FIG. 8D) was above the content-display intensity threshold (e.g., "$IT_D$"). For example, the decrease in intensity of the contact 14704 shown in the transition from FIG. 8D to FIG. 8E initiated the above described sequence of operations.

FIG. 8O illustrates an example of increasing the size of the affordance to the respective size and forgoing displaying the respective content in response to detecting the subsequent decrease in intensity of the contact and in accordance with a determination that a maximum intensity of the contact was (during the gesture) below the content-display intensity threshold (e.g., "$IT_D$"). In this example, the size of affordance 14701-4-*a* in FIG. 8C is increased to respective size of the affordances 14701 (e.g., including affordance 14701-4) shown in FIG. 8B, and the device forgoes displaying the respective content (e.g., content 14711-*d* in FIG. 8N is not displayed). These operations occur in response to the device detecting the subsequent decrease in intensity of the contact 14704 from a maximum intensity, and in accordance with the determination that the maximum intensity of the contact 14704 (e.g., marker 14714 at T2), is below the content-display intensity threshold (e.g., "$IT_D$").

FIG. 8P illustrates an example of detecting liftoff of the contact from the touch-sensitive surface. In this example, a liftoff of the contact from the touch-sensitive surface 451 is detected by the device. FIG. 8P further illustrates the intensity of contact at T3, represented by marker 14720, below a contact intensity threshold (e.g., "$IT_0$"). In some implementations, liftoff is detected by the device when the intensity of the contact falls below $IT_0$, the contact intensity threshold, and optionally in accordance with additional criteria with respect to a maximum intensity of the contact prior to the intensity falling below $IT_0$.

FIGS. 9A-9B are flow diagrams illustrating a method 14800 of displaying content associated with a corresponding affordance in accordance with some embodiments. The method 14800 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 14800 are, optionally, combined and/or the order of some operations is, optionally, changed.

As described below, the method 14800 provides an intuitive way to display content associated with a corresponding affordance. The method reduces the cognitive burden on a user when displaying content associated with a corresponding affordance, thereby creating a more efficient human-machine interface. For battery-operated electronic devices, enabling a user to display content associated with a corresponding affordance faster and more efficiently conserves power and increases the time between battery charges.

The device displays (14802), on the display, an affordance corresponding to respective content, where the affordance is displayed at a respective size (e.g., a default or baseline size of the affordance). FIG. 8A, for example, shows user interface 14700, displayed on display 450, with a plurality of affordances 14701 corresponding to respective content. FIGS. 8A-8B and 8O-8P, for example, show the affordances 14701 displayed at a respective size.

In some embodiments, the affordance is (14804) a thumbnail image that includes a reduced scale representation of the respective content (e.g., a cached version of the respective content such as a cached snapshot of a portion of a webpage, a thumbnail of a photo or a frame of a video).

In some other embodiments, the affordance is displayed (14806) in an array of affordances (e.g., a multi-column, multi-row array of links to favorite or recently visited websites). FIGS. 8A-8B and 8O-8P, for example, shows the affordances 14701 displayed in an array of affordances.

In some embodiments, the affordance is (14808) an application icon corresponding to a respective application, and the respective content is a newly initialized application window associated with the application (e.g., a blank document for a document editing application, a default webpage or webpage launch interface for a web browser, or a launch screen for an application). In some embodiments, the affordance is a document icon corresponding to an electronic document, and the respective content is (14810) the electronic document (e.g., a word processing document, a spreadsheet document, a PDF document, or a presentation document). In some embodiments, the affordance is (14812) a representation of a cached version of a webpage (e.g., a thumbnail of a bookmarked or favorite webpage), and the respective content is the webpage. In some other embodiments, the affordance is (14814) a thumbnail of a photo, and the respective content is the photo. In some embodiments, the affordance is (14816) a thumbnail of a video, and the content is the video or a frame of the video (e.g., displayed in a video player application).

While a focus selector (e.g., cursor 14702 when the touch-sensitive surface 451 is separate from display 450 or contact 14704 when the touch-sensitive surface is part of or coincident with the display) is over the affordance, the device detects (14818) a gesture that includes an increase in intensity of the contact on the touch-sensitive surface followed by a subsequent decrease in intensity of the contact on the touch-sensitive surface. FIGS. 8B-8E, for example, show a cursor 14702 over affordance 14701-4. The device detects an increase in intensity of the contact 14704, for example in FIGS. 8B-8C, from below $IT_L$ to above $IT_L$, and a decrease in intensity of the contact 14704, for example in FIGS. 8D-8E, from above $IT_D$ to below $IT_D$.

In some embodiments, detecting the subsequent decrease in intensity of the contact includes detecting (14820) liftoff of the contact from the touch-sensitive surface. FIG. 8P, for example, shows detecting liftoff of the contact 14704 from the touch-sensitive surface 451. In this example, the intensity of the contact 14704 at T3, represented by marker 14720, is below a contact intensity threshold (e.g., "$IT_0$"). In some embodiments, the contact is no longer detected on the touch-sensitive surface after detecting liftoff of the contact.

In some embodiments, detecting the subsequent decrease in intensity of the contact includes detecting (14822) a reduction in intensity of the contact below a respective intensity threshold while continuing to detect the contact on the touch-sensitive surface (e.g., the affordance is activated even if the contact remains on the touch-sensitive surface if the intensity of the contact is reduced below the respective intensity threshold). FIGS. 8D-8E, for example, show detecting a reduction in intensity of the contact 14704 from above a respective intensity threshold (e.g., $IT_D$) to below the respective intensity threshold (e.g., $IT_D$) while continuing to detect the contact 14704 on the touch-sensitive surface 451 (e.g., contact 14704 is still detected on the touch-sensitive surface 451 with an intensity above $IT_0$).

In response to detecting the increase in intensity of the contact, the device decreases (14824) a size of the affordance below the respective size. FIG. 8C, for example, shows affordance 14701-4-a displayed at a size below the respective size of the affordances 14701, including affordance 14701-4, shown in FIG. 8B. This operation occurs in response to the device detecting the increase in the intensity of the contact 14704 (e.g., from below $IT_L$ in FIG. 8B to above $IT_L$ in FIG. 8C). In some embodiments, a different display property (e.g., shape, angle, color, opacity, and/or saturation) of the affordance is changed (e.g., in accordance with the increase in intensity of the contact) instead of, or in addition to, changing the size of the affordance. In situations where the affordance is displayed in an array of affordances, the change in the display property differentiates the affordance from other affordances in the array of affordances so as to provide the user with visual feedback indicating which affordance is responding to the user's inputs and indicates the amount of intensity of the contact. When the different display property is a shape of the affordance, changing the different display property includes moving the affordance laterally on the display (e.g., up, down, to the left, to the right, or at an angle). When the different display property is an angle of the affordance, changing the different display property includes rotating the affordance on the display (e.g., clockwise or counterclockwise in a plane of the display, about an axis running horizontally in the plane of the display or about an axis running vertically in the plane of the display). When the different display property is a color of the affordance, changing the different display property includes shifting a hue of the affordance. When the different display property is an opacity of the affordance, changing the different display property includes increasing or decreasing the opacity to hide or reveal the background of the user interface behind the affordance. When the different display property is a saturation of the affordance, changing the different display property includes increasing or decreasing a degree of saturation of the affordance. While the embodiments above have described with reference to specific examples of display properties, in some situations analogous operations are performed using other display properties.

In response to detecting (14826) the subsequent decrease in intensity of the contact and in accordance with a determination that a maximum intensity of the contact is (14828) above a content-display intensity threshold, the device ceases to display the affordance and displays at least a portion of the respective content (e.g., content associated with the affordance "springs out" of the location previously occupied by the affordance). FIG. 8N, for example, shows the device displaying at least the portion of the respective content 14711-d in response to the subsequent decrease in intensity of the contact 14704 from above $IT_D$ in FIG. 8D to below $IT_D$ in FIG. 8N and in accordance with the determination that the maximum intensity of the contact 14704 in FIG. 8D is above the content-display intensity threshold (e.g., $IT_D$). Furthermore, in FIG. 8N, for example, the device is no longer displaying the affordance (e.g., the affordance 14701-4-b in FIG. 8D) on the display 450. In some embodiments, a different display property (e.g., shape, angle, color, opacity, saturation, and/or contrast) of the affordance is changed (e.g., in accordance with the decrease in intensity of the contact) instead of, or in addition to, changing the size of the affordance. In some embodiments, when the different display property was changed in a first direction (e.g., decreased saturation, shifted up, rotated clockwise) in response to detecting the increase in intensity of the contact, the display property is changed in an opposite direction (e.g., increased saturation, shifted down, rotated counterclockwise) in response to detecting the decrease in intensity of the contact.

In situations where the affordance is displayed in an array of affordances, the change in the display property differentiates the affordance from other affordances in the array of affordances so as to provide the user with visual feedback indicating which affordance is responding to the user's inputs and indicates the amount of intensity of the contact. For example, as the intensity of the contact increases while the focus selector is over the affordance, the saturation of the affordance decreases so that the affordance is less saturated than other affordances in the array of affordances; subsequently when the intensity of the contact decreases the saturation of the affordance increases until it reaches the saturation of the other affordances in the array of affordances (e.g., the original saturation of the affordance) and then, optionally, exceeds the saturation of the other affordances in the array of affordances. In some embodiments, the different display property (e.g., the saturation of the affordance) changes in accordance with the change in size of the affordance. For example, as the affordance gets smaller, the saturation of the affordance decreases; and as the affordance gets larger, the saturation of the affordance increases.

In some embodiments, ceasing to display the affordance and displaying at least a portion of the respective content includes displaying (14830) an animated transition of the affordance transforming into the portion of the respective content (e.g., a thumbnail of the respective contact or an icon representing the respective content is enlarged and replaced with, or alternatively morphs into an application window including the respective content). FIGS. 8E-8G and 8N, for example, show an animated transition of the affordance transforming into the portion of the respective content 14719-d in FIG. 8N. FIGS. 8E-8G show enlarging the affordance 14701-4 to a size bigger than the respective size of the affordances 14701 shown in FIG. 8B, and FIG. 8N shows the affordance 14701-4-e in FIG. 8G after it has transformed into the portion of the respective content 14711-d.

In some embodiments, ceasing to display the affordance and displaying at least a portion of the respective content includes displaying (14832) an animated transition that includes: enlarging the affordance to a size bigger than the respective size; and displaying an animation of the affordance rotating about an axis parallel to the display to reveal the portion of the respective content that is on a simulated back side of the affordance (e.g., enlarging a thumbnail of a cached snapshot of a website and enlarging and displaying an animation simulating "flipping over" the thumbnail to reveal a web browser window that includes a recently retrieved version of the website). FIGS. 8E-8G, for example, show enlarging the affordance 14701-4 to a size bigger than the respective size of affordances 14701 shown in FIG. 8B. FIGS. 8H-8J, for example, show rotating the affordance 14701-4 about a vertical axis parallel to the display at angles increasingly approaching 90 degrees. FIGS. 8K-8M, for example, show revealing the portion of the respective content 14711 that is on a simulated back side of the affordance 14701-4 at angles increasingly approaching 180 degrees.

In contrast, in situations where the maximum intensity of the contact is below the content-display intensity threshold, in response to detecting (14826) the subsequent decrease in intensity of the contact and in accordance with a determination that a maximum intensity of the contact is (14834) below the content-display intensity threshold, the device increases the size of the affordance to the respective size and forgoes displaying the respective content (e.g., the affordance "springs back" to its original size). In FIG. 8O, the sequence of markers 14706, 14708, 14714 and 14718, corresponds to transitions between the user interfaces shown in FIGS. 8B, 8C and 8O, with the affordance 14701-4 initially decreasing in size (as shown in FIG. 8C) as the intensity of the contact increases, and then (as shown in FIG. 8O) increasing in size back to the respective size (e.g., its original size before the gesture began). Furthermore, the device forgoes displaying the respective content (e.g., content 14711-d in FIG. 8N is not displayed) in response to the subsequent decrease in intensity of the contact 14704 (e.g., from between $IT_L$ and $IT_D$ at T2, represented by marker 14714, to below $IT_L$ at T3, represented by marker 14718), in accordance with the determination that the maximum intensity of the contact 14704, represented by marker 14714, is below the content-display intensity threshold (e.g., $IT_D$).

It should be understood that the particular order in which the operations in FIGS. 9A-9B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 14800 described above with respect to FIGS. 9A-9B. For example, the contacts, gestures, intensity thresholds, focus selectors, animations described above with reference to e method 14800 optionally have one or more of the characteristics of the contacts, gestures, intensity thresholds, focus selectors, animations described herein with reference to other methods described herein (e.g., those listed in the fifth paragraph of the Description of Embodiments). For brevity, these details are not repeated here.

Figure 10:
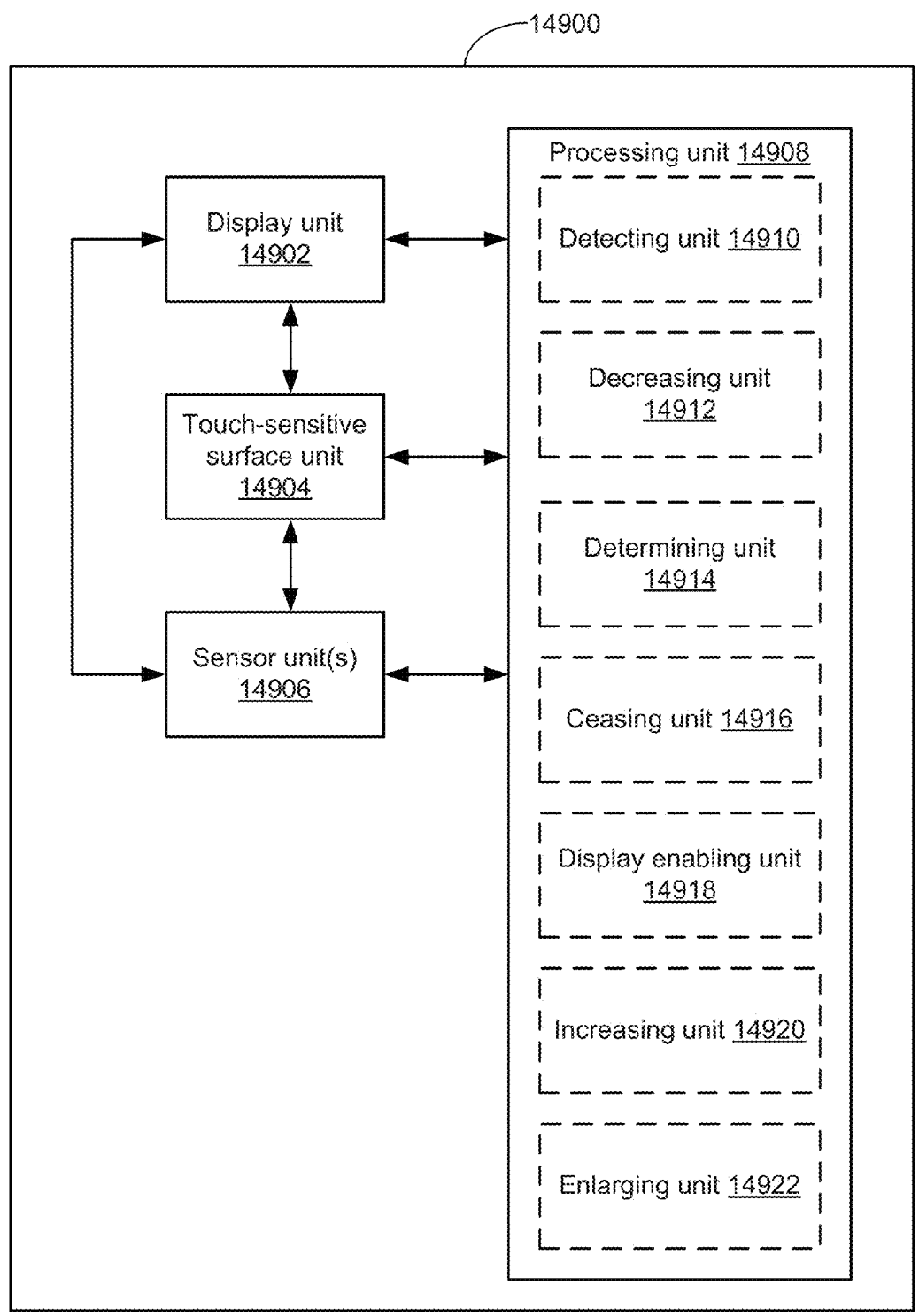
FIG. 10 is a functional block diagram of an electronic device in accordance with some embodiments.

In accordance with some embodiments, FIG. 10 shows a functional block diagram of an electronic device 14900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 14900 includes a display unit 14902 configured to display, on the display, an affordance corresponding to respective content, wherein the affordance is displayed at a respective size, a touch-sensitive surface unit 14904 configured to receive contacts, one or more sensor units 14906 configured to detect intensity of contacts with the touch-sensitive surface unit 14904; and a processing unit 14908 coupled to the display unit 14902, the touch-sensitive surface unit 14904 and the one or more sensor units 14906. In some embodiments, the processing unit 14908 includes a detecting unit 14910, a decreasing unit 14912, a determining unit 14914, a ceasing unit 14916, a display enabling unit 14918, an increasing unit 14920 and an enlarging unit 14922.

The processing unit 14908 is configured to: while a focus selector is over the affordance, detect a gesture that includes an increase in intensity of the contact on the touch-sensitive surface unit 14904 followed by a subsequent decrease in intensity of the contact on the touch-sensitive surface unit 14904 (e.g., with the detecting unit 14910); in response to detecting the increase in intensity of the contact (e.g., with the detecting unit 14910), decrease a size of the affordance below the respective size (e.g., with the decreasing unit 14912); and in response to detecting the subsequent decrease in intensity of the contact (e.g., with the detecting unit 14910): in accordance with a determination that a maximum intensity of the contact is above a content-display intensity threshold (e.g., with the determining unit 14914), cease to display the affordance (e.g., with the ceasing unit 14916) and enable display of at least a portion of the respective content (e.g., with the display enabling unit 14918); and in accordance with a determination that a maximum intensity of the contact is below the content-display intensity threshold (e.g., with the determining unit 14914), increase the size of the affordance to the respective size (e.g., with the increasing unit 14920) and forgo displaying the respective content (e.g., with the display enabling unit 14918).

In some embodiments, detecting the subsequent decrease in intensity of the contact (e.g., with the detecting unit 14910) includes detecting liftoff of the contact from the touch-sensitive surface unit 14904 (e.g., with the detecting unit 14910).

In some embodiments, detecting the subsequent decrease in intensity of the contact (e.g., with the detecting unit 14910) includes detecting a reduction in intensity of the contact below a respective intensity threshold while continuing to detect the contact on the touch-sensitive surface unit 14904 (e.g., with the detecting unit 14910).

In some embodiments, ceasing to display the affordance (e.g., with the ceasing unit 14916) and enabling display of at least a portion of the respective content (e.g., with the display enabling unit 14918) includes enabling display of an animated transition of the affordance transforming into the portion of the respective content (e.g., with the display enabling unit 14918).

In some embodiments, ceasing to display the affordance and displaying at least a portion of the respective content includes displaying an animated transition that includes enlarging the affordance to a size bigger than the respective size (e.g., with the enlarging unit 14922); and enabling display of an animation of the affordance rotating about an axis parallel to the display unit to reveal the portion of the respective content that is on a simulated back side of the affordance (e.g., with the display enabling unit 14918).

In some embodiments, the affordance is a thumbnail image that includes a reduced scale representation of the respective content.

In some embodiments, the affordance is displayed in an array of affordances (e.g., with the display enabling unit 14918).

In some embodiments, the affordance is an application icon corresponding to a respective application, and the respective content is a newly initialized application window associated with the application.

In some embodiments, the affordance is a document icon corresponding to an electronic document, and the respective content is the electronic document.

In some embodiments, the affordance is a representation of a cached version of a webpage, and the respective content is the webpage.

In some embodiments, the affordance is a thumbnail of a photo, and the respective content is the photo.

In some embodiments, the affordance is a thumbnail of a video, and the content is the video or a frame of the video.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B are, optionally, implemented by components depicted in FIGS. 1A-1B or FIG. 10. For example, displaying operation 14802, detecting operation 14818 and determining operations 14828 and 14834 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Previewing Media Content

Many electronic devices include a media player application for playing media items in a media library and accessing media stores for acquiring media items. In some methods, a media player application can include a preview capability for media items in a media store. However, in these methods, the preview capability includes only playing and stopping the preview. The embodiments described below improve on the these methods. In a media player application, a respective media item is associated with a respective media player control apart from a set of primary or master media player controls. In response to an input that includes an increase in the intensity of a contact, a determination is made as to whether to advance through the media item in accordance with the intensity of the contact. Advancement through the media item includes playback or fast forwarding. Thus, a preview for a media item can be controlled individually, and more control options are available to the user.

FIGS. 11A-11T illustrate exemplary user interfaces for previewing media content in accordance with some embodiments. The user interfaces in these figures are used to illustrate the processes described below, including the processes in FIGS. 12A-12E. FIGS. 11A-11T include intensity diagrams that show the current intensity of the contact on the touch-sensitive surface relative to a plurality of intensity thresholds including a deep press intensity threshold (e.g., "$IT_D$") and a light press intensity threshold (e.g., "$IT_L$"). In some embodiments, operations similar to those described below with reference to "$IT_D$" are performed with reference to a different intensity threshold (e.g., "$IT_L$").

In some embodiments, the device is an electronic device with a separate display (e.g., display 450) and a separate touch-sensitive surface (e.g., touch-sensitive surface 451). In some embodiments, the device is portable multifunction device 100, the display is touch-sensitive display system 112, and the touch-sensitive surface includes tactile output generators 167 on the display (FIG. 1A). For convenience of explanation, the embodiments described with reference to FIGS. 11A-11T and FIGS. 12A-12E will be discussed with reference to display 450 and a separate touch-sensitive surface 451, however analogous operations are, optionally, performed on a device with a touch-sensitive display system 112 in response to detecting the contacts described in FIGS. 11A-11T on the touch-sensitive display system 112 while displaying the user interfaces shown in FIGS. 11A-11T on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 16536.

FIG. 11A illustrates user interface 16502 for a media player application displayed on display 450. User interface 16502 may be used to access a media library and/or a media store. The media library includes media items (e.g., music, videos, podcasts, etc.) owned by a user of the device, that are stored locally at the device and/or in remote (e.g., in the cloud) storage space associated with the device or a user of the device. The media store is accessed to acquire (e.g., purchase) media items for addition to the media library. For example, user interface 16502 includes one or more links 16516 to the media library (e.g., links to media items in the media library by category) and link 16518 to a media store. Link selection indicator 16520 indicates that link 16518 is selected; the media player application is currently accessing the media store.

User interface 16502 includes area 16522 for displaying information associated with media items, such as an album of one or more media items or media items in the media library. For example, in FIG. 11A, area 16522 includes album information 16524, which includes information identifying a currently displayed album, the artist(s) associated with the currently displayed album, and optionally, graphics associated with the currently displayed album (e.g., album art). For example, album information 16524 indicates that the currently displayed album is "Album 1" by "Artist 1." Area 16522 also includes a list of media items 16526 (or respective representations of media items 16526) in the currently displayed album. A representation of a media item 16526 is, for example, an icon, an item or entry in a list, etc. For a respective media item 16526, track number 16528, item name or title 16530, and library status 16532 are displayed. For example, media item 16526-1 is titled "Song 1," is track number 1 in "Album 1," and is in the media library (indicated by the "In Library" label). If a media item is not in the media library (e.g., media item 16526-2), its library status 16532 includes purchase icon or button 16534 that, when activated, activates a process acquiring (e.g., by purchase) the media item from the media store to add to the media library, at which point purchase icon 16534 is no longer displayed for that media item.

Media items 16526 displayed in area 16522 include media items that are in the media library (whether locally or remotely stored), media items that are not in the media library (and therefore remotely stored at storage space associated with the media store) and have yet to be acquired for addition to the media library, or a combination of the above. For example, media items 16526 as shown in FIG. 11A include media items 16526-1 and 16526-3 that are in the media library, and media items 16526-2, 16526-4, and 16526-5 that are not in the media library.

As described above, the media library includes media items that are stored locally at the device and/or in remote storage space associated with the device. For example, "Song 1" media item 16526 is locally stored (at the device) and "Song 3" 16526-3 is remotely stored at remote storage associated with the device. On the other hand, media items that have not been acquired for the device yet are remotely stored at remote (with respect to the device) storage associated with the media store. For example, media items 16526-2, 16526-4, and 16526-5 are remotely stored at remote storage associated with the media store.

In some embodiments, additional icons or other visual indications are displayed to indicate, for each respective media item 16526, whether the respective media item 16526 is locally stored or remotely stored.

User interface 16502 includes one or more media player controls for controlling playback of media items (e.g., the media items in the media library). The media player controls include, for example, a rewind control (e.g., rewind button 16510), a play/pause control (e.g., play/pause button 16512), a fast forward control (e.g., fast forward button 16514). In some embodiments, media player controls 16510, 16512, and 16514 are the primary or master media player controls for the media player application. For convenience, media player controls 16510, 16512, and 16514 are hereinafter collectively referred to as the "primary media player controls." User interface 16502 also includes volume control 16504 for controlling the playback volume.

User interface 16502 further includes information display 16506 indicating a media item that is currently associated with the primary media player controls, and scrubber 16508 for indicating the playback progress or current location in the media item currently associated with the primary media controls and for scrubbing the media item currently associated with the primary media controls. In FIG. 11A, information display 16506 indicates that "Song 1" (e.g., media item 16526-1), by "Artist 1," in "Album 1" is the media item currently associated with the primary media player controls. A media item in the media library can become associated with the primary media player controls A focus selector (e.g., cursor 16536) is displayed on display 450. In some embodiments, cursor 16536 is a pointer (e.g., a mouse pointer). In FIG. 11A, cursor 16536 is located over play/pause button 16512.

In FIG. 11A, playback of "Song 1" is stopped or paused. While playback of "Song 1" is stopped and while cursor 16536 is located over play/pause button 16512, an input that includes contact 16538 is detected on touch-sensitive surface 451 (e.g., a gesture or a press input including an increase in intensity of contact 16538 from an intensity below $IT_L$ to an intensity above $IT_L$). In FIG. 11A, contact 16538 has a maximum intensity between intensity thresholds $IT_L$ and $IT_D$. In response to detection of the press input performed with contact 16538, play/pause button 16512 is activated. In response to activation of play/pause button 16512, "Song 1" (e.g., media item 16526-1) is played back (e.g., starting from where playback last left off), as shown in FIG. 11B.

Figure 11C:
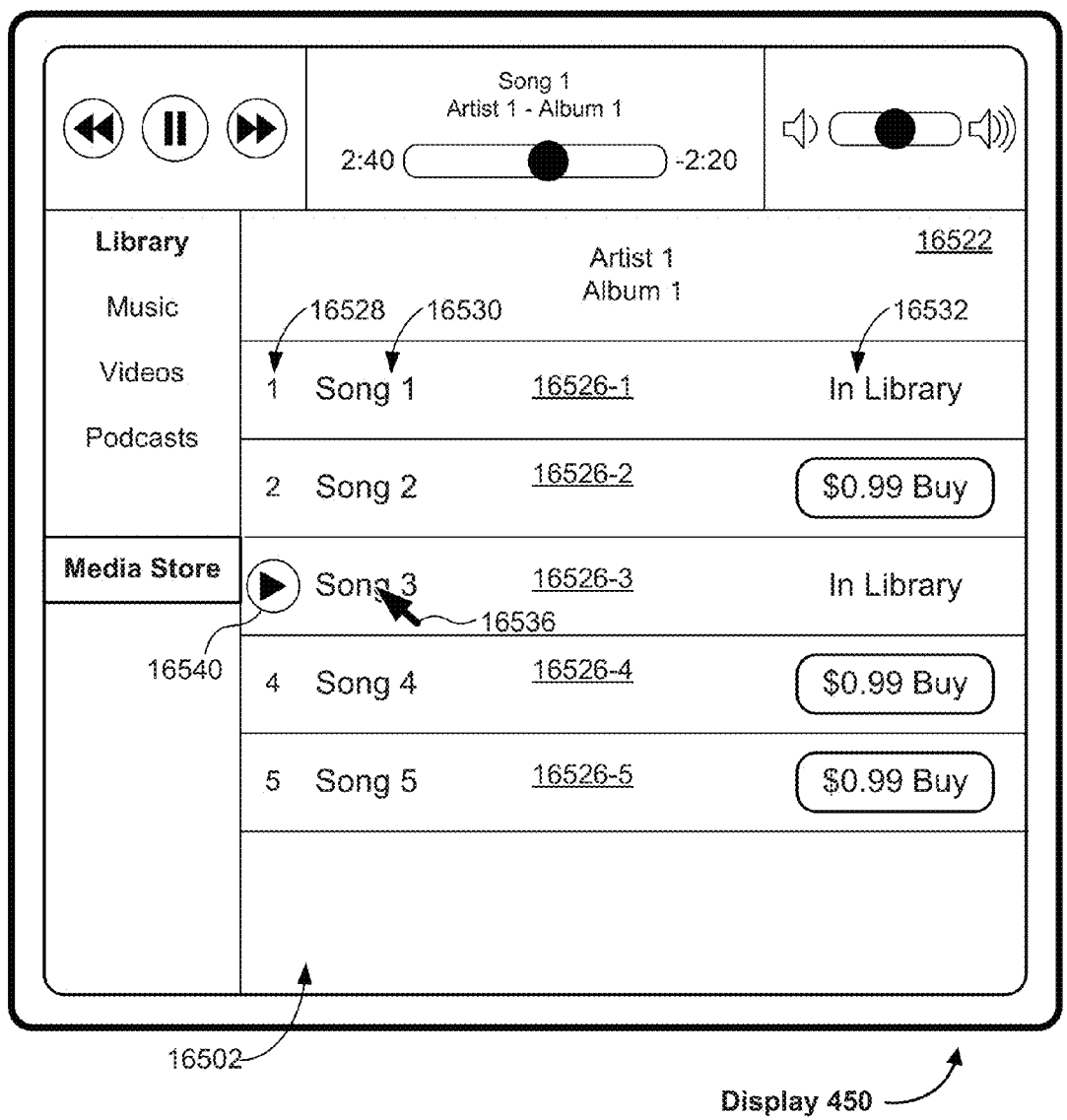
Figure 11C:
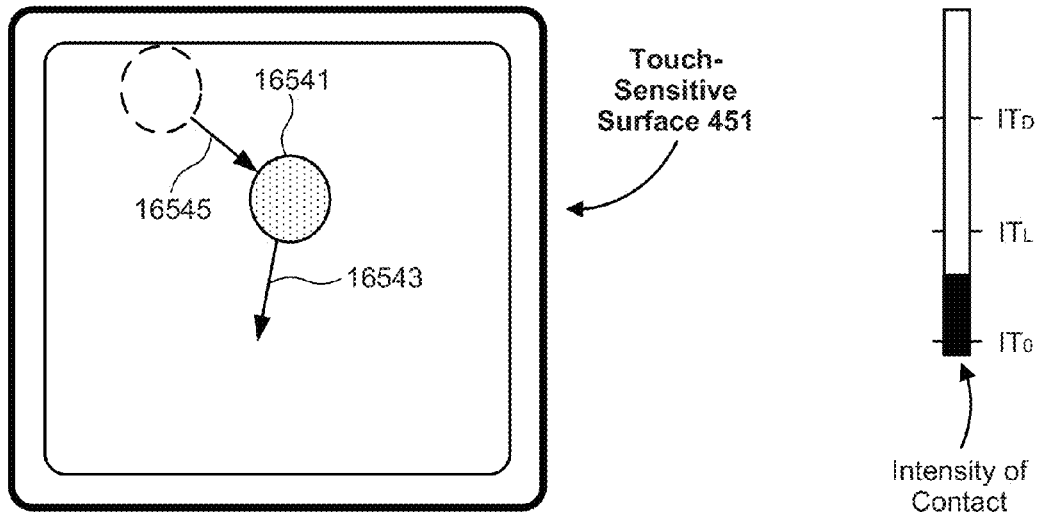

FIG. 11C illustrates cursor 16536 located over media item "Song 3" 16526-3. Cursor 16536 was moved over media item 16526-3 in response to detection of an input performed with contact 16541 (e.g., movement 16545 of contact 16541). In response to detection of the movement of cursor 16536 over media item 16526-3, preview control 16540 associated with media item 16526-3 is displayed in place of the track number 16528 for media item 16526-3. In some embodiments, preview control 16540 is a single button that controls multiple media playback operations including, for example, playback and fast forwarding. In some embodiments, whether preview control 16540 controls playback or fast forwarding is based on the intensity of a contact in an input activating preview control 16540 (e.g., an input detected while cursor 16536 is located over preview control 16540).

Figure 11D:
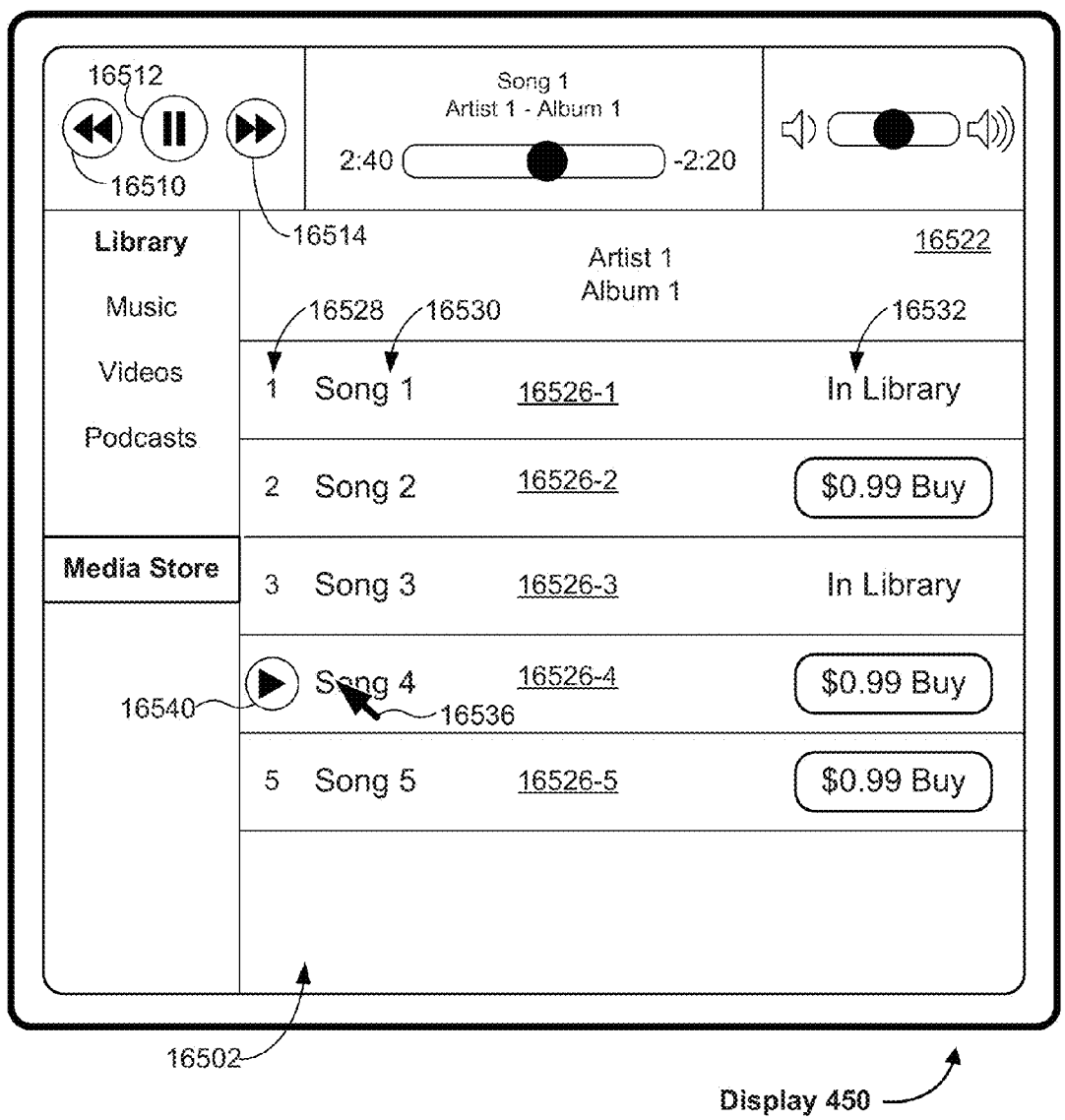
Figure 11D:
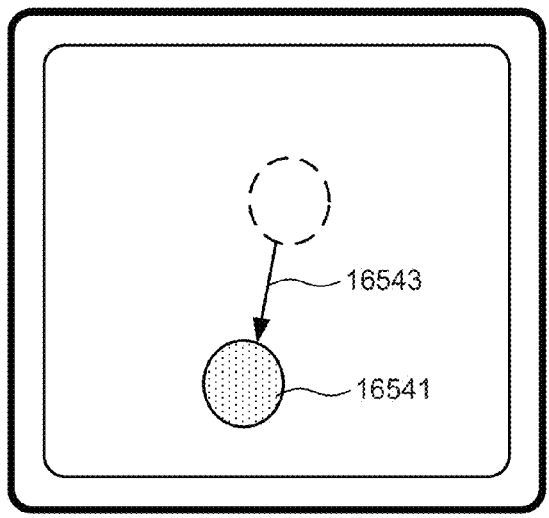

In FIGS. 11C-11D, an input that includes contact 16541 and movement 16543 of contact 16541 is detected on touch-sensitive surface 451. Contact 16541 has an intensity between thresholds $IT_0$ and $IT_L$. In response to detection of the movement 16543 of contact 16541, cursor 16536 is moved over media item 16526-4, as shown in FIG. 11D. In response to detection of movement of cursor 16536 over media item 16526-4, preview control 16540 associated with media item 16526-4 is displayed in place of the track number 16528 corresponding to media item 16526-4. For media item 16526-3, the associated preview control 16540 ceases to be displayed and the corresponding track number 16528 is again displayed.

Figure 11E:
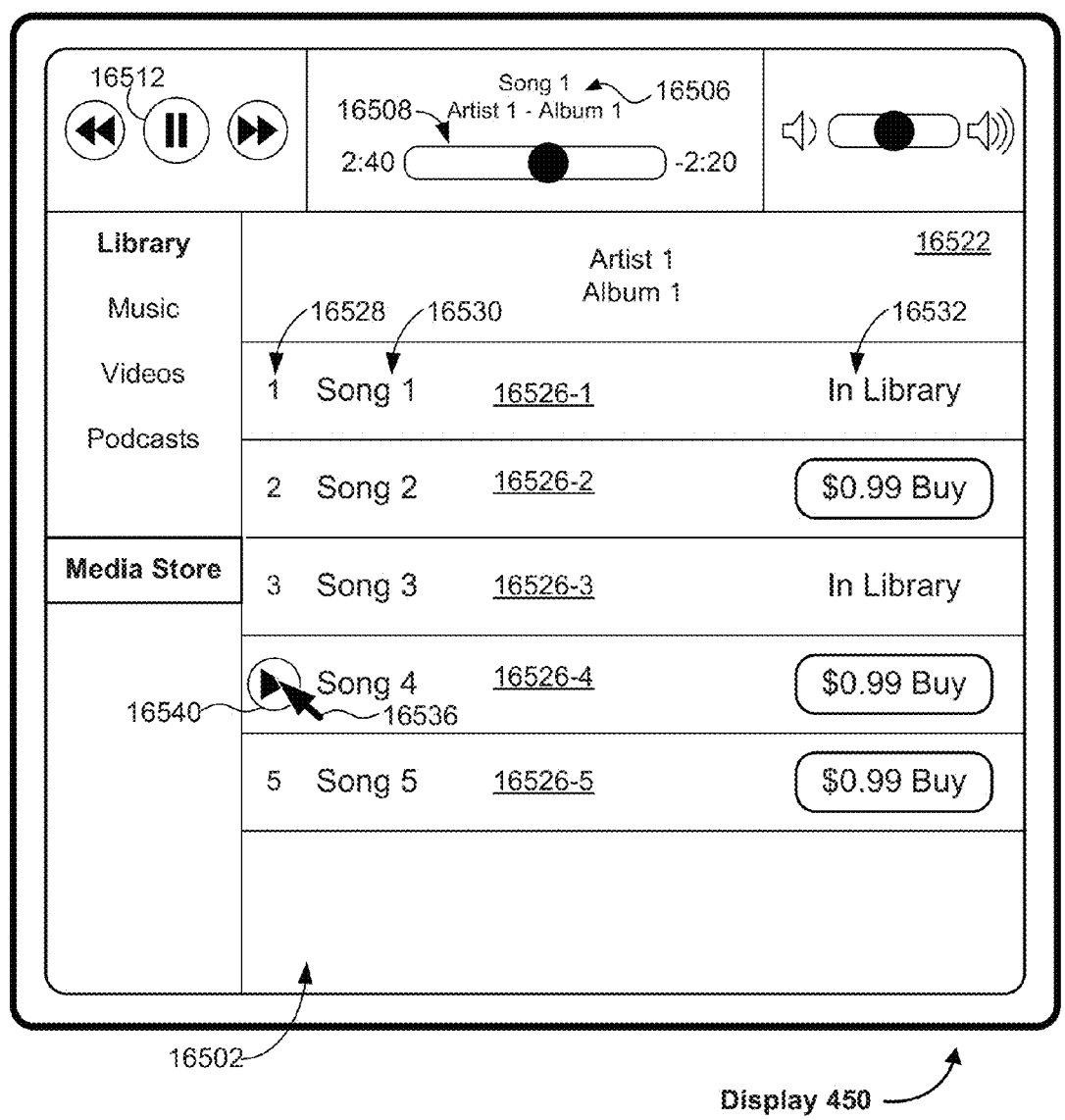
Figure 11E:
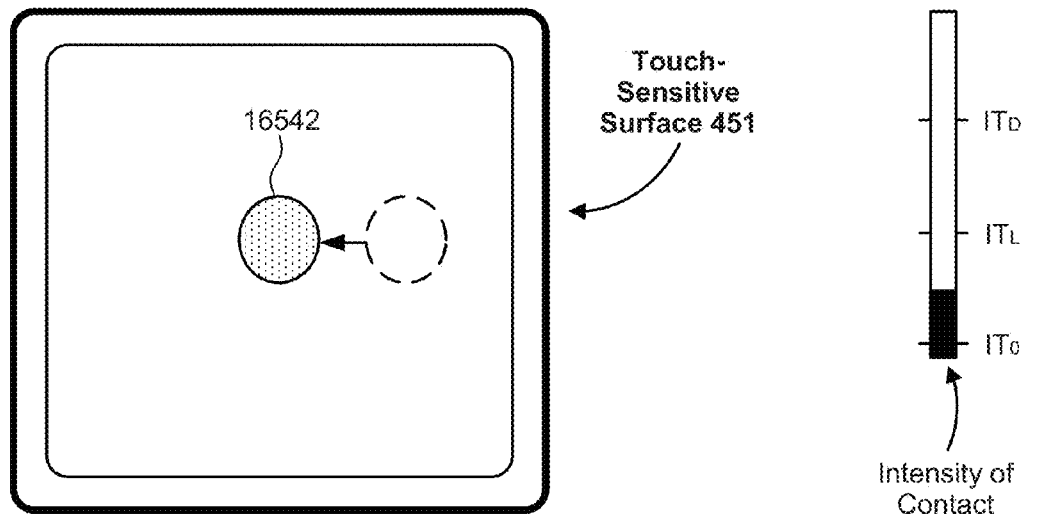

After preview control 16540 associated with media item 16526-4 is displayed, cursor 16536 is moved to a location over preview control 16540 associated with media item 16526-4, as shown in FIG. 11E, in response to an input performed with contact 16542 (e.g., the movement of contact 16542 shown in FIG. 11E). While cursor 16536 is located over preview control 16540 associated with media item 16526-4, an input (e.g., a press input, a gesture) that includes contact 16542 and an increase in the intensity of contact 16542 (e.g., from an intensity below $IT_L$ in FIG. 11E to an intensity above $IT_D$ in FIG. 11G) is detected on touch-sensitive surface 451. In response to detecting the input, the device determines whether to activate preview control 16540 associated with "Song 4" and advance through "Song 4" (e.g., media item 16526-4) in accordance with the intensity of contact 16542, in FIG. 11G.

Figure 11F:
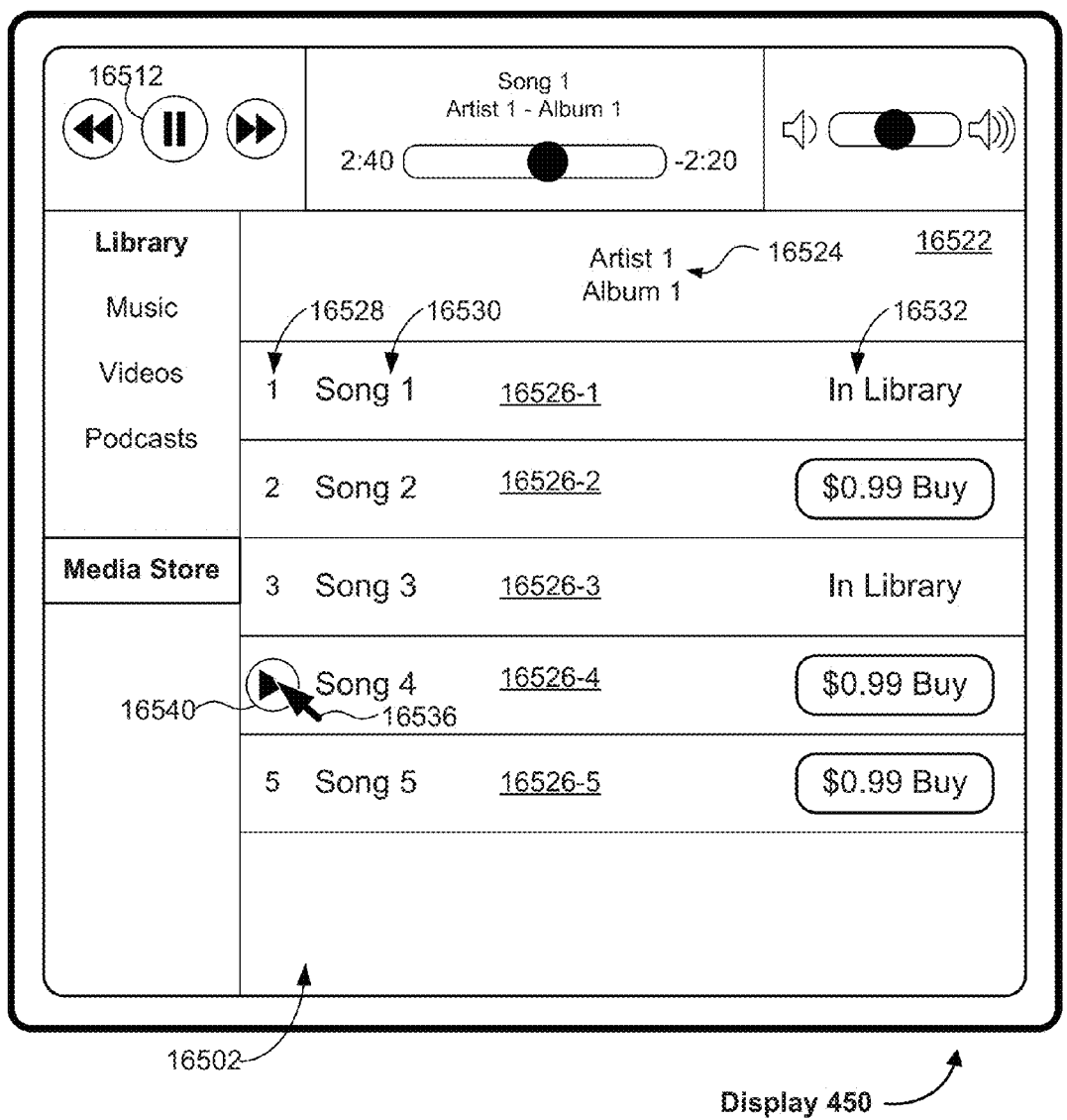
Figure 11F:
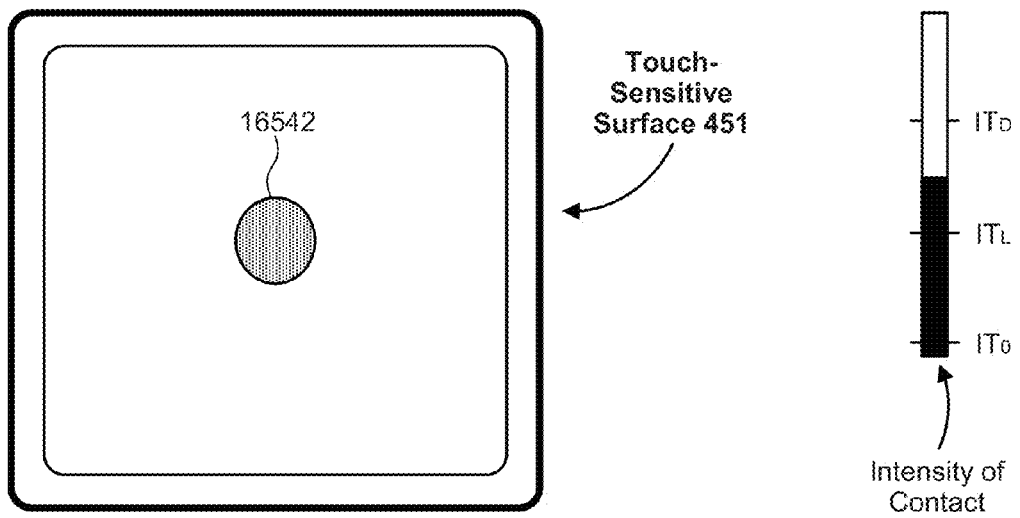

In some embodiments, determining whether to advance through "Song 4" includes determining whether the intensity of contact 16542 is above a deep press intensity threshold (e.g., $IT_D$). In accordance with a determination that the intensity of contact 16542 is below the deep press intensity threshold (e.g., $IT_D$), the device forgoes advancing through "Song 4," and preview control 16540 associated with "Song 4" is not activated. For example, while the intensity of contact 16542 is still below threshold $IT_D$ in FIGS. 11E and 11F, preview control 16540 associated with "Song 4" is not activated, and "Song 4" is not advanced through, as shown in FIGS. 11E-11F. In accordance with a determination that the intensity of contact 16542 is above the deep press intensity threshold (e.g., the intensity of contact 16542 has increased from an intensity below $IT_D$ to an intensity above $IT_D$), as shown in FIG. 11G, preview control 16540 associated with "Song 4" is activated, and the device advances through "Song 4" in accordance with the intensity of contact 16542, as shown in FIG. 11G, for example.

Figure 11G:
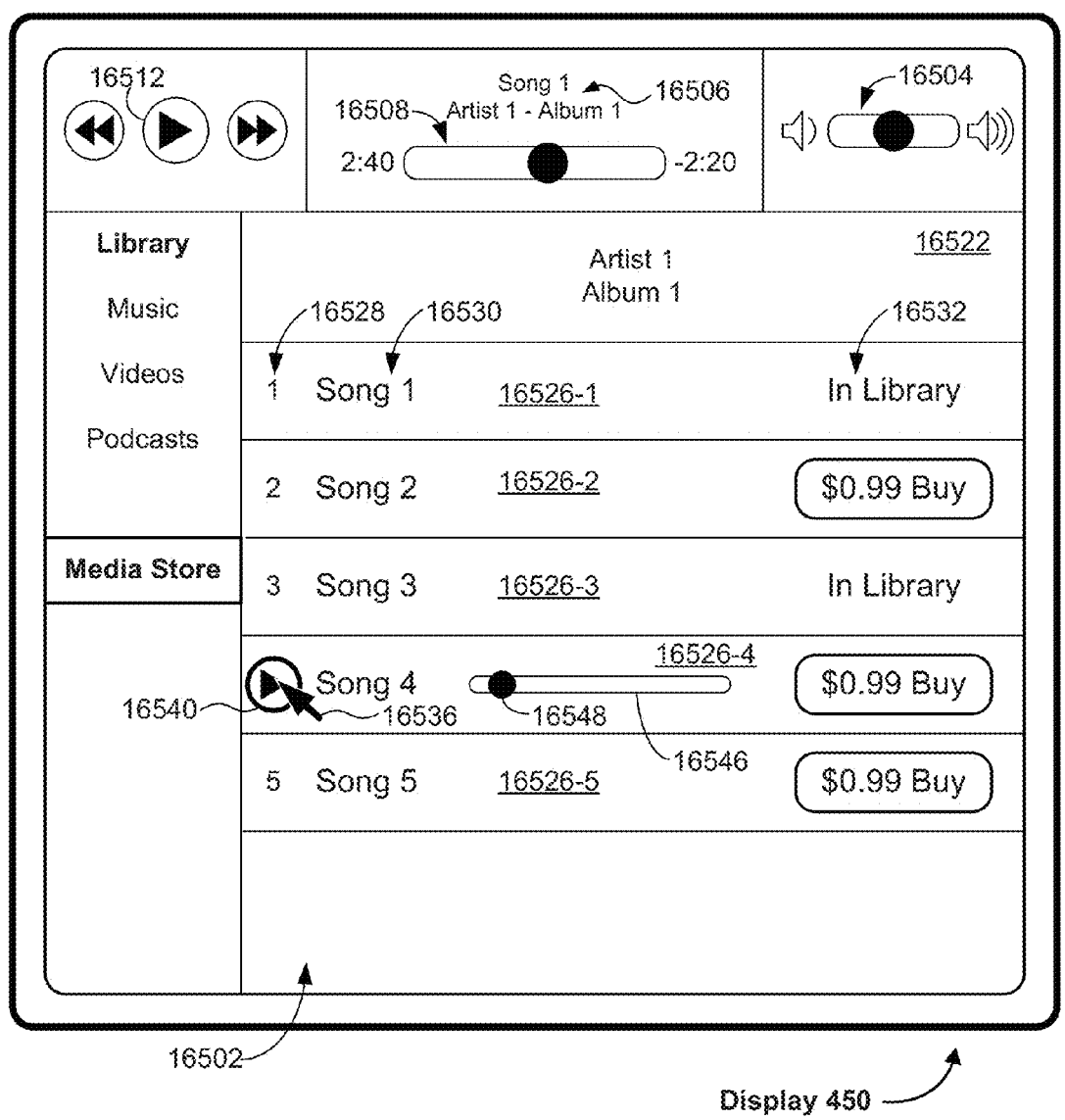
Figure 11G:
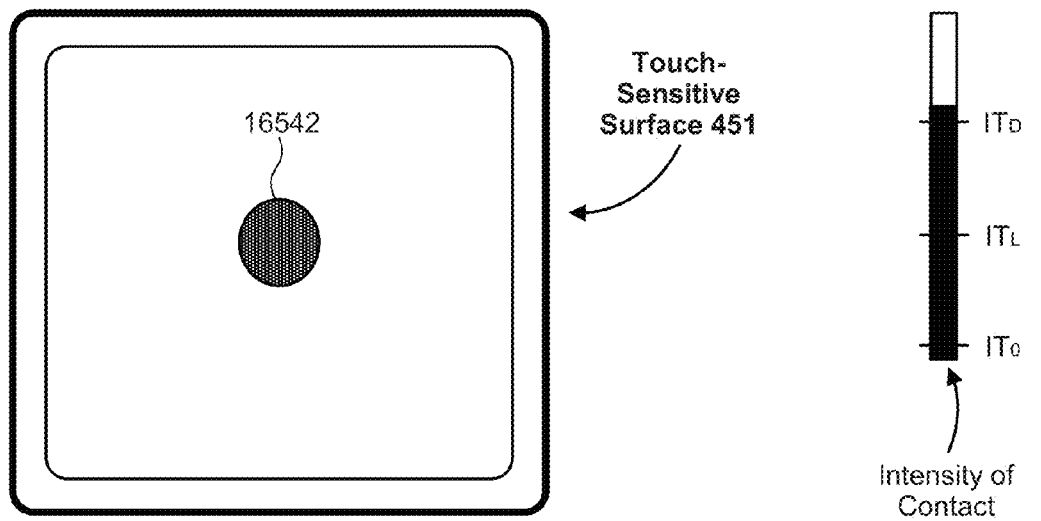

In some embodiments, advancing through "Song 4" in accordance with the intensity of contact 16542 includes playing "Song 4" at normal, reduced, or accelerated playback speed, as shown in FIG. 11G. In some embodiments, a preview portion of "Song 4" is advanced through, rather than the entire "Song 4." The preview portion is, for example, a predefined time amount (e.g., 30, 60, or 90 seconds) or a predefined fraction (e.g., a half, a third, etc.) of "Song 4." While the device is advancing through "Song 4," preview scrubber 16546 and thumb 16548, or some other visual indicator of playback/scrubbing progress, is optionally displayed for "Song 4." In FIG. 11G, while "Song 4" is being previewed, information indicator 16506 and scrubber 16508 still indicates that "Song 1" is associated with the primary media player controls; "Song 4" is not associated with the primary media player controls in response to detection of the input performed with contact 16542.

In some embodiments, if a media item associated with the primary media player controls is being played back (e.g., in response to activation of play/pause button 16512, as in FIGS. 11A-11B) when the input performed with contact 16542 is detected, playback of the media item associated with the primary media player controls is interrupted by advancement through "Song 4" in accordance with the intensity of contact 16542. For example, in FIGS. 11E-11F, "Song 1," which is associated with the primary media player controls, is being played back when the input performed with contact 16542 is detected on touch-sensitive surface 451. In response to detection of the input performed with contact 16542, playback of "Song 1" is stopped and "Song 4" is advanced through in accordance with the intensity of contact 16542, in FIG. 11G.

Figure 11H:
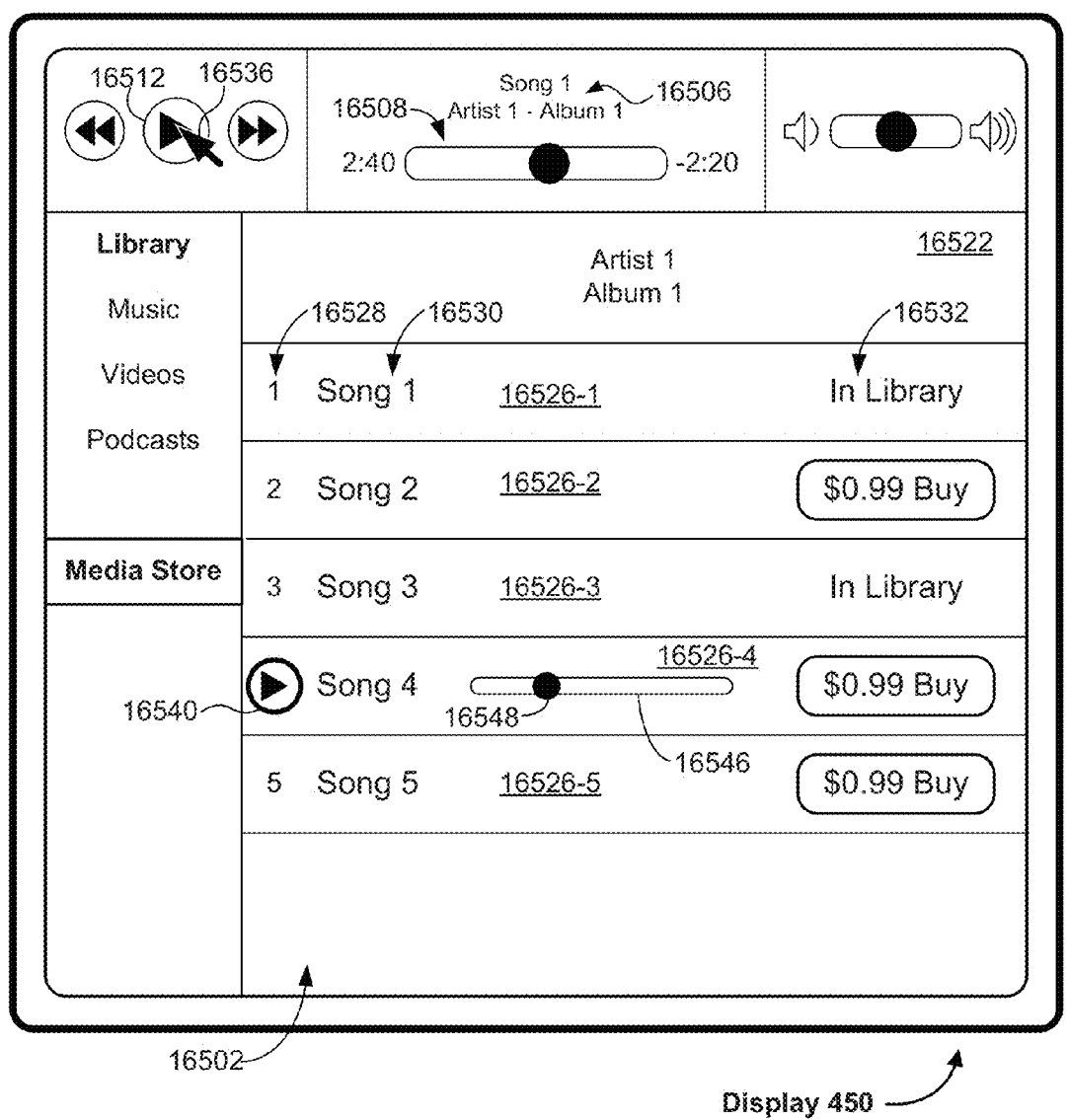
Figure 11H:
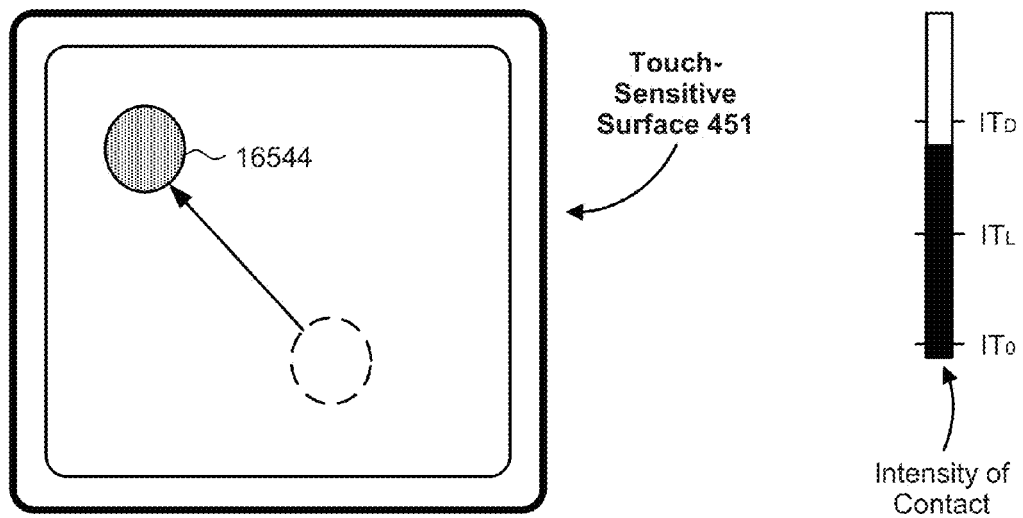
Figure 11I:
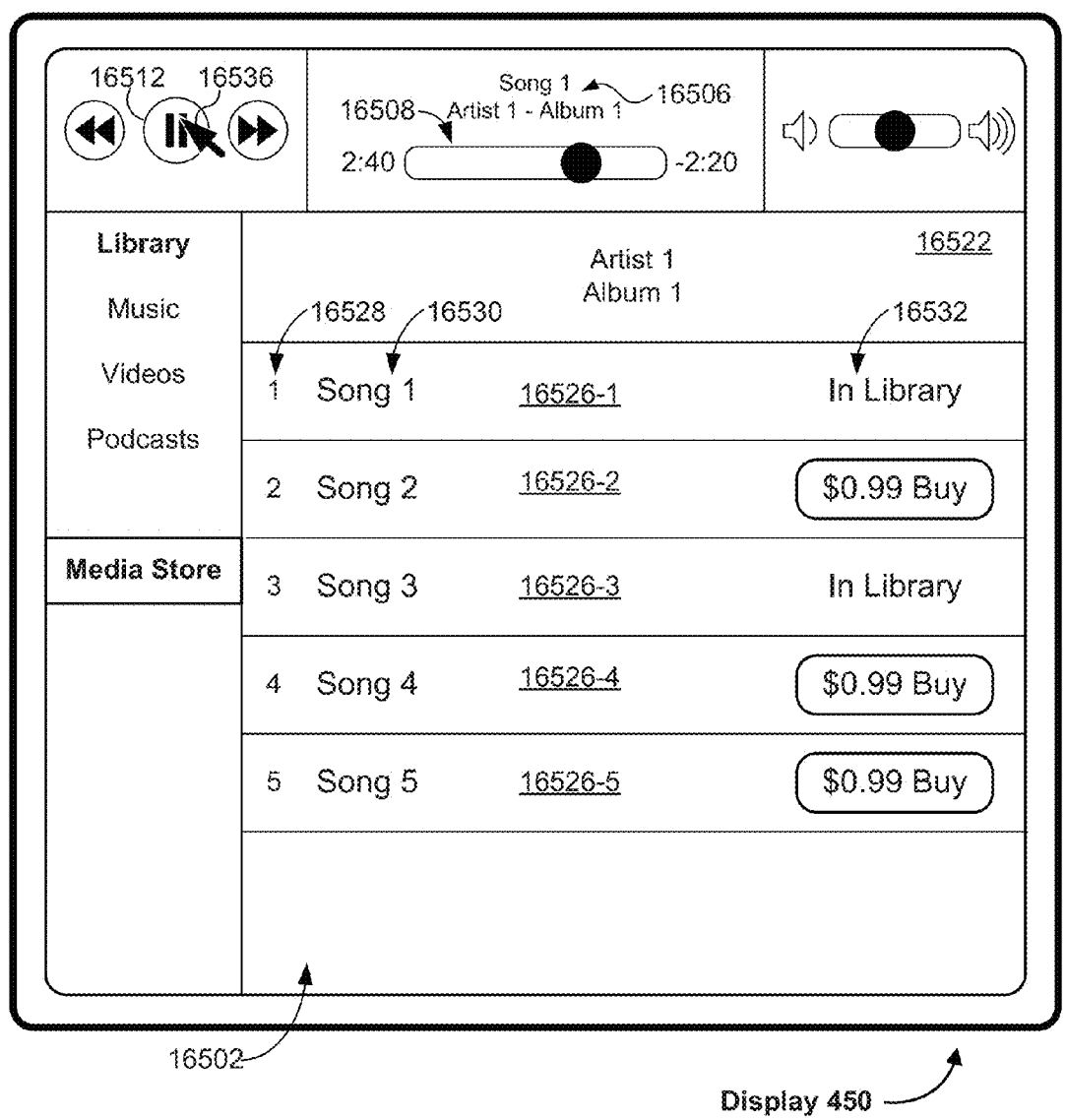
Figure 11I:
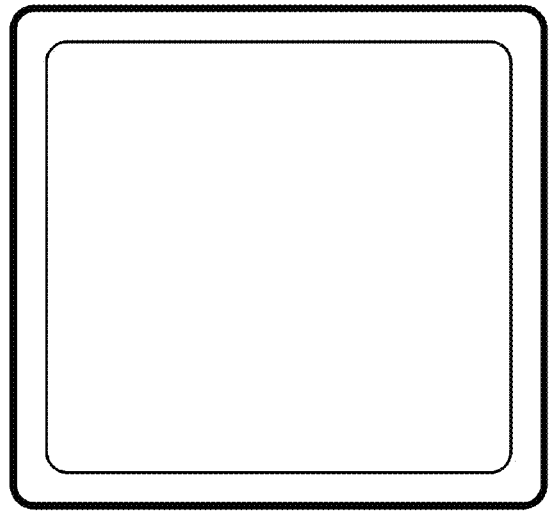

While playback of "Song 1" is stopped and "Song 4" is being advanced through in accordance with the intensity of contact 16542, cursor 16536 is, optionally, moved over play/pause button 16512 in accordance with an input performed with contact 16544 (e.g., movement of contact 16544 shown in FIG. 11H). While cursor 16536 is located over play/pause button 16512, an input (e.g., a gesture, a press input) that includes contact 16544 is detected on touch-sensitive surface 451, as shown in FIG. 11H (e.g., an increase in intensity of contact 16544 from an intensity below $IT_L$ to an intensity above $IT_L$). In response to detection of the input performed with contact 16544, play/pause button 16512 is activated. In response to activation of play/pause button 16512, advancement through "Song 4" is stopped and playback of "Song 1" is resumed, as shown in FIG. 11I.

Figure 11J:
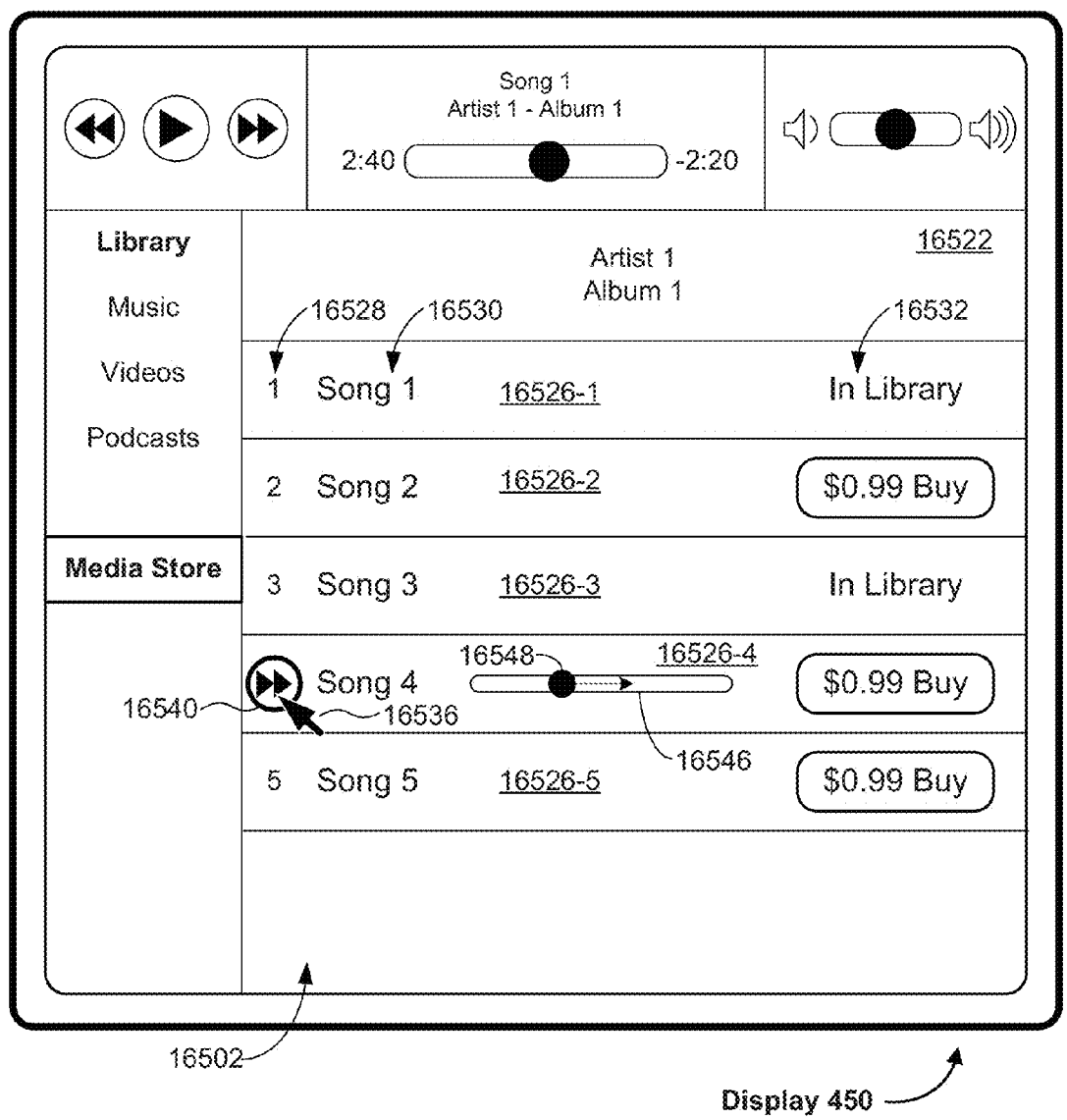
Figure 11J:
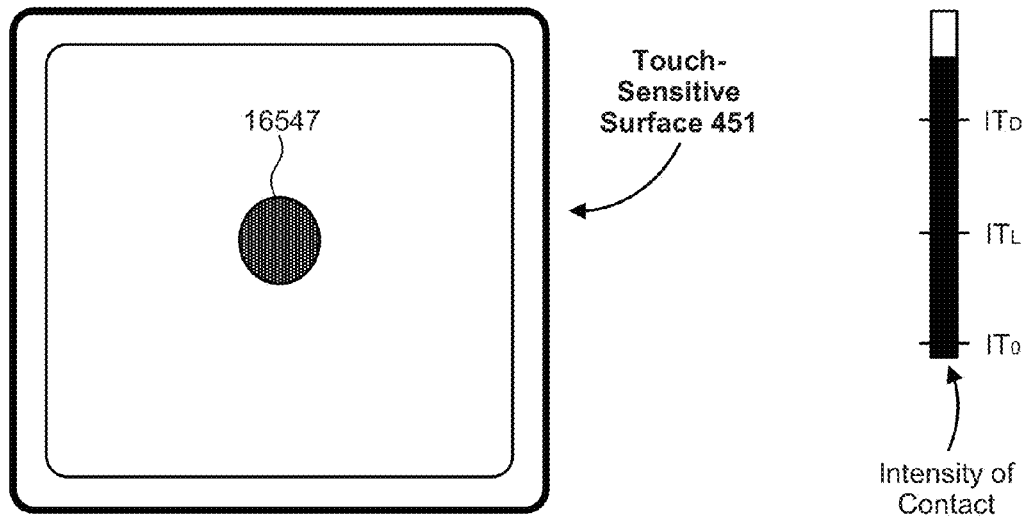

In some embodiments, advancing through "Song 4" in accordance with the intensity of the contact (e.g., contact 16542) includes advancing through (e.g., scrubbing through) "Song 4" at a rate that corresponds to the intensity of the contact, with or without concurrently playing "Song 4." For example, FIG. 11J shows an input that includes contact 16547, which is analogous to contact 16542, detected on touch-sensitive surface 451. An increase in the intensity of contact 16547 from an intensity below the deep press intensity threshold (e.g., "$IT_D$") to an intensity above the deep press intensity threshold (e.g., "$IT_D$") is detected. In response to detection of the input, "Song 4" is advanced through in accordance with the intensity of contact 16547; thumb 16548 moves along scrubber 16546 in the direction of the advancement as "Song 4" is advanced through. In FIG. 11J, "Song 1" remains associated with the primary media player controls but is not currently playing. In FIG. 11J, the rate of advancing (e.g., scrubbing through "Song 4" or a preview of "Song 4") is based on the intensity of contact 16547. For example, a higher intensity of contact 16547, yields a faster advancement speed (and faster movement of thumb 16548 along scrubber 16546) than the lower intensity of contact 16542 in FIG. 11G.

Figure 11K:
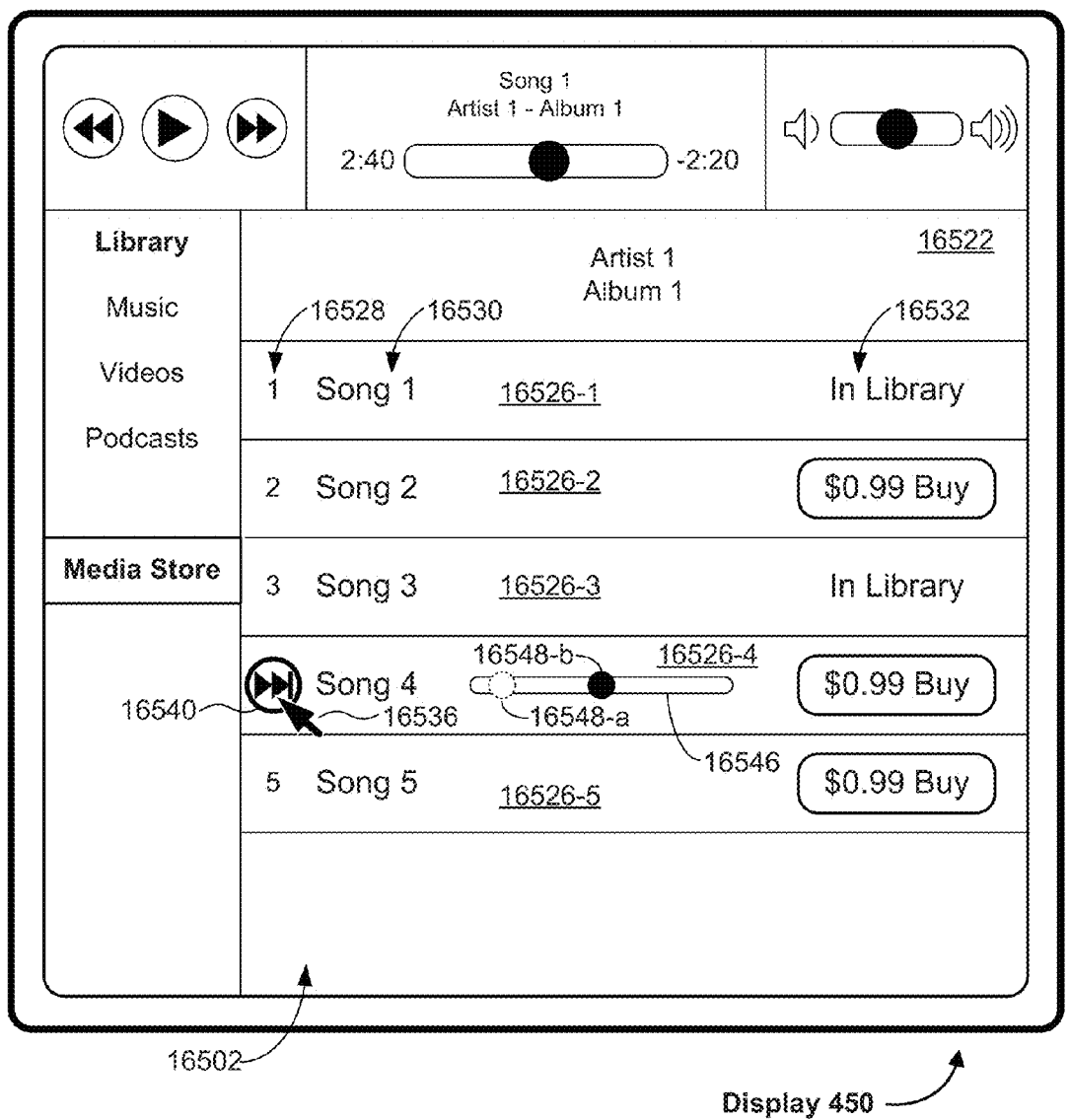
Figure 11K:
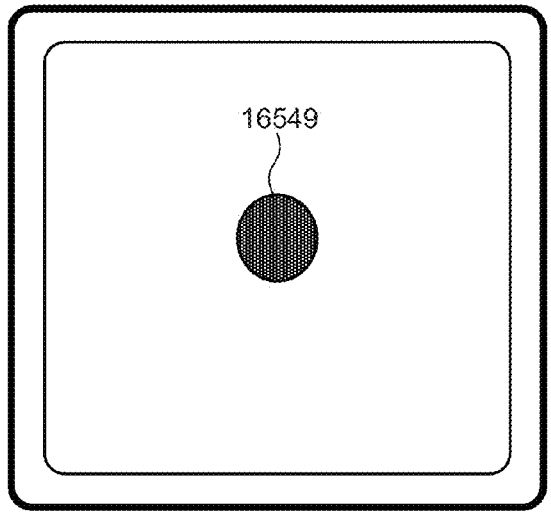
Figure 11K:
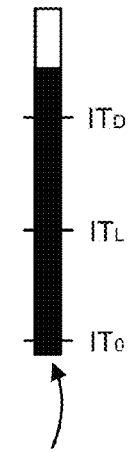

In some embodiments, advancing through "Song 4" in accordance with the intensity of the contact (e.g., contact 16542) includes advancing through "Song 4" to a position in "Song 4" that corresponds to the intensity of the contact. For example, FIG. 11K shows an input that includes contact 16549, which is analogous to contact 16542, detected on touch-sensitive surface 451. An increase in the intensity of contact 16549 from an intensity below the deep press intensity threshold (e.g., "$IT_D$") to an intensity above the deep press intensity threshold (e.g., $IT_D$) is detected. In response to detection of the input, "Song 4" is advanced through to another position in accordance with the intensity of contact 16549; thumb 16548 jumps from position 16548-a to position 16548-b along scrubber 16546, where position 16548-a along scrubber 16546 corresponds to the intensity of contact 16542 in FIG. 11G and position 16548-b along scrubber 16546 corresponds to the intensity of contact 16549 in FIG. 11K. "Song 1" remains associated with the primary media player controls. The destination position in "Song 4" is based on the intensity of contact 16549. For example, a higher intensity of contact 16549 yields a destination position in "Song 4" that is deeper into "Song 4" (e.g., closer to the end and further away from the beginning) than the lower intensity of contact 16542 in FIG. 11G.

Figure 11L:
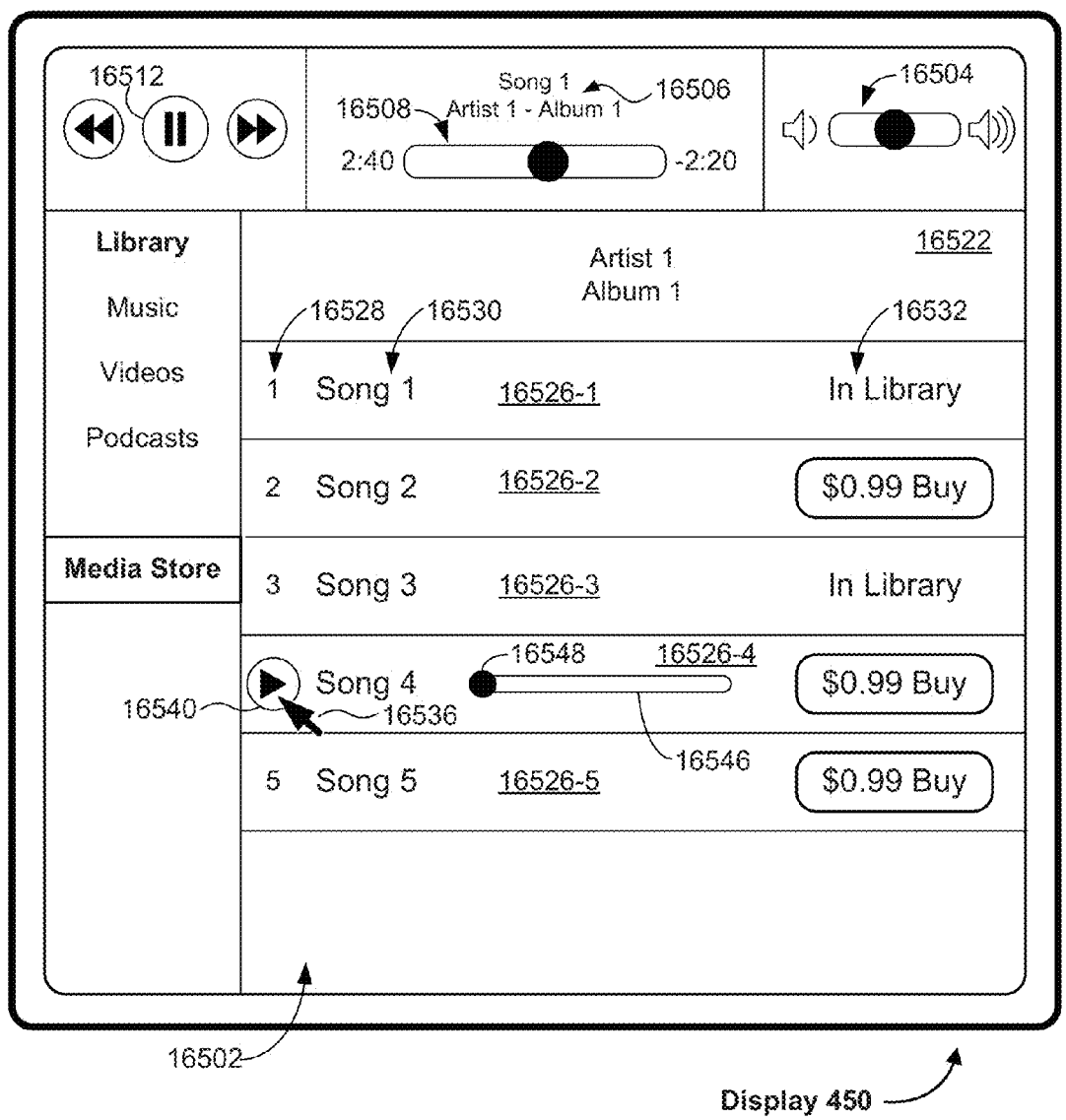
Figure 11L:
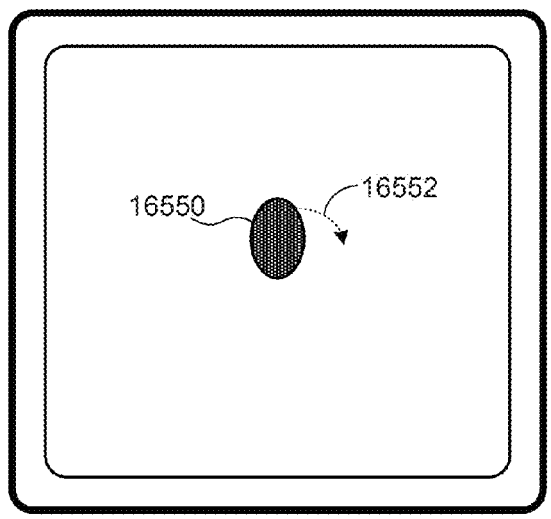
Figure 11M:
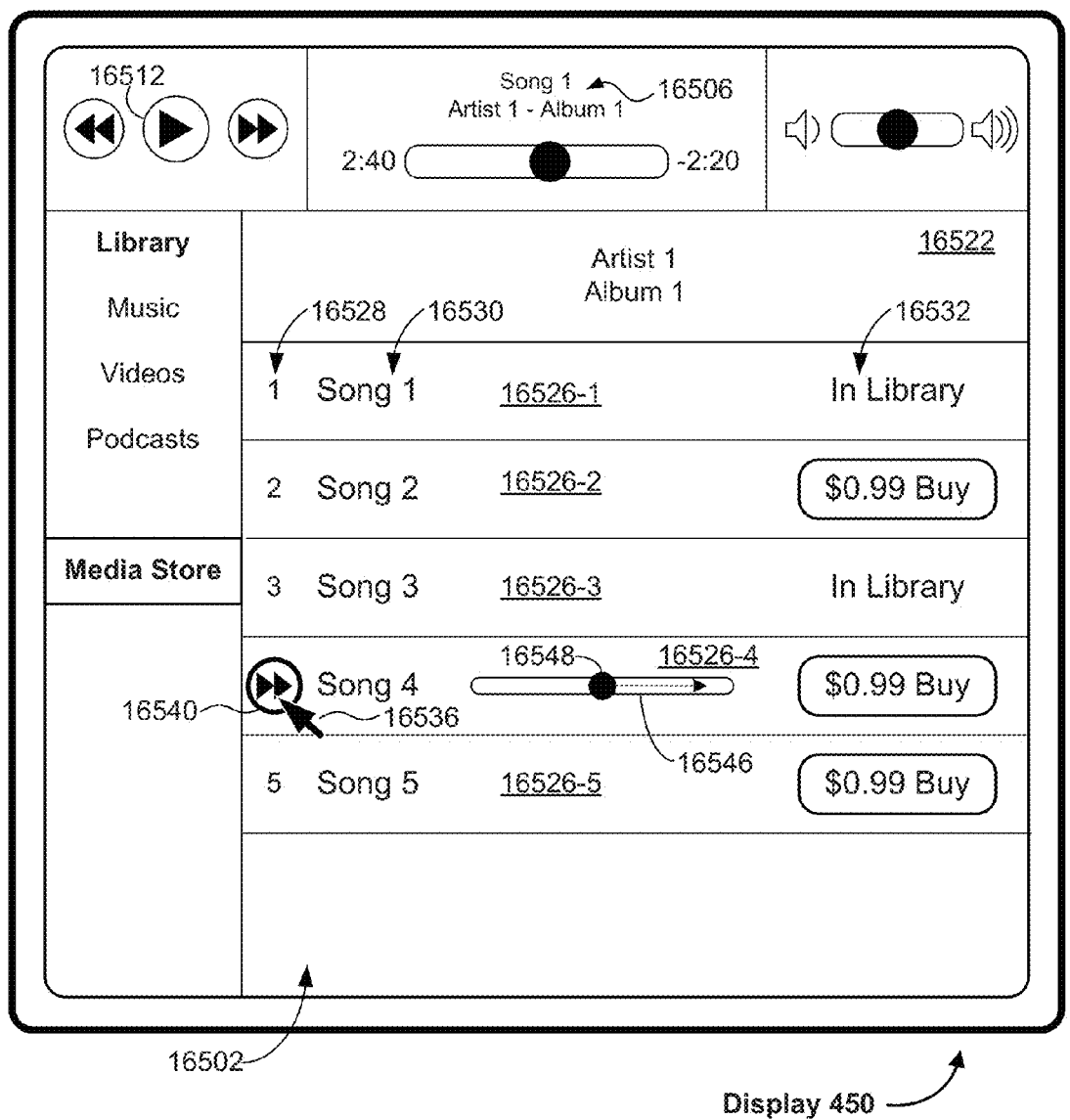
Figure 11M:
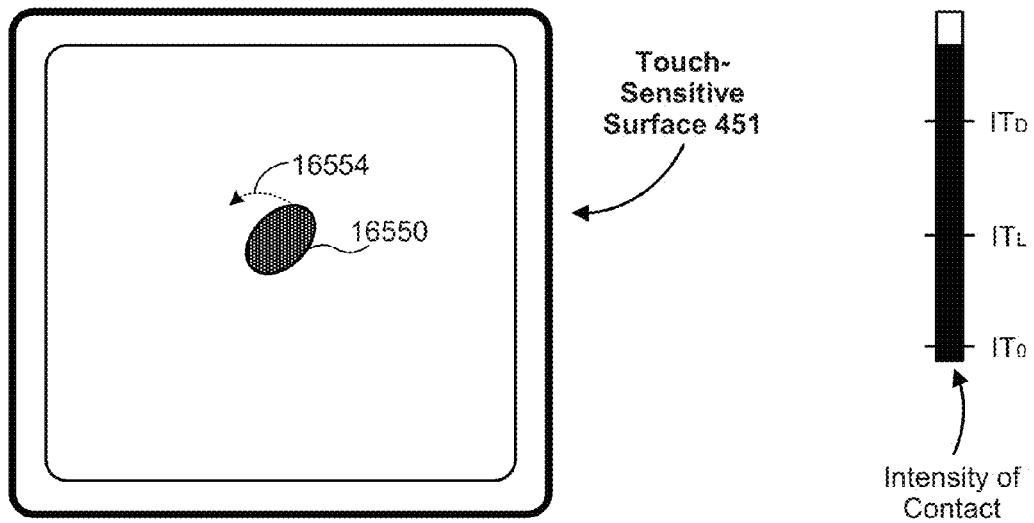

In some embodiments, the direction of the advancement through "Song 4" is based on a direction of rotation of the contact (e.g., contact 16542). For example, in FIGS. 11L-11M shows an input that includes contact 16550, which is analogous to contact 16542, detected on touch-sensitive surface 451. An increase in the intensity of contact 16550 above the deep press intensity threshold (e.g., $IT_D$) and rotation 16552 of contact 16550 in a clockwise direction are detected. In response to detection of the input, "Song 4" is advanced through in accordance with the intensity of contact 16550, as shown in FIG. 11M. In accordance with rotation direction of rotation 16552, "Song 4" is advanced forward (e.g., thumb 16548 moves toward the end of scrubber 16546). In FIG. 11L, "Song 1" remains associated with the primary media player controls.

Figure 11N:
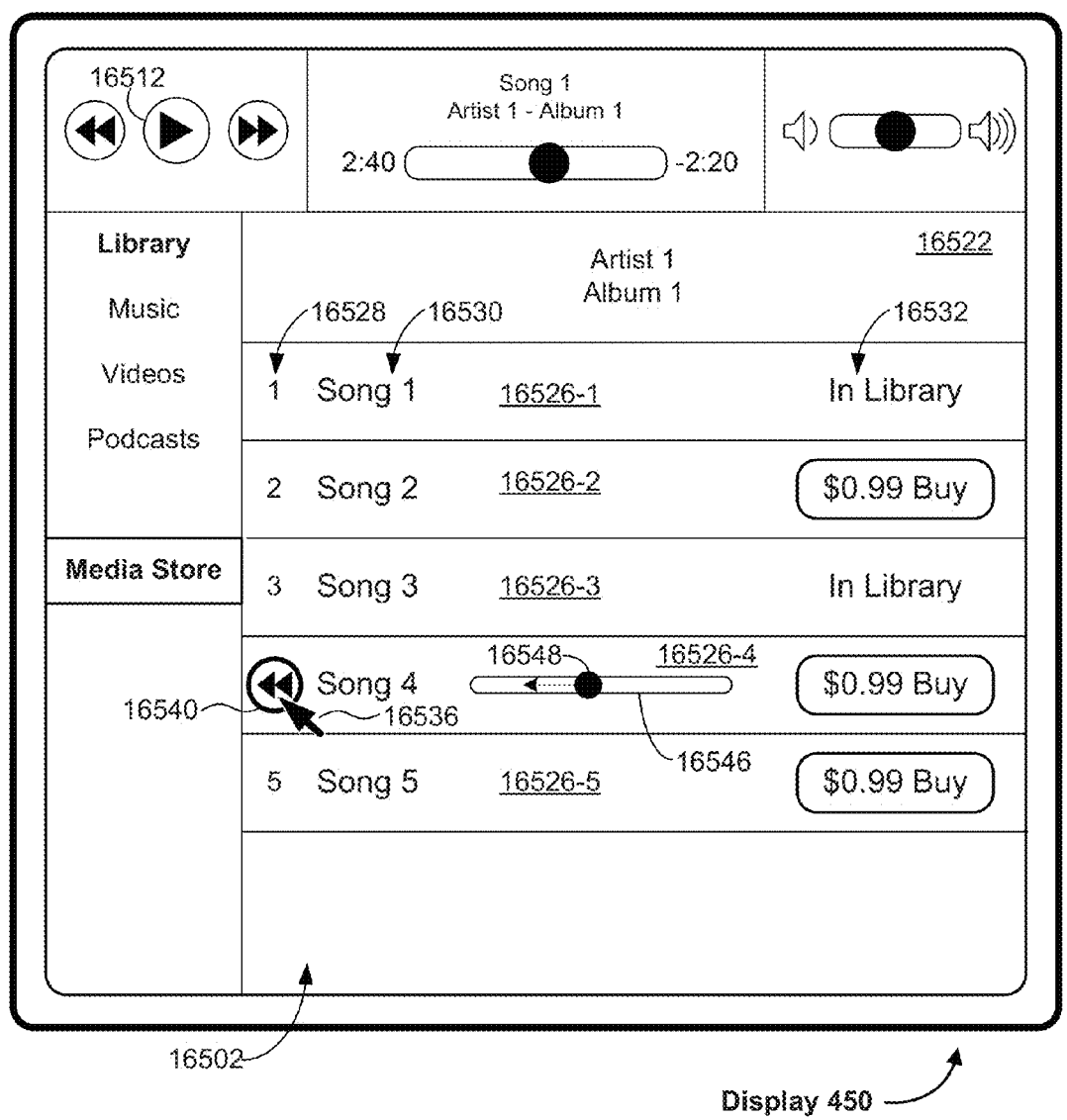
Figure 11N:
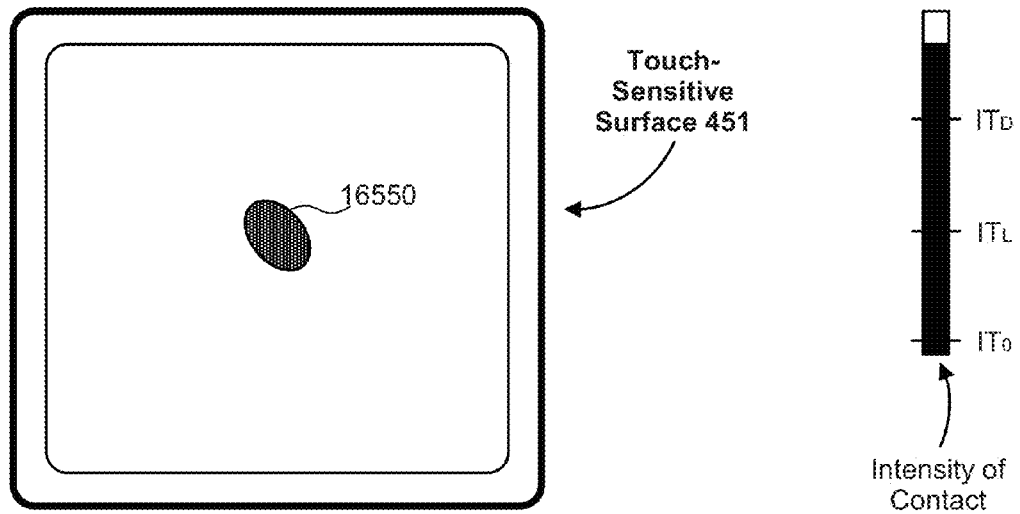

FIG. 11M also shows that contact 16550 stops rotating 16552 in a clockwise direction and rotates 16554 in a counterclockwise direction (e.g., while "Song 4" is advancing forward). In accordance with rotation direction 16554 shown in FIGS. 11M-11N, advancement of "Song 4" reverses direction and "Song 4" is advanced backwards, as shown in FIG. 11N (e.g., thumb 16548 moves toward the beginning of scrubber 16546).

Figure 11O:
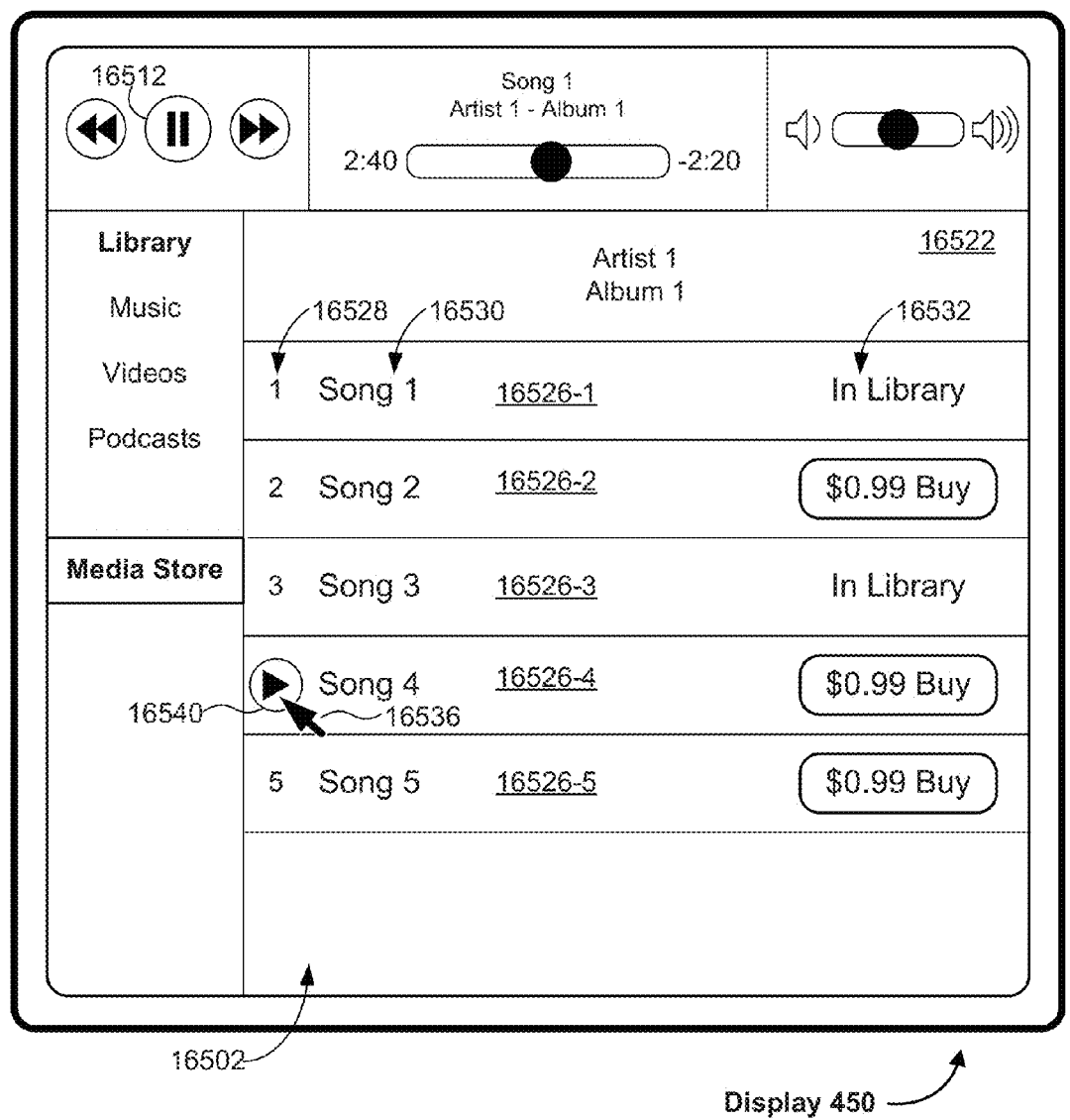
Figure 11O:
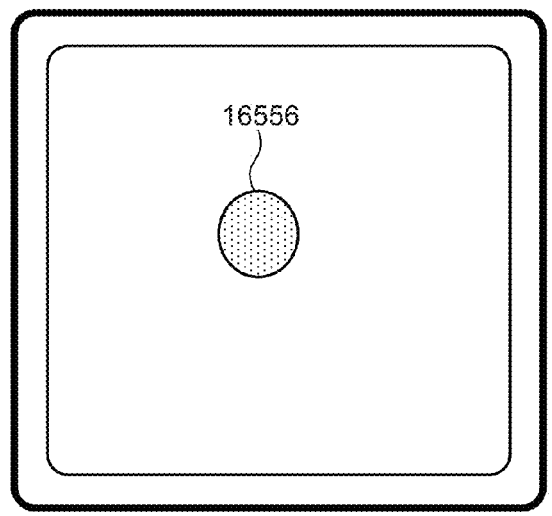
Figure 11O:
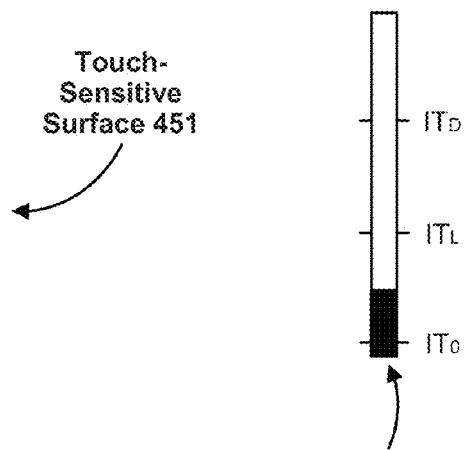
Figure 11P:
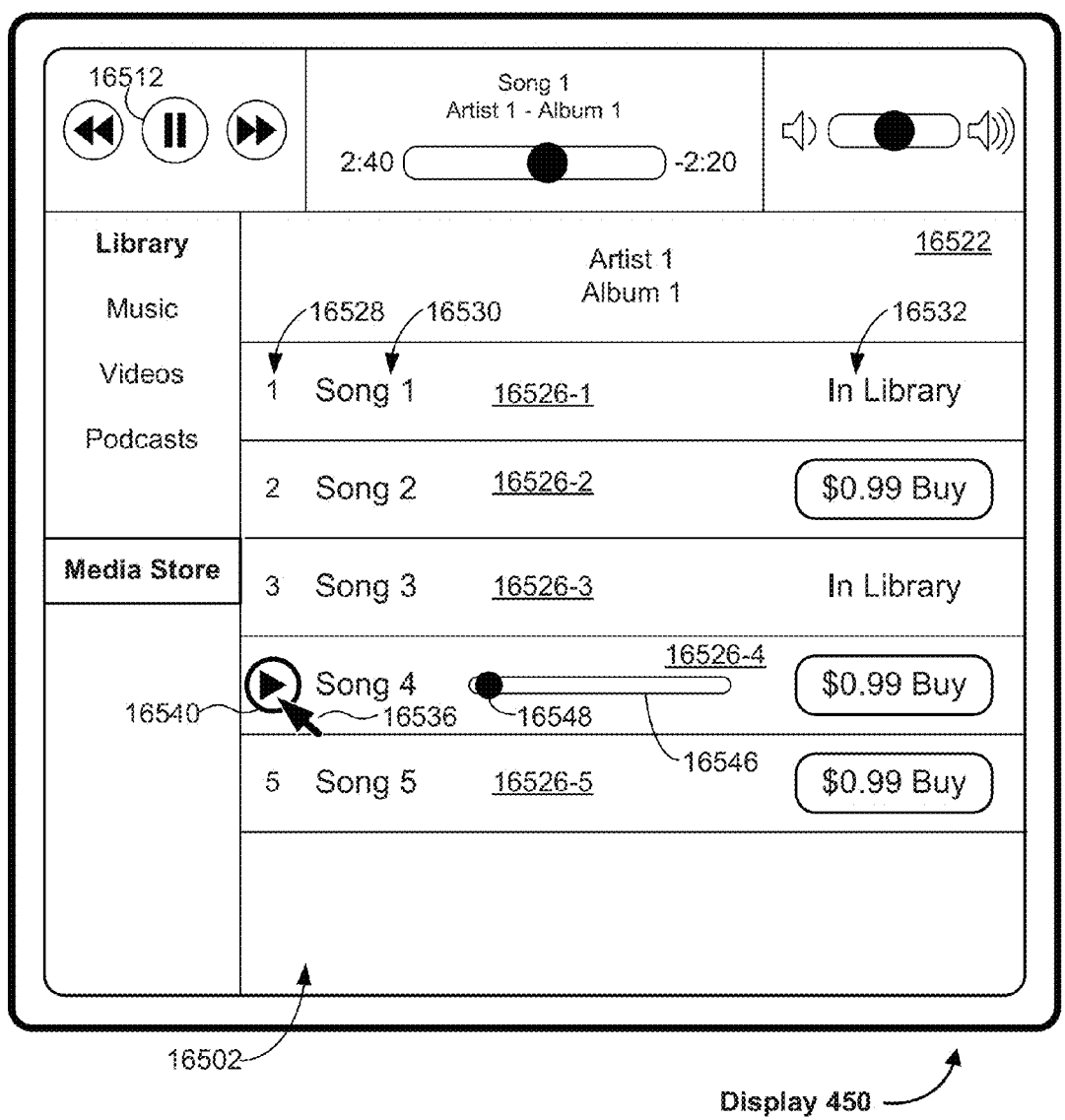
Figure 11P:
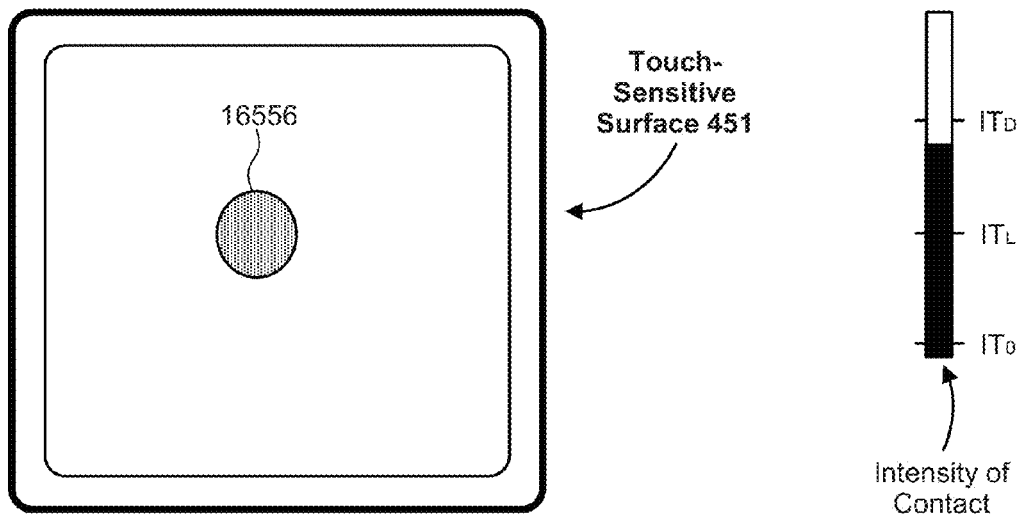

As described above, in some embodiments, preview control 16540 associated with a media item 16526 is a single button that controls multiple media playback operations, including playback and fast forwarding; preview control 16540 is multi-purpose button or control. Preview control 16540 is activated in response to detection of an input (e.g., a contact press input and/or a contact rotation input) while cursor 16536 is located over preview control 16540. The operation controlled by preview control 16540 is based on the intensity of the contact. For example, in FIG. 11O, cursor 16536 is located over preview control 16540 associated with "Song 4." An input that includes contact 16556 is detected on touch-sensitive surface 451. In FIG. 11P, contact 16556 has an intensity between a light press intensity threshold (e.g., $IT_L$) and the deep press intensity threshold (e.g., $IT_D$). In some embodiments, the input is a tap gesture (e.g., a tap gesture including contact 16556 with intensity between $IT_L$ and $IT_D$ in FIG. 11P) or a light press input (e.g., an increase in intensity of contact 16556 from an intensity below $IT_L$ in FIG. 11O to an intensity between $IT_L$ and $IT_D$ in FIG. 11P). In response to detection of the input, preview control 16540 is activated and "Song 4" is played back at a playback rate, as shown in FIG. 11P.

Figure 11Q:
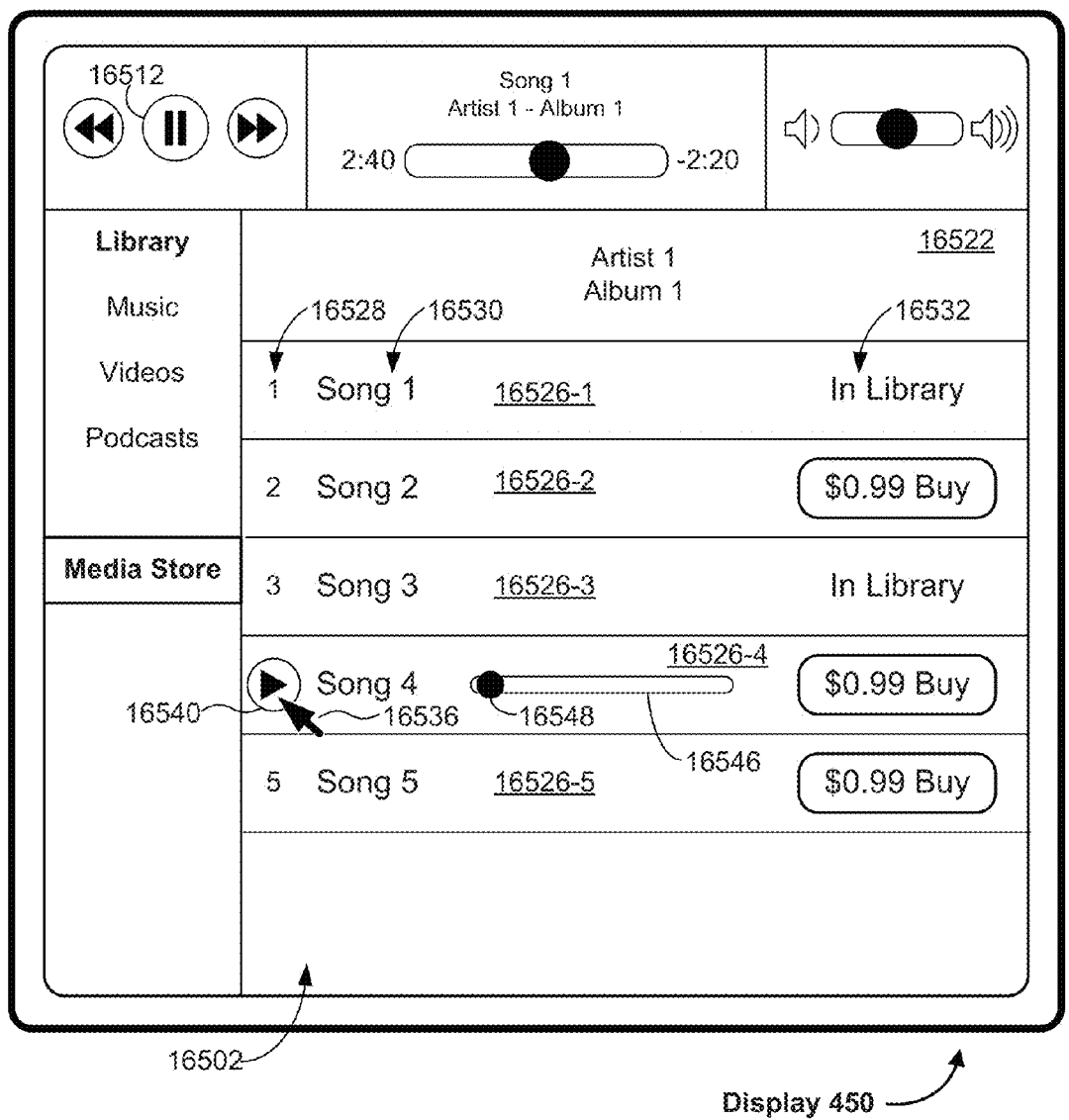
Figure 11Q:
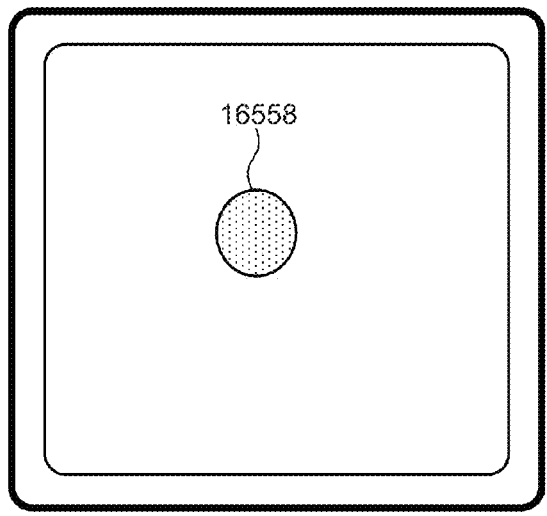
Figure 11Q:
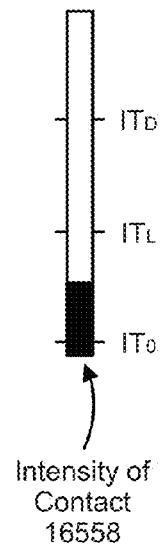
Figure 11R:
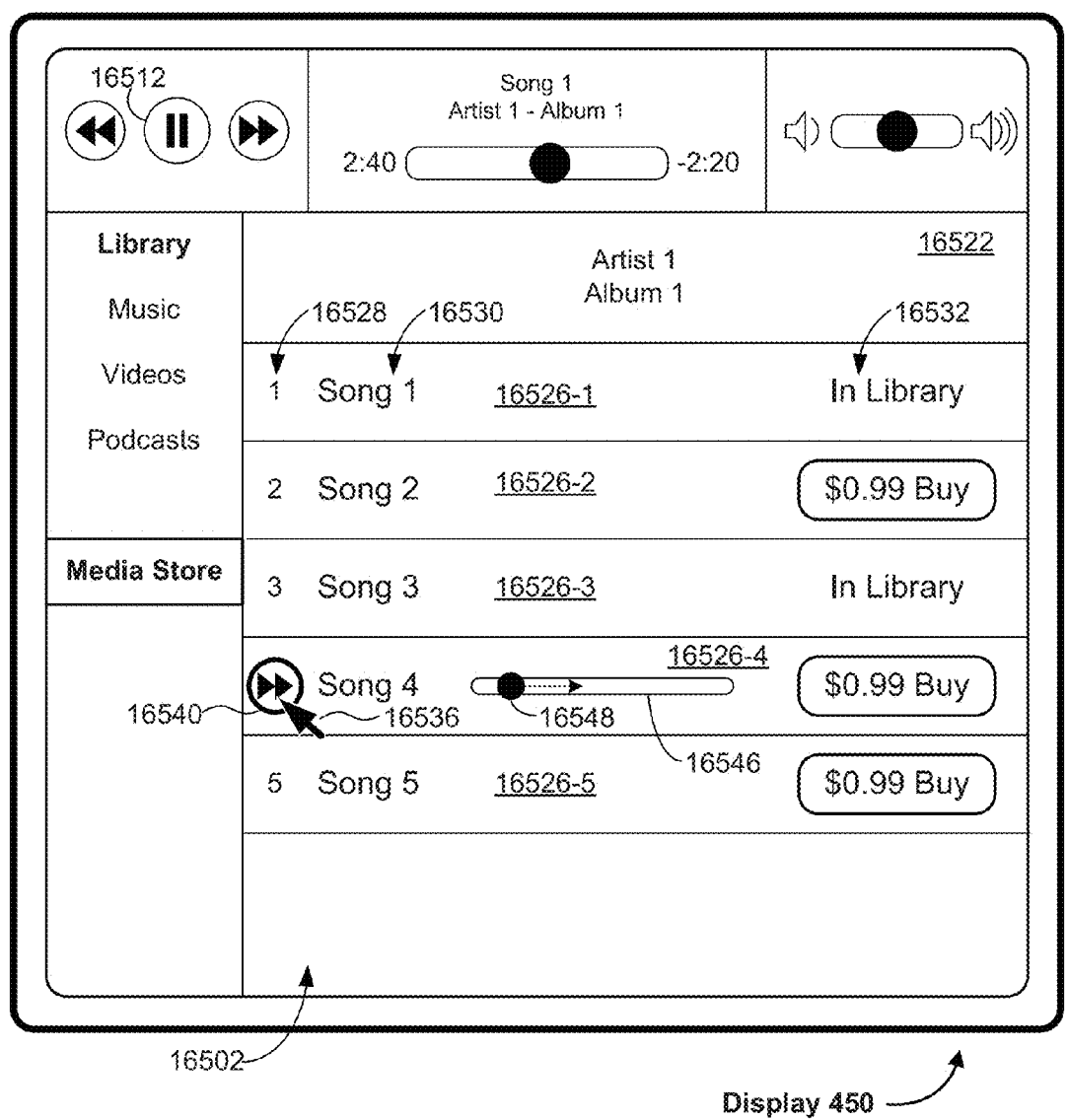
Figure 11R:
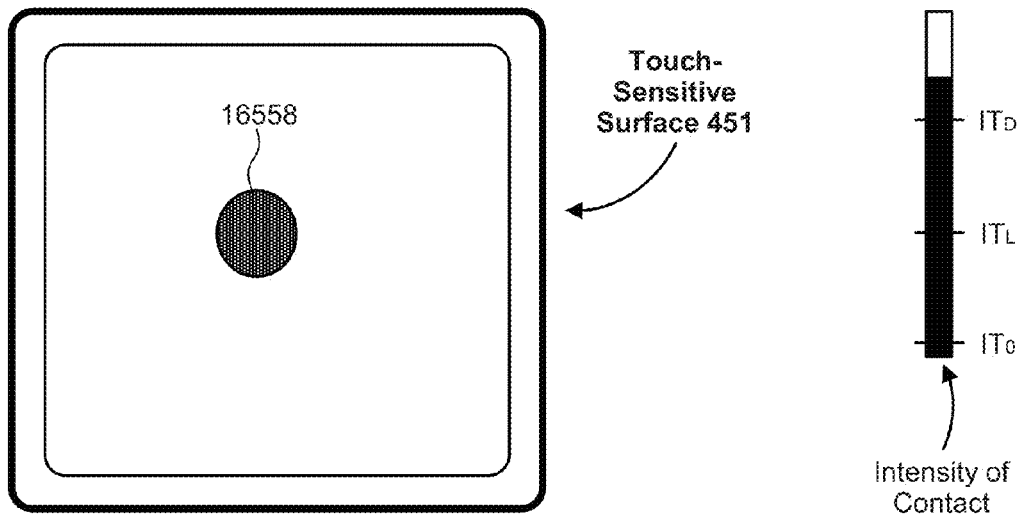

In FIG. 11Q, cursor 16536 is located over preview control 16540 associated with "Song 4." An input that includes contact 16558 is detected on touch-sensitive surface 451. In FIG. 11R, contact 16558 has an intensity above the deep press intensity threshold (e.g., $IT_D$). In some embodiments, the input is a tap gesture (e.g., a tap gesture including contact 16558 with intensity above $IT_D$ in FIG. 11R) or a deep press input (e.g., an increase in intensity of contact 16558 from an intensity below $IT_D$ in FIG. 11Q to an intensity above $IT_D$ in FIG. 11R). In response to detection of the input, preview control 16540 is activated and "Song 4" is fast forwarded at a rate faster than the playback rate, as shown in FIG. 11R. In some embodiments the appearance of the preview control 16540 changes in accordance with the intensity of the contact. For example, before the preview control 16540 is activated, the preview control has a "non-activated" appearance, as shown in FIG. 11P. In this example, after the as the intensity of the contact (e.g., contact 16656) increases above the light press intensity threshold (e.g., $IT_L$), the preview control 16540 has a "normal playback" appearance indicating that the preview control has been activated for playback at the playback rate. Additionally, in some embodiments, as the intensity of the contact (e.g., contact 16656) continues to increase up to or above the deep press intensity threshold (e.g., $IT_D$), the preview control 16540 has a "fast forward" appearance (e.g., the appearance of preview control 16540 in FIG. 11R) indicating that the preview control has been activated into a different mode (e.g., a fast forward mode of operation where device advances through content associated with the preview control at a rate faster than a normal playback rate). Alternatively or in addition, in some embodiments, as the intensity of the contact (e.g., contact 16656) continues to increase up to or above the deep press intensity threshold (e.g., $IT_D$) or a higher intensity threshold (e.g., an intensity threshold above $IT_D$), the preview control 16540 has a "skip content" appearance (e.g., the appearance of preview control 16540 in FIG. 11K) indicating that the preview control has been activated into a different mode (e.g., a fast forward mode of operation where device skips ahead in the content by a predefined amount such as by advancing by 5, 15 or 30 seconds or skipping to a next content item in a list of content items such as "Song 5" in FIG. 11R).

In some embodiments the device displays an animated transition of the preview control between the "non-activated" appearance, the "normal playback" appearance, the "fast forward" appearance and/or the "skip content" appearance. In some embodiments, a first appearance corresponds to a first activation state that occurs when the contact reaches (or exceeds) a first intensity threshold (e.g., $IT_L$) and the second appearance corresponds to a second activation state that occurs when the content reaches (or exceeds) the second intensity threshold (e.g., $IT_D$) and the animation between the first appearance and the second appearance progresses in accordance with the change in intensity of the contact on the touch-sensitive surface. In some embodiments, the preview control transitions between three or more appearances in response to detecting an increase in intensity of a continuously detected contact (e.g., as a contact increases in intensity from $IT_0$ to $IT_L$, the device displays a first animation of the appearance of the preview control changing from the "non-activated" appearance to the "normal playback" appearance; and as the contact increases in intensity from $IT_L$ to $IT_D$, the device displays a second animation of the appearance of the preview control changing from the "normal playback" appearance to the "fast forward" appearance).

Figure 11S:
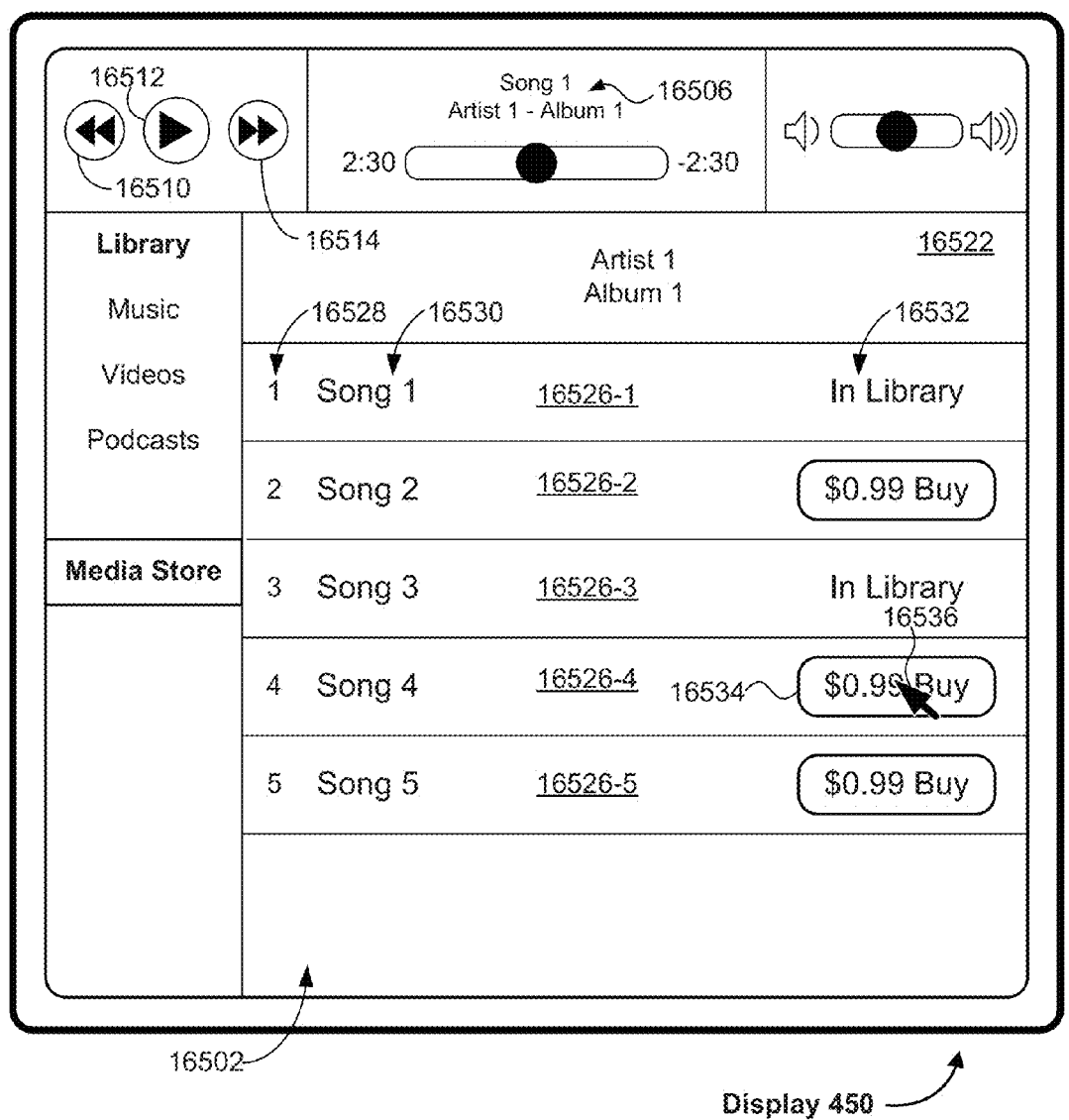
Figure 11S:
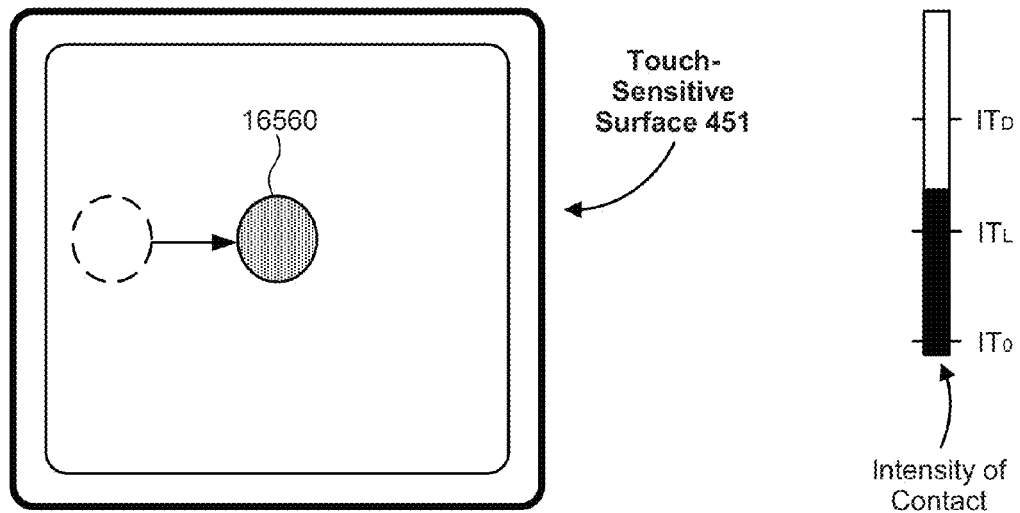
Figure 11T:
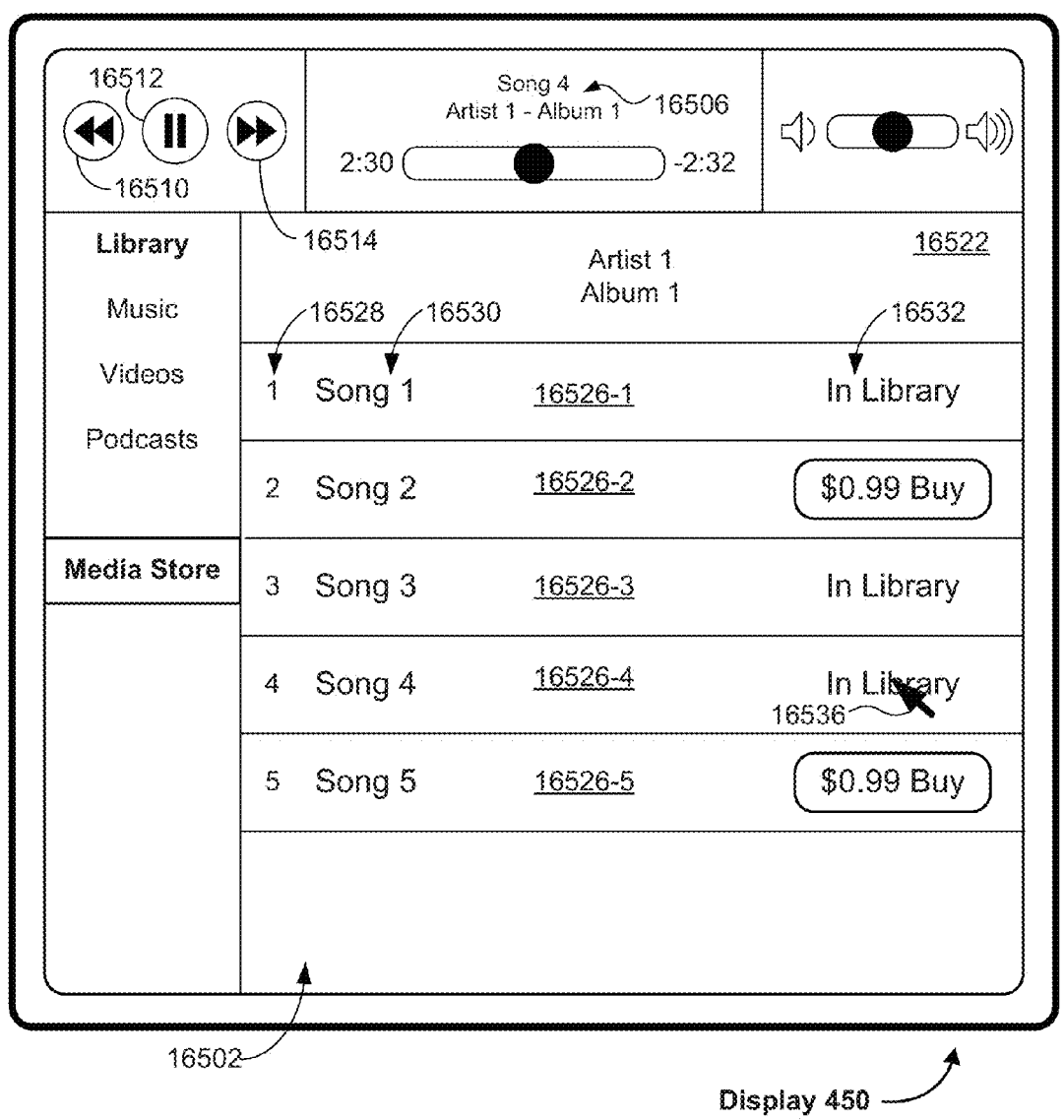
Figure 11T:
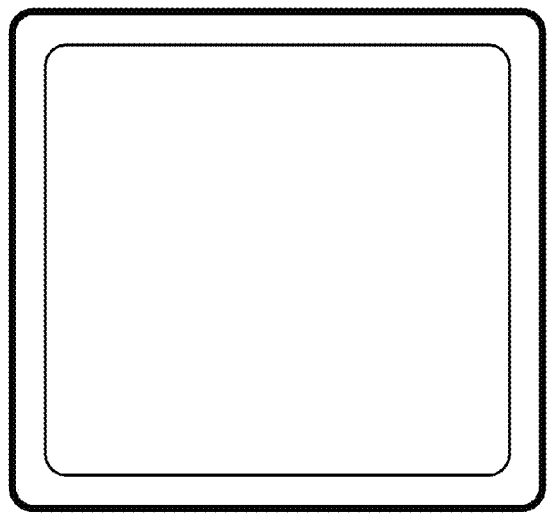
Figure 12A:
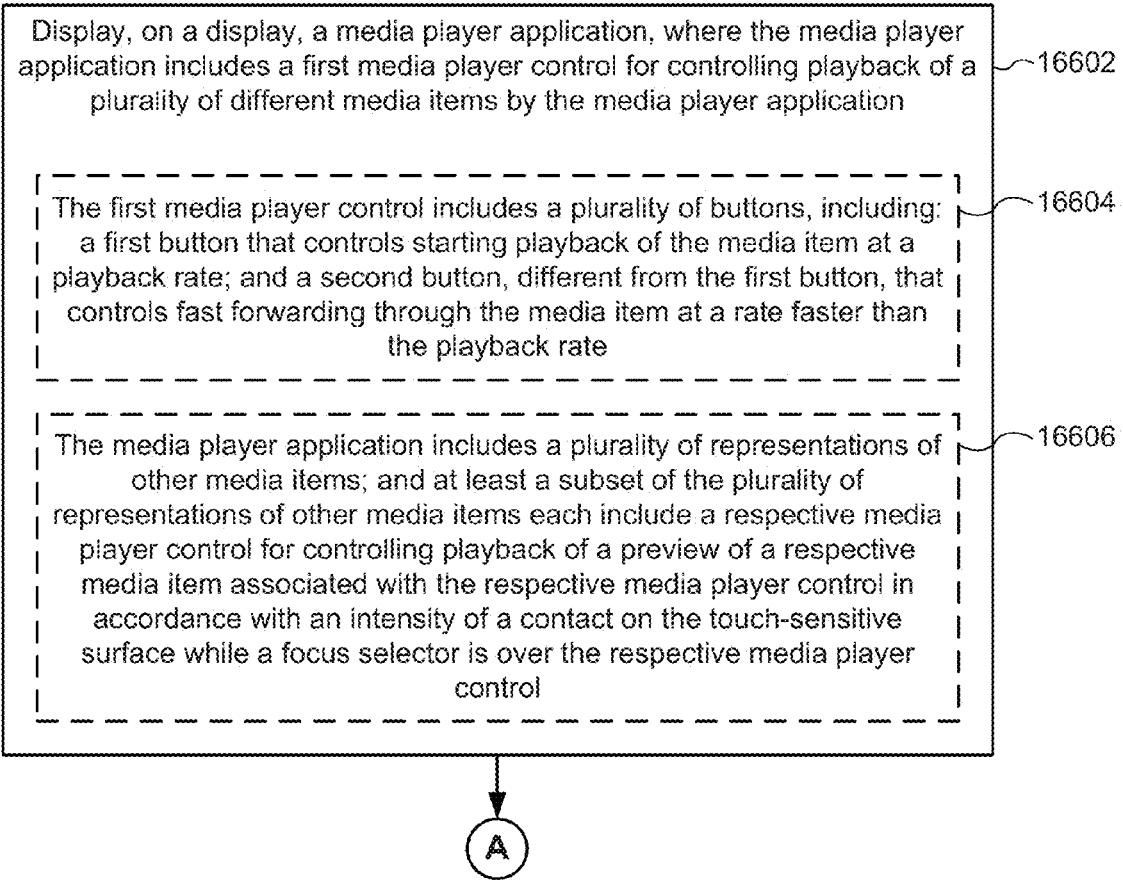
FIGS. 12A-12E are flow diagrams illustrating a method of previewing media content in accordance with some embodiments.
Figure 12B:
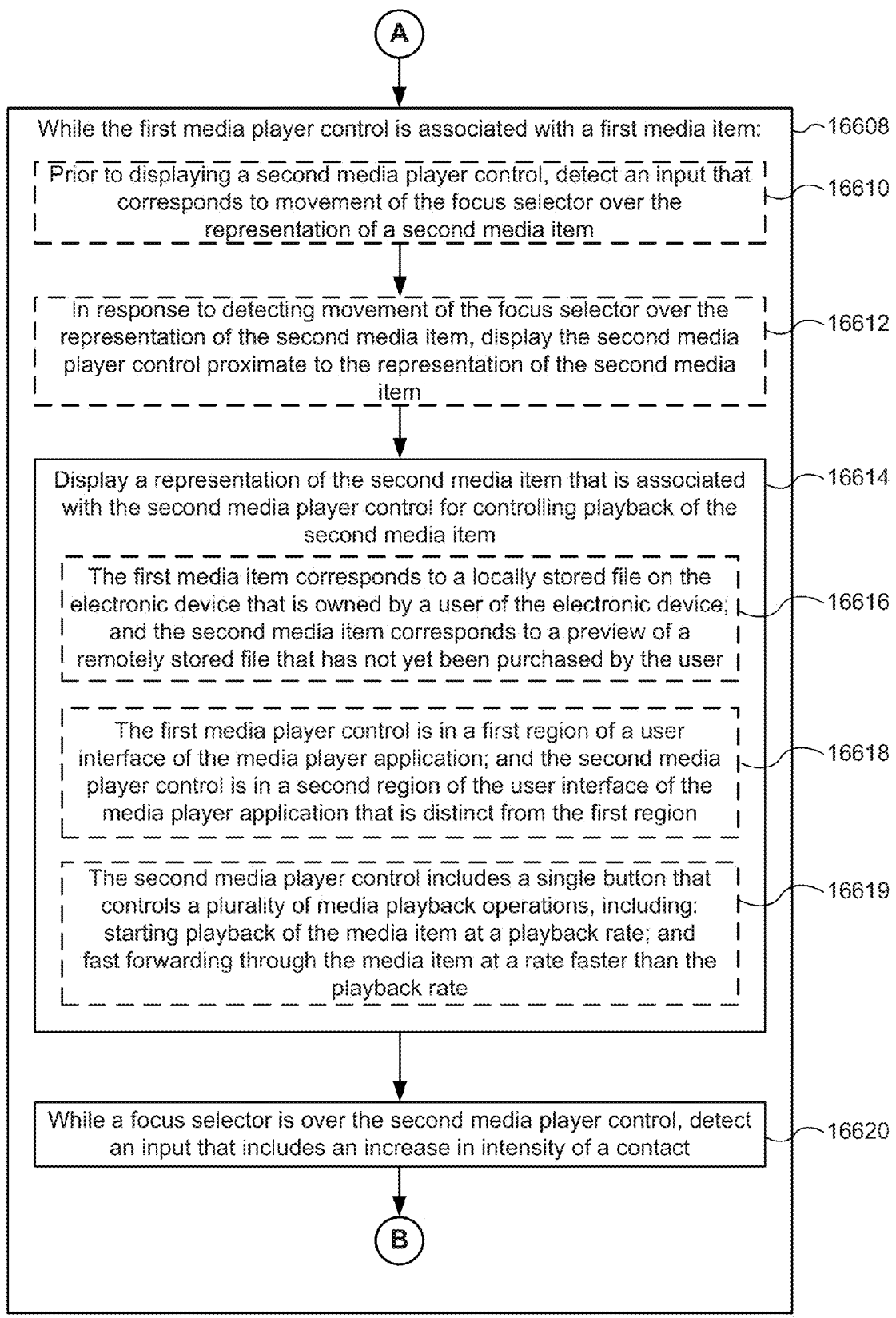
Figure 12C:
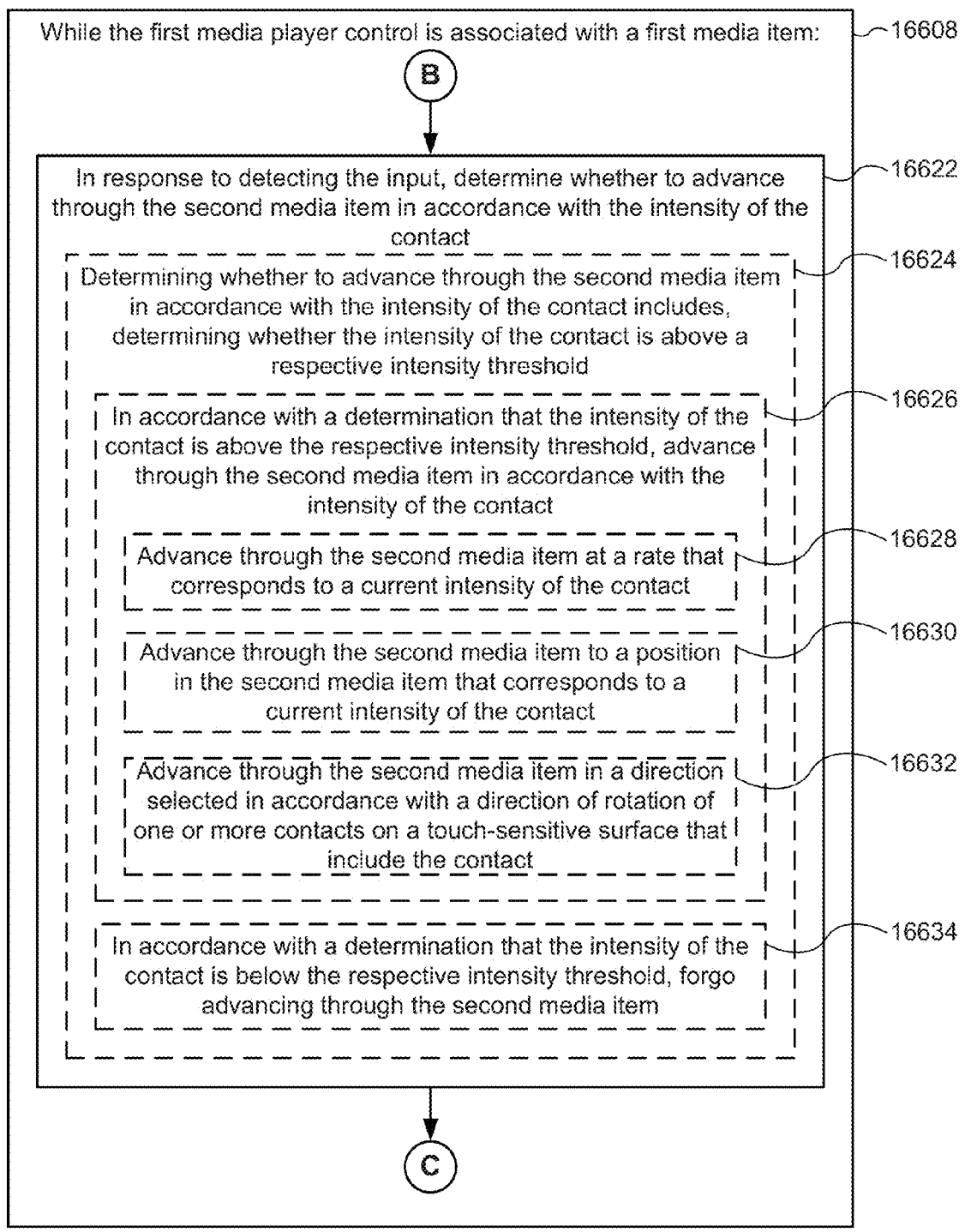
Figure 12D:
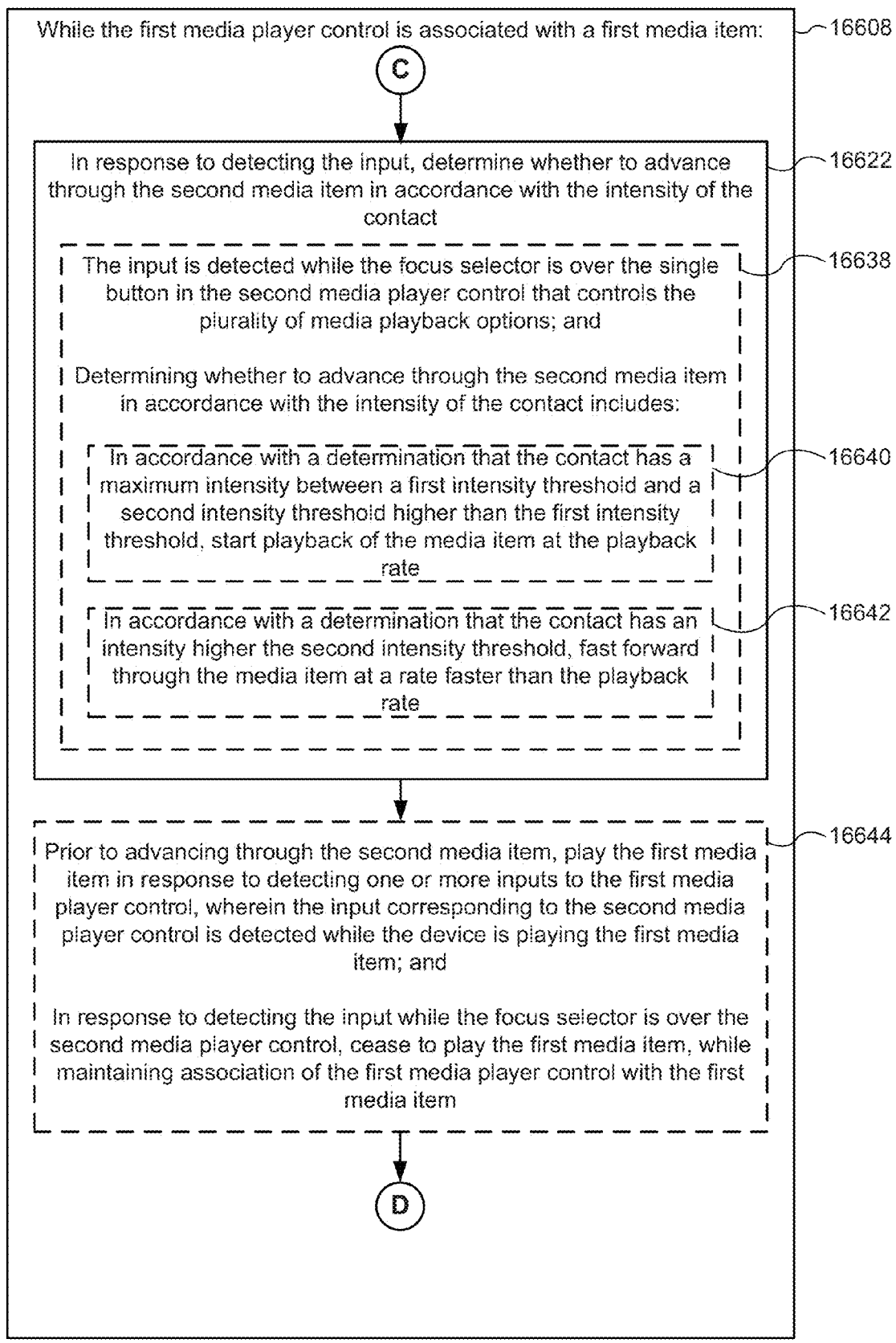
Figure 12E:
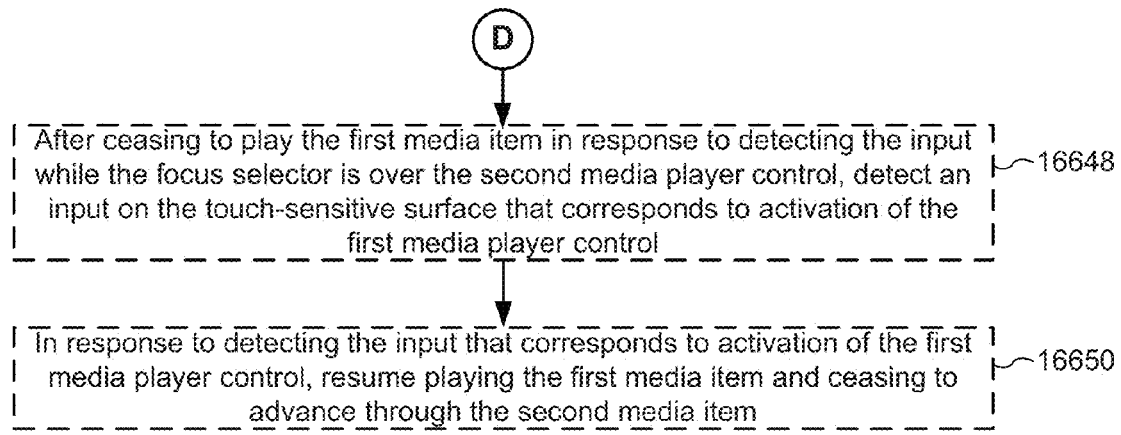
Figure 12E:
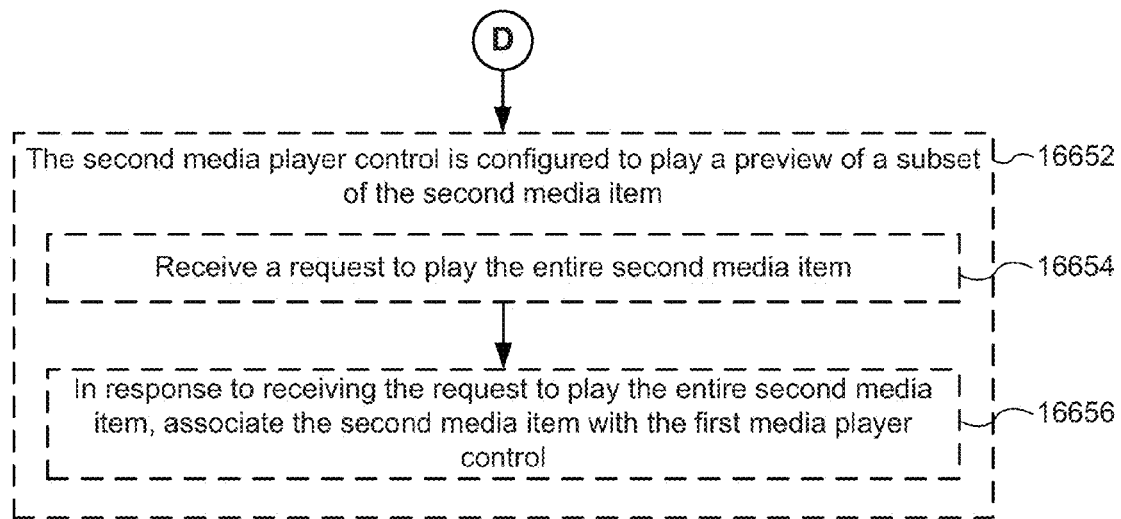

A media item 16526 not currently associated with the primary media player controls can be associated with the primary media player controls, replacing the association between the primary media player controls and the currently associated media item 16526. For example, FIG. 11S illustrates "Song 1" being associated with the primary media player controls (as indicated by information display 16506), and cursor 16536 being located over purchase icon 16534 associated with "Song 4. " "Song 4" is currently not in the media library. An input that includes contact 16560 (e.g., movement of contact 16560 across touch-sensitive surface 451 so that cursor 16536 is over purchase icon 16534 and a subsequent press input or tap gesture including an increase in intensity of contact from an intensity below $IT_L$ to an intensity above $IT_L$ in FIG. 11S) is detected on touch-sensitive surface 451. In response to detection of the input, "Song 4" is acquired and added to the media library. "Song 4" in its entirety (as opposed to a preview portion) is associated with the primary media player controls, displacing the association between the primary media player controls and "Song 1," as shown in FIG. 11T. In FIG. 11T, purchase icon 16534 for "Song 4" is replaced with an "In Library" label to indicate the change in library status 16532, and information display 16506 is updated to reflect the association between "Song 4" and the primary media player controls. When "Song 4" is associated with the primary media player controls, "Song 4" is, optionally, played back without waiting for activation of play/pause button 16512, as shown in FIG. 11T.

FIGS. 12A-12E are flow diagrams illustrating a method 16600 of previewing media content in accordance with some embodiments. The method 16600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 16600 are, optionally, combined and/or the order of some operations is, optionally, changed.

As described below, the method 16600 provides an intuitive way to preview media content. The method reduces the cognitive burden on a user when previewing media content, thereby creating a more efficient human-machine interface. For battery-operated electronic devices, enabling a user to preview media content faster and more efficiently conserves power and increases the time between battery charges.

The device displays (16602), on the display, a media player application, where the media player application includes a first media player control for controlling playback of a plurality of different media items by the media player application (e.g., the first media player control is a generic media player control for controlling playback of media in the user's media library). FIG. 11A, for example, illustrates user interface 16502 for a media player application displayed on display 450. User interface 16502 includes a set of primary media player controls, which include play/pause button 16512, rewind button 16510, and fast forward button 16514.

In some embodiments, the first media player control includes (16604) a plurality of buttons, including a first button that controls starting playback of the media item at a playback rate, and a second button, different from the first button, that controls fast forwarding through the media item at a rate faster than the playback rate. For example, the primary media player controls include play/pause button 16512 and fast forward button 16514.

In some embodiments, the media player application includes (16606) a plurality of representations of other media items (e.g., media items that are different from the first media item and the second media item), and at least a subset of the plurality of representations of other media items each include a respective media player control for controlling playback of a preview of a respective media item associated with the respective media player control in accordance with an intensity of a contact on the touch-sensitive surface while a focus selector is over the respective media player control. As shown in FIGS. 11A-11D, for example, multiple media items 16526 are displayed in area 16522. Each of the multiple media items 16526 in FIGS. 11A-11D has a respective associated preview control 16540 (e.g., "Song 3" (e.g., media item 16526-3) has an associated preview control 16540 (FIG. 11C), and "Song 4" has an associated preview control 16540 (FIG. 11D)). In some embodiments, two or more of the media player controls for controlling playback of previews of the media items are displayed concurrently. In some embodiments, two or more of the media player controls for controlling playback of previews of the media items are displayed sequentially (e.g., as shown in FIGS. 11C-11D.

In some embodiments, while (16608) the first media player control is associated with a first media item prior to displaying a second media player control, the device detects (16610) an input that corresponds to movement of the focus selector over the representation of a second media item, and in response to detecting movement of the focus selector over the representation of the second media item, the device displays (16612) the second media player control proximate to the representation of the second media item (e.g., the second media player control is hidden until the user moves a focus selector over the representation of the second media item). In FIG. 11C, for example, preview control 16540 for "Song 4" is not displayed, and cursor 16536 is not located over the listing for "Song 4" (media item 16526-4). An input that includes contact 16541 and movement 16543 of contact 16541 in direction is detected on touch-sensitive surface 451. The input corresponds to movement of cursor 16536 over media item 16526-4. In response to detecting the movement of cursor 16536 over media item 16526-4, preview control 16540 for "Song 4" is displayed, as shown in FIG. 11D.

While (16608) the first media player control is associated with a first media item (e.g., a first media item is being played by the media player or the first media item is currently paused but would be played if a play affordance of the first media player control is selected by a user), the device displays (16614) a representation of a second media item that is associated with a second media player control for controlling playback of the second media item (e.g., the second media player control is a media-item-specific media player control 16540 for controlling playback of a specific media item 16526-4 in FIG. 11D).

In some embodiments, the first media item corresponds (16616) to a locally stored file on the electronic device that is owned by a user of the electronic device, and the second media item corresponds to a preview of a remotely stored file that has not yet been purchased by the user. In some embodiments, the second media item is being streamed to the electronic device, so that a temporary cache of the second media item is stored at the device, but the entire second media item is not available to the user for unlimited playback (e.g., because the second media item has not been purchased by the user). For example, in FIGS. 11D-11G, "Song 1" media item 16526-1 is in the media library and is locally stored, and "Song 4" media item 16526-4 is not in the media library and is remotely stored. The portion of "Song 4" that is played is a preview portion of "Song 4" rather than "Song 4" in its entirety.

In some embodiments, the first media player control is (16618) in a first region of a user interface of the media player application, and the second media player control is in a second region of the user interface of the media player application that is distinct from the first region (e.g., the first media player control is in a menu bar of the application, while the second media player control is integrated into content displayed in the media player application). For example, as shown in FIG. 11D, the primary media player controls (buttons 16510, 16512, 16514) are in an upper corner area of user interface 16502, away from media items 16526, and preview control 16540 for a media item 16526 (e.g., "Song 4" media item 16526-4) is integrated with (e.g., displayed proximate to) the media item 16526.

In some embodiments, the second media player control includes (16619) a single button that controls a plurality of media playback operations, including: starting playback of the media item at a playback rate, and fast forwarding through the media item at a rate faster than the playback rate. In some embodiments, the single button also controls rewind functionality. In some embodiments, the second media player control includes a second button for controlling rewind functionality. In some embodiments, the second media player control does not include rewind functionality, because the second media item is a preview. FIGS. 11J-11R, for example, illustrate preview control 16540, as a single button, being used to control playback, fast forwarding and rewinding of "Song 4."

While a focus selector is over the second media player control, the device detects (16620) an input that includes an increase in intensity of a contact; and in response to detecting the input, determines (16622) whether to advance through the second media item in accordance with the intensity of the contact (e.g., in response to the contact exceeding a predefined intensity threshold such as deep press intensity threshold $IT_D$ or in response to detecting liftoff of the contact). In some embodiments, "advancing through" content encompasses both: (1) playing back content (at a normal, reduced, or accelerated playback speed) and (2) scrubbing through content without playing or otherwise presenting the content.

For example, in FIGS. 11E-11G, while the primary media player controls are associated with "Song 1" (e.g., media item 16526-1), a listing for "Song 4" (e.g., media item 16526-4) is displayed in area 16522. "Song 4" has an associated preview control 16540. While cursor 16536 is located over preview control 16540 for "Song 4," an input that includes contact 16542 is detected. The input includes an increase in the intensity of contact 16542 (e.g., an increase in intensity from an intensity below $IT_L$ in FIG. 11E to an intensity above $IT_D$ in FIG. 11G). In response to detection of the input, the device determines whether to advance through "Song 4" in accordance with the intensity of contact 16542 (e.g., the advancing is forgone, as shown in FIG. 11F where the intensity of contact 16542 does not increase above $IT_D$, or the advancing is performed as shown in FIG. 11G where the intensity of contact 16542 increases above $IT_D$).

In some embodiments, determining (16622) whether to advance through the second media item in accordance with the intensity of the contact includes: determining (16624) whether the intensity of the contact is above a respective intensity threshold (e.g., "$IT_D$"). In some embodiments, in accordance with a determination that the intensity of the contact is above the respective intensity threshold (e.g., "$IT_D$"), the device advances (16626) through the second media item in accordance with the intensity of the contact (e.g., playing audio/video), In some embodiments, in response to detecting a tap gesture on the second media control, the second media item is played back at a regular media playback speed (e.g., even when the contact in the tap gesture has a maximum intensity that is below the respective intensity threshold $IT_D$). For example, in FIGS. 11E-11G, whether "Song 4" is advanced through depends on whether the intensity of contact 16542 is above a respective intensity threshold (e.g., "$IT_D$"). While the intensity is below threshold $IT_D$, the device does not advance through "Song 4" (e.g., advancement of "Song 4" is forgone), as shown in FIG. 11F. When the intensity is increased above threshold $IT_D$, the device advances through "Song 4," as shown in FIG. 11G.

In some embodiments, advancing through the second media item in accordance with the intensity of the contact includes advancing (16628) through the second media item at a rate that corresponds to a current intensity of the contact (e.g., different scrubbing speeds for the second media item are mapped to different intensities of the contact of a plurality of detectable intensity values). FIG. 11J, for example, illustrates "Song 4" being advanced through at a rate that corresponds to the intensity of contact 16547.

In some embodiments, advancing through the second media item in accordance with the intensity of the contact includes advancing (16630) through the second media item to a position in the second media item that corresponds to a current intensity of the contact (e.g., different positions in the second media item are mapped to different intensities of the contact in a plurality of detectable intensity values). FIG. 11K, for example, illustrates "Song 4" being advanced through to the position corresponding to location 16548-b on scrubber 16546 in accordance with the intensity of contact 16549; thumb 16548 jumps from location 16548-a to location 16548-b, where location 16548-a corresponds to the intensity of contact 16542 in FIG. 11G location 16548-b corresponds to the intensity of contact 16549 in FIG. 11K.

In some embodiments, advancing through the second media item in accordance with the intensity of the contact includes advancing (16632) through the second media item in a direction selected in accordance with a direction of rotation of one or more contacts on the touch-sensitive surface that include the contact. In some embodiments, if the contact rotates clockwise, the device advances forward through the content either at a rate determined in accordance with an intensity of the contact, at a rate determined in accordance with an amount of rotation of the one or more contacts or at a predefined rate. In some embodiments, if the contact rotates counterclockwise, the device advances backward through the content either at a rate determined in accordance with an intensity of the contact, at a rate determined in accordance with an amount of rotation of the one or more contacts or at a predefined rate. For example, FIGS. 11L-11M illustrate "Song 4" being advanced forward in accordance with rotation 16552 of contact 16550 in a clockwise direction. FIGS. 11M-11N illustrate "Song 4" being advanced backward in accordance with rotation 16554 of contact 16550 in a counterclockwise direction.

In contrast, in some embodiments, in accordance with a determination that the intensity of the contact is below the respective intensity threshold (e.g., "$IT_D$"), the device forgoes (16634) advancing through the second media item. For example, in FIGS. 11E-11G, whether "Song 4" is advanced through depends on whether the intensity of contact 16542 is above a respective intensity threshold (e.g., "$IT_D$"). While the intensity is below threshold $IT_D$, the device does not advance through "Song 4" (e.g., advancement of "Song 4" is forgone), as shown in FIG. 11F. When the intensity is increased above threshold $IT_D$, the device advances through "Song 4," as shown in FIG. 11G.

In some embodiments, the input is detected (16638) while the focus selector is over the single button in the second media player control that controls the plurality of media playback options, and determining (16622) whether to advance through the second media item in accordance with the intensity of the contact includes: in accordance with a determination that the contact has a maximum intensity between a first intensity threshold (e.g., "$IT_L$") and a second intensity threshold (e.g., "$IT_D$") higher than the first intensity threshold (e.g., "$IT_L$"), the device starts (16640) playback of the media item at the playback rate; and in accordance with a determination that the contact has an intensity higher the second intensity threshold (e.g., "$IT_D$"), the device fast forwards (16642) through the media item at a rate faster than the playback rate. FIGS. 11O-11P, for example, illustrate detection of an input performed with contact 16556 while cursor 16536 is located over preview control 16540. In FIGS. 11O-11P, contact 16556 increases in intensity from an intensity below $IT_L$ in FIG. 11O to an intensity between intensity thresholds $IT_L$ and $IT_D$ in FIG. 11P. In accordance with the increase in intensity of contact 16556 to an intensity between thresholds $IT_L$ and $IT_D$, "Song 4" is played back as shown in FIG. 11P. FIGS. 11Q-11R illustrate detection of an input performed with contact 16558 while cursor 16536 is located over preview control 16540. In FIGS. 11Q-11R, contact 16558 increases in intensity from an intensity below $IT_D$ in FIG. 11Q to an intensity above $IT_D$ in FIG. 11R. In accordance the increase in intensity of contact 16558 to an intensity above $IT_D$, "Song 4" is fast forwarded, as shown in FIG. 11R.

In some embodiments, prior to advancing through the second media item, the device plays the first media item in response to detecting one or more inputs to the first media player control, where the input corresponding to the second media player control is detected while the device is playing the first media item, and in response to detecting the input while the focus selector is over the second media player control, the device ceases (16644) to play the first media item, (e.g., stopping or pausing) while maintaining association of the first media player control with the first media item. In other words, the first media player control (e.g., the primary media player control for the media player application) maintains its association with the previously playing media item even after the user initiates playback of a preview of a media item in a media store using the second media player control. For example, in FIGS. 11E-11G, the input performed with contact 16542 is detected while "Song 1" is playing (e.g., in response to activation of play/pause button 16512, as in FIGS. 11A-11B). In response to detection of the input performed with contact 16542 (e.g., the press input including an increase in intensity of contact 16542 from an intensity below $IT_D$ to an intensity above $IT_D$), "Song 4" is advanced through, as shown in FIG. 11G. Playback of "Song 1" is stopped, but the association between "Song 1" and the primary media player controls is maintained (e.g., so that it playback of "Song 1" easily be resumed by the user performing subsequent inputs corresponding to activation of control 16512).

In some embodiments, after ceasing to play the first media item in response to detecting the input while the focus selector is over the second media player control, the device detects (16648) an input on the touch-sensitive surface that corresponds to activation of the first media player control. In response to detecting the input that corresponds to activation of the first media player control, the device resumes (16650) playing the first media item and ceases to advance through the second media item. For example, in FIG. 11H, after playback of "Song 1" has stopped in response to detection of the input performed with contact 16542, an input performed with contact 16544 (e.g., a press input including an increase in intensity of contact 16544 from an intensity below $IT_L$ to an intensity above $IT_L$) is detected while cursor 16536 is located over play/pause button 16512. In response to detection of the input performed with contact 16544, play/pause button 16512 is activated. In response to activation of play/pause button 16512, advancement through "Song 4" is stopped and playback of "Song 1" is resumed, as shown in FIG. 11I.

In some embodiments, the second media player control is configured (16652) to play a preview of a subset of the second media item (e.g., the first 30 seconds or the first minute of a song). The device receives (16654) a request to play the entire second media item, and in response to receiving the request to play the entire second media item, the device associates (16656) the second media item with the first media player control. For example, if the user selects the second media item for full playback (e.g., rather than a "preview") such as by "double clicking," by selecting a playback icon from a drop down menu, or by purchasing the media item, control of playback of the second media item is transferred to the first media player control. For example, the portion of "Song 4" that is advanced through (e.g., played) in response to activation of the associated preview control 16540 is a preview portion that is less than the entire "Song 4." In FIGS. 11S-11T, in response to activation of purchase icon 16534 for "Song 4," "Song 4" becomes associated with the primary media player controls (e.g., 16510, 16512 and 16514 in FIG. 11T). From there, the primary media player controls can be used to control playback of the entire "Song 4," as shown in FIG. 11T in response to subsequent user inputs that correspond to the primary media player controls.

It should be understood that the particular order in which the operations in FIGS. 12A-12E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., those listed in the fifth paragraph of the Description of Embodiments) are also applicable in an analogous manner to method 16600 described above with respect to FIGS. 12A-12E. For example, the contacts, intensity thresholds, and focus selectors described above with reference to method 16600 optionally have one or more of the characteristics of the contacts, intensity thresholds, and focus selectors described herein with reference to other methods described herein (e.g., those listed in the fifth paragraph of the Description of Embodiments). For brevity, these details are not repeated here.

Figure 13:
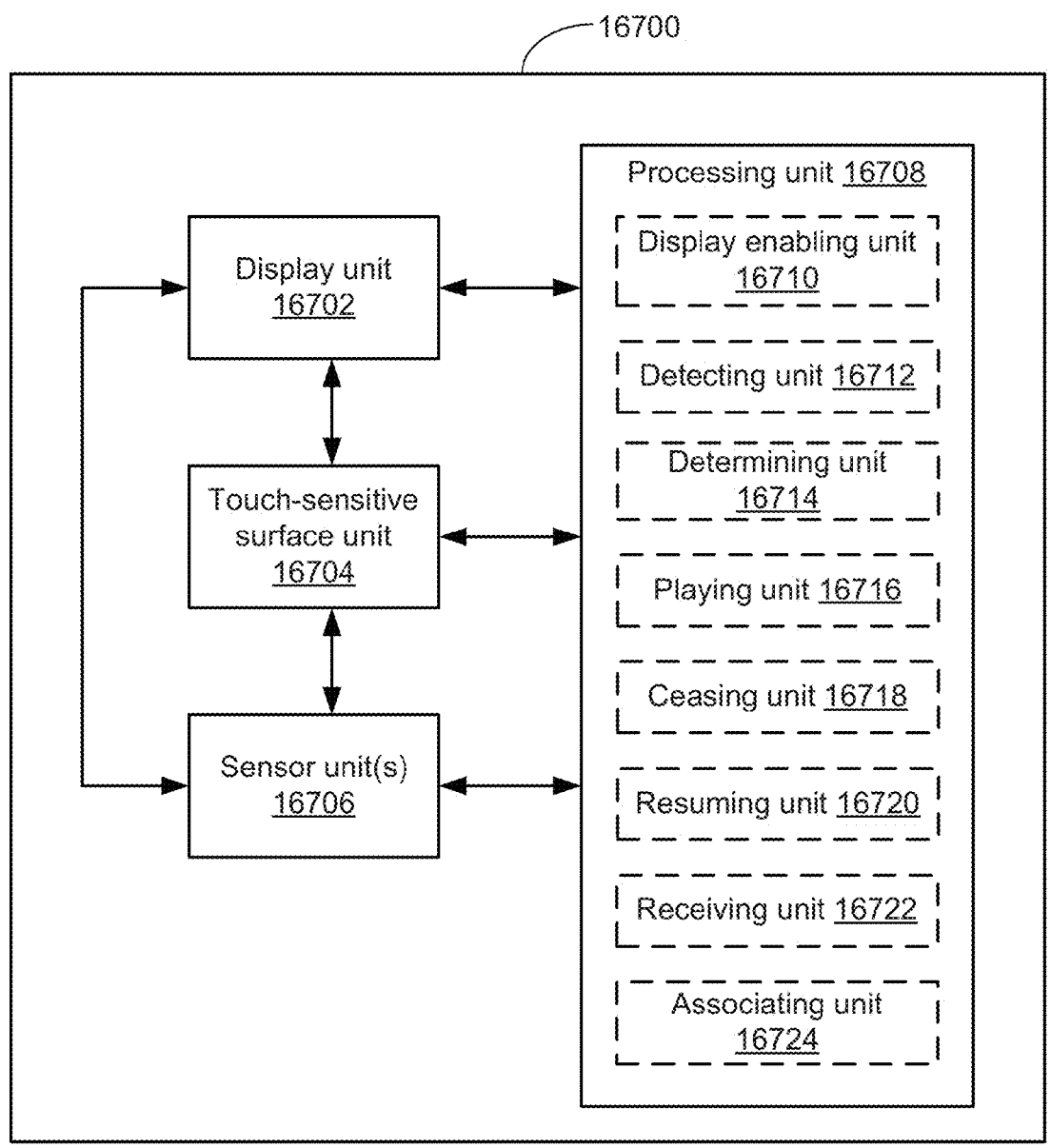
FIG. 13 is a functional block diagram of an electronic device in accordance with some embodiments.

In accordance with some embodiments, FIG. 13 shows a functional block diagram of an electronic device 16700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 16700 includes a display unit 16702 configured to display a media player application, wherein the media player application includes a first media player control for controlling playback of a plurality of different media items by the media player application; a touch-sensitive surface unit 16704 configured to receive inputs that include contacts; one or more sensors 16706 configured to detect intensity of contacts with the touch-sensitive surface unit 16704; and a processing unit 16708 coupled to the display unit 16702, the touch-sensitive surface unit 16704, and the sensors 16706. In some embodiments, the processing unit 16708 includes a display enabling unit 16710, a detecting unit 16712, a determining unit 16714, a playing unit 16716, a ceasing unit 16718, a resuming unit 16720, a receiving unit 16722, and an associating unit 16724.

The processing unit 16708 is configured to: while the first media player control is associated with a first media item: enable display of a representation of a second media item that is associated with a second media player control for controlling playback of the second media item (e.g., with the display enabling unit 16710); while a focus selector is over the second media player control, detect an input that includes an increase in intensity of a contact (e.g., with the detecting unit 16712); and in response to detecting the input, determine whether to advance through the second media item in accordance with the intensity of the contact (e.g., with the determining unit 16714).

In some embodiments, determining whether to advance through the second media item in accordance with the intensity of the contact includes: determining whether the intensity of the contact is above a respective intensity threshold (e.g., "$IT_D$"); in accordance with a determination that the intensity of the contact is above the respective intensity threshold, advancing through the second media item in accordance with the intensity of the contact; and in accordance with a determination that the intensity of the contact is below the respective intensity threshold, forgoing advancing through the second media item.

In some embodiments, advancing through the second media item in accordance with the intensity of the contact includes advancing through the second media item at a rate that corresponds to a current intensity of the contact.

In some embodiments, advancing through the second media item in accordance with the intensity of the contact includes advancing through the second media item to a position in the second media item that corresponds to a current intensity of the contact.

In some embodiments, advancing through the second media item in accordance with the intensity of the contact includes advancing through the second media item in a direction selected in accordance with a direction of rotation of one or more contacts on the touch-sensitive surface unit 16704 that include the contact.

In some embodiments, the first media item corresponds to a locally stored file on the electronic device that is owned by a user of the electronic device, and the second media item corresponds to a preview of a remotely stored file that has not yet been purchased by the user.

In some embodiments, the first media player control includes a plurality of buttons, including a first button that controls starting playback of the media item at a playback rate, and a second button, different from the first button, that controls fast forwarding through the media item at a rate faster than the playback rate.

In some embodiments, the second media player control includes a single button that controls a plurality of media playback operations, including starting playback of the media item at a playback rate and fast forwarding through the media item at a rate faster than the playback rate.

In some embodiments, the input is detected while the focus selector is over the single button in the second media player control that controls the plurality of media playback options; and determining whether to advance through the second media item in accordance with the intensity of the contact includes: in accordance with a determination that the contact has a maximum intensity between a first intensity threshold (e.g., "$IT_L$") and a second intensity threshold (e.g., "$IT_D$") higher than the first intensity threshold, starting playback of the media item at the playback rate; and in accordance with a determination that the contact has an intensity higher the second intensity threshold, fast forwarding through the media item at a rate faster than the playback rate.

In some embodiments, the processing unit 16708 is configured to: prior to advancing through the second media item, play the first media item in response to detecting one or more inputs to the first media player control (e.g., with the playing unit 16716), wherein the input corresponding to the second media player control is detected while the device is playing the first media item; and in response to detecting the input while the focus selector is over the second media player control, cease to play the first media item (e.g., with the ceasing unit 16718), while maintaining association of the first media player control with the first media item.

In some embodiments, the processing unit 16708 is configured to: after ceasing to play the first media item in response to detecting the input while the focus selector is over the second media player control, detect an input on the touch-sensitive surface unit 16704 that corresponds to activation of the first media player control (e.g., with the detecting unit 16712); and in response to detecting the input that corresponds to activation of the first media player control, resume playing the first media item (e.g., with the resuming unit 16720) and cease to advance through the second media item (e.g., with the ceasing unit 16718).

In some embodiments, the processing unit 16708 is configured to: prior to enabling display of the second media player control, detect an input that corresponds to movement of the focus selector over the representation of the second media item (e.g., with the detecting unit 16712); and in response to detecting movement of the focus selector over the representation of the second media item, enable display of the second media player control proximate to the representation of the second media item (e.g., with the display enabling unit 16710).

In some embodiments, the second media player control is configured to play a preview of a subset of the second media item, and the processing unit 16708 is configured to: receive a request to play the entire second media item (e.g., with the receiving unit 16722), and in response to receiving the request to play the entire second media item, associate the second media item with the first media player control (e.g., with the associating unit 16724).

In some embodiments, the first media player control is in a first region of a user interface of the media player application, and the second media player control is in a second region of the user interface of the media player application that is distinct from the first region.

In some embodiments, the media player application includes a plurality of representations of other media items, and at least a subset of the plurality of representations of other media items each include a respective media player control for controlling playback of a preview of a respective media item associated with the respective media player control in accordance with an intensity of a contact on the touch-sensitive surface unit 16704 while a focus selector is over the respective media player control.

The operations in the information processing methods described above are, optionally, implemented by running one or more functional modules in information processing apparatus such as general purpose processors (e.g., as described above with respect to FIGS. 1A and 3) or application specific chips.

The operations described above with reference to FIGS. 12A-12E are, optionally, implemented by components depicted in FIGS. 1A-1B or FIG. 13. For example, detection operation 16620 and determining operation 16622 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations have been described above is merely exemplary and is not intended to indicate that the described order is the only order in which the operations could be performed. One of ordinary skill in the art would recognize various ways to reorder the operations described herein. Additionally, it should be noted that the various processes separately described herein (e.g., those listed in the fifth paragraph of the Description of Embodiments) can be combined with each other in different arrangements. For example, the contacts, user interface objects, tactile sensations, intensity thresholds, and/or focus selectors described above with reference to any one of the various processes separately described herein (e.g., those listed in the fifth paragraph of the Description of Embodiments) optionally have one or more of the characteristics of the contacts, gestures, user interface objects, tactile sensations, intensity thresholds, and focus selectors described herein with reference to one or more of the other methods described herein (e.g., those listed in the fifth paragraph of the Description of Embodiments). For brevity, all of the various possible combinations are not specifically enumerated here, but it should beunderstood that the claims described above may be combined in any way that is not precluded by mutually exclusive claim features.

The foregoing description, for purpose of explanation, has been described with reference to specific embodiments. However, the illustrative discussions above are not intended to be exhaustive or to limit the various described embodiments to the precise forms disclosed. Many modifications and variations are possible in view of the above teachings. The embodiments were chosen and described in order to best explain the principles of the various described embodiments and their practical applications, to thereby enable others skilled in the art to best utilize the various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface and one or more sensors to detect intensity of contacts with the touch-sensitive surface, cause the electronic device to:
    display, on the display, an affordance corresponding to respective content, wherein the affordance is displayed at a respective size;
    while a focus selector is over the affordance, detect a gesture that includes an increase in intensity of the contact on the touch-sensitive surface followed by a subsequent decrease in intensity of the contact on the touch-sensitive surface;
    in response to detecting the increase in intensity of the contact, decrease a size of the affordance below the respective size; and
    in response to detecting the subsequent decrease in intensity of the contact:
        in accordance with a determination that a maximum intensity of the contact is above a content-display intensity threshold, cease to display the affordance and display at least a portion of the respective content, wherein ceasing to display the affordance and displaying at least a portion of the respective content includes displaying an animated transition that includes enlarging the affordance to a size bigger than the respective size and the affordance is dynamically enlarged to the size bigger than the respective size in accordance with the changes in the intensity of the contact over time; and
        in accordance with a determination that a maximum intensity of the contact is below the content-display intensity threshold, increase the size of the affordance to the respective size without increasing the size of the affordance to the size bigger than the respective size and forgo displaying the respective content.

2. The non-transitory computer readable storage medium of claim 1, wherein detecting the subsequent decrease in intensity of the contact includes detecting liftoff of the contact from the touch-sensitive surface.

3. The non-transitory computer readable storage medium of claim 1, wherein detecting the subsequent decrease in intensity of the contact includes detecting a reduction in intensity of the contact below a respective intensity threshold while continuing to detect the contact on the touch-sensitive surface.

4. The non-transitory computer readable storage medium of claim 1, wherein ceasing to display the affordance and displaying at least a portion of the respective content includes displaying an animated transition of the affordance transforming into the portion of the respective content.

5. The non-transitory computer readable storage medium of claim 1, wherein ceasing to display the affordance and displaying at least a portion of the respective content includes displaying an animated transition that includes:
    displaying an animation of the affordance rotating about an axis parallel to the display to reveal the portion of the respective content that is on a simulated back side of the affordance.

6. The non-transitory computer readable storage medium of claim 1, wherein the affordance is a thumbnail image that includes a reduced scale representation of the respective content.

7. The non-transitory computer readable storage medium of claim 1, wherein the affordance is displayed in an array of affordances.

8. The non-transitory computer readable storage medium of claim 1, wherein:
    the affordance is an application icon corresponding to a respective application; and
    the respective content is a newly initialized application window associated with the application.

9. The non-transitory computer readable storage medium of claim 1, wherein:
    the affordance is a document icon corresponding to an electronic document; and
    the respective content is the electronic document.

10. The non-transitory computer readable storage medium of claim 1, wherein:
    the affordance is a representation of a cached version of a webpage; and
    the respective content is the webpage.

11. The non-transitory computer readable storage medium of claim 1, wherein:
the affordance is a thumbnail of a photo; and
the respective content is the photo.

12. The non-transitory computer readable storage medium of claim 1, wherein:
the affordance is a thumbnail of a video; and
the content is the video or a frame of the video.

13. An electronic device, comprising:
a display;
a touch-sensitive surface;
one or more sensors to detect intensity of contacts with the touch-sensitive surface;
one or more processors;
memory; and
one or more programs, wherein the one or more programs are stored in the memory and configured to be executed by the one or more processors, the one or more programs including instructions for:
displaying, on the display, an affordance corresponding to respective content, wherein the affordance is displayed at a respective size;
while a focus selector is over the affordance, detecting a gesture that includes an increase in intensity of the contact on the touch-sensitive surface followed by a subsequent decrease in intensity of the contact on the touch-sensitive surface;
in response to detecting the increase in intensity of the contact, decreasing a size of the affordance below the respective size; and
in response to detecting the subsequent decrease in intensity of the contact:
in accordance with a determination that a maximum intensity of the contact is above a content-display intensity threshold, ceasing to display the affordance and displaying at least a portion of the respective content, wherein ceasing to display the affordance and displaying at least a portion of the respective content includes displaying an animated transition that includes enlarging the affordance to a size bigger than the respective size and the affordance is dynamically enlarged to the size bigger than the respective size in accordance with the changes in the intensity of the contact over time; and
in accordance with a determination that a maximum intensity of the contact is below the content-display intensity threshold, increasing the size of the affordance to the respective size without increasing the size of the affordance to the size bigger than the respective size and forgoing displaying the respective content.

14. The electronic device of claim 13, wherein detecting the subsequent decrease in intensity of the contact includes detecting liftoff of the contact from the touch-sensitive surface.

15. The electronic device of claim 13, wherein detecting the subsequent decrease in intensity of the contact includes detecting a reduction in intensity of the contact below a respective intensity threshold while continuing to detect the contact on the touch-sensitive surface.

16. The electronic device of claim 13, wherein ceasing to display the affordance and displaying at least a portion of the respective content includes displaying an animated transition of the affordance transforming into the portion of the respective content.

17. The electronic device of claim 13, wherein ceasing to display the affordance and displaying at least a portion of the respective content includes displaying an animated transition that includes:
displaying an animation of the affordance rotating about an axis parallel to the display to reveal the portion of the respective content that is on a simulated back side of the affordance.

18. The electronic device of claim 13, wherein the affordance is a thumbnail image that includes a reduced scale representation of the respective content.

19. The electronic device of claim 13, wherein the affordance is displayed in an array of affordances.

20. The electronic device of claim 13, wherein:
the affordance is an application icon corresponding to a respective application; and
the respective content is a newly initialized application window associated with the application.

21. The electronic device of claim 13, wherein:
the affordance is a document icon corresponding to an electronic document; and
the respective content is the electronic document.

22. The electronic device of claim 13, wherein:
the affordance is a representation of a cached version of a webpage; and
the respective content is the webpage.

23. The electronic device of claim 13, wherein:
the affordance is a thumbnail of a photo; and
the respective content is the photo.

24. The electronic device of claim 13, wherein:
the affordance is a thumbnail of a video; and
the content is the video or a frame of the video.

25. A method, comprising:
at an electronic device with a touch-sensitive surface and a display, wherein the device includes one or more sensors to detect intensity of contacts with the touch-sensitive surface:
displaying, on the display, an affordance corresponding to respective content, wherein the affordance is displayed at a respective size;
while a focus selector is over the affordance, detecting a gesture that includes an increase in intensity of the contact on the touch-sensitive surface followed by a subsequent decrease in intensity of the contact on the touch-sensitive surface;
in response to detecting the increase in intensity of the contact, decreasing a size of the affordance below the respective size; and
in response to detecting the subsequent decrease in intensity of the contact:
in accordance with a determination that a maximum intensity of the contact is above a content-display intensity threshold, ceasing to display the affordance and displaying at least a portion of the respective content, wherein ceasing to display the affordance and displaying at least a portion of the respective content includes displaying an animated transition that includes enlarging the affordance to a size bigger than the respective size and the affordance is dynamically enlarged to the size bigger than the respective size in accordance with the changes in the intensity of the contact over time; and
in accordance with a determination that a maximum intensity of the contact is below the content-display intensity threshold, increasing the size of the affordance to the respective size without increasing the size of the affordance to the size bigger than the respective size and forgoing displaying the respective content.

26. The method of claim 25, wherein detecting the subsequent decrease in intensity of the contact includes detecting liftoff of the contact from the touch-sensitive surface.

27. The method of claim 25, wherein detecting the subsequent decrease in intensity of the contact includes detecting a reduction in intensity of the contact below a respective intensity threshold while continuing to detect the contact on the touch-sensitive surface.

28. The method of claim 25, wherein ceasing to display the affordance and displaying at least a portion of the respective content includes displaying an animated transition of the affordance transforming into the portion of the respective content.

29. The method of claim 25, wherein ceasing to display the affordance and displaying at least a portion of the respective content includes displaying an animated transition that includes:
  displaying an animation of the affordance rotating about an axis parallel to the display to reveal the portion of the respective content that is on a simulated back side of the affordance.

30. The method of claim 25, wherein the affordance is a thumbnail image that includes a reduced scale representation of the respective content.

31. The method of claim 25, wherein the affordance is displayed in an array of affordances.

32. The method of claim 25, wherein:
  the affordance is an application icon corresponding to a respective application; and
  the respective content is a newly initialized application window associated with the application.

33. The method of claim 25, wherein:
  the affordance is a document icon corresponding to an electronic document; and
  the respective content is the electronic document.

34. The method of claim 25, wherein:
  the affordance is a representation of a cached version of a webpage; and
  the respective content is the webpage.

35. The method of claim 25, wherein:
  the affordance is a thumbnail of a photo; and
  the respective content is the photo.

36. The method of claim 25, wherein:
  the affordance is a thumbnail of a video; and
  the content is the video or a frame of the video.

* * * * *